United States Patent
Kimura et al.

(10) Patent No.: US 12,534,544 B2
(45) Date of Patent: Jan. 27, 2026

(54) SOLID TITANIUM CATALYST COMPONENT, OLEFIN POLYMERIZATION CATALYST, OLEFIN POLYMERIZATION METHOD, AND PROPYLENE POLYMER

(71) Applicant: MITSUI CHEMICALS, INC., Tokyo (JP)

(72) Inventors: Takashi Kimura, Hatsukaichi (JP); Makoto Isogai, Hatsukaichi (JP); Yasushi Nakayama, Hiroshima (JP); Kenji Michiue, Otake (JP); Takashi Jinnai, Hiroshima (JP); Wataru Yamada, Chiba (JP); Shotaro Takano, Ichikawa (JP); Hiroshi Terao, Chiba (JP); Takaaki Yano, Ichihara (JP); Yoshiyuki Totani, Ichihara (JP); Sunil Krzysztof Moorthi, Ichihara (JP); Takashi Nakano, Narashino (JP)

(73) Assignee: MITSUI CHEMICALS, INC., Tokyo (JP)

(*) Notice: Subject to any disclaimer, the term of this patent is extended or adjusted under 35 U.S.C. 154(b) by 319 days.

(21) Appl. No.: 18/022,478

(22) PCT Filed: Aug. 26, 2021

(86) PCT No.: PCT/JP2021/031282
§ 371 (c)(1),
(2) Date: Feb. 21, 2023

(87) PCT Pub. No.: WO2022/045232
PCT Pub. Date: Mar. 3, 2022

(65) Prior Publication Data
US 2024/0067763 A1    Feb. 29, 2024

(30) Foreign Application Priority Data

Aug. 26, 2020  (JP) .................. 2020-142571

(51) Int. Cl.
*C08F 4/16*    (2006.01)
*C08F 10/06*   (2006.01)

(52) U.S. Cl.
CPC ............ *C08F 4/16* (2013.01); *C08F 10/06* (2013.01); *C08F 2410/04* (2013.01)

(58) Field of Classification Search
None
See application file for complete search history.

(56) References Cited

U.S. PATENT DOCUMENTS 2,938,049 A    5/1960   Johnson et al.
6,403,708 B2   6/2002   Moriya et al.
(Continued)

FOREIGN PATENT DOCUMENTS

CA    1174225 A    9/1984
CA    1185960 A    4/1985
(Continued)

OTHER PUBLICATIONS

Kolesnikov, "Catalysis in the gas and oil industry", M.: Publishing House, 2012, p. 116.
(Continued)

*Primary Examiner* — Catherine S Branch
(74) *Attorney, Agent, or Firm* — Foley & Lardner LLP

(57) ABSTRACT

The solid titanium catalyst component (I) of the present invention contains titanium, magnesium, halogen, and a cyclic multiple-ester-group-containing compound (a) represented by the following formula (1).

(Continued)

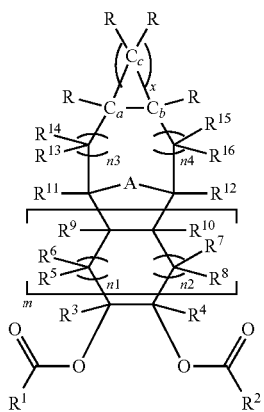

(1)

13 Claims, 4 Drawing Sheets

(56) References Cited

U.S. PATENT DOCUMENTS

| 7,388,061 | B2 | 6/2008 | Gao et al. |
| 7,649,062 | B2 | 1/2010 | Matsunaga et al. |
| 7,888,437 | B2 | 2/2011 | Matsunaga et al. |
| 8,742,040 | B2 | 6/2014 | Matsunaga et al. |
| 9,034,781 | B2 | 5/2015 | Kim et al. |
| 9,045,572 | B2 | 6/2015 | Kim et al. |
| 2005/0239636 | A1 | 10/2005 | Gao et al. |
| 2008/0097050 | A1 | 4/2008 | Matsunaga et al. |
| 2008/0125555 | A1 | 5/2008 | Matsunaga et al. |
| 2008/0306228 | A1 | 12/2008 | Matsunaga et al. |
| 2009/0069515 | A1 | 3/2009 | Matsunaga et al. |
| 2009/0203855 | A1 | 8/2009 | Matsunaga et al. |
| 2010/0144991 | A1 | 6/2010 | Zhu et al. |
| 2010/0305285 | A1 | 12/2010 | Matsunaga et al. |
| 2013/0017946 | A1 | 1/2013 | Kim et al. |
| 2013/0237406 | A1 | 9/2013 | Kim et al. |

FOREIGN PATENT DOCUMENTS

| CA | 1185961 A | 4/1985 |
| CN | 101195668 A | 6/2008 |
| CN | 108250335 A | 7/2018 |
| EP | 0 903 356 A1 | 3/1999 |
| JP | S5763310 A | 4/1982 |
| JP | 2005-517746 A | 6/2005 |
| JP | 2010-132904 A | 6/2010 |
| JP | 2012-241056 A | 12/2012 |
| RU | 2441028 C2 | 1/2012 |
| RU | 2443715 C1 | 2/2012 |
| WO | WO-2006/077945 A1 | 7/2006 |
| WO | WO-2006/077946 A1 | 7/2006 |
| WO | WO-2008/010459 A1 | 1/2008 |
| WO | WO-2011/087231 A2 | 7/2011 |

OTHER PUBLICATIONS

Office Action issued in corresponding Russian Patent Application No. 2023103767 dated Sep. 21, 2023 (10 pages).

Rishina, et al., "Polymerization Of 3-Methylbutene-1 in the Presence of Heterogeneous Titanium-Magnesium Catalysts and Homogeneous Metallocene Catalysts", High-molecular compounds, Series A, 2003, vol. 45, No. 3, pp. 383-389.

Shmakov, et al., "Catalysts for stereospecific polymerization of propylene: a study of the influence of structural characteristics of donors", Bulletin of PNRPU, Chemical Technology and Biotechnology, 2018, No. 2, pp. 120-136.

Taffin et al., "Diels-Alder reaction of vinylene carbonate and 2,5-dimethylfuran: kinetic vs. thermodynamic control", New Journal of Chemistry, Jan. 19, 2010, vol. 34, pp. 517-525.

[Fig. 1]
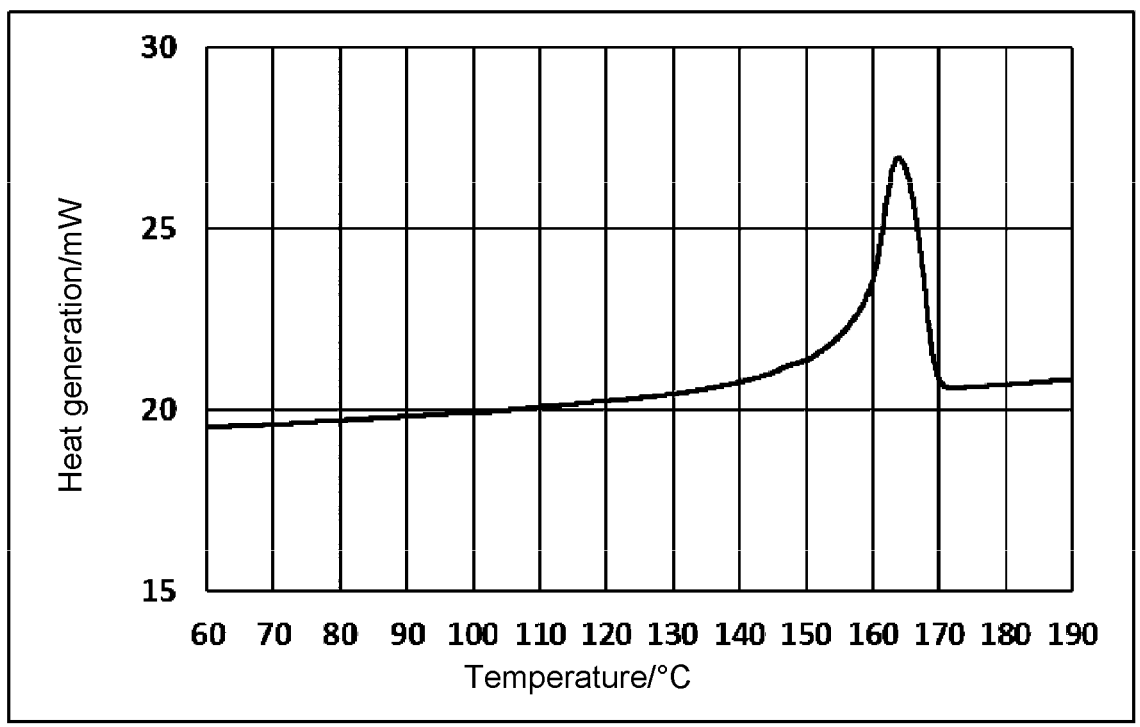
[Fig. 2]
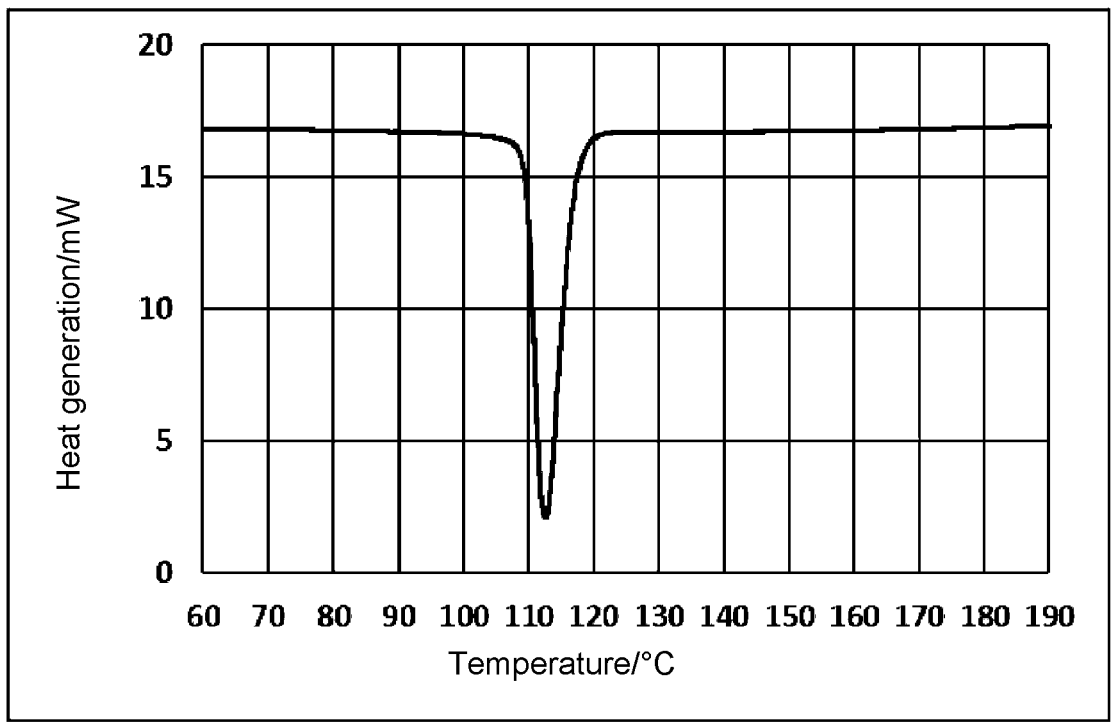

[Fig. 3]
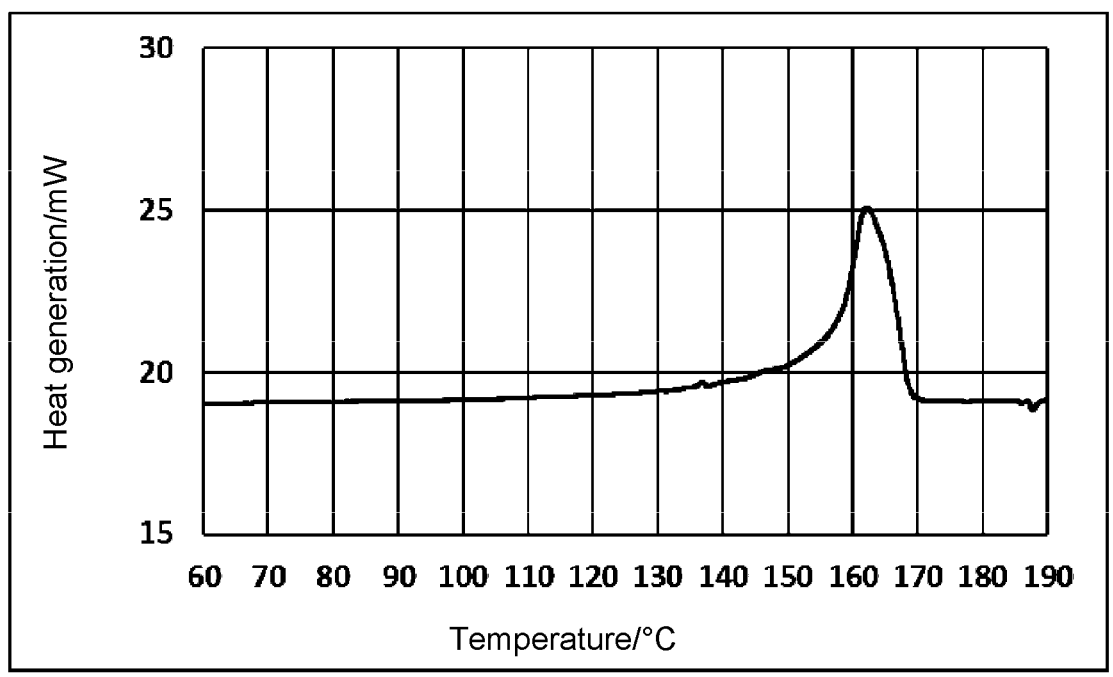
[Fig. 4]
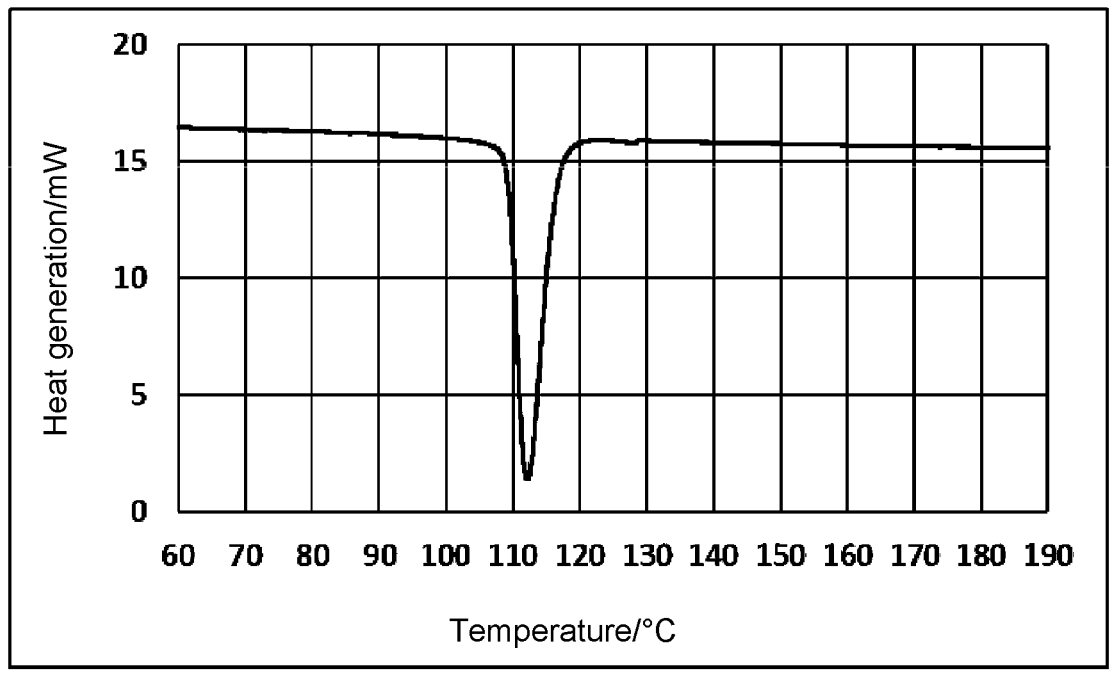

[Fig. 5]
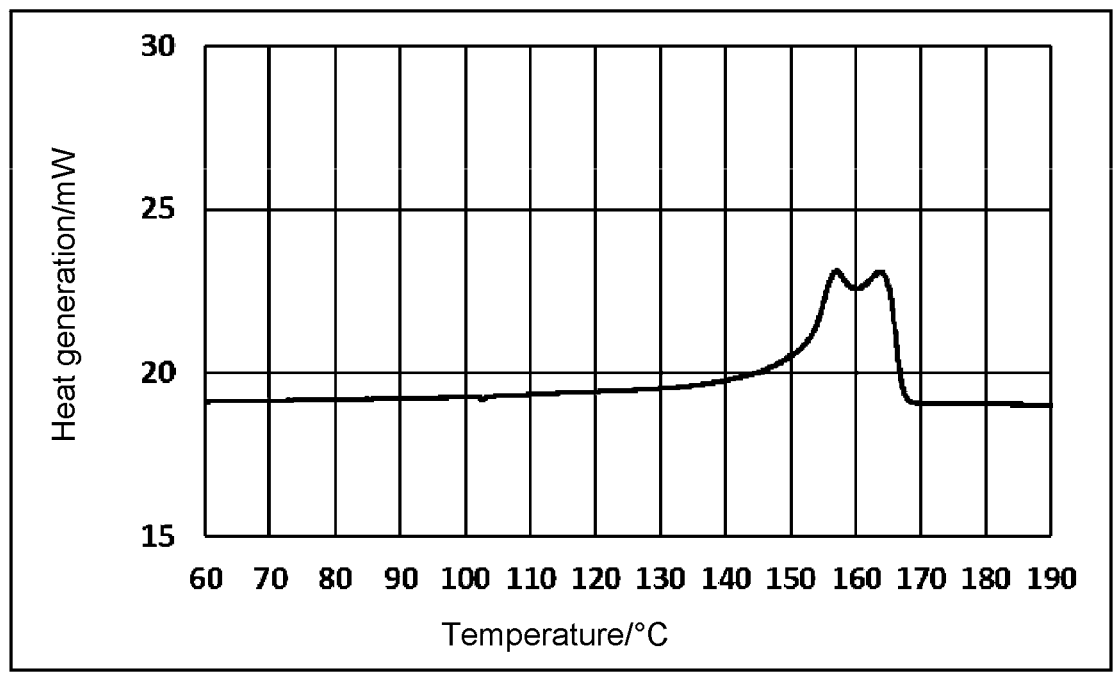
[Fig. 6]
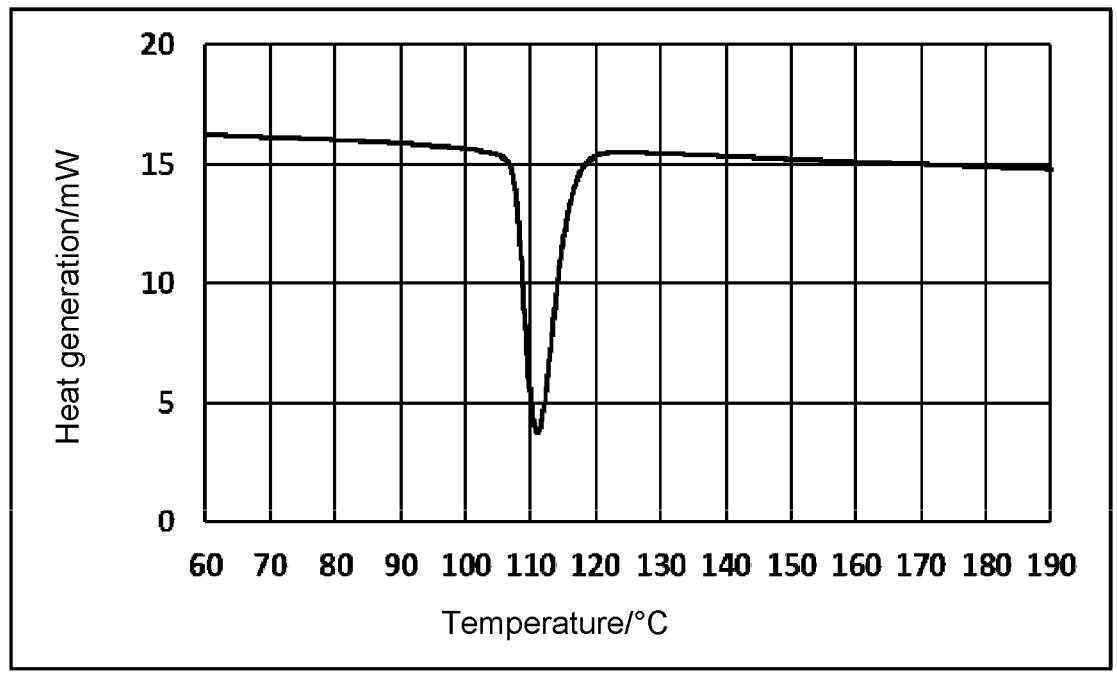

[Fig. 7]
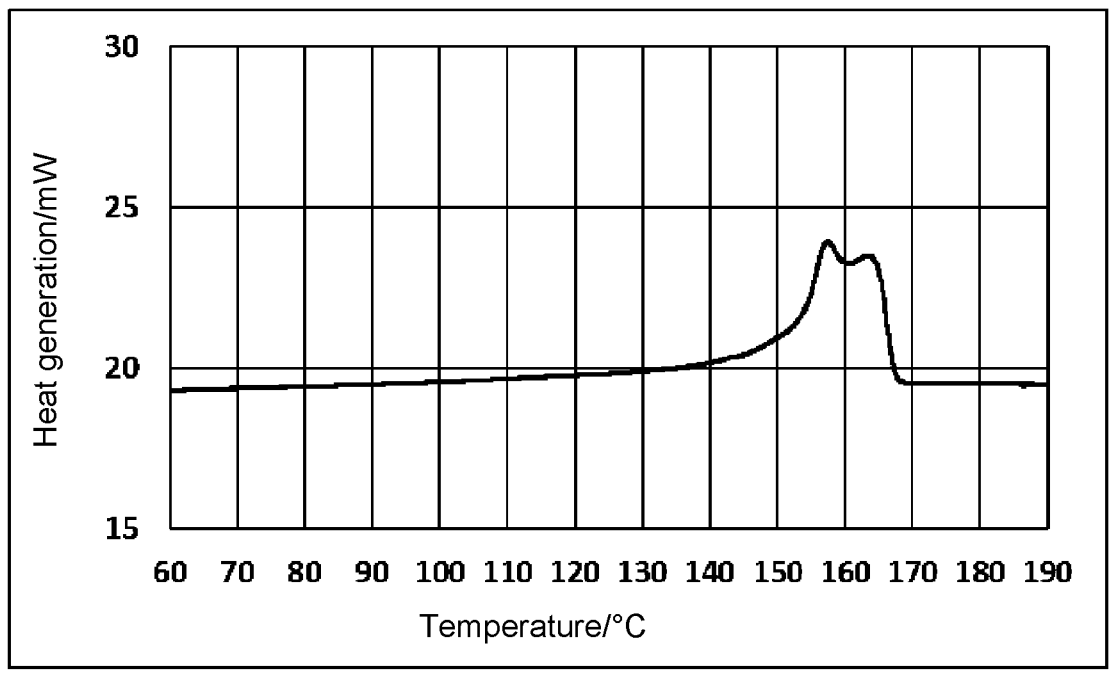
[Fig. 8]
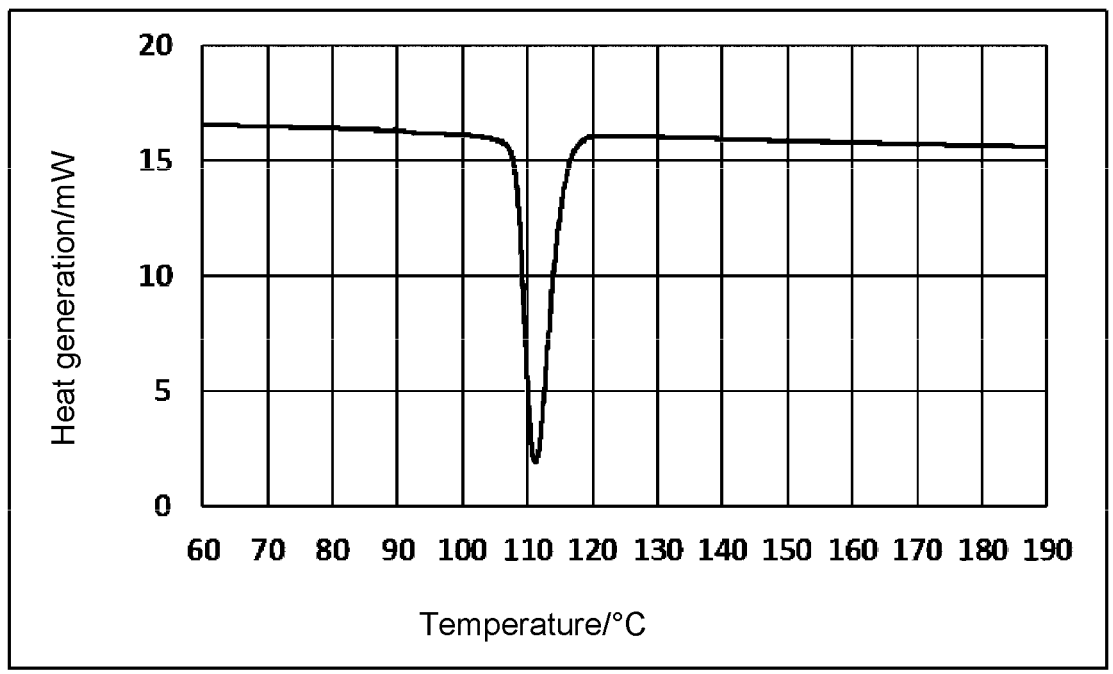

SOLID TITANIUM CATALYST COMPONENT, OLEFIN POLYMERIZATION CATALYST, OLEFIN POLYMERIZATION METHOD, AND PROPYLENE POLYMER

CROSS-REFERENCE TO RELATED APPLICATIONS

The present application claims priority under 35 U.S.C. § 371 to International Patent Application No. PCT/JP2021/031282, filed Aug. 26, 2021, which claims priority to and the benefit of Japanese Patent Application No. 2020-142571, filed on Aug. 26, 2020. The contents of these applications are hereby incorporated by reference in their entireties.

TECHNICAL FIELD

The present invention relates to a solid titanium catalyst component, a catalyst for olefin polymerization containing the solid titanium catalyst component, an olefin polymerization method involving the catalyst for olefin polymerization, and a propylene polymer.

BACKGROUND ART

To date, known catalysts that are used to produce an olefin polymer such as an α-olefin homopolymer or an ethylene/α-olefin copolymer include catalysts containing a titanium compound supported on an activated magnesium halide. Hereinafter, "homopolymerization" and "copolymerization" may be collectively referred to as "polymerization".

For example, catalysts containing titanium tetrachloride or titanium trichloride called Ziegler-Natta catalysts, and catalysts containing an organometallic compound and a solid titanium catalyst component composed of magnesium, titanium, halogen, and an electron donor are widely known as such catalysts for olefin polymerization.

The latter catalysts show high activity in the polymerization of α-olefins such as ethylene, propylene, and 1-butene. The resulting α-olefin polymers may have high stereoregularity.

It is reported that excellent polymerization activity and stereospecificity are demonstrated when, among the above catalysts, a catalyst composed of a solid titanium catalyst component carrying an electron donor selected from carboxylic acid esters typically represented by phthalic acid esters, an aluminum-alkyl compound as a cocatalyst component, and a silicon compound having at least one Si—OR (wherein R is a hydrocarbon group) is used in particular (e.g., Patent Literature 1). In addition to phthalic acid esters, a large number of electron donors such as polyether compounds are being researched.

Concerning the research involving an ester compound as an electron donor, a catalyst containing a carboxylic acid ester having two or more ester groups (e.g., Patent Literature 2) is also disclosed. The present applicant also reported that an ester compound having a specific cyclic structure provides, in a highly active manner, a polyolefin having a broad molecular weight distribution (Patent Literature 3).

A catalyst having a substituted succinic acid ester as an electron donor is reported as a catalyst that provides a polyolefin having a broad molecular weight distribution. The present applicant also reported a catalyst containing a polycarboxylic acid ester having a specific cyclic structure (Patent Literature 4).

CITATION LIST

Patent Literature

Patent Literature 1: JP57-63310A
Patent Literature 2: JP2005-517746A
Patent Literature 3: WO2008/010459
Patent Literature 4: WO2006/077945

SUMMARY OF INVENTION

Technical Problem

Polypropylene (a propylene polymer) representing a polymer of an olefin having 3 or more carbon atoms is known to have a potential to show heat resistance and rigidity comparable to general-purpose engineering plastics while having a hydrocarbon structure. Polyolefin, which is a hydrocarbon structure, is a material entailing relatively low environmental burdens by barely generating toxic gas during combustive disposal or thermal recycle (a recycling method for recovering the thermal energy of combustion as, e.g., electric power).

It is also known that the heat resistance of the propylene polymer is greatly dependent on the stereoregularity thereof, and that the rigidity is affected by not only the stereoregularity but also the molecular weight distribution. While techniques have been developed that control stereoregularity to a considerable degree, it is expected with recent advancement of molding technology that polymers having higher stereoregularity may exhibit unexpected physical properties. Simultaneously having a broader molecular weight distribution may further improve the physical-property balance as well. On the other hand, from the viewpoint of environmental protection and economy, development of catalysts showing higher activity is required.

Accordingly, an object of the present invention is to provide a solid titanium catalyst component, a catalyst for olefin polymerization, and an olefin polymerization method that enable an olefin polymer having a higher stereoregularity and a better molecular weight distribution than conventional polymers to be produced in a highly active manner.

Solution to Problem

As a result of diligent research, the present inventors have found that a solid titanium catalyst component containing a polyvalent ester compound having a specific alicyclic structure enables a polymer having a broad molecular weight distribution and an extremely high stereoregularity to be produced in a highly active manner, and have completed the present invention. The present invention relates to the following [1] to [15] for example.

[1] A solid titanium catalyst component (I) comprising titanium, magnesium, halogen, and a cyclic multiple-ester-group-containing compound (a) represented by the following formula (1):

[Chem. 1]

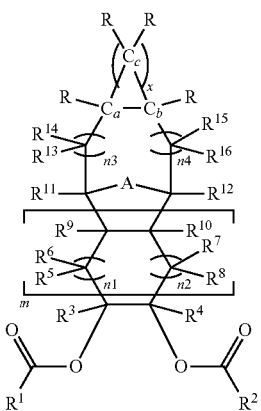

(1)

wherein n1 to n4 are each independently an integer of 0 to 2, m is 0 or 1, and x is an integer of 0 to 10, with a relationship of m+x≥1 being satisfied;

$R^1$ and $R^2$ are each independently a substituted or unsubstituted hydrocarbon group having 1 to 20 carbon atoms; $R^3$ to $R^{16}$ and R are each independently a hydrogen atom, a substituted or unsubstituted hydrocarbon group having 1 to 20 carbon atoms, or a halogen atom; a hydrogen atom, a carbon atom, or both, of $R^1$ to $R^{16}$ and R are optionally replaced by at least one atom selected from the group consisting of a nitrogen atom, an oxygen atom, a phosphorus atom, a halogen atom, and a silicon atom; and two or more selected from $R^3$ to $R^{16}$ and R are optionally bonded to one another to form a monocyclic or polycyclic ring, and adjacent substituents are optionally directly bonded to form a multiple bond;

$C_a$, $C_b$, and $C_c$ are carbon atoms, and in a carbon-carbon bond of a cyclic structure formed of $C_a$, $C_b$, and $C_c$, R bonded to adjacent carbon are optionally directly bonded to one another to form a multiple bond; and A is a single bond or a divalent linking group having a chain with a length of 1 to 3 atoms between two free radicals.

[2] The solid titanium catalyst component (I) according to [1], wherein in the formula (1), a moiety in which two or more selected from $R^3$ to $R^{16}$ and R are bonded to one another to form a monocyclic or polycyclic ring is a structure containing a carbon-carbon double bond.

[3] The solid titanium catalyst component (I) according to [1], wherein in the formula (1), a moiety in which two or more selected from $R^3$ to $R^{16}$ and R are bonded to one another to form a monocyclic or polycyclic ring further contains a monocyclic or polycyclic structure.

[4] The solid titanium catalyst component (I) according to [1], wherein A is a divalent group selected from the following general formula group (2):

[Chem. 2]

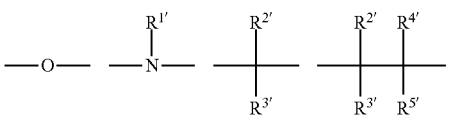

(2)

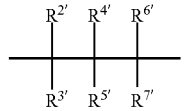

-continued wherein $R^{1'}$ to $R^{7'}$ each independently represent a hydrogen atom, a substituted or unsubstituted alkyl group, a substituted or unsubstituted cycloalkyl group, a substituted or unsubstituted aryl group, or a substituted or unsubstituted heteroaryl group; and $R^{2'}$ to $R^{7'}$ are optionally bonded to one another to form a monocyclic or polycyclic ring, or adjacent substituents are optionally directly bonded to each other to form a multiple bond.

[5] The solid titanium catalyst component (I) according to [1], wherein x is 2 to 6.

[6] The solid titanium catalyst component (I) according to [1], wherein n1 and n2 are 1.

[7] The solid titanium catalyst component (I) according to [1], wherein n3 and n4 are 0.

[8] The solid titanium catalyst component (I) according to [1], wherein $R^1$ and $R^2$ are a substituted or unsubstituted alkyl group, a substituted or unsubstituted alkenyl group, a substituted or unsubstituted cycloalkyl group, a substituted or unsubstituted aryl group, or a substituted or unsubstituted heteroaryl group.

[9] The solid titanium catalyst component (I) according to [1], wherein $R^3$ to $R^{16}$ are each independently a hydrogen atom, a substituted or unsubstituted alkyl group, a substituted or unsubstituted alkenyl group, a substituted or unsubstituted cycloalkyl group, a substituted or unsubstituted cycloalkenyl group, a substituted or unsubstituted alkoxy group, a substituted or unsubstituted alkenyloxy group, a substituted or unsubstituted cycloalkyloxy group, a substituted or unsubstituted cycloalkenyloxy group, a substituted or unsubstituted aryl group, a substituted or unsubstituted aryloxy group, a substituted or unsubstituted heteroaryl group, or a substituted or unsubstituted heteroaryloxy group.

[10] The solid titanium catalyst component (I) according to [1], wherein R is each independently a hydrogen atom, a substituted or unsubstituted alkyl group, a substituted or unsubstituted alkenyl group, a substituted or unsubstituted cycloalkyl group, a substituted or unsubstituted cycloalkenyl group, a substituted or unsubstituted alkoxy group, a substituted or unsubstituted alkenyloxy group, a substituted or unsubstituted cycloalkyloxy group, a substituted or unsubstituted cycloalkenyloxy group, a substituted or unsubstituted aryl group, a substituted or unsubstituted aryloxy group, a substituted or unsubstituted heteroaryl group, or a substituted or unsubstituted heteroaryloxy group.

[11] A catalyst for olefin polymerization, comprising: the solid titanium catalyst component (I) according to [1]; and an organometallic compound catalyst component (II) comprising a metal element selected from Group 1, Group 2, and Group 13 of the periodic table.

[12] The catalyst for olefin polymerization according to [11], further comprising an electron donor (III).

[13] An olefin polymerization method, comprising polymerizing an olefin in the presence of the catalyst for olefin polymerization according to [11] or [12].

[14] A propylene polymer, having a melt flow rate (MFR) determined under conditions of a measurement temperature of 230° C. in accordance with ASTM 1238 standard, in a range of 0.01 g/10 min or more and 1000 g/10 min or less, and having a maximum temperature (Tm-maxv) at which heat absorption is zero in differential scanning calorimetry (DSC) at a heating condition of 10° C./min, of 169.0° C. or higher and 220° C. or lower, wherein the propylene polymer satisfies two or more of the following requirements (p), (q), and (r):

(p) Mz/Mw determined by gel permeation chromatography (GPC) is 3.50 or more and 5.65 or less;

(q) a difference between Mw/Mn and Mz/Mw determined by GPC is 8.3 or less; and (r) a decane soluble component content (C10sol.) (/wt %) and MFR (/(g/10 min)) satisfy the following relational expression:

(C10*sol.*)−4/3×Log(*MFR*)≤2.30.

[15] The propylene polymer according to [14], further satisfying the following requirement (s):

(s) temperature (Tm-maxt) at an intersection of a baseline and a tangent of an endothermic curve in a temperature range not lower than Tm of a chart obtained by differential scanning calorimetry (DSC) at a heating condition of 10° C./min is 168.1° C. or higher and 210° C. or lower.

Advantageous Effects of Invention

According to the present invention, an olefin polymer having extremely high stereoregularity, showing properties of a high melting point and molecular weight dependency of heat of fusion, and having a broad molecular weight distribution can be produced in a highly active manner.

It can be expected that the use of the solid titanium catalyst component, the catalyst for olefin polymerization, and the olefin polymerization method of the present invention enables an olefin polymer having, for example, not only moldability and rigidity but also higher heat resistance to be produced.

BRIEF DESCRIPTION OF DRAWINGS

FIG. 1 FIG. 1 is a chart of DSC measurement (conditions during second heating) of the polymer of Example 1.

FIG. 2 FIG. 2 is a chart of DSC measurement (conditions during cooling) of the polymer of Example 1.

FIG. 3 FIG. 3 is a chart of DSC measurement (conditions during second heating) of the polymer of Example 2.

FIG. 4 FIG. 4 is a chart of DSC measurement (conditions during cooling) of the polymer of Example 2.

FIG. 5 FIG. 5 is a chart of DSC measurement (conditions during second heating) of the polymer of Comparative Example 1.

FIG. 6 FIG. 6 is a chart of DSC measurement (conditions during cooling) of the polymer of Comparative Example 1.

FIG. 7 FIG. 7 is a chart of DSC measurement (conditions during second heating) of the polymer of Comparative Example 2.

FIG. 8 FIG. 8 is a chart of DSC measurement (conditions during cooling) of the polymer of Comparative Example 2.

DESCRIPTION OF EMBODIMENT

Hereinafter, the solid titanium catalyst component (I), the catalyst for olefin polymerization, the olefin polymer production method, and the propylene polymer according to the present invention will now be described in detail.

[Solid Titanium Catalyst Component (I)]

The solid titanium catalyst component (I) according to the present invention contains titanium, magnesium, halogen, and a polyvalent ester compound having a specific cyclic structure (hereinafter also referred to as "a cyclic multiple-ester-group-containing compound (a)").

<Cyclic Multiple-Ester-Group-Containing Compound (a)>

The cyclic multiple-ester-group-containing compound (a) is represented by the following formula (1):

[Chem. 3]

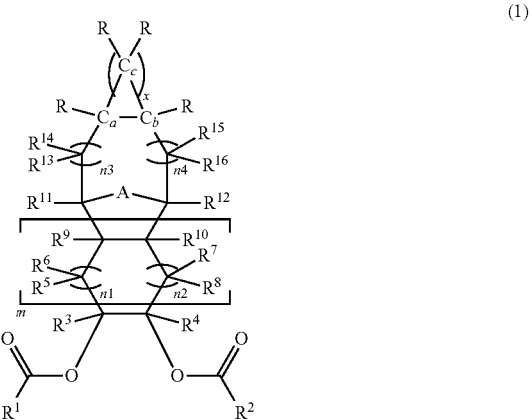

(1)

wherein n1 to n4 are each independently an integer of 0 to 2, m is 0 or 1, and x is an integer of 0 to 10, with a relationship of m+x≥1 being satisfied;

$R^1$ and $R^2$ are each independently a substituted or unsubstituted hydrocarbon group having 1 to 20 carbon atoms; $R^3$ to $R^{16}$ and R are each independently a hydrogen atom, a substituted or unsubstituted hydrocarbon group having 1 to 20 carbon atoms, or a halogen atom; a hydrogen atom, a carbon atom, or both, of $R^1$ to $R^{16}$ and R are optionally replaced by at least one atom selected from the group consisting of a nitrogen atom, an oxygen atom, a phosphorus atom, a halogen atom, and a silicon atom; and two or more selected from $R^3$ to $R^{16}$ and R are optionally bonded to one another to form a monocyclic or polycyclic ring, and adjacent substituents are optionally directly bonded to form a multiple bond;

$C_a$, $C_b$, and $C_c$ are carbon atoms, and in a carbon-carbon bond of a cyclic structure formed of $C_a$, $C_b$, and $C_c$, R bonded to adjacent carbon are optionally directly bonded to one another to form a multiple bond; and A is a single bond or a divalent linking group having a chain with a length of 1 to 3 atoms between two free radicals.

n1 to n4 described above are numerical values relating to the size of the cyclic structure, and are preferably 0 to 1, and more preferably 0. The numerical values n1 to n4 described above may be the same or different, and can be selected according to the purpose. Particularly preferably, n1 and n2 are 0. Also, n3 and n4 are particularly preferably 0.

The m is a numerical value mainly relating to the chain structure of a monocyclic structure moiety, and the x is a numerical value relating to the size of the cyclic structure of a so-called terminal moiety that is away from the ester groups. m is 0 or 1, and preferably 0. x is 0 to 10, and a preferable upper limit is 8, more preferably 6, and even more preferably 5. While the lower limit of x is 0 as described above, a preferable lower limit is 2 when x is a natural number.

The relationship m+x≥1 is satisfied. This indicates that when m is 0, the cyclic structure containing carbon atoms $C_a$, $C_b$, and $C_c$ is essential, and that when m is 1, the cyclic structure containing carbon atoms $C_a$, $C_b$, and $C_c$ may be absent. $C_a$, $C_b$, and $C_c$ all represent carbon atoms, and a, b, and c are symbols for specifying the positions. The upper limit of m+x is preferably 10, more preferably 8, even more preferably 6, and particularly preferably 5.

$R^1$ and $R^2$ are each independently a substituted or unsubstituted hydrocarbon group having 1 to 20 carbon atoms and preferably a hydrocarbon that has an aryl group and 6 to 20 carbon atoms preferably and may have a structure containing a heteroatom as described below.

$R^3$ to $R^{16}$ and R are each independently a hydrogen atom, a substituted or unsubstituted hydrocarbon group having 1 to 20 carbon atoms, or a halogen atom.

A hydrogen atom, a carbon atom, or both in $R^1$ to $R^{16}$ and R may be partially replaced by at least one atom selected from the group consisting of a nitrogen atom, an oxygen atom, a phosphorus atom, a halogen atom, and a silicon atom. That is to say, embodiments of $R^1$ to $R^{16}$ and R include hydrocarbon groups containing nitrogen, oxygen, phosphorus, halogen, and silicon. The elements may be replaced at one or multiple positions.

Concerning $R^3$ to $R^{16}$ and R, adjacent substituents may be directly bonded to form a carbon-carbon double bond or triple bond. Accordingly, the cyclic structure of the formula (1) may contain an aryl structure.

$R^1$ and $R^2$ may be bonded to one another to form a ring structure. In addition, a substituent selected from the group consisting of $R^1$ and $R^2$ and a substituent selected from the group consisting of $R^3$ to $R^{16}$ and R may be bonded to one another to form a ring structure.

At least one of the substituents R and $R^3$ to $R^{16}$ may be preferably a substituent other than hydrogen from the viewpoint of a balance between activity, stereoregularity, and other properties. Moreover, one or more carbon atoms that form the cyclic structure may preferably be quaternary carbon.

Embodiments of $R^3$ to $R^{16}$ and R also include those in which $R^3$ to $R^{16}$ and R are bonded to one another to form a cyclic structure. The moiety that forms the ring may have a monocyclic structure as well as a polycyclic structure. The moiety that forms the ring is preferably a structure having a double structure and a further cyclic structure. More preferably, the further cyclic structure is a structure having a double bond. The double bond is even more preferably a carbon-carbon double bond. The carbon-carbon double bond includes an aromatic structure. The specific structure of the moiety that forms the ring is the same as the specific structure of A described below.

The hydrocarbon group is a monovalent hydrocarbon group having 1 to 20 carbon atoms, preferably 1 to 10 carbon atoms, more preferably 2 to 8 carbon atoms, even more preferably 4 to 8 carbon atoms, and particularly preferably 4 to 6 carbon atoms. Examples of the hydrocarbon group include aliphatic hydrocarbon groups, alicyclic hydrocarbon groups, and aromatic hydrocarbon groups, such as a methyl group, an ethyl group, an n-propyl group, an isopropyl group, a n-butyl group, an isobutyl group, a hexyl group, a heptyl group, an octyl group, a 2-ethylhexyl group, a decyl group, a dodecyl group, a tetradecyl group, a hexadecyl group, an octadecyl group, an eicosyl group, a cyclohexyl group, a substituted or unsubstituted aryl group such as a phenyl group, and a substituted or unsubstituted cycloalkenyl group. The alicyclic hydrocarbon groups and the aromatic hydrocarbon groups may contain a substituent. Among these, for example, a n-butyl group, an isobutyl group, a hexyl group, an octyl group, and a phenyl group are preferable, and a n-butyl group, an isobutyl group, and a phenyl group are even more preferable.

$R^1$ to $R^{16}$ and R may be hydrocarbon groups containing nitrogen, oxygen, phosphorus, halogen, and silicon. Such substituents can be selected from known structures. More specifically, preferable examples include a carbonyl structure-containing group such as a carboxylic acid ester group, an aldehyde group, an acetyl group, or an oxycarbonylalkyl group, an alkoxy group, a substituted or unsubstituted alkoxy group, a substituted or unsubstituted alkenyloxy group, a substituted or unsubstituted cycloalkyloxy group, a substituted or unsubstituted cycloalkenyloxy group, a substituted or unsubstituted aryloxy group, a substituted or unsubstituted heteroaryl group, a substituted or unsubstituted heteroaryloxy group, and a siloxy group.

Among those described above, $R^3$ to $R^{16}$ and R are preferably a hydrogen atom, a substituted or unsubstituted alkyl group, a substituted or unsubstituted alkenyl group, a substituted or unsubstituted cycloalkyl group, a substituted or unsubstituted cycloalkenyl group, a substituted or unsubstituted alkoxy group, a substituted or unsubstituted alkenyloxy group, a substituted or unsubstituted cycloalkyloxy group, a substituted or unsubstituted cycloalkenyloxy group, a substituted or unsubstituted aryl group, a substituted or unsubstituted aryloxy group, a substituted or unsubstituted heteroaryl group, or a substituted or unsubstituted heteroaryloxy group.

A is a single bond or a divalent linking group having a chain length of 1 to 3 atoms between two free radicals. A is preferably a divalent group selected from the following general formula group (2):

[Chem. 4]

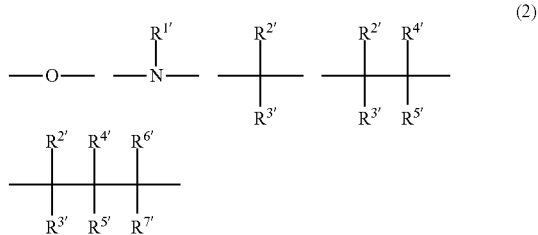

(2)

wherein $R^{1'}$ to $R^{7'}$ each independently represent a hydrogen atom, a substituted or unsubstituted alkyl group, a substituted or unsubstituted cycloalkyl group, a substituted or unsubstituted aryl group, or a substituted or unsubstituted heteroaryl group; and $R^{2'}$ to $R^{7'}$ may be bonded to one another to form a monocyclic or polycyclic ring, or adjacent substituents may be directly bonded to each other to form a multiple bond (a double bond or a triple bond).

Concerning the hydrogen atom, the substituted or unsubstituted alkyl group, the substituted or unsubstituted cycloalkyl group, the substituted or unsubstituted aryl group, or the substituted or unsubstituted heteroaryl group, structures comparable to various substituents represented by $R^1$ to $R^{16}$ and R can be exemplified.

As described above, $R^{2'}$ to $R^{7'}$ may be bonded to one another to form a monocyclic or polycyclic ring, or adjacent substituents may be directly bonded to each other to form a multiple bond (a double bond or a triple bond). As for the multiple bond, a double bond may be preferable, and a carbon-carbon double bond may be even more preferable. Examples of such a ring-forming moiety include the following structures.

[Chem. 5]

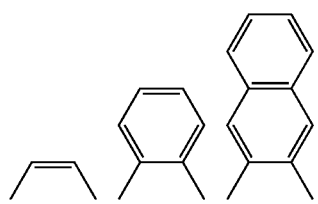

$R^{1'}$ to $R^{7'}$ can also be bonded to $R^1$ to $R^{16}$ and R to form a ring structure and, preferably, can be bonded to $R^3$ to $R^{16}$ and R to form a ring structure.

Specific examples of the ring skeleton containing the above A include a norbornane skeleton and an admantyl skeleton.

Examples of such cyclic multiple-ester-group-containing compound (a) include the following structures. Some structural formulae of the exemplary compounds below have stereoisomers, and while some isomer structures are depicted, there may be other isomer structures that are not exemplified.

[Chem. 6]

A-1

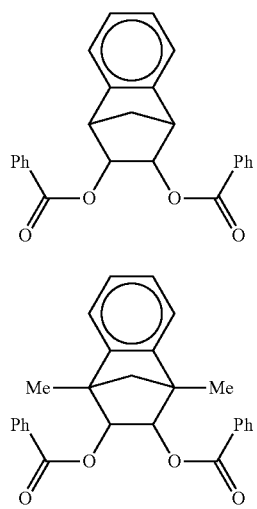

A-2

A-3

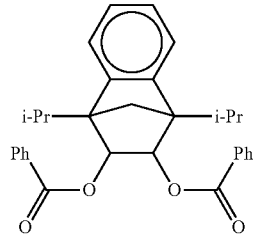

A-4

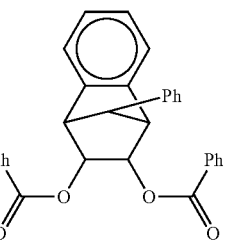

A-5

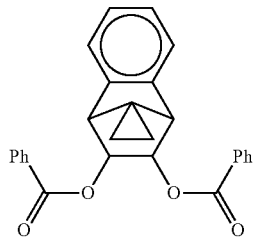

A-6

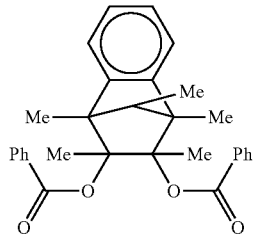

A-7

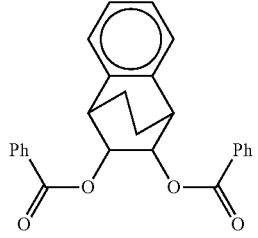

A-8

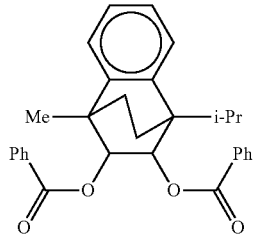

A-9

A-10
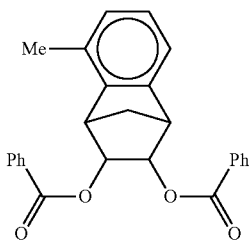
A-11
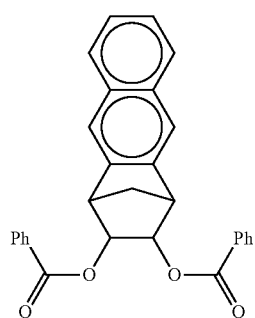
A-12
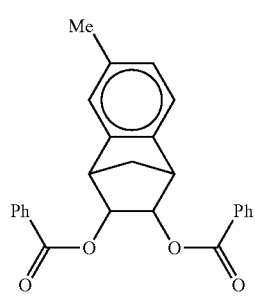
A-13
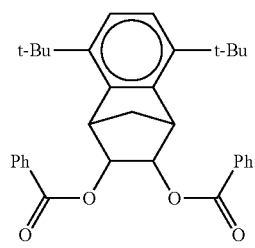
A-14
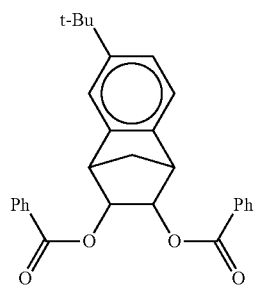
A-15
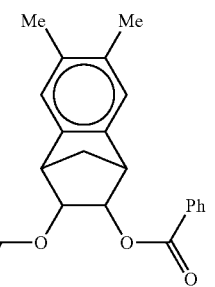
A-16
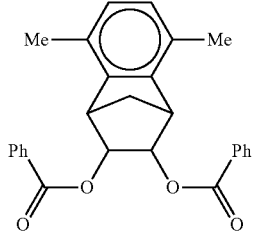
A-17
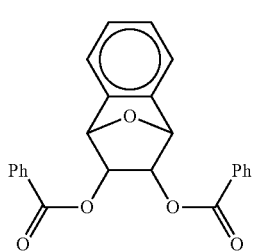
A-18
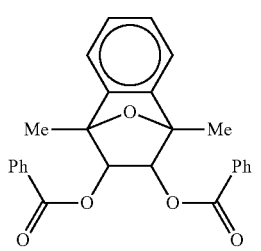
A-19
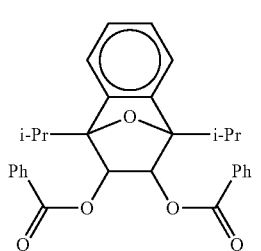
A-20
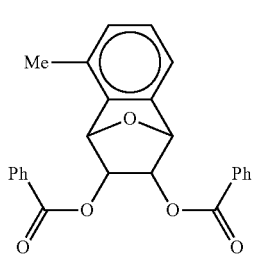

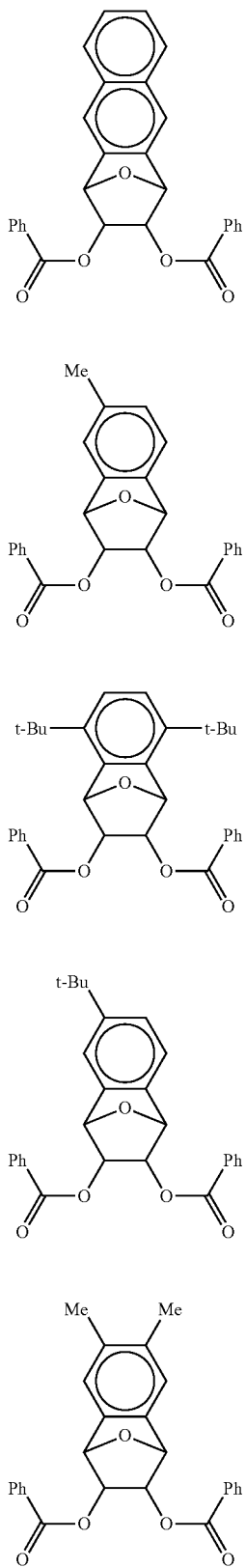
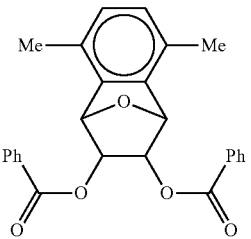
A-26
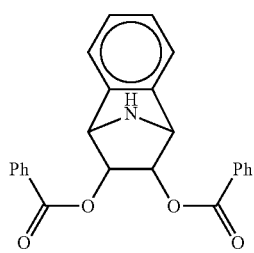
A-27
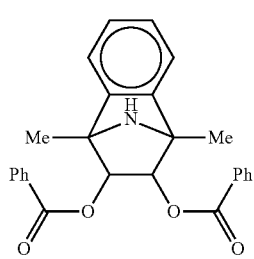
A-28
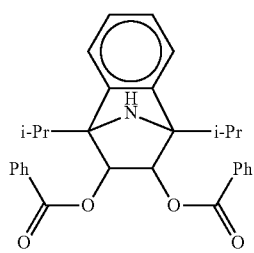
A-29
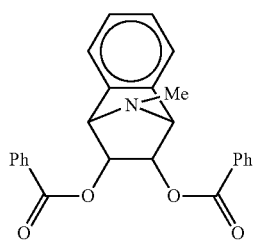
A-30
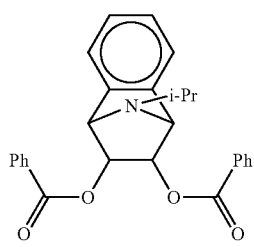
A-31

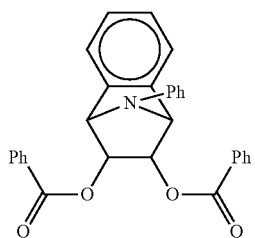
A-32
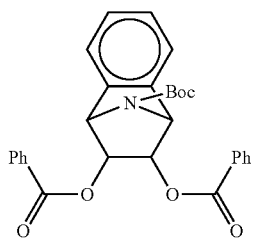
A-33
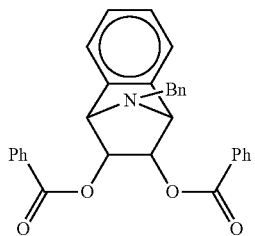
A-34
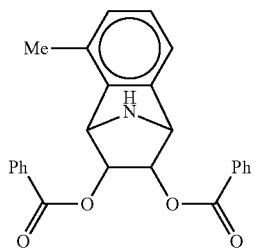
A-35
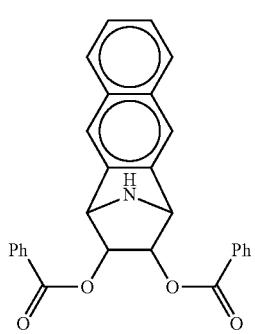
A-36
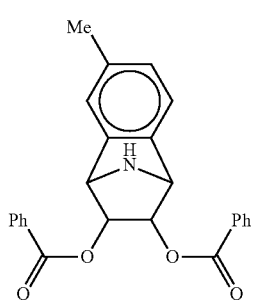
A-37
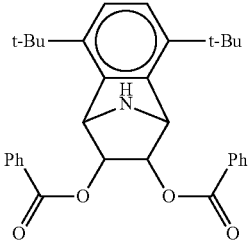
A-38
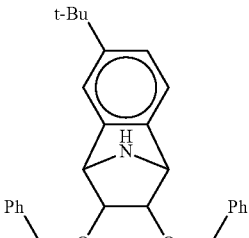
A-39
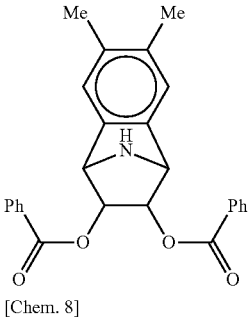
A-40
[Chem. 8]
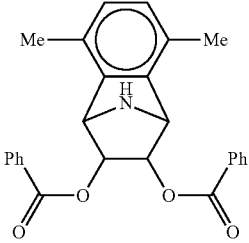
A-41
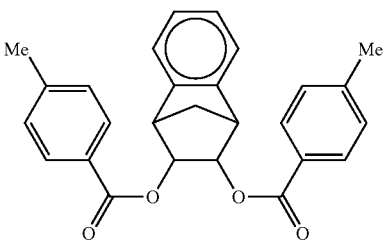
A-42
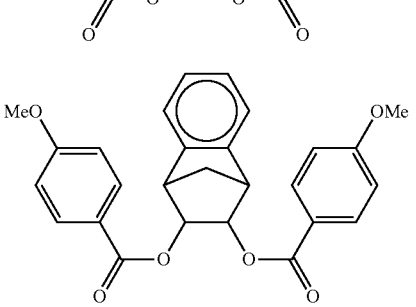
A-43

A-44
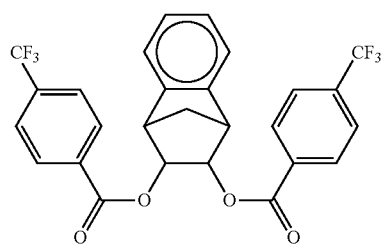
A-45
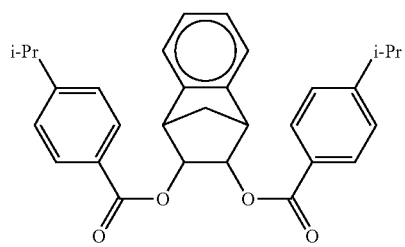
A-46
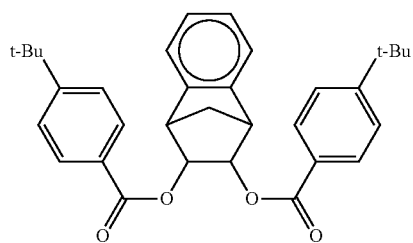
A-47
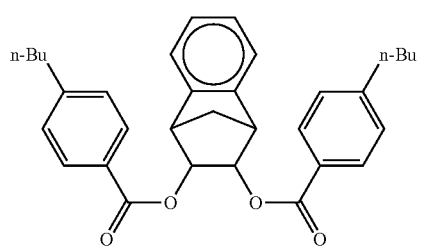
A-48
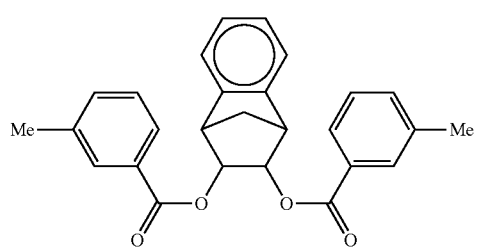
A-49
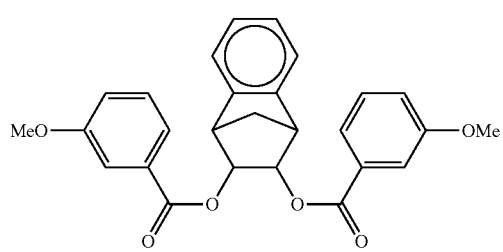
A-50
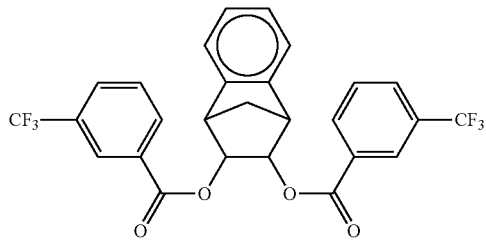
A-51
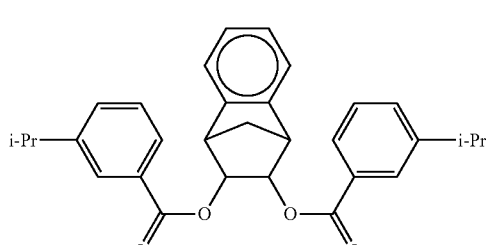
A-52
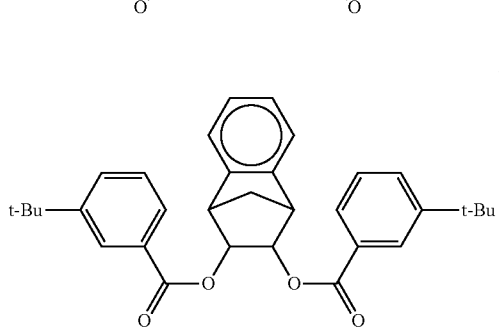
A-53
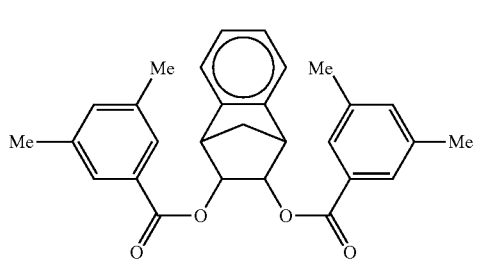
A-54
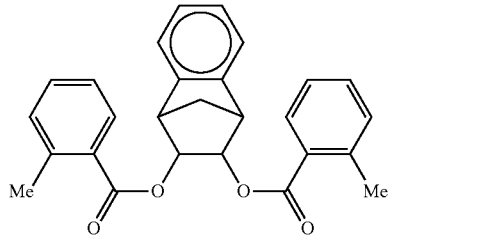
A-55
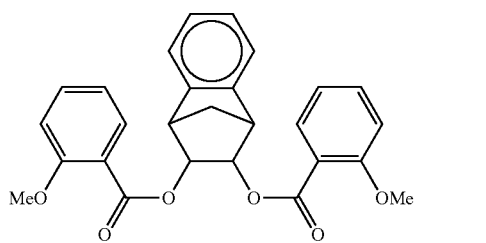

A-56
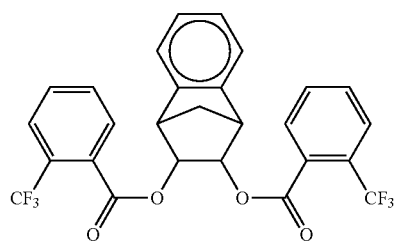
[Chem. 9]
A-57
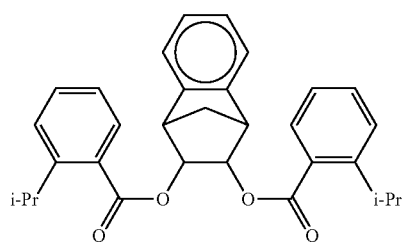
A-58
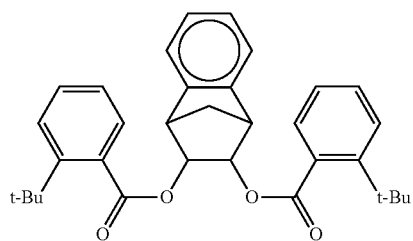
A-59
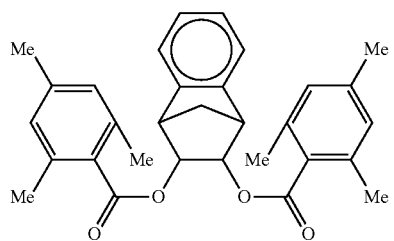
A-60
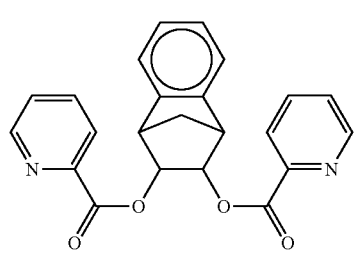
A-61
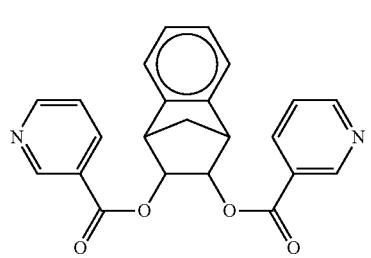
A-62
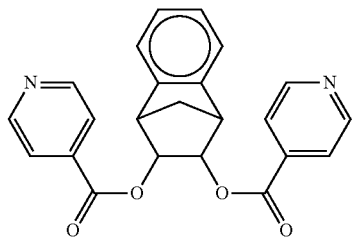
A-63
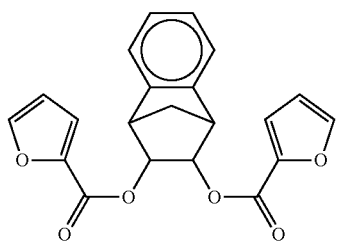
A-64
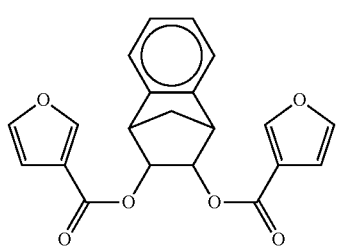
A-65
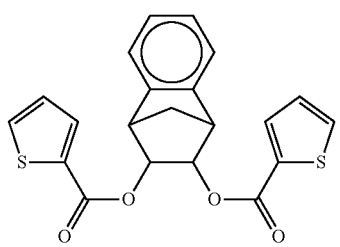
A-66
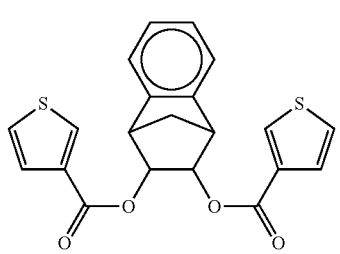
A-67
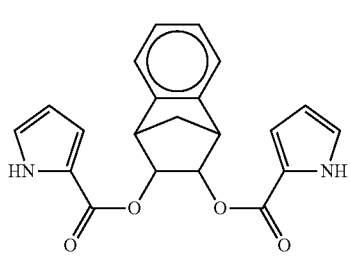

A-68
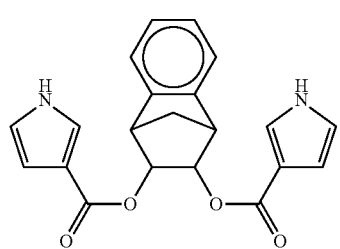
A-69
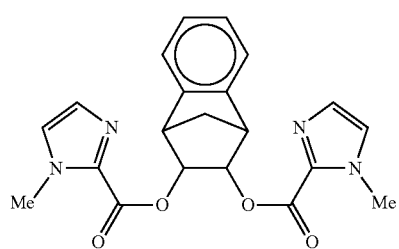
A-70
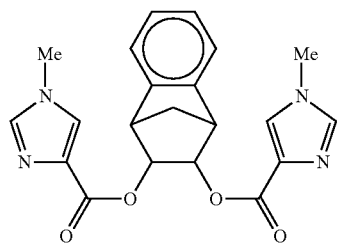
A-71
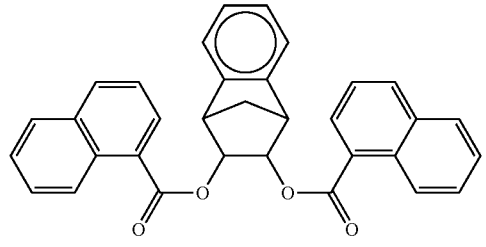
A-72
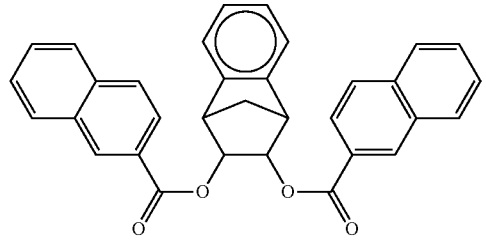
A-73
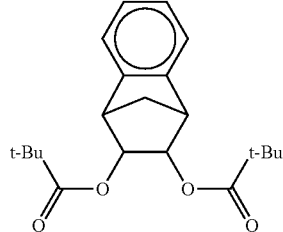
A-74
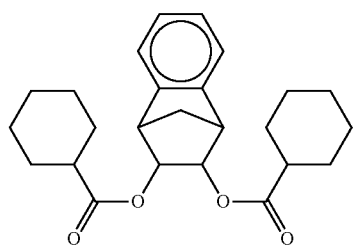
[Chem. 10]
B-1
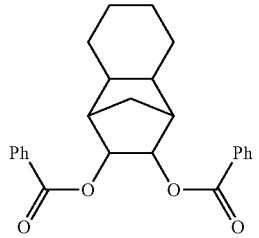
B-2
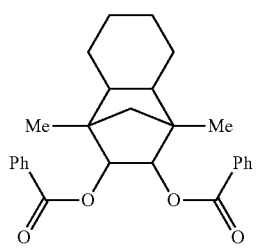
B-3
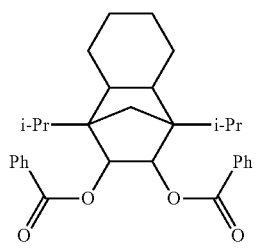
B-4
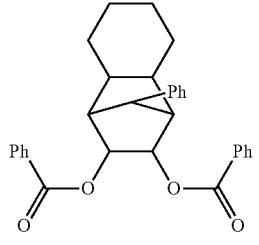
B-5
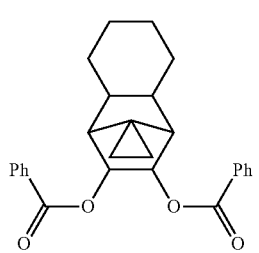

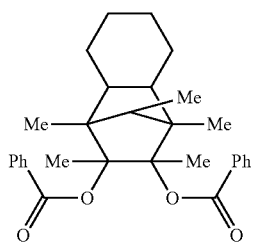 B-6
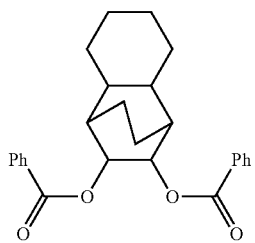 B-7
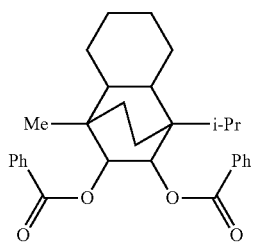 B-8
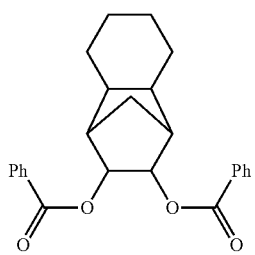 B-9
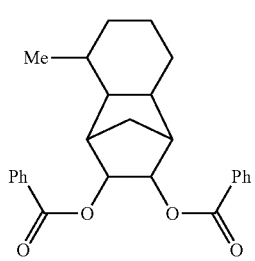 B-10
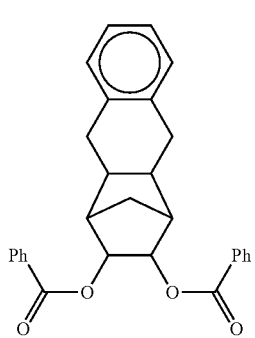 B-11
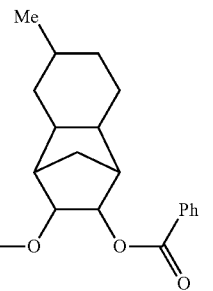 B-12
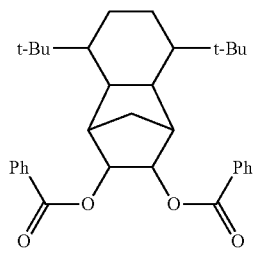 B-13
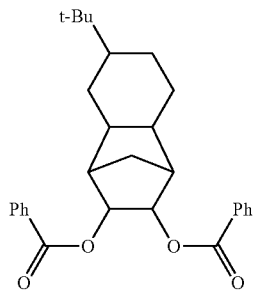 B-14
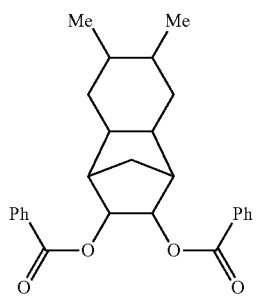 B-15
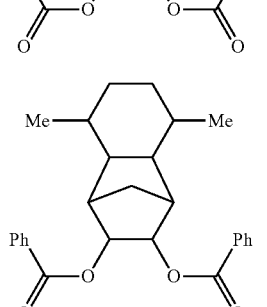 B-16
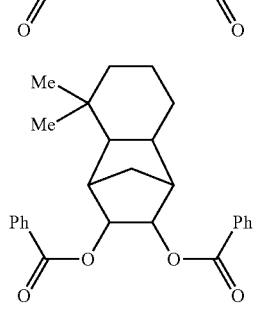 B-17

-continued
B-18 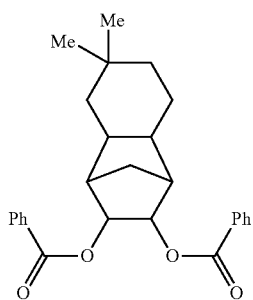
B-19 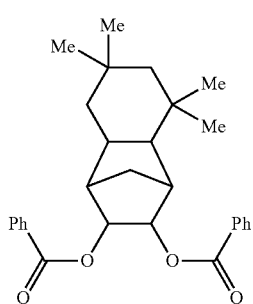
B-20 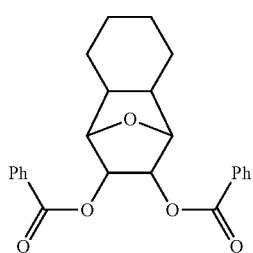
[Chem. 11]
B-21 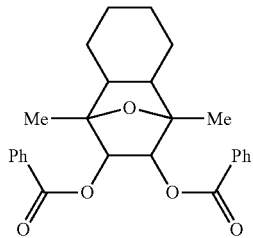
B-22 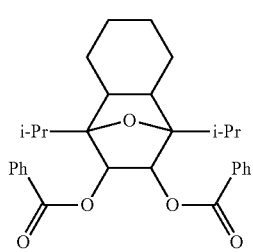
-continued
B-23 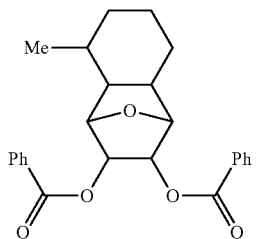
B-24 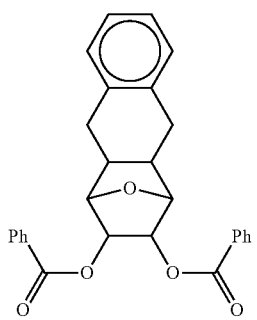
B-25 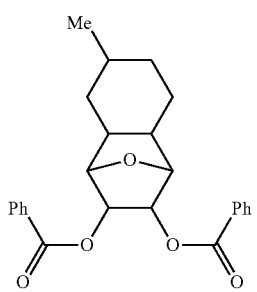
B-26 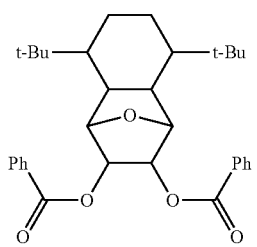
B-27 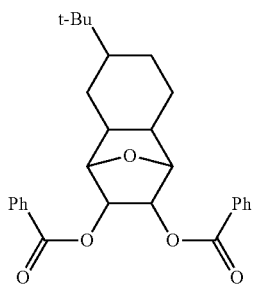

B-28
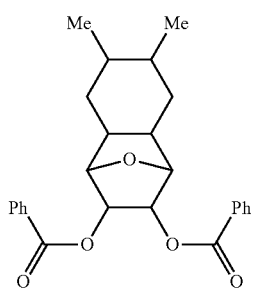
B-29
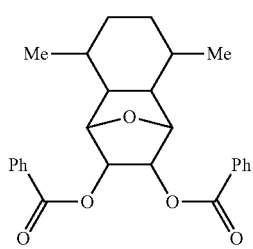
B-30
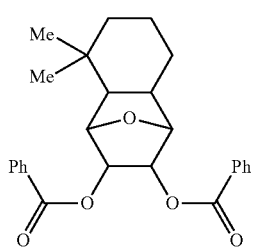
B-31
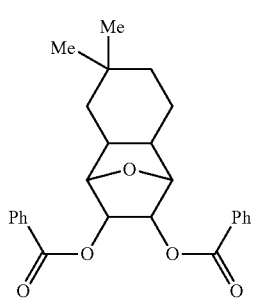
B-32
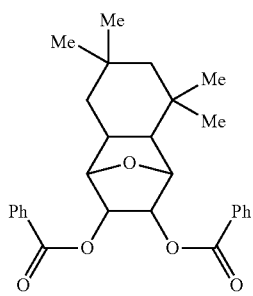
B-33
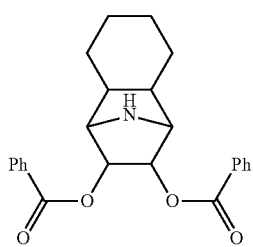
B-34
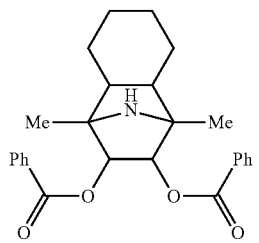
B-35
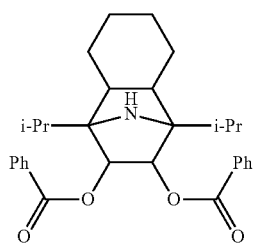
B-36
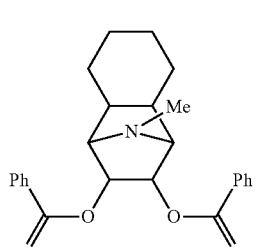
B-37
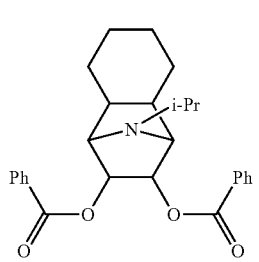
B-38
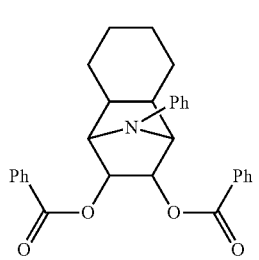
B-39
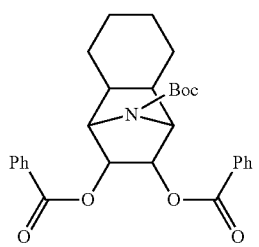

-continued
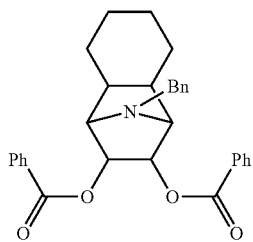
[Chem. 12]
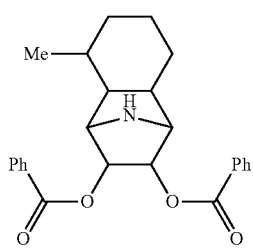
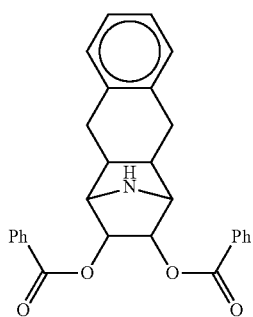
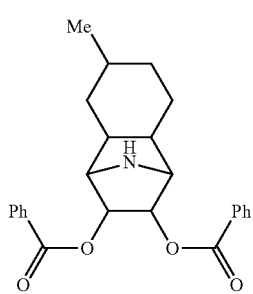
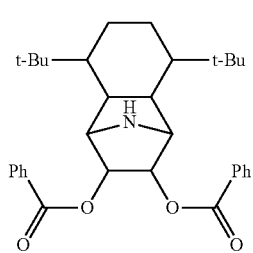
-continued
B-40
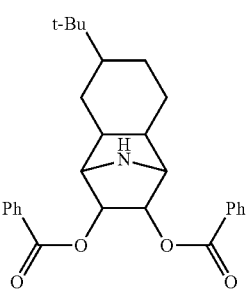
B-41
B-42
B-43
B-44
B-45
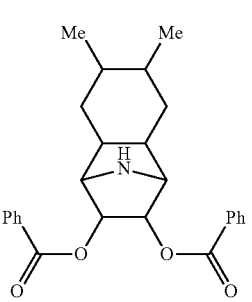
B-46
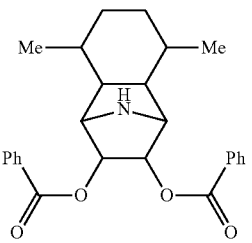
B-47
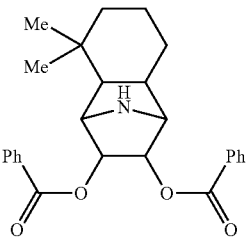
B-48
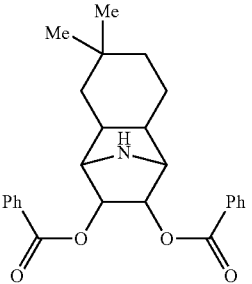
B-49

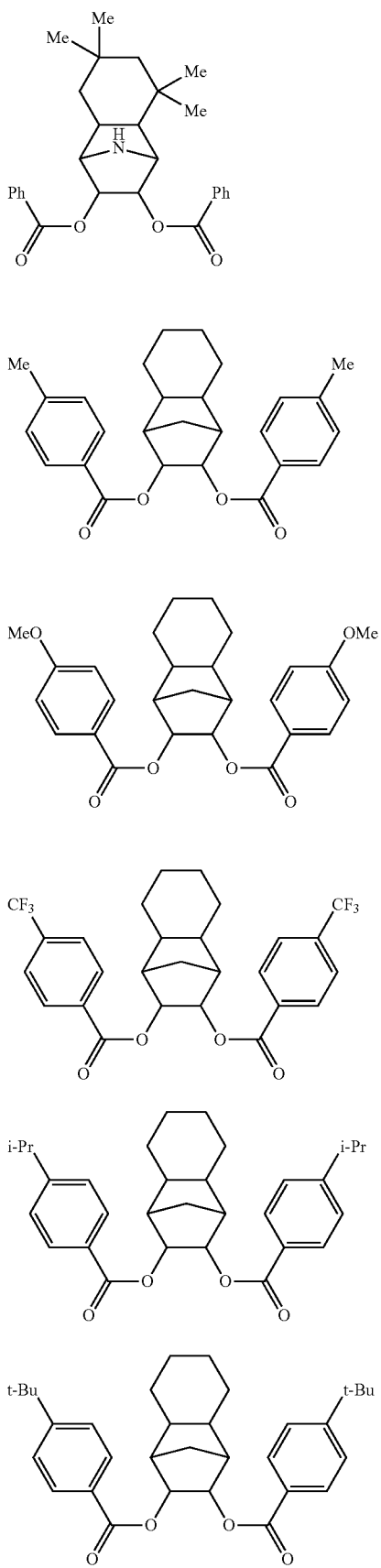
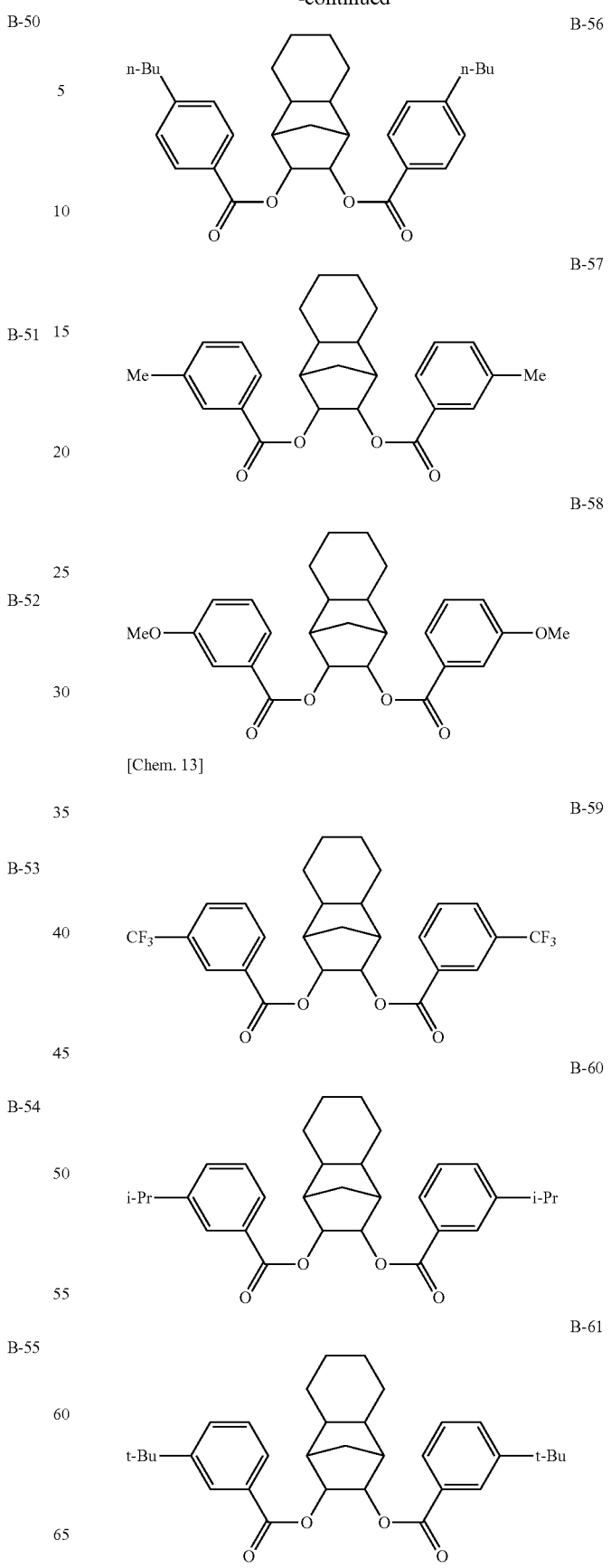

B-62 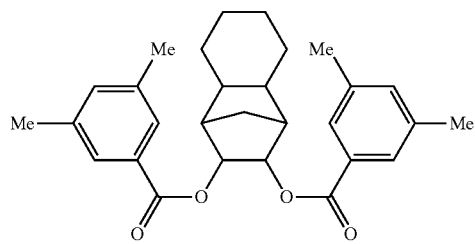
B-63 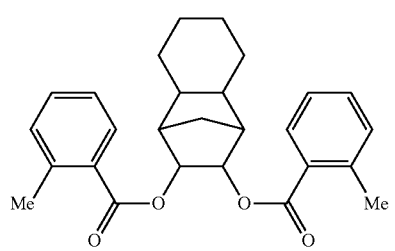
B-64 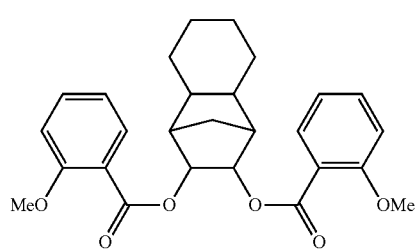
B-65 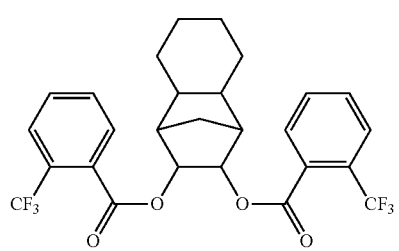
B-66 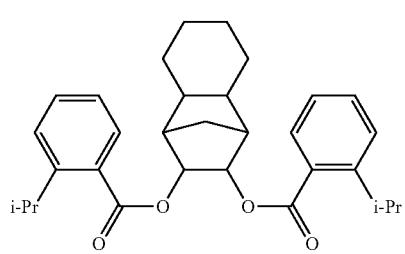
B-67 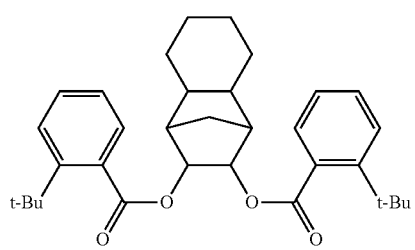
B-68 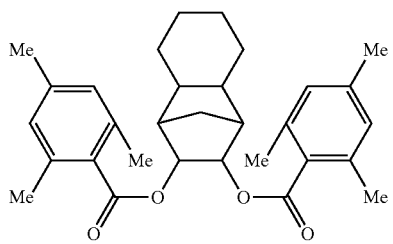
B-69 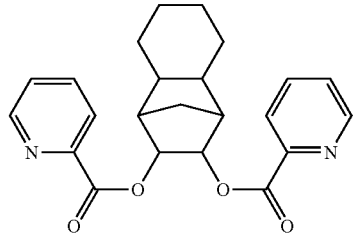
B-70 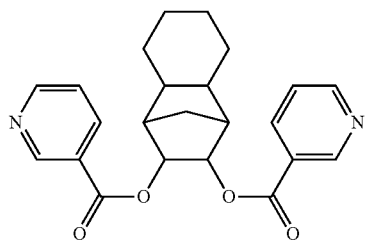
[Chem. 14]
B-71 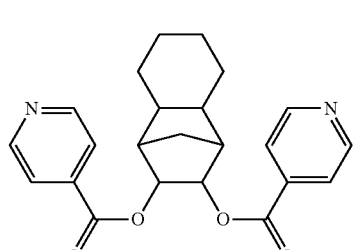
B-72 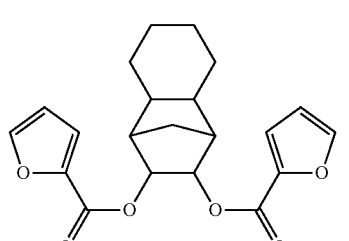
B-73 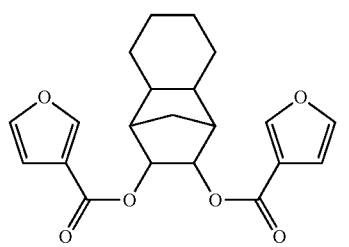

B-74
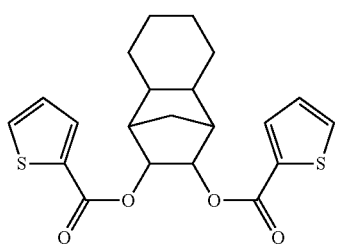
B-75
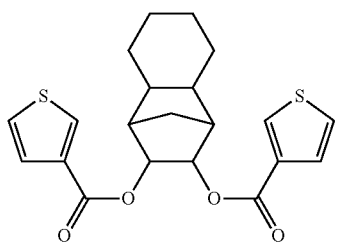
B-76
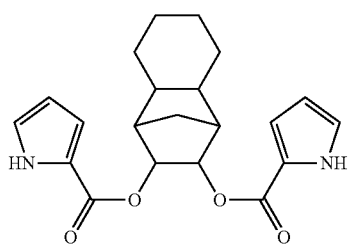
B-77
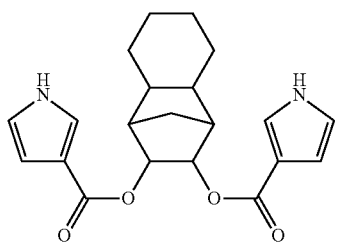
B-78
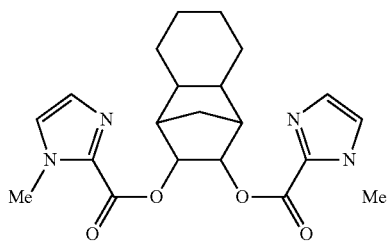
B-79
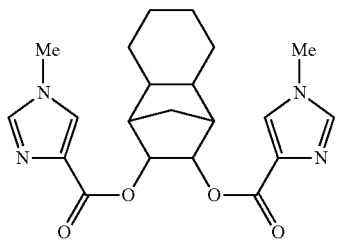
B-80
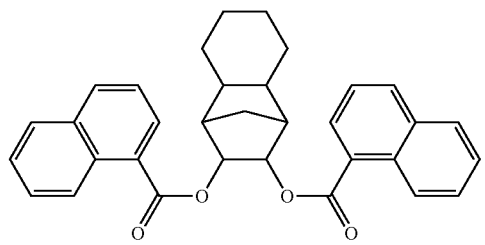
B-81
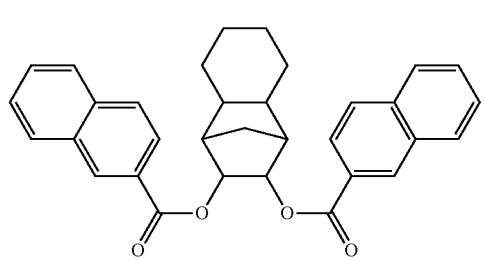
B-82
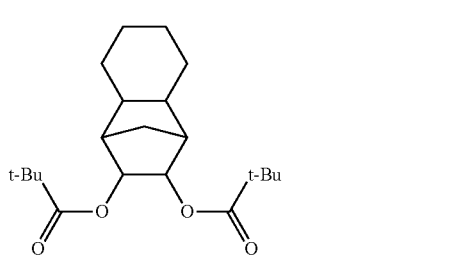
B-83
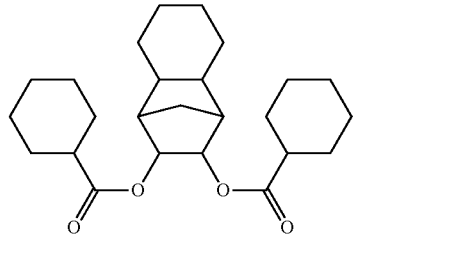
[Chem. 15]
C-1
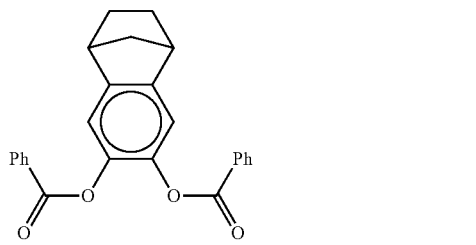
C-2
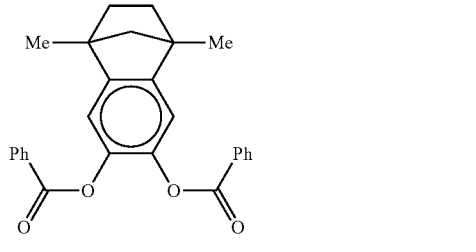

-continued
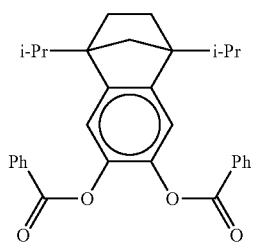
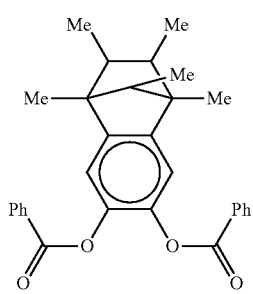
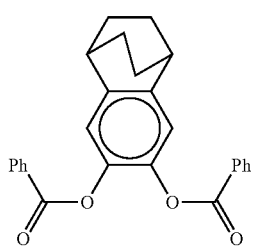
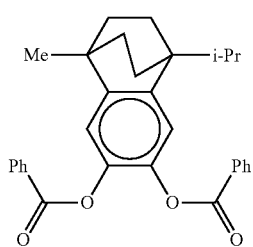
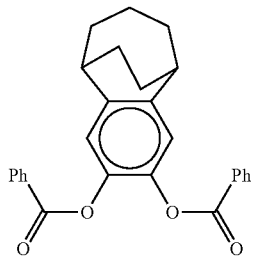
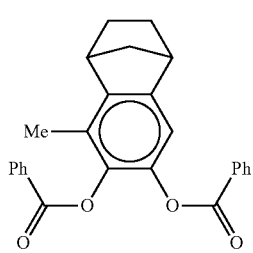
-continued
C-3
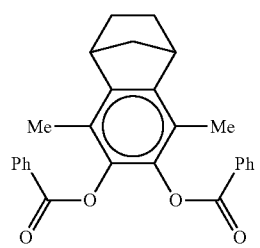
C-9
C-4
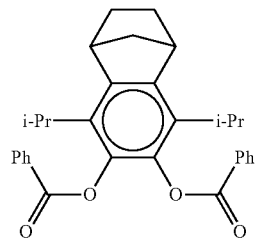
C-10
C-5
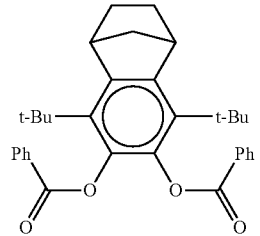
C-11
C-6
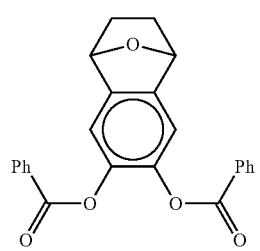
C-12
C-7
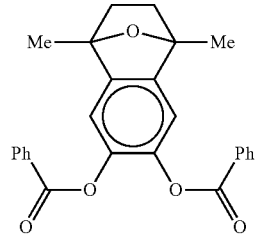
C-13
C-8
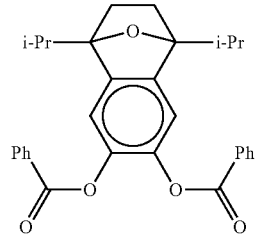
C-14

C-15
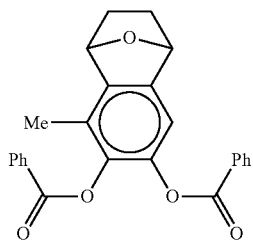
C-16
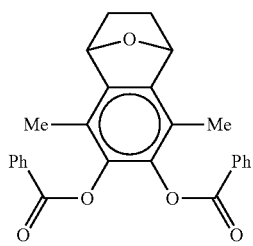
C-17
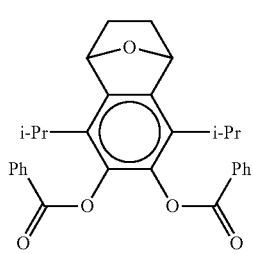
C-18
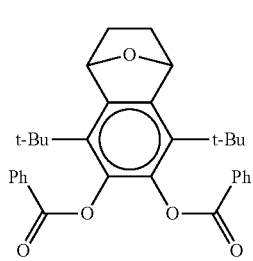
C-19
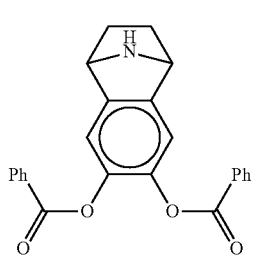
C-20
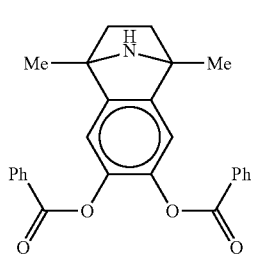
[Chem. 16]
C-21
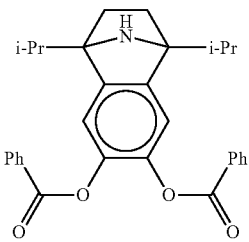
C-22
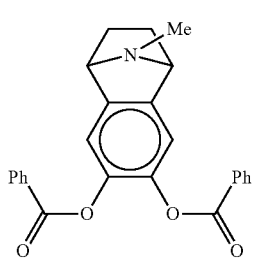
C-23
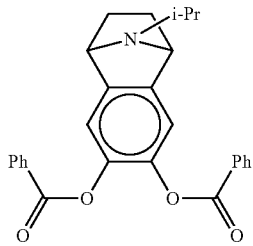
C-24
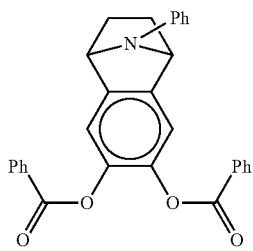
C-25
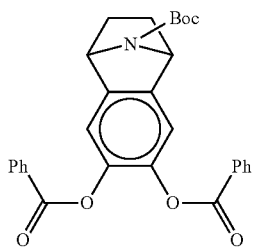
C-26
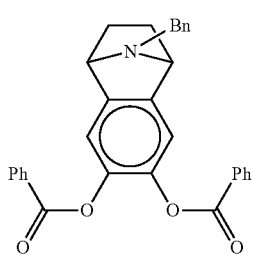

C-27
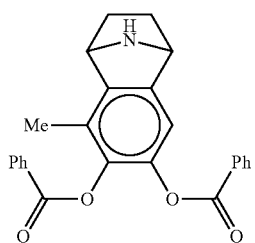
C-28
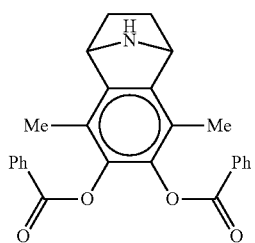
C-29
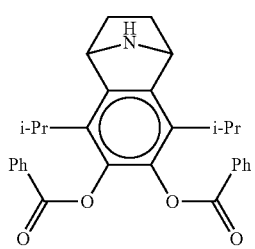
C-30
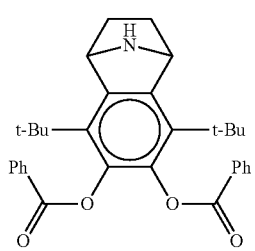
C-31
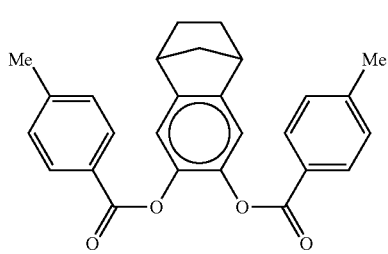
C-32
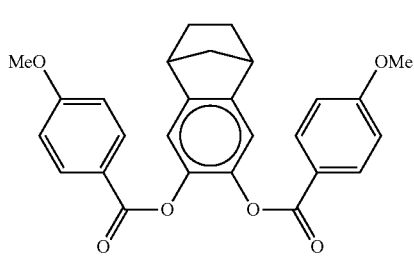
C-33
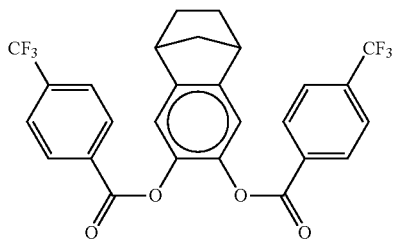
C-34
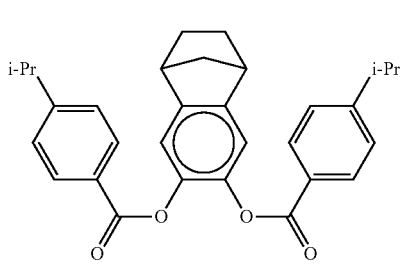
[Chem. 17]
C-35
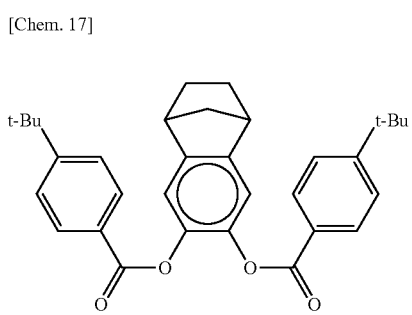
C-36
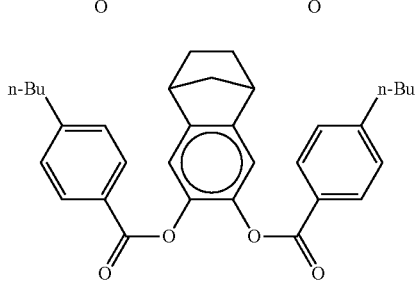
C-37
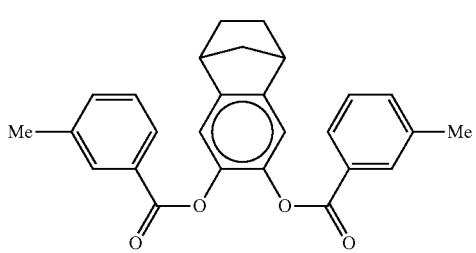
C-38
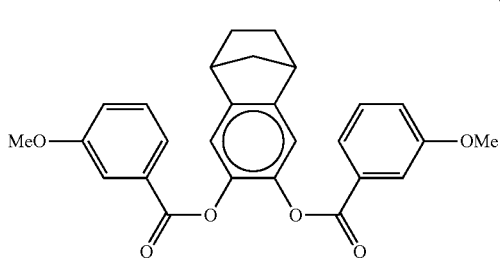

C-39
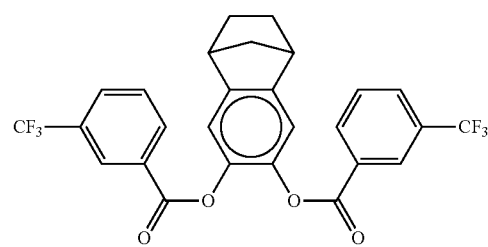
C-40
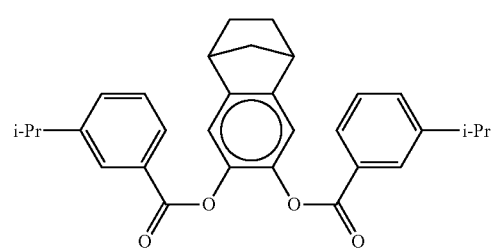
C-41
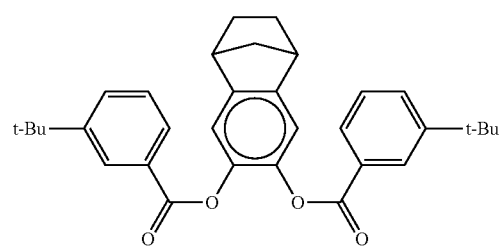
C-42
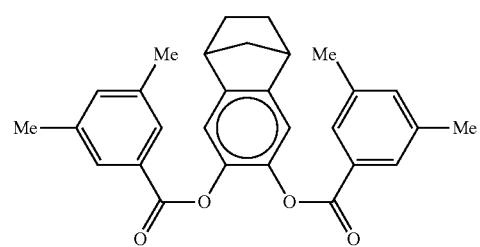
C-43
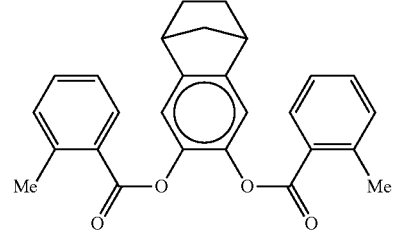
C-44
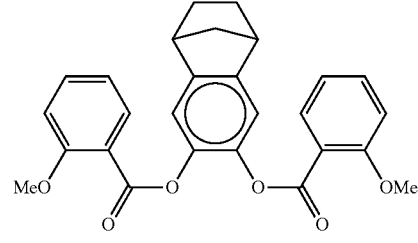
C-45
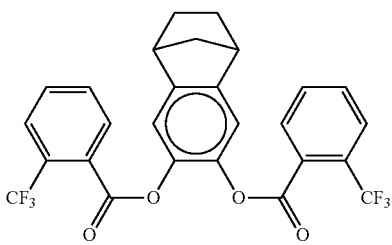
C-46
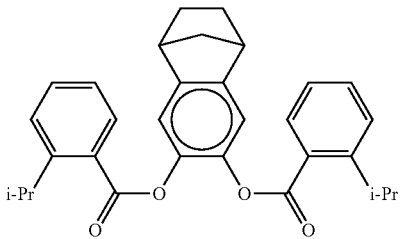
C-47
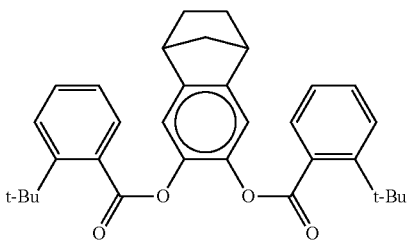
C-48
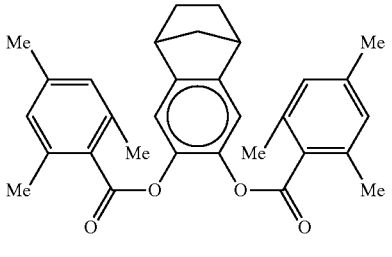
C-49
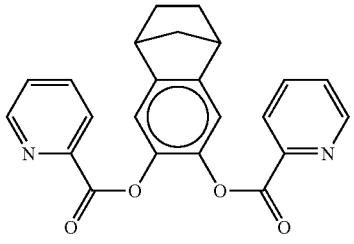
C-50
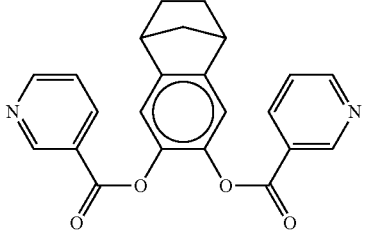

[Chem. 18]
C-51
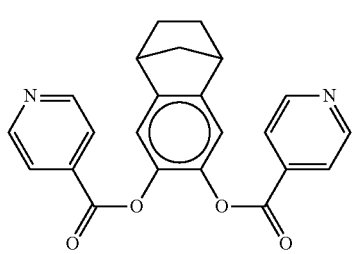
C-52
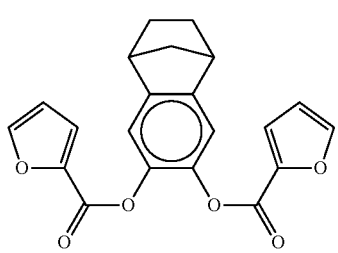
C-53
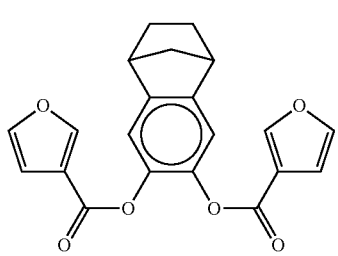
C-54
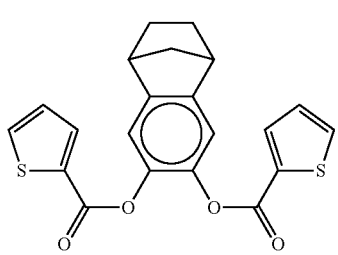
C-55
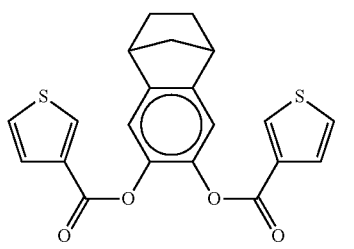
C-56
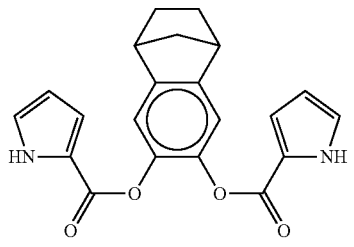
C-57
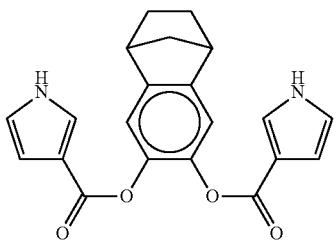
C-58
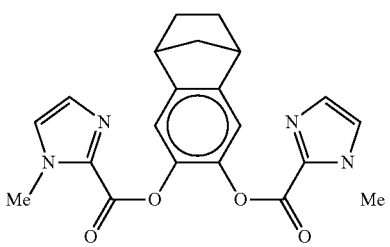
C-59
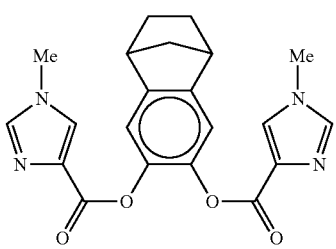
C-60
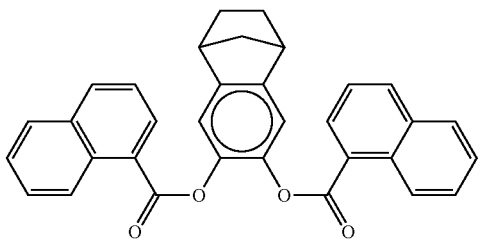
C-61
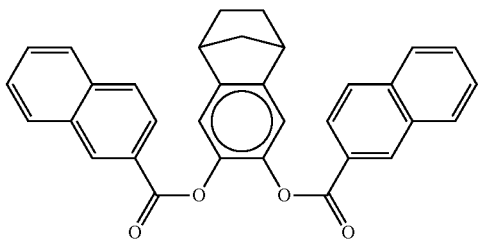
C-62
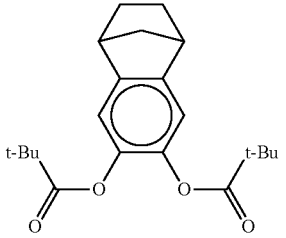

[Chem. 19]
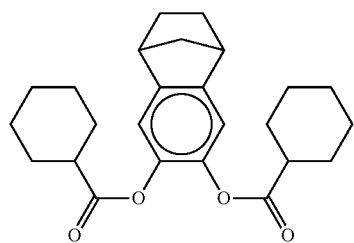
C-63
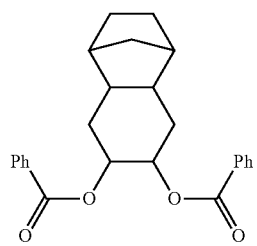
D-1
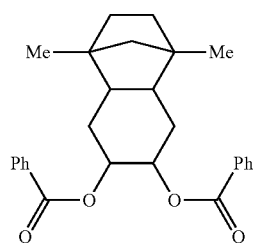
D-2
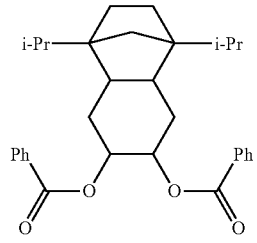
D-3
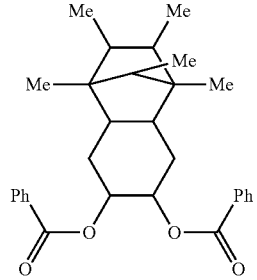
D-4
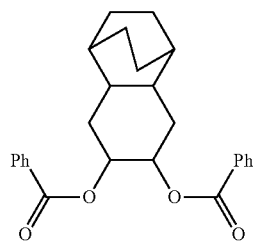
D-5
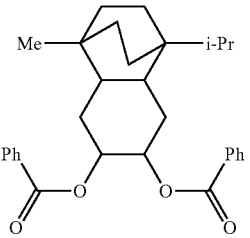
D-6
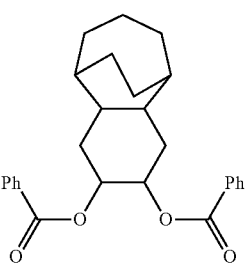
D-7
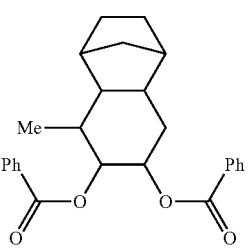
D-8
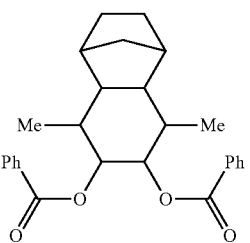
D-9
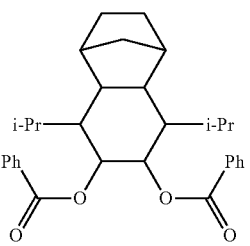
D-10
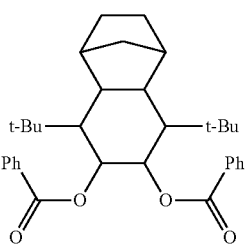
D-11

D-12 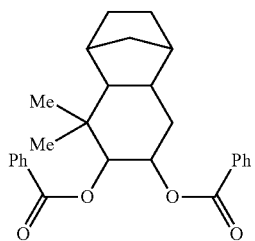
D-13 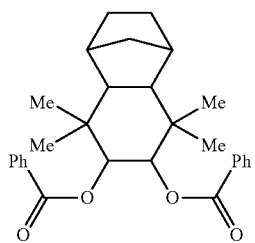
D-14 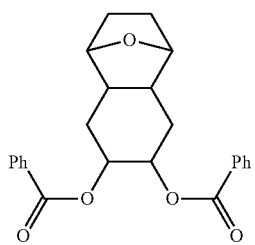
D-15 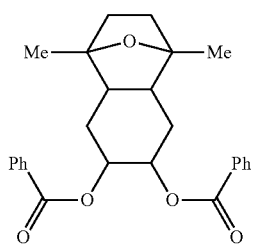
D-16 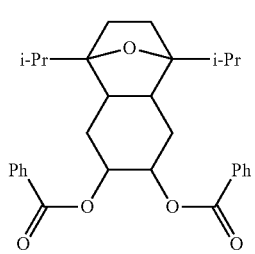
D-17 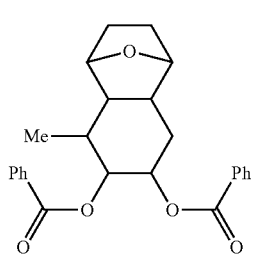
D-18 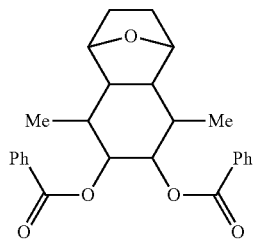
D-19 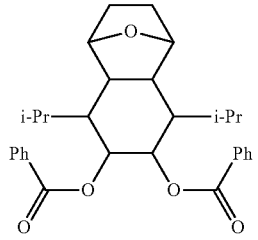
D-20 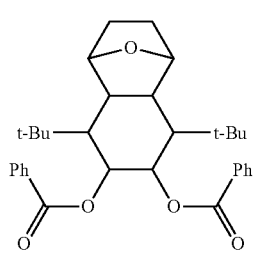
[Chem. 20]
D-21 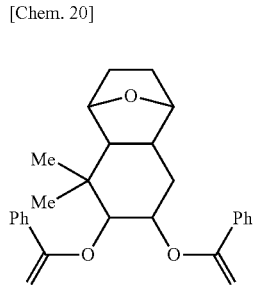
D-22 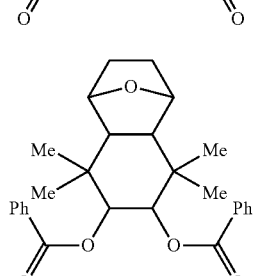
D-23 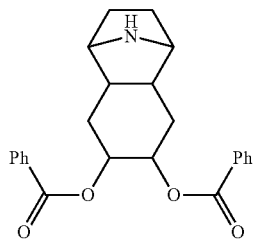

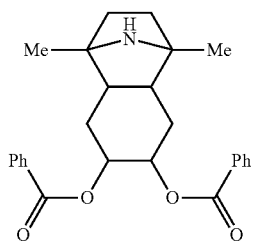
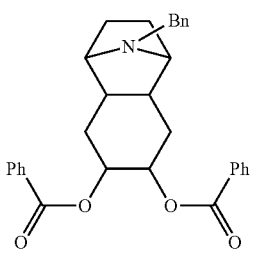

D-36 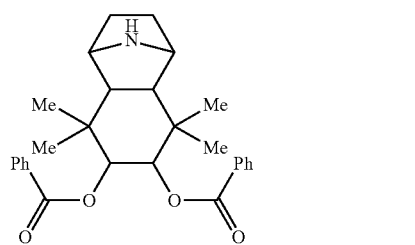
D-37 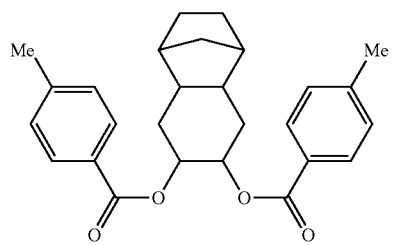
D-38 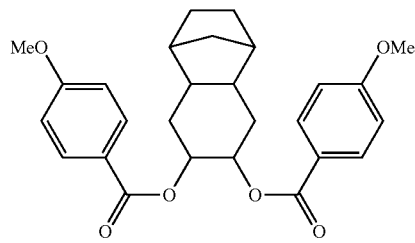
D-39 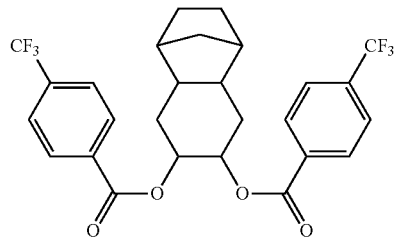
[Chem. 21]
D-40 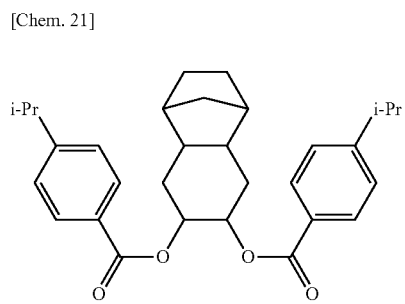
D-41 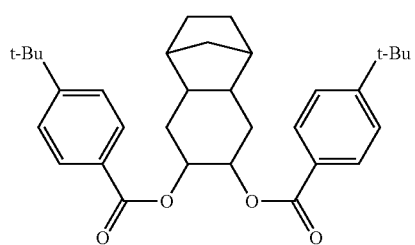
D-42 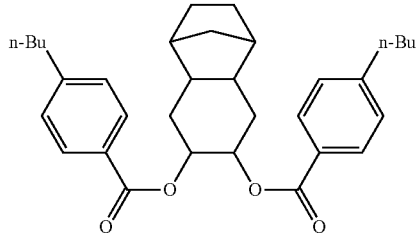
D-43 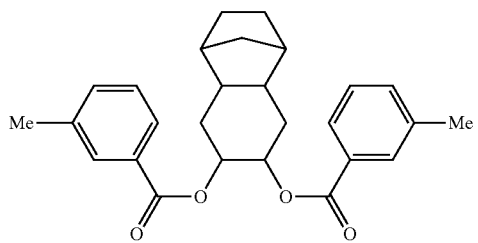
D-44 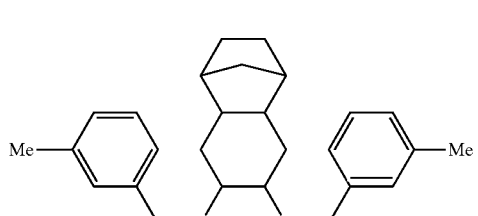
D-45 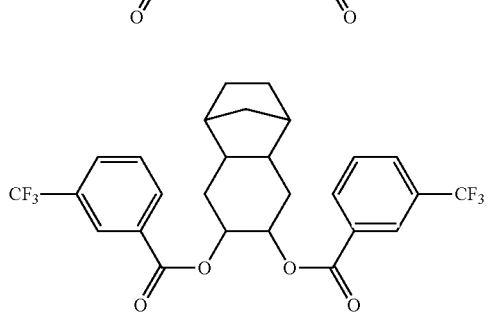
D-46 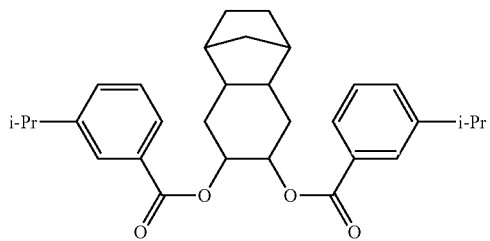
D-47 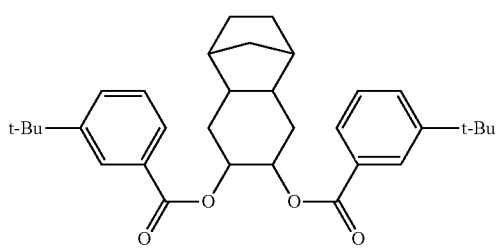

D-48 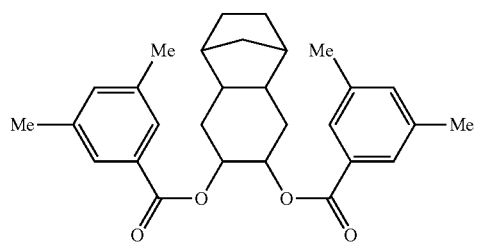
D-49 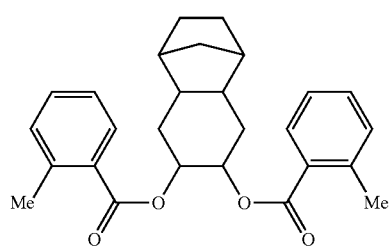
D-50 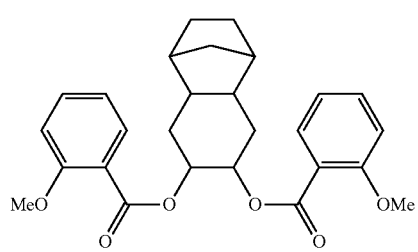
D-51 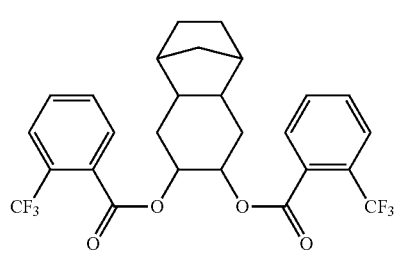
D-52 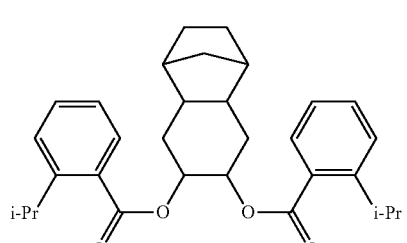
D-53 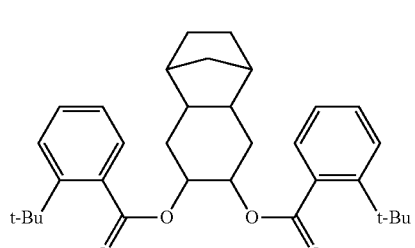
D-54 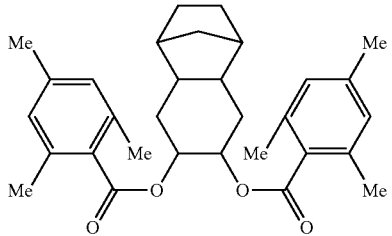
D-55 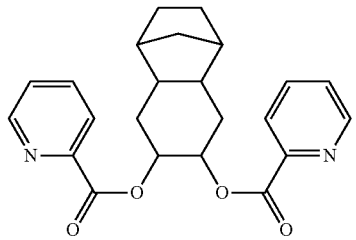
[Chem. 22]
D-56 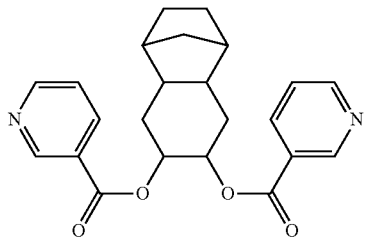
D-57 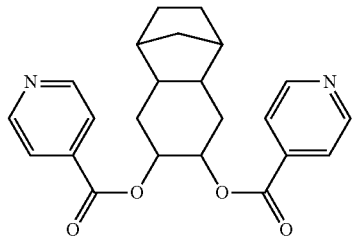
D-58 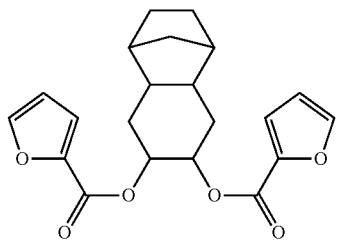
D-59 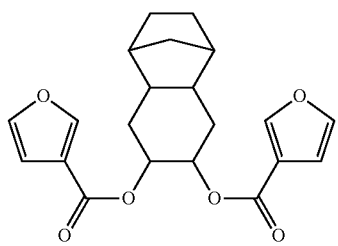

D-60 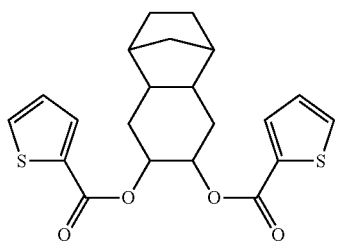
D-61 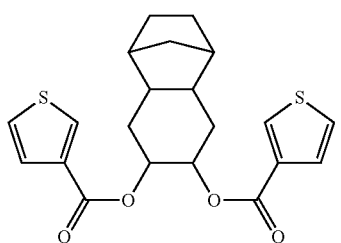
D-62 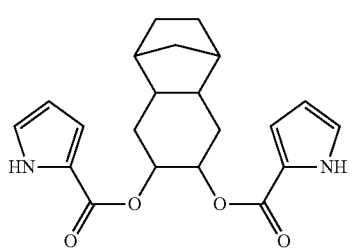
D-63 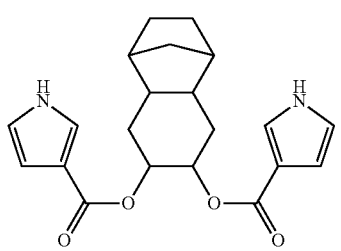
D-64 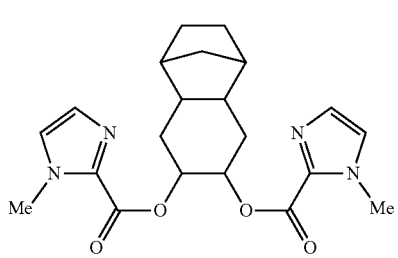
D-65 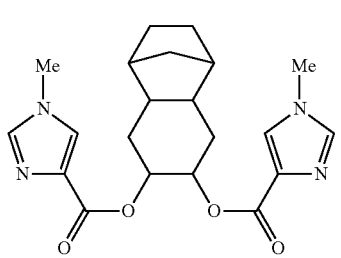
D-66 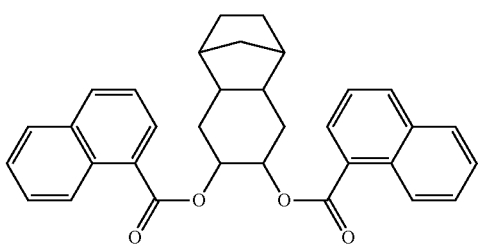
D-67 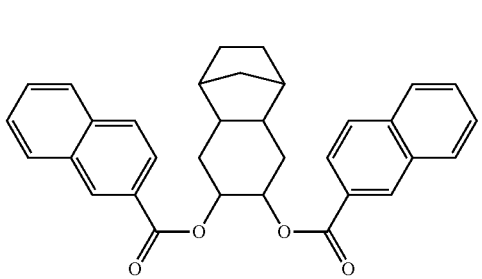
D-68 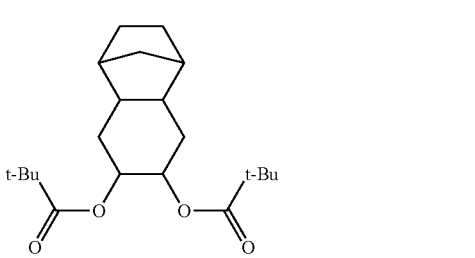
D-69 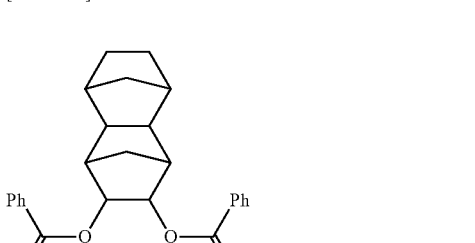
[Chem. 23]
E-1 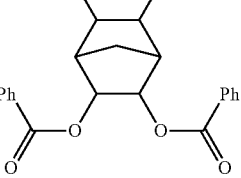
E-2 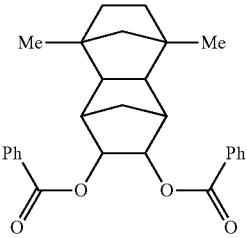

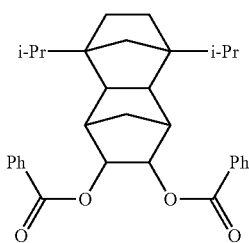 E-3
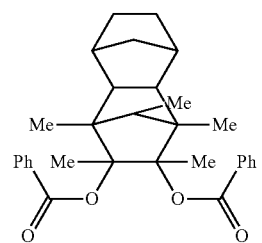 E-9
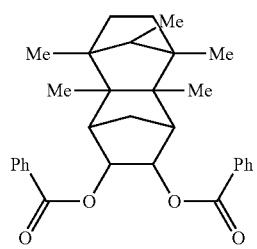 E-4
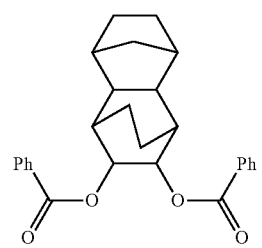 E-10
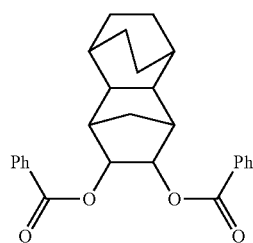 E-5
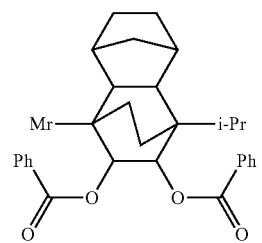 E-11
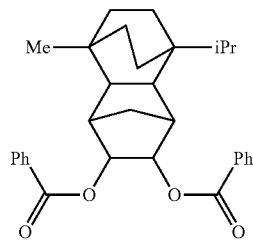 E-6
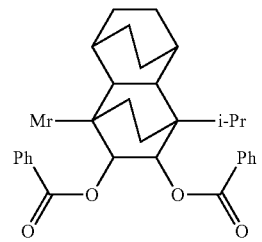 E-12
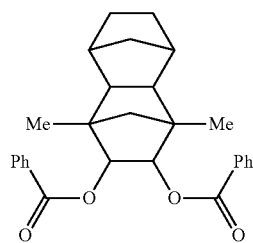 E-7
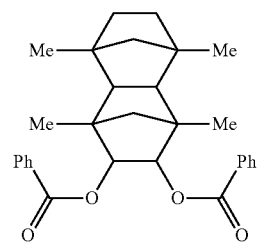 E-13
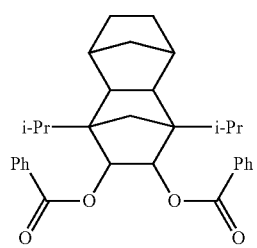 E-8
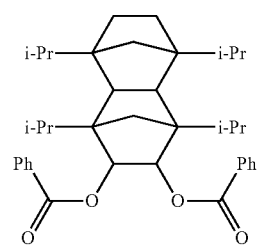 E-14

E-15
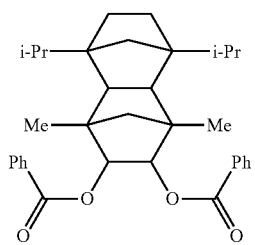
E-16
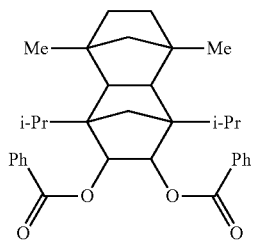
E-17
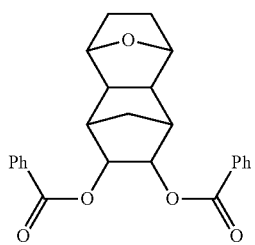
E-18
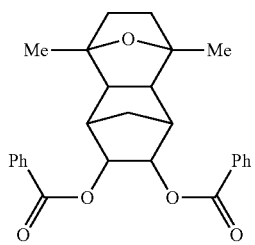
E-19
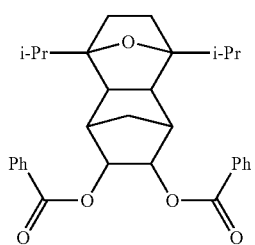
E-20
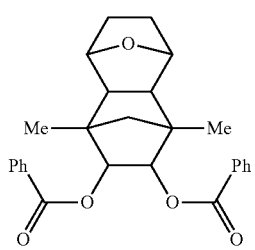
E-21
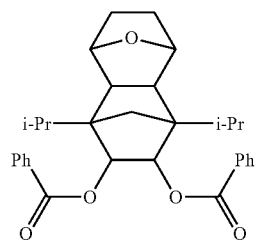
E-22
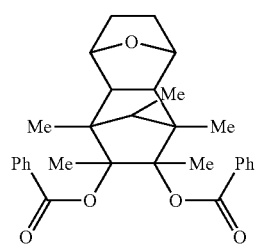
E-23
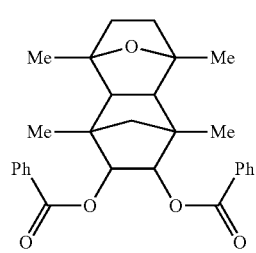
E-24
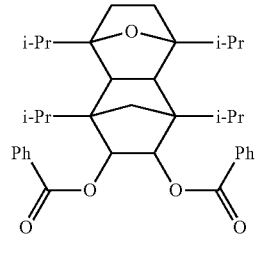
E-25
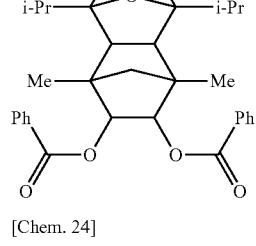
[Chem. 24]
E-26
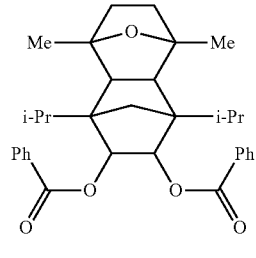

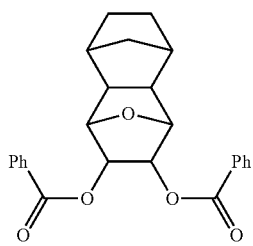
E-27
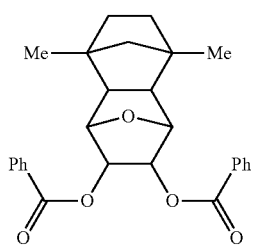
E-28
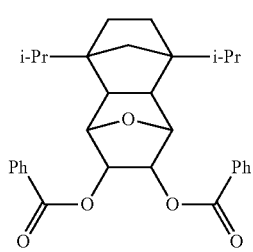
E-29
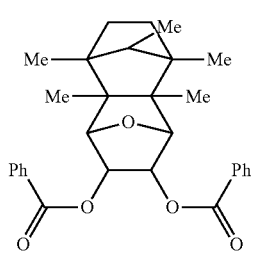
E-30
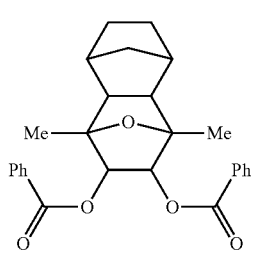
E-31
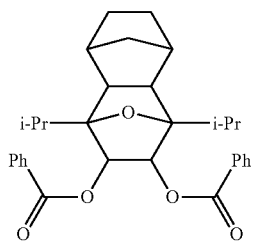
E-32
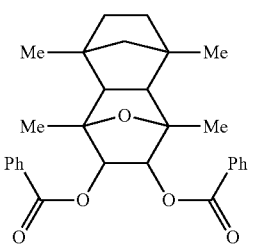
E-33
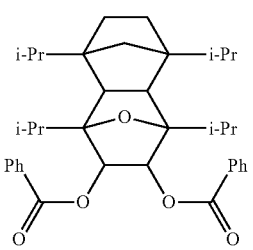
E-34
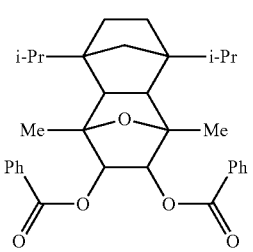
E-35
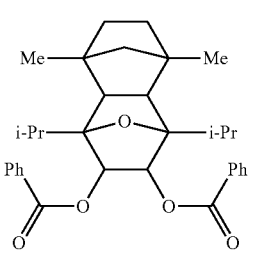
E-36
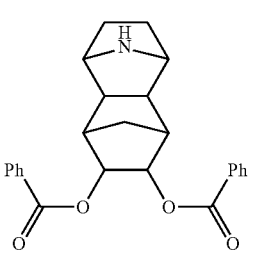
E-37
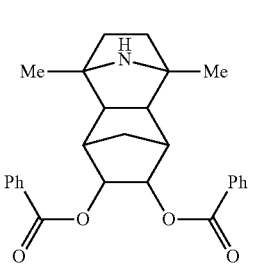
E-38

E-39 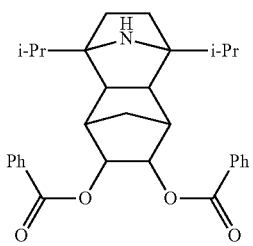
E-40 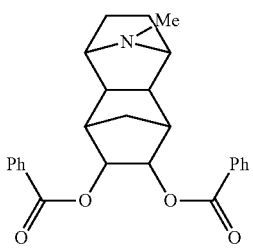
E-41 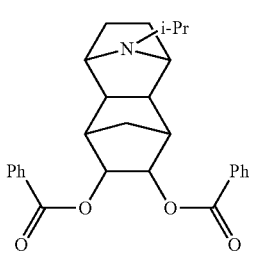
E-42 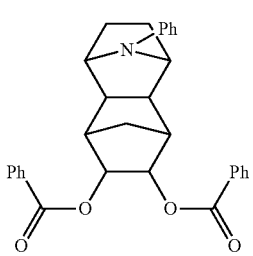
E-43 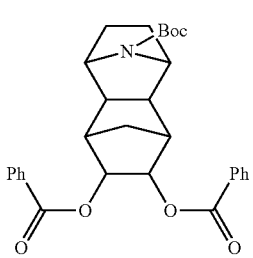
E-44 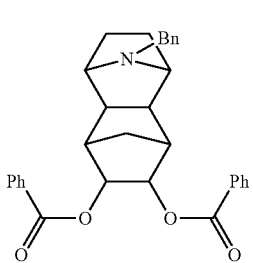
E-45 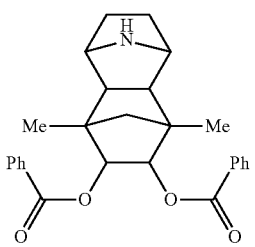
[Chem. 25]
E-46 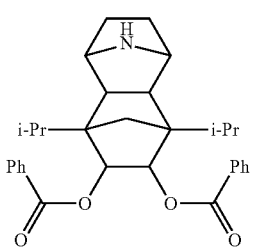
E-47 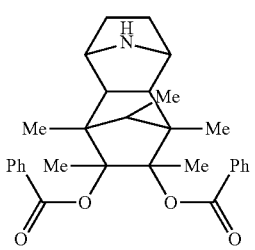
E-48 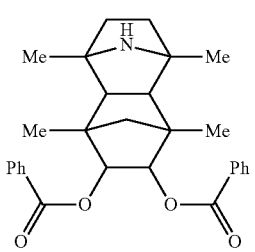
E-49 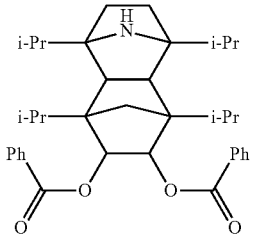
E-50 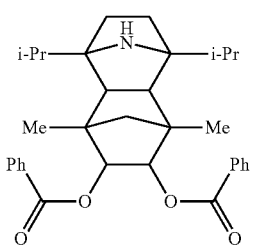

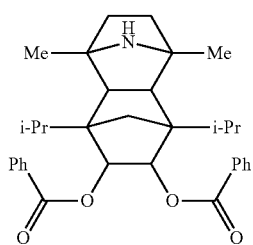 E-51
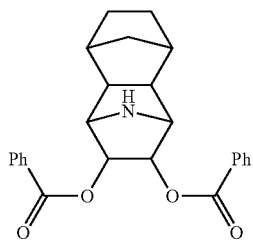 E-52
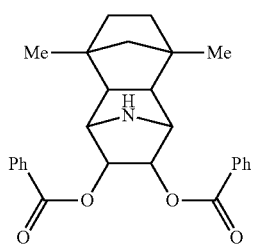 E-53
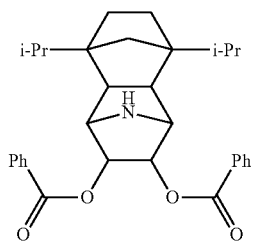 E-54
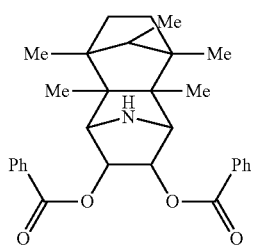 E-55
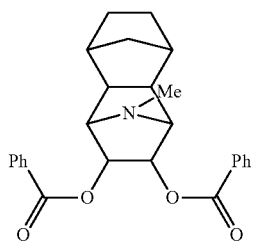 E-56
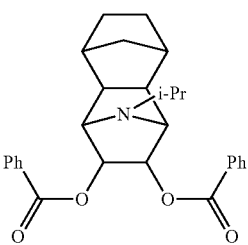 E-57
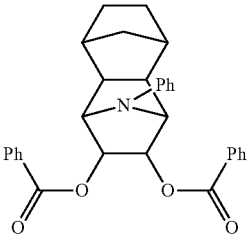 E-58
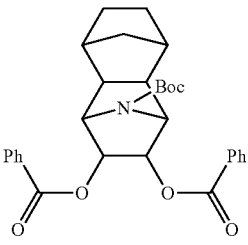 E-59
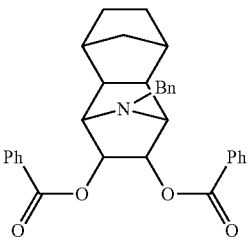 E-60
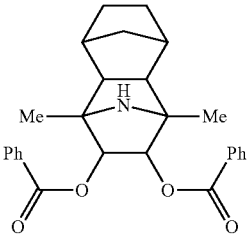 E-61
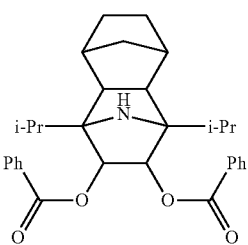 E-62

E-63
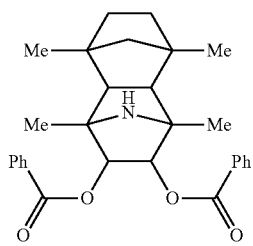
E-64
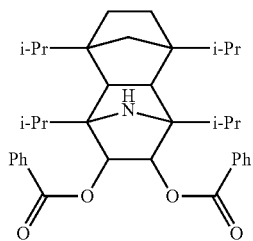
E-65
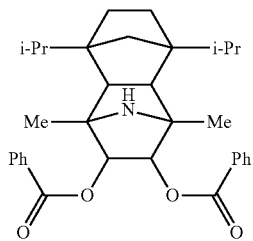
[Chem. 26]
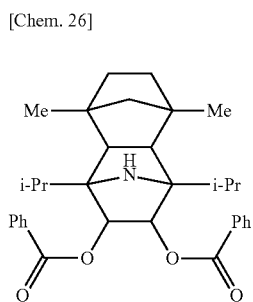
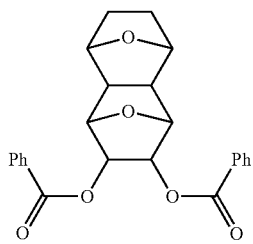
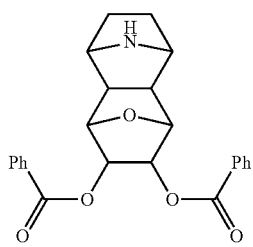
E-69
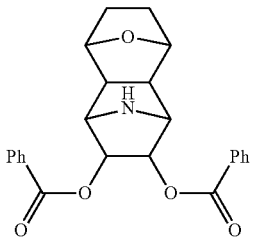
E-70
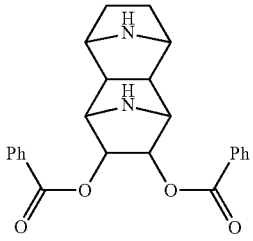
E-71
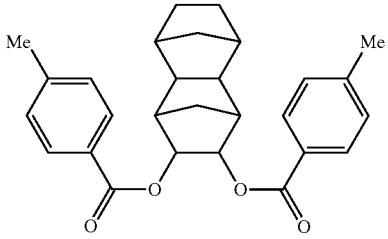
E-72
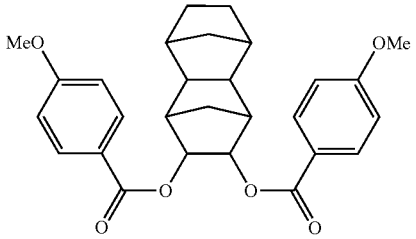
E-73
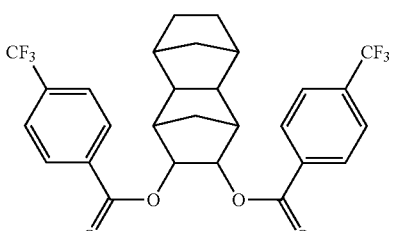
E-74
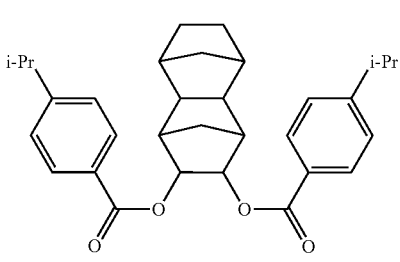

E-75
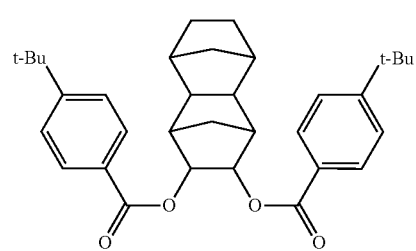
E-76
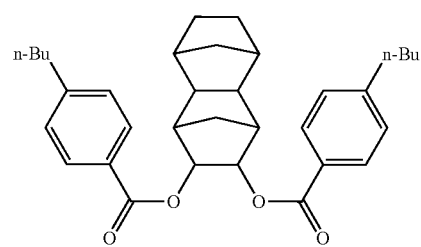
E-77
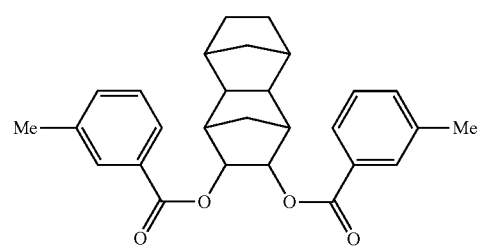
E-78
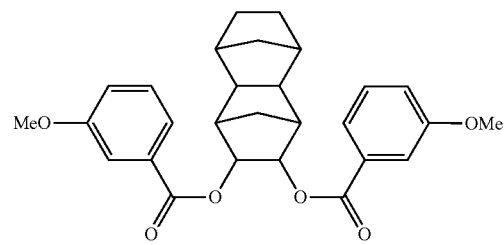
E-79
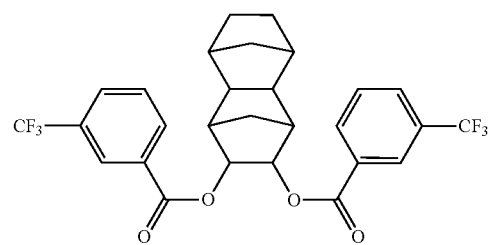
E-80
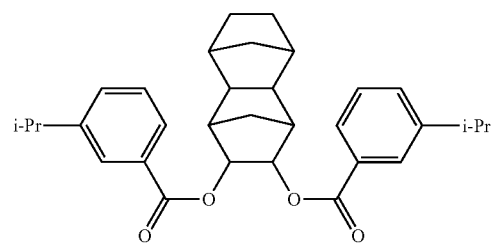
E-81
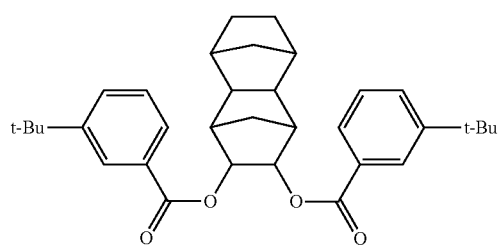
E-82
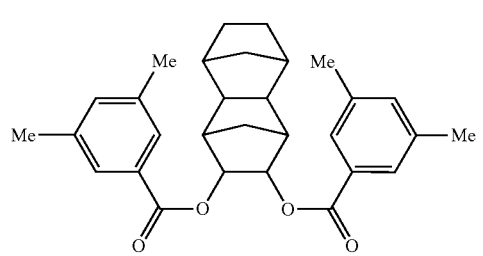
E-83
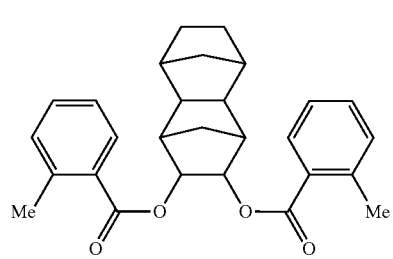
E-84
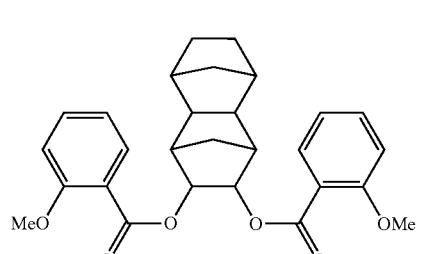
E-85
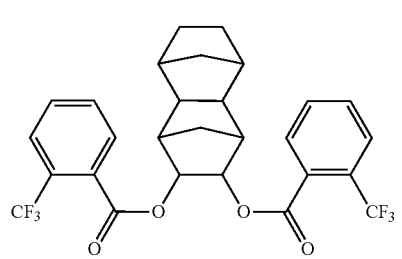
E-86
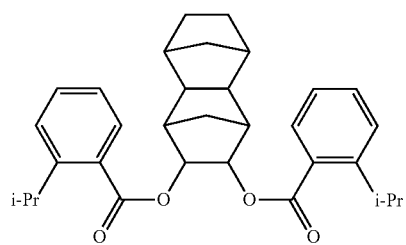

[Chem. 27]
E-87 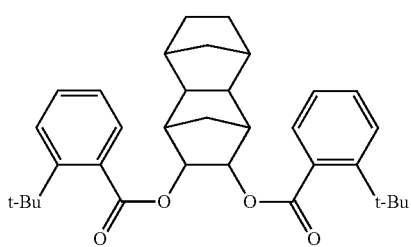
E-88 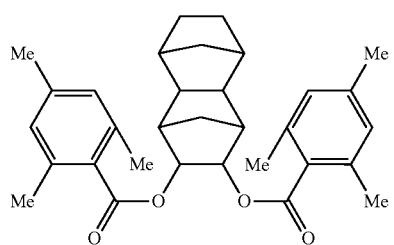
E-89 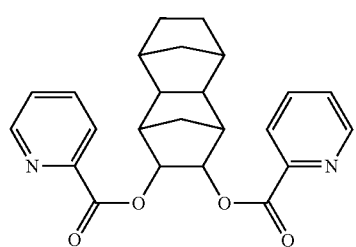
E-90 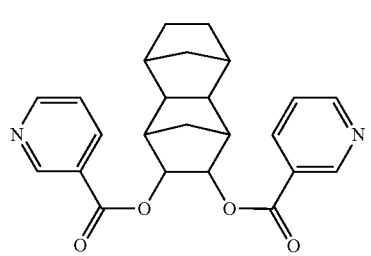
E-91 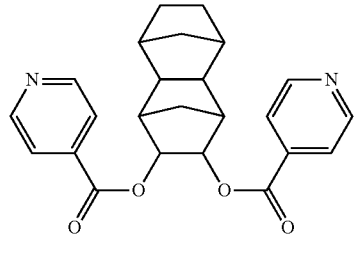
E-92 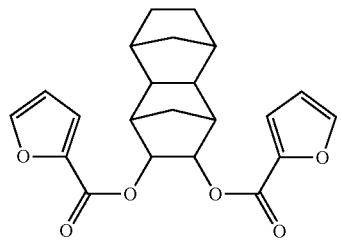
E-93 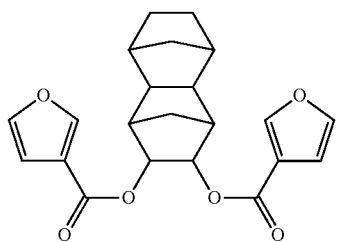
E-94 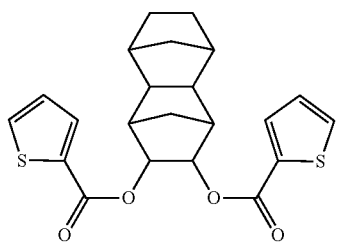
E-95 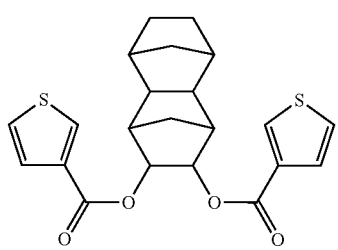
E-96 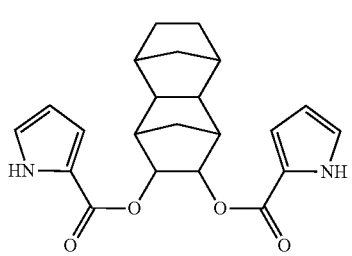
E-97 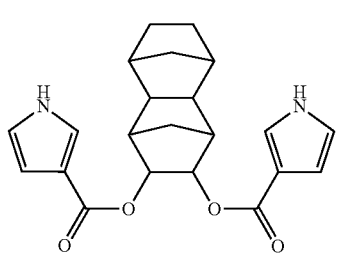
E-98 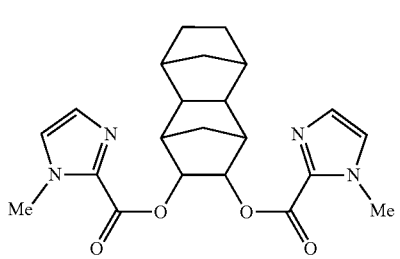

E-99
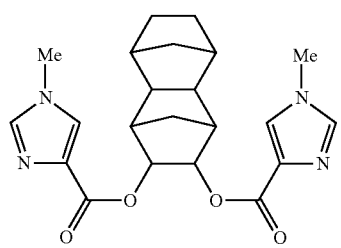
E-100
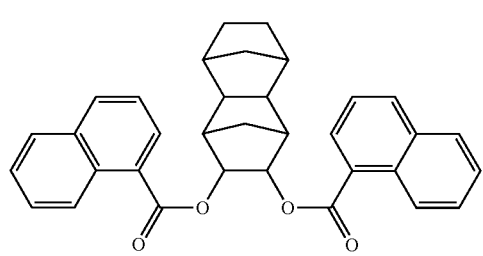
E-101
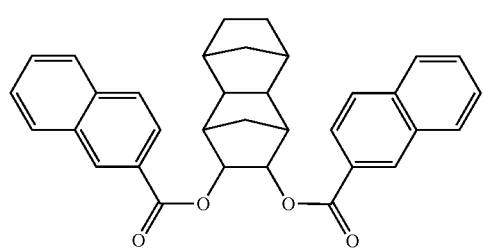
E-102
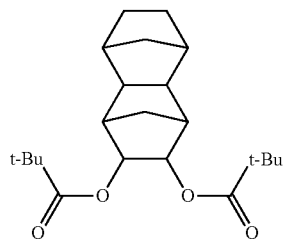
E-103
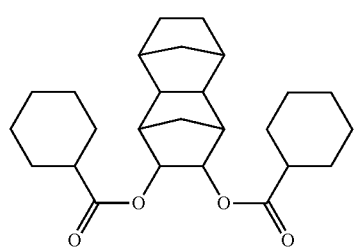
[Chem. 28]
F-1
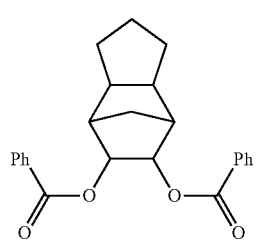
F-2
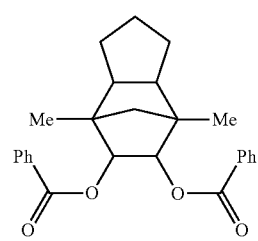
F-3
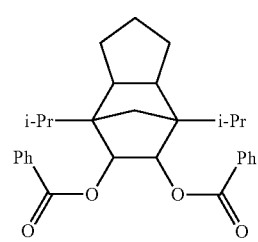
F-4
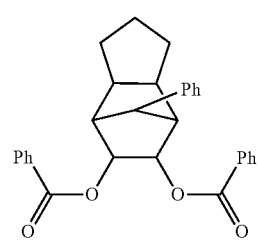
F-5
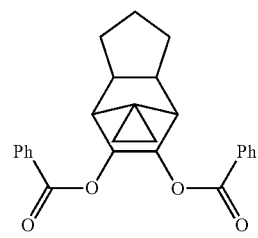
F-6
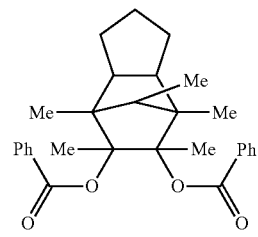
F-7
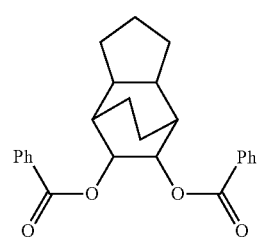

F-8
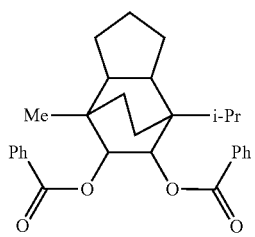
F-9
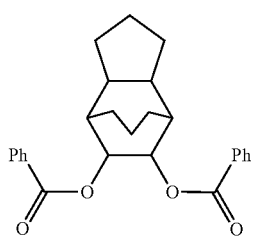
F-10
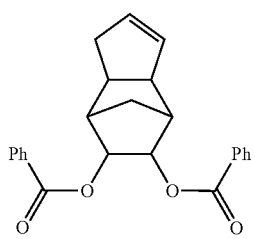
F-11
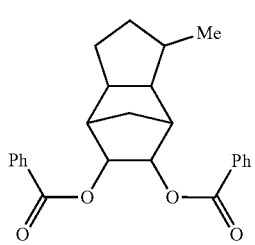
F-12
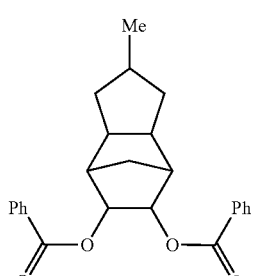
F-13
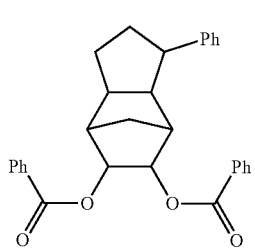
F-14
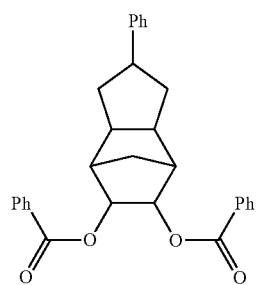
F-15
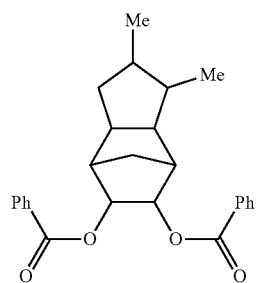
F-16
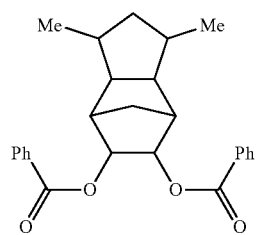
F-17
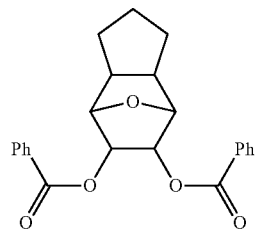
F-18
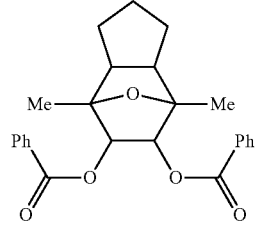
F-19
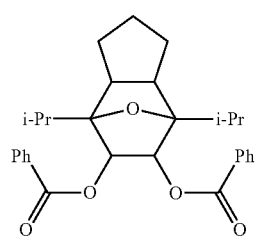

F-20 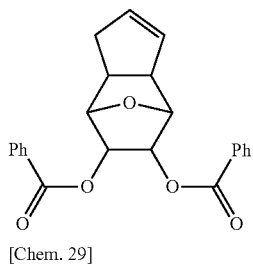
[Chem. 29]
F-21 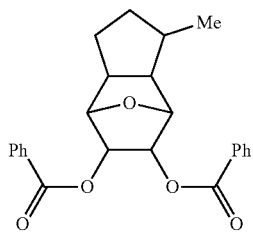
F-22 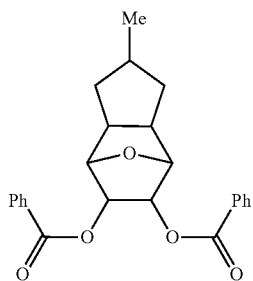
F-23 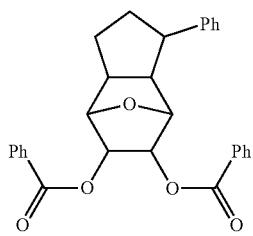
F-24 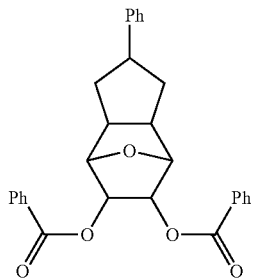
F-25 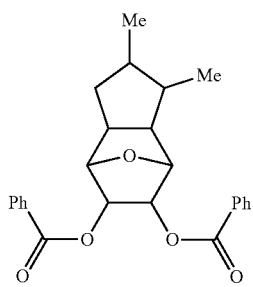
F-26 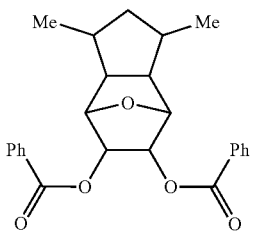
F-27 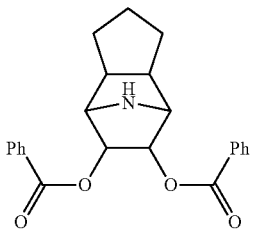
F-28 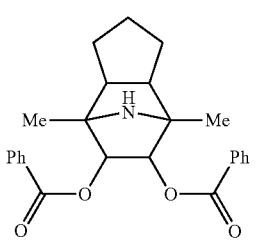
F-29 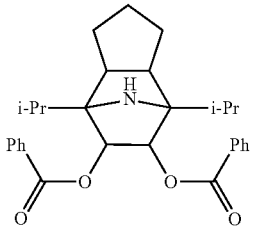
F-30 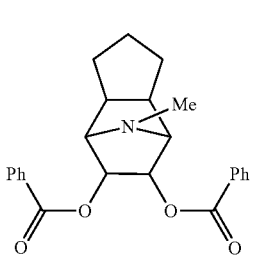
F-31 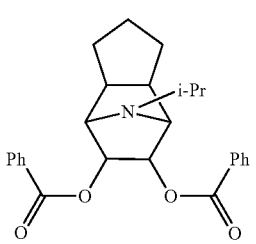

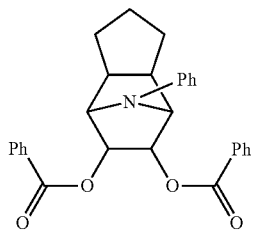 F-32
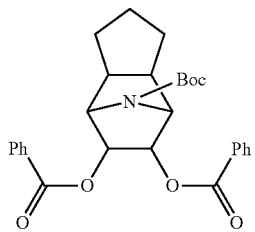 F-33
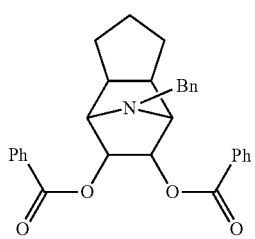 F-34
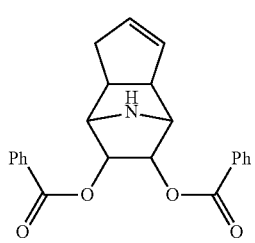 F-35
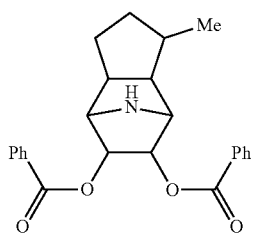 F-36
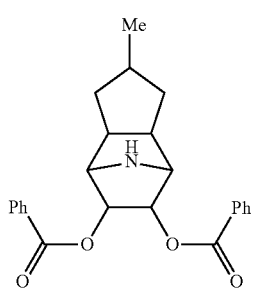 F-37
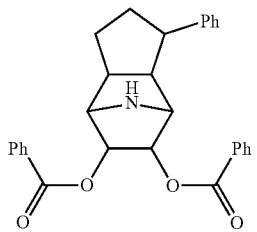 F-38
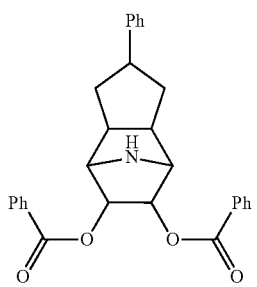 F-39
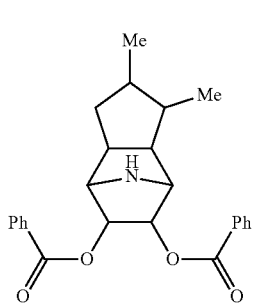 F-40
[Chem. 30]
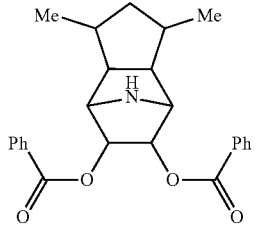 F-41
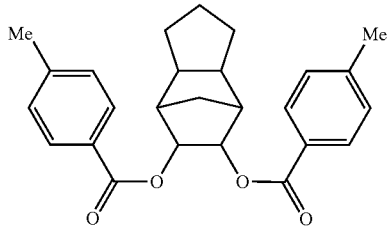 F-42
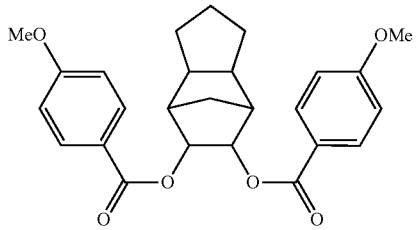 F-43

F-44
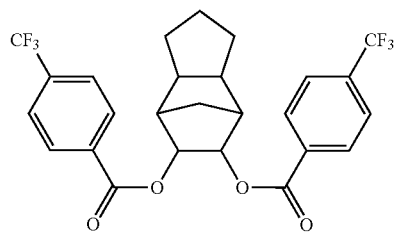
F-45
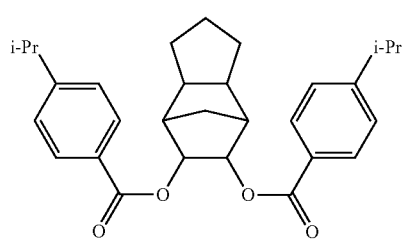
F-46
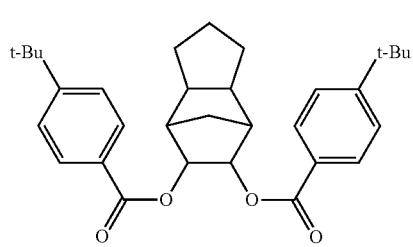
F-47
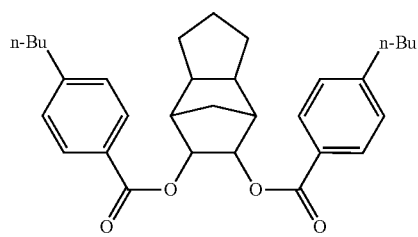
F-48
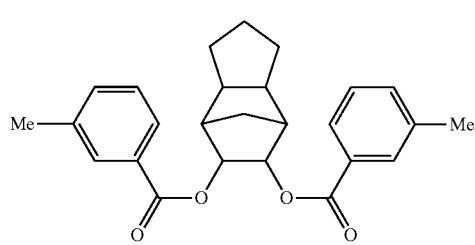
F-49
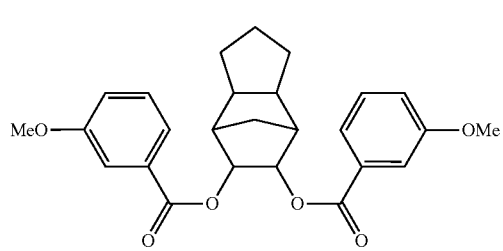
F-50
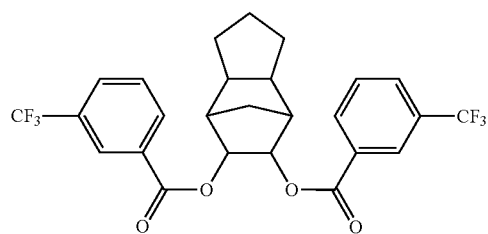
F-51
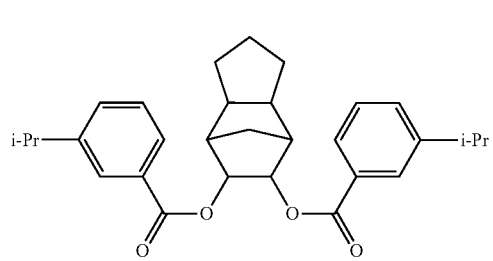
F-52
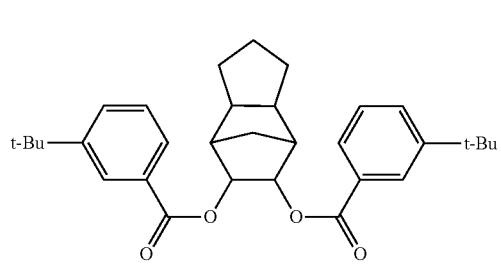
F-53
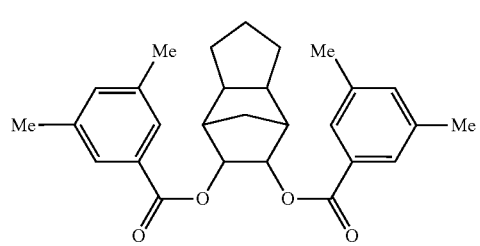
F-54
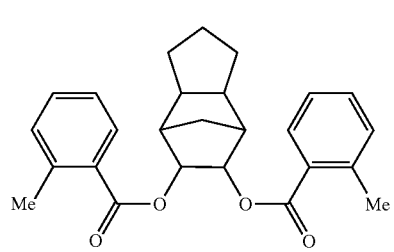
F-55
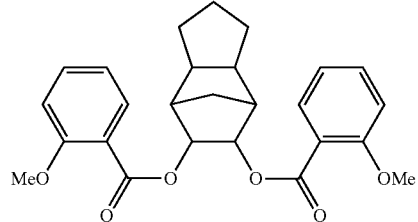

F-56 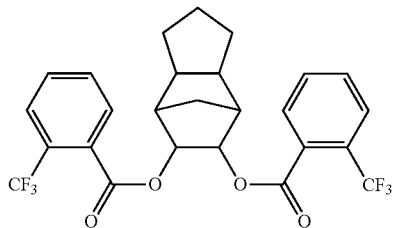
[Chem. 31]
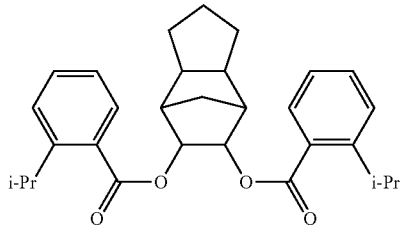
F-58 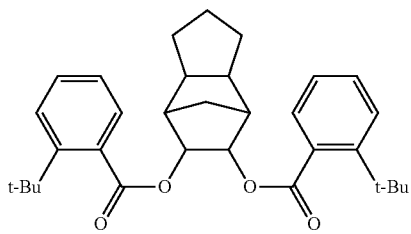
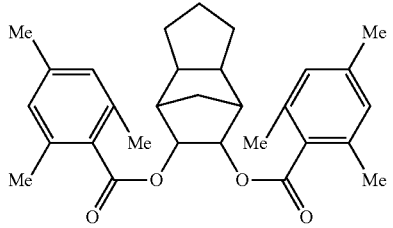
F-60 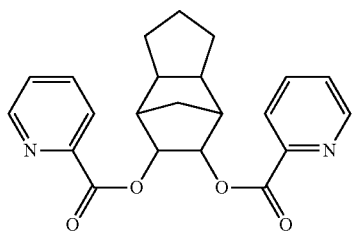
F-61 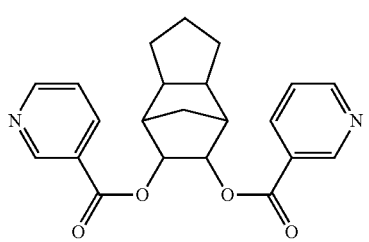
F-61 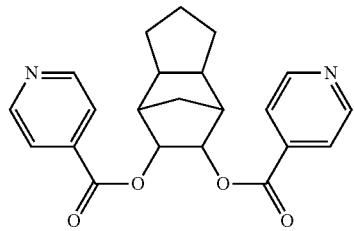
F-63 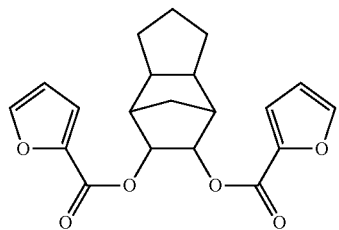
F-64 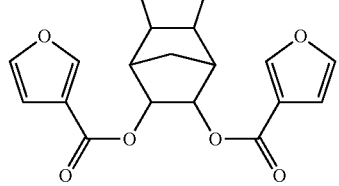
F-65 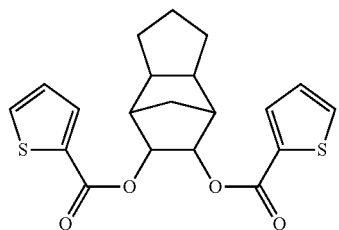
F-66 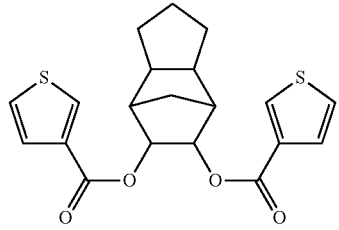
F-67 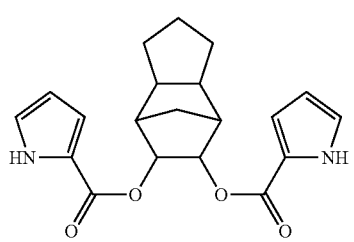

F-68 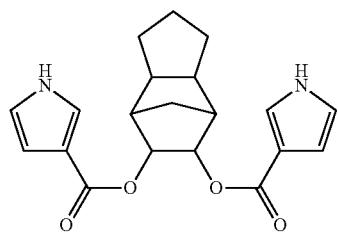
F-69 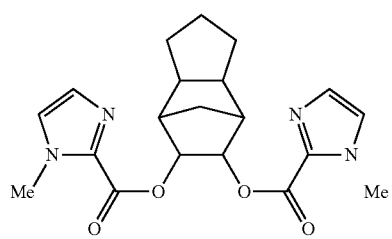
F-70 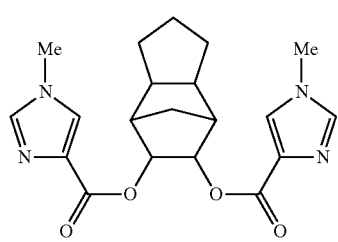
F-71 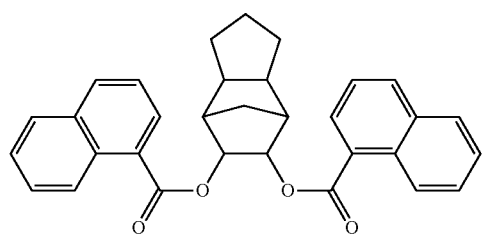
F-72 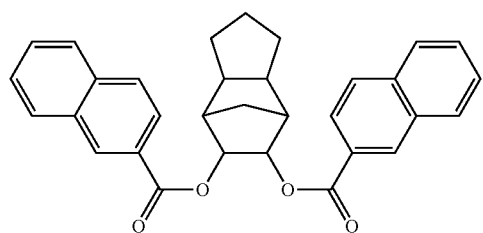
F-73 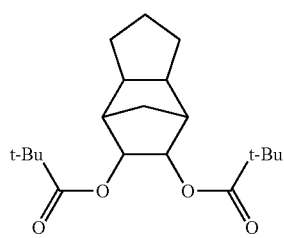
F-74 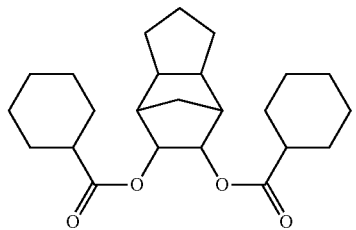
[Chem. 32]
G-1 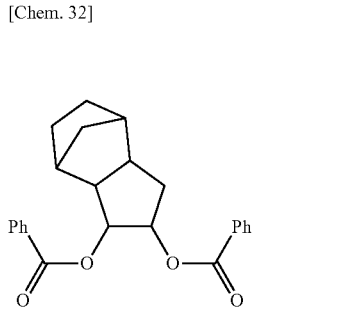
G-2 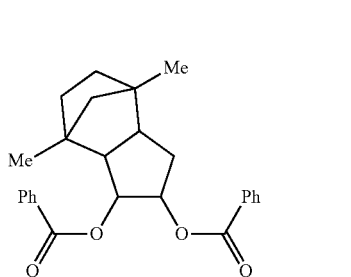
G-3 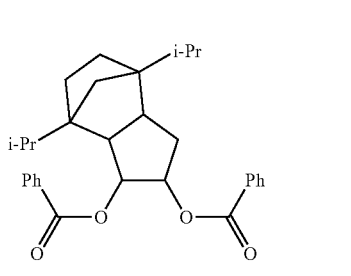
G-4 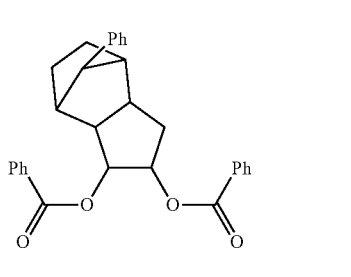
G-5 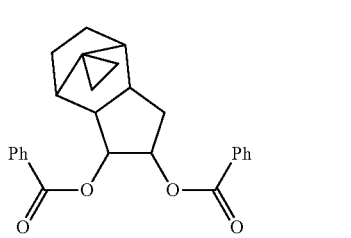

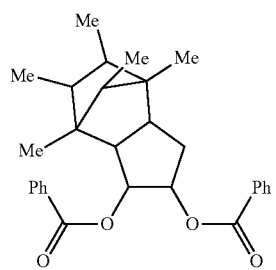
G-6
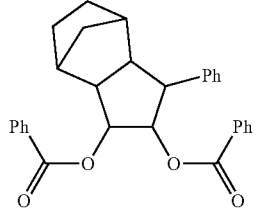
G-13
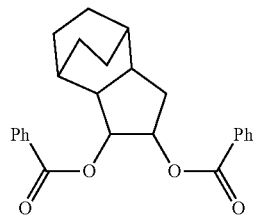
G-7
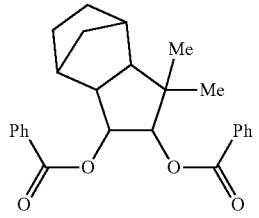
G-14
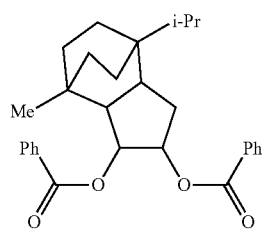
G-8
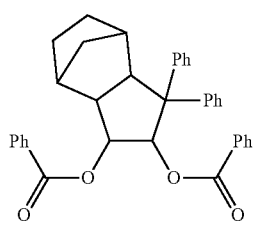
G-15
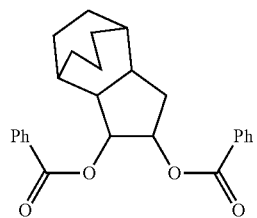
G-9
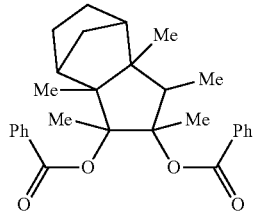
G-16
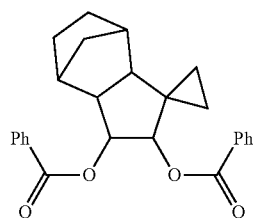
G-10
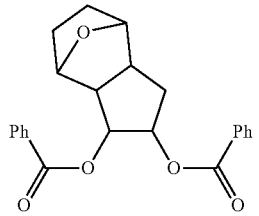
G-17
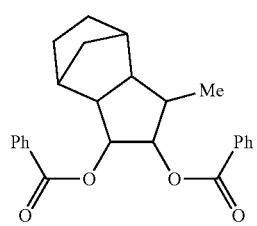
G-11
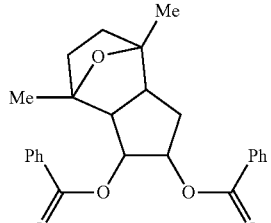
G-18
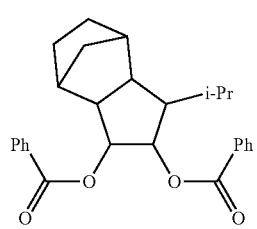
G-12
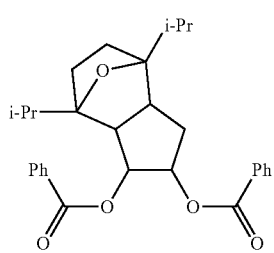
G-19

G-20 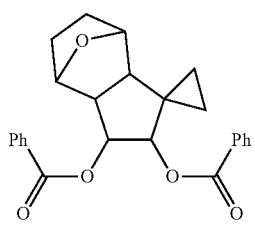
[Chem. 33]
G-21 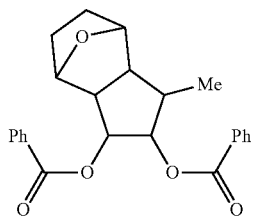
G-22 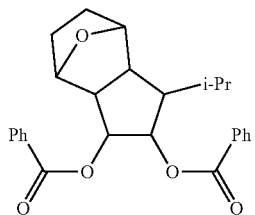
G-23 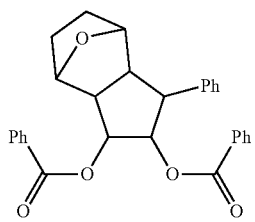
G-24 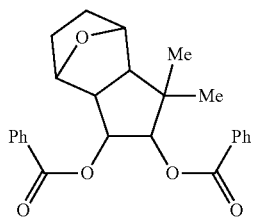
G-25 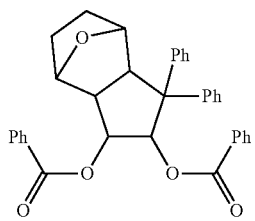
G-26 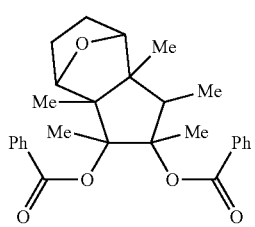
G-27 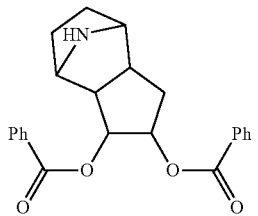
G-28 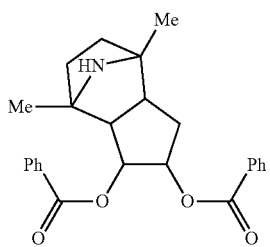
G-29 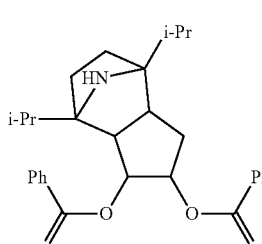
G-30 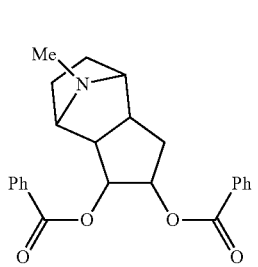
G-31 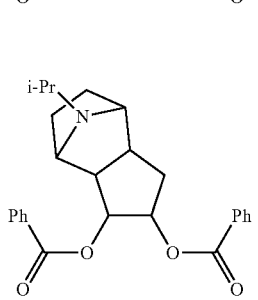
G-32 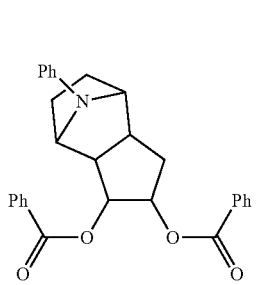

G-33 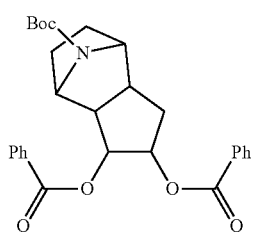
G-34 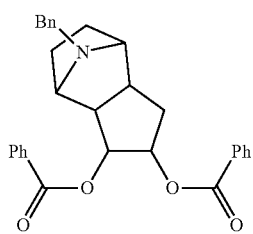
G-35 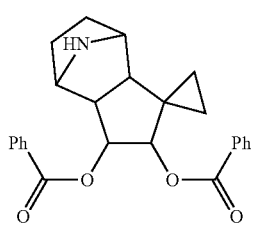
G-36 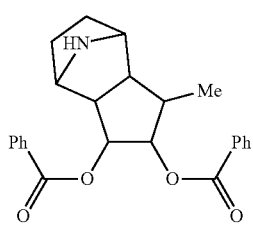
G-37 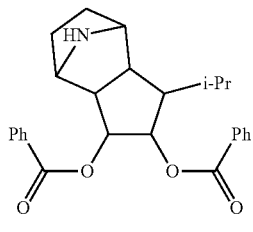
G-38 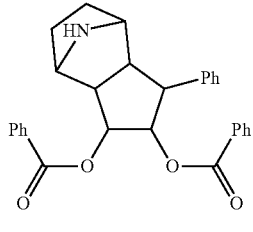
G-39 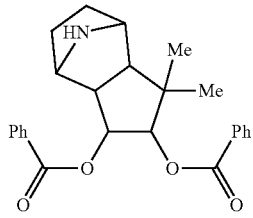
G-40 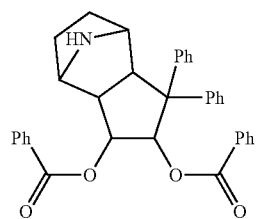
[Chem. 34]
G-41 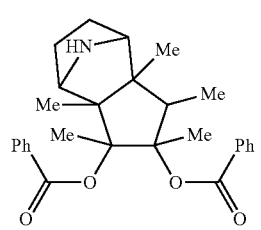
G-42 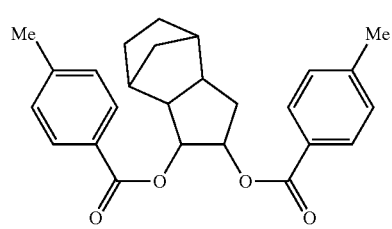
G-43 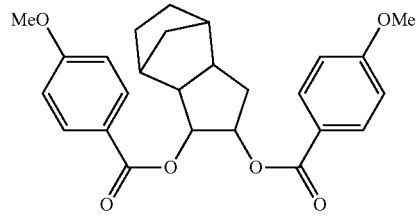
G-44 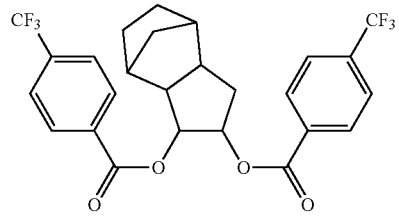
G-45 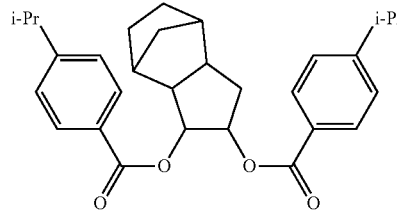
G-46 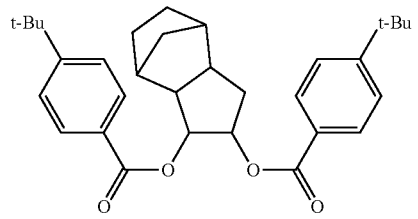

G-47
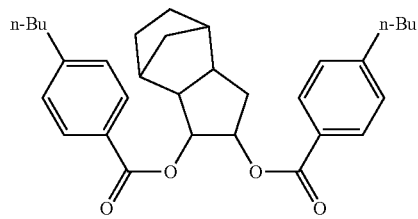
G-48
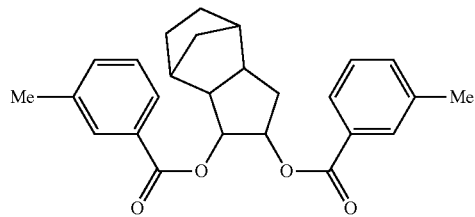
G-49
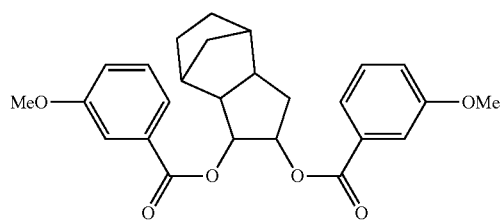
G-50
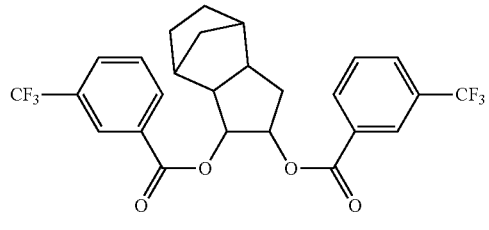
G-51
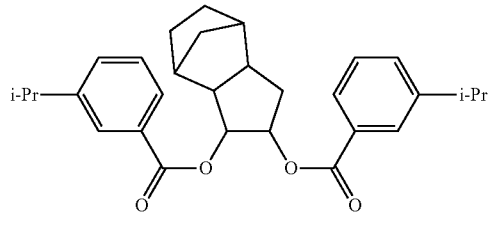
G-52
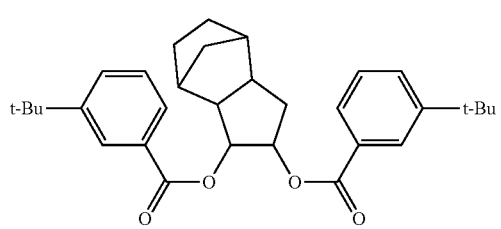
G-53
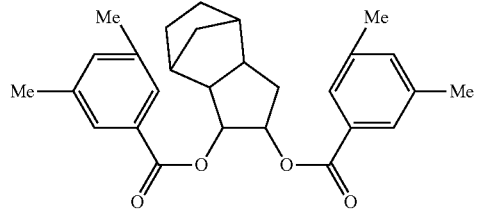
G-54
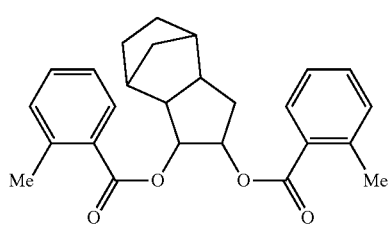
G-55
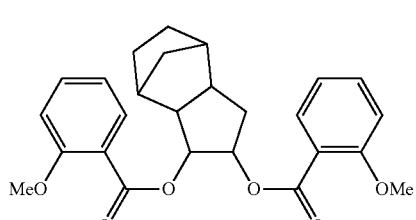
G-56
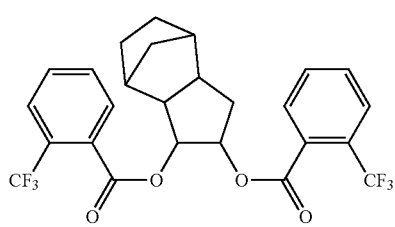
G-57
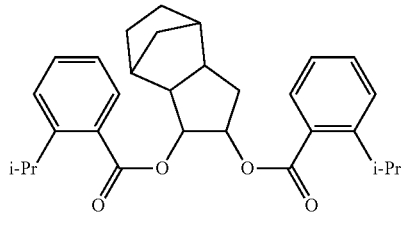
G-58
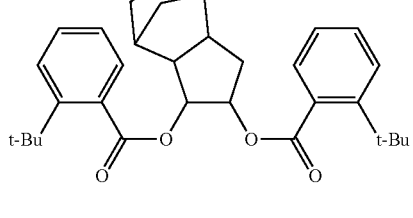
G-59
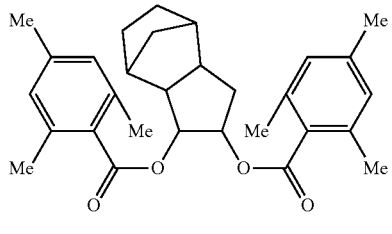
G-60
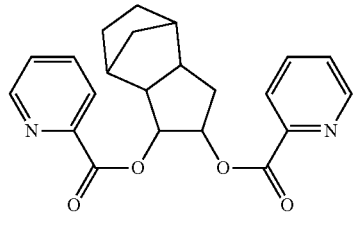

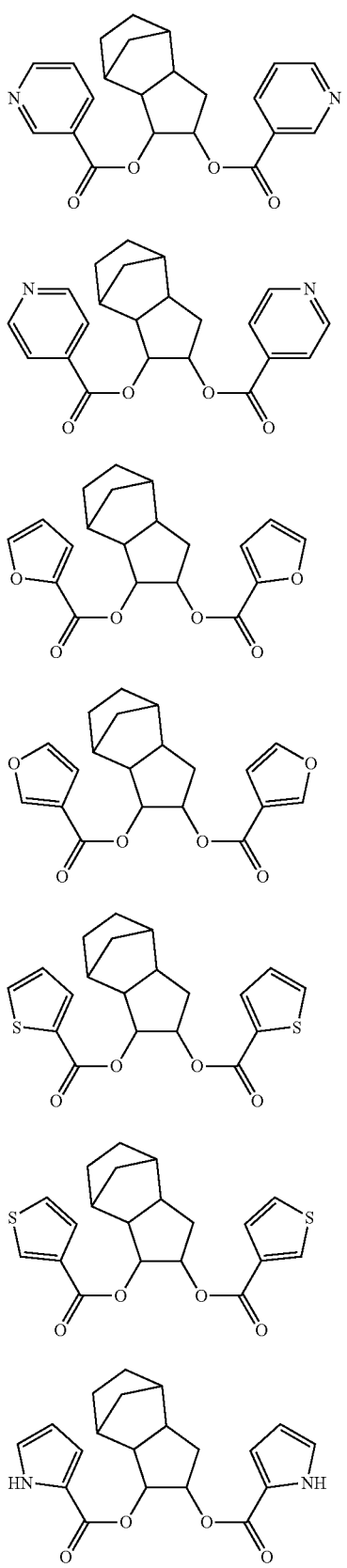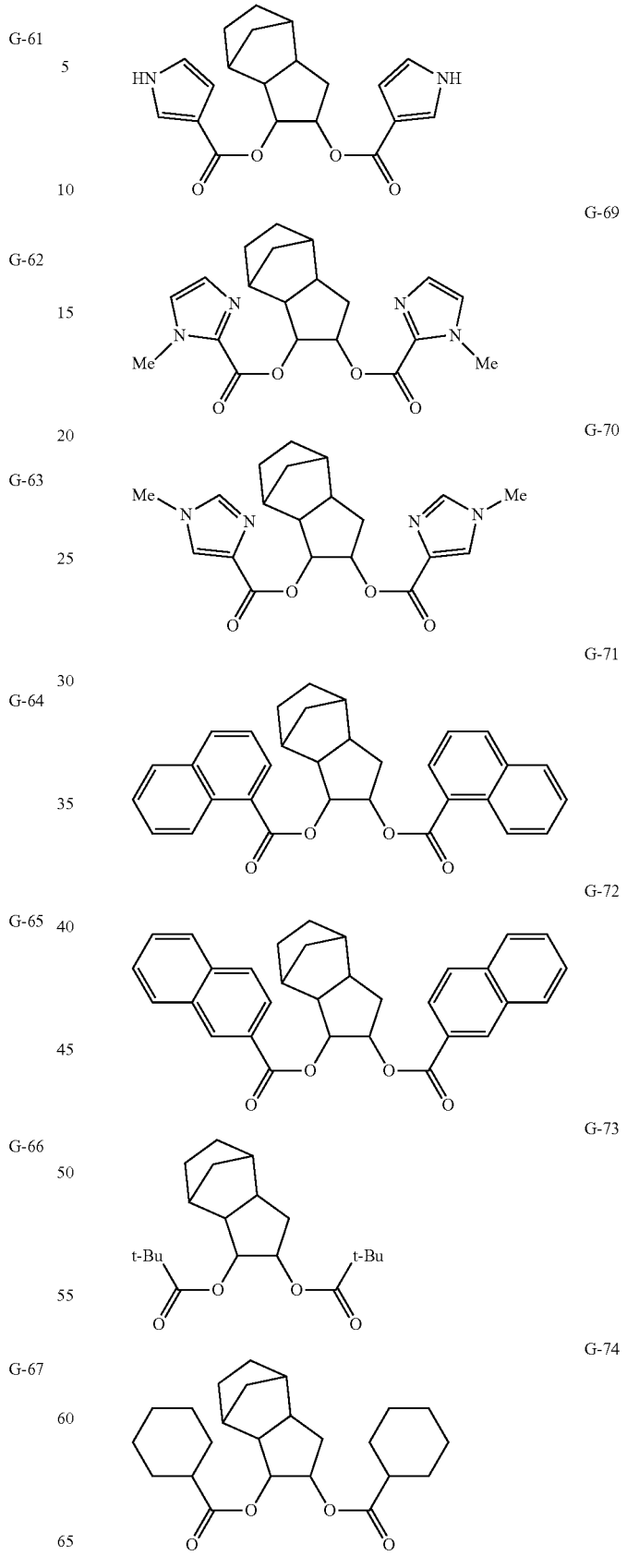

[Chem. 36]
I-1
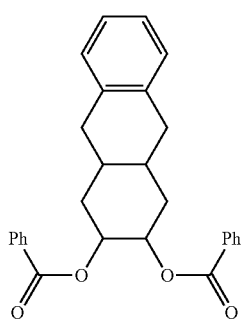
I-2
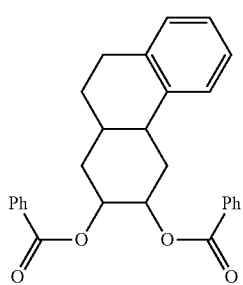
I-3
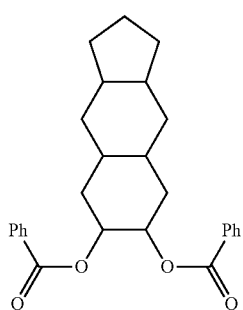
I-4
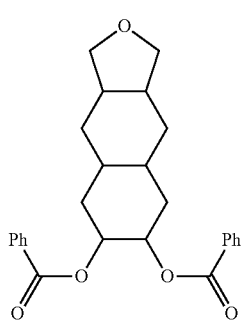
I-5
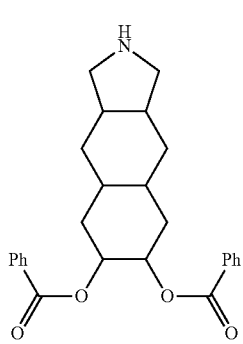
-continued
I-6
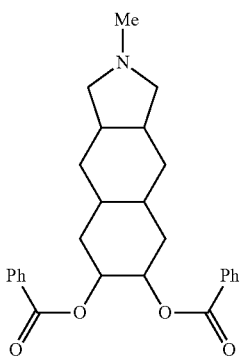
I-7
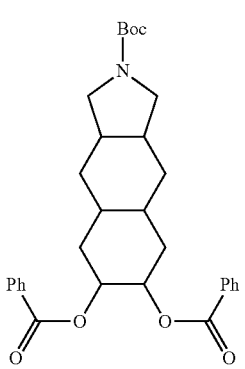
I-8
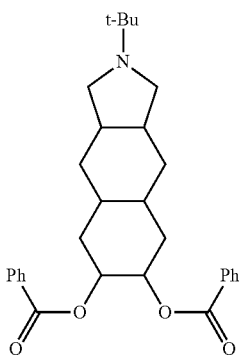
I-9
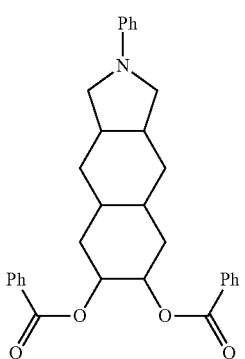

I-10
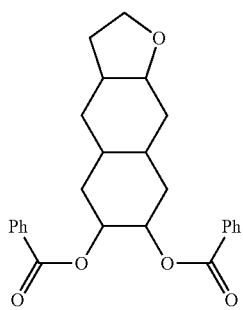
I-11
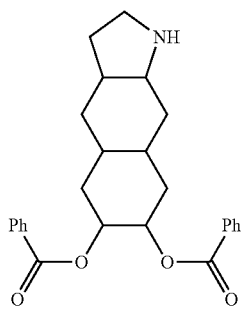
I-12
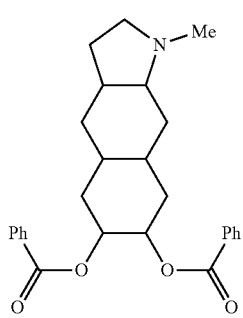
I-13
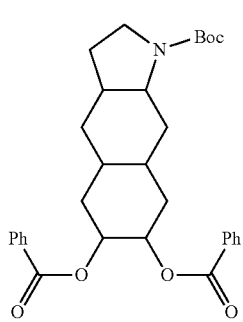
I-14
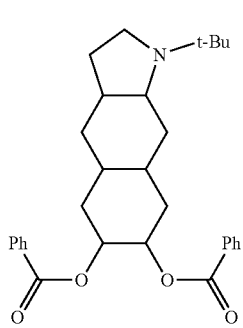
I-15
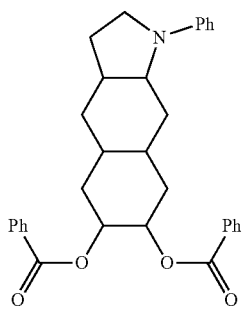
[Chem. 37]
I-16
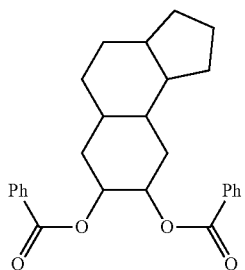
I-17
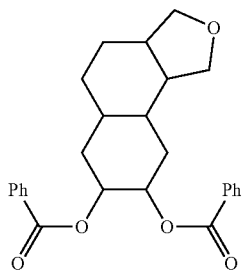
I-18
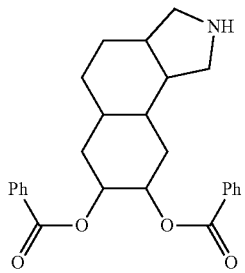
I-19
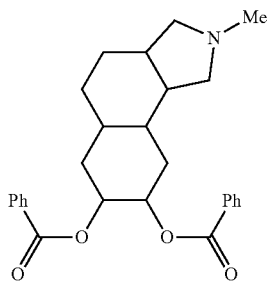

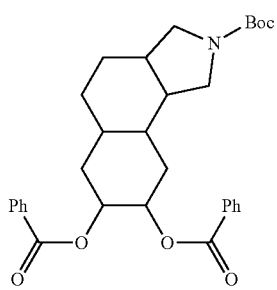
I-20
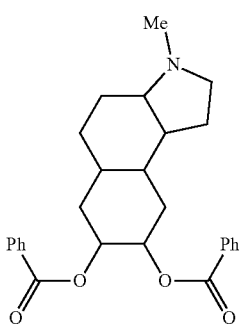
I-25
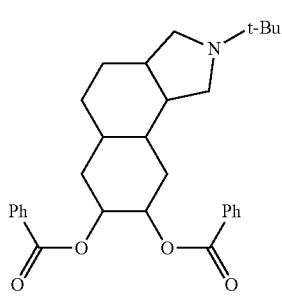
I-21
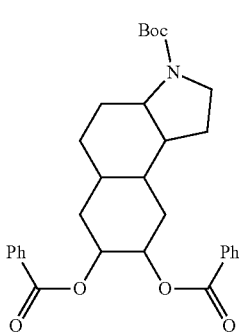
I-26
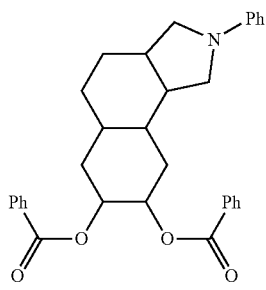
I-22
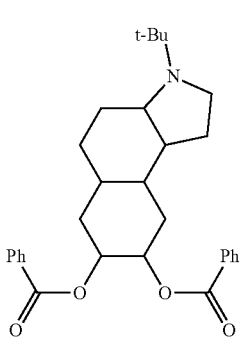
I-27
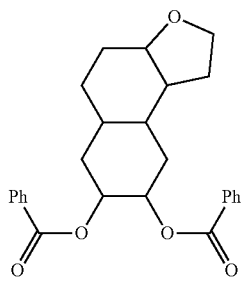
I-23
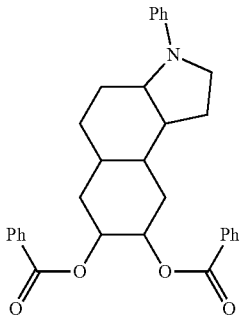
I-28
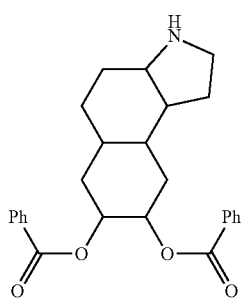
I-24
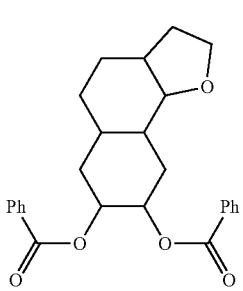
I-29

I-30
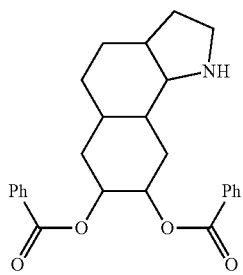
[Chem. 38]
I-31
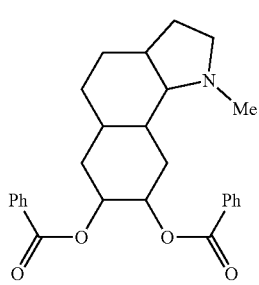
I-32
I-33
I-34
I-36
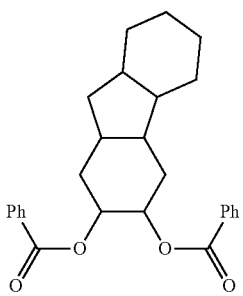
I-56
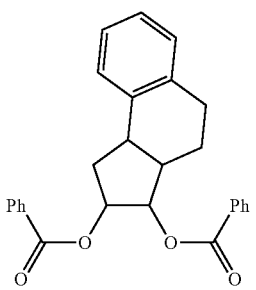
I-61
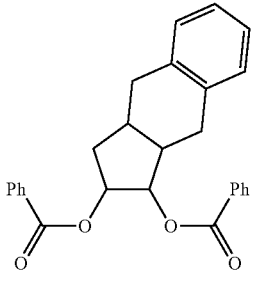
I-62
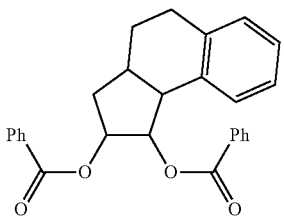
I-67
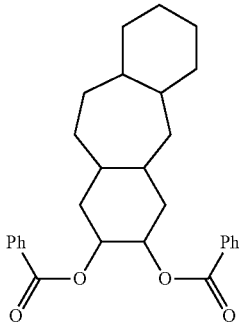

I-68
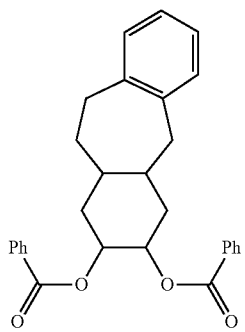
I-69
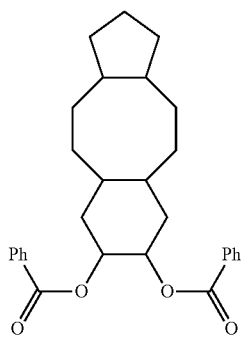
I-70
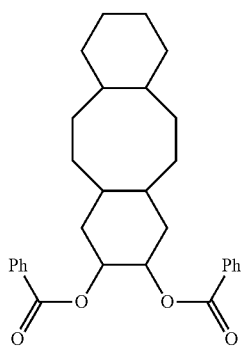
I-71
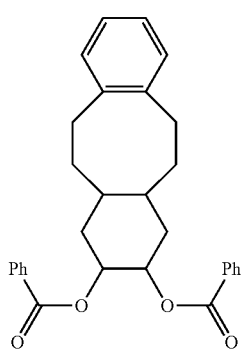
I-74
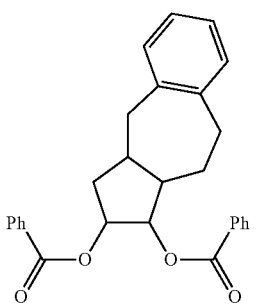
I-75
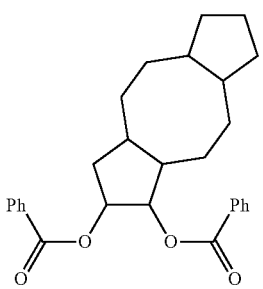
[Chem. 39]
I-76
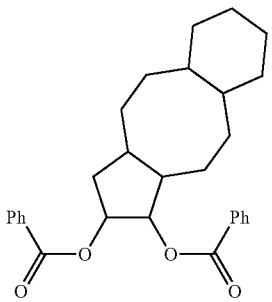
I-77
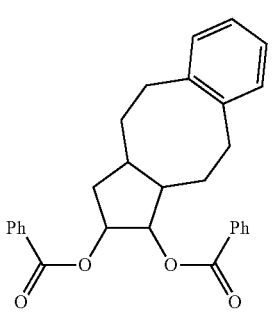
I-78
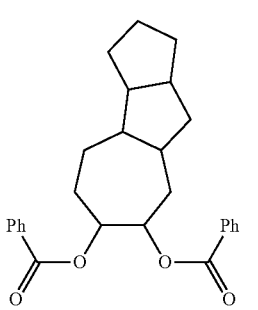

I-79
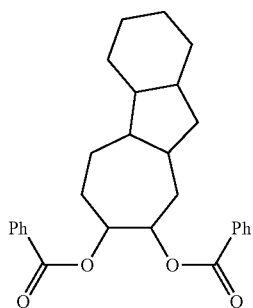
I-80
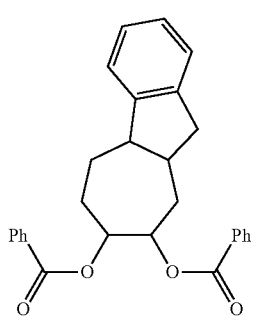
I-81
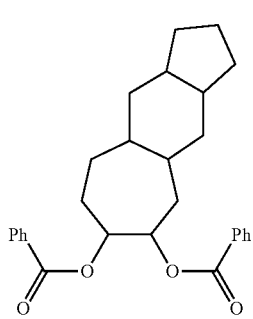
I-83
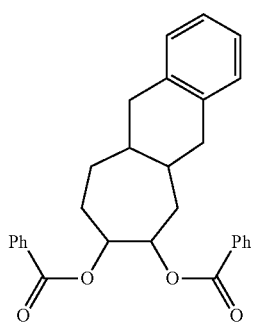
I-84
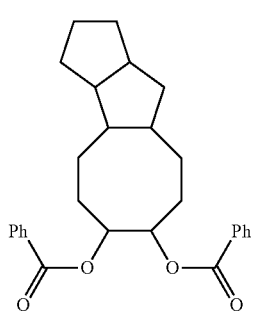
I-85
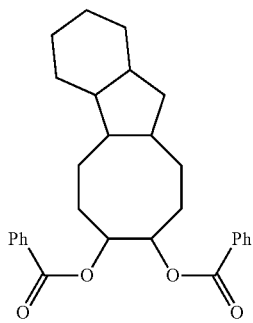
I-86
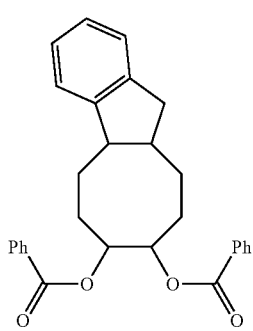
I-87
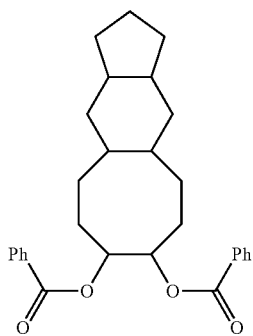
I-88
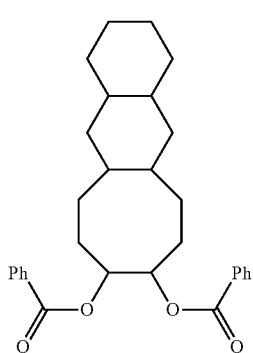

I-89
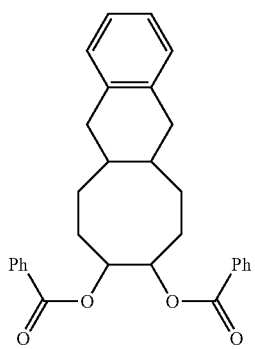
[Chem. 40]
F-75
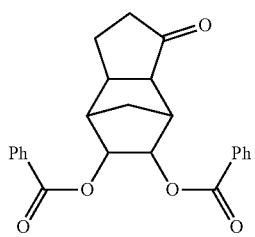
F-76
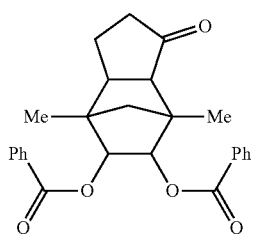
F-77
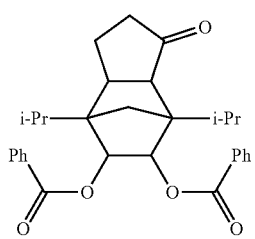
F-78
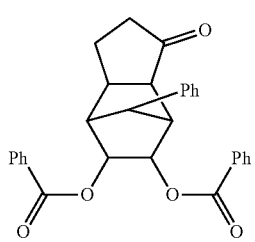
F-79
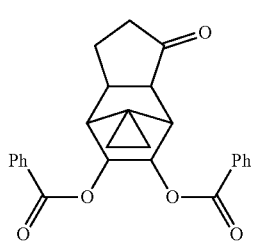
F-80
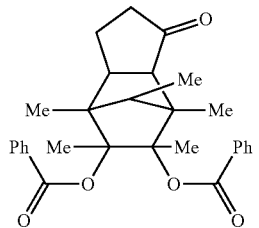
F-81
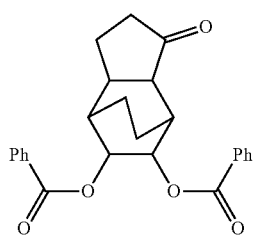
F-82
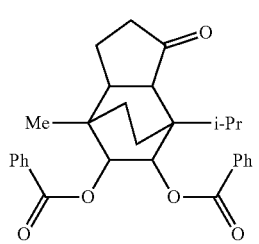
F-83
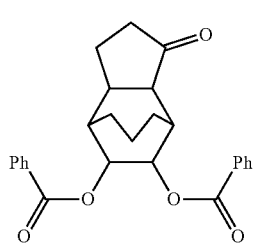
F-84
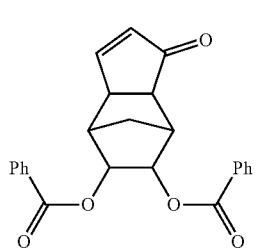
F-85
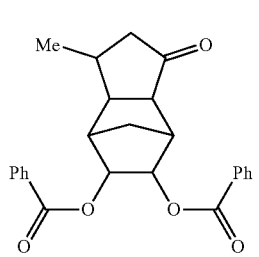

F-86 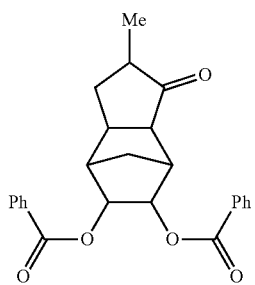
F-87 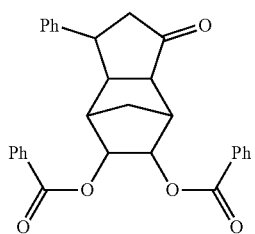
F-88 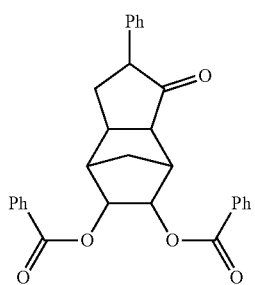
F-89 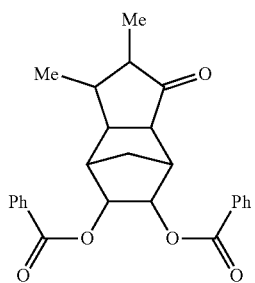
F-90 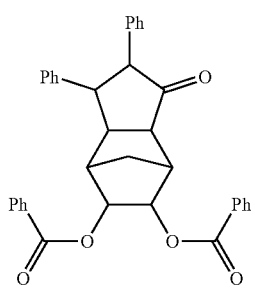
F-91 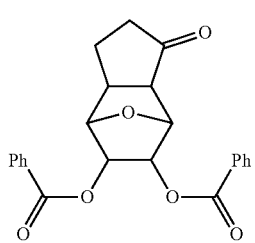
F-92 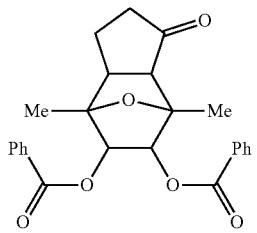
F-93 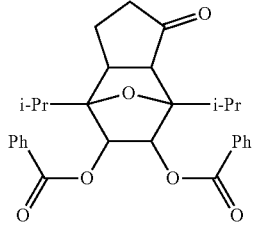
F-94 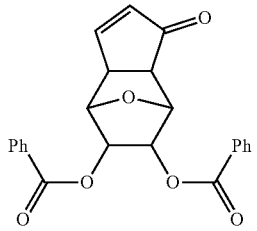
[Chem. 41]
F-95 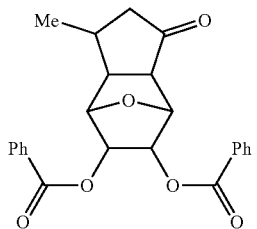
F-96 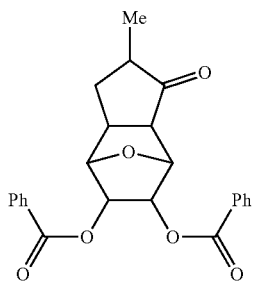
F-97 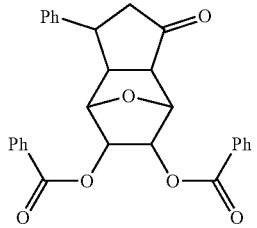

F-98
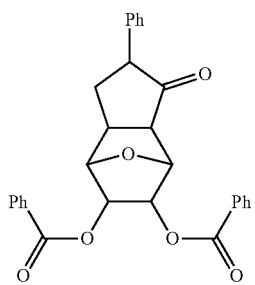
F-99
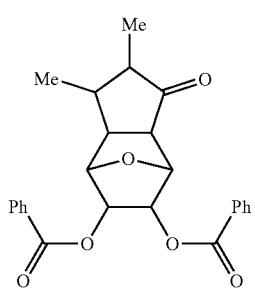
F-100
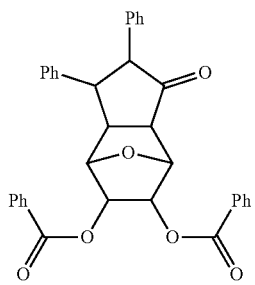
F-101
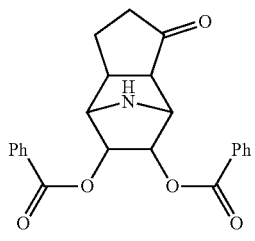
F-102
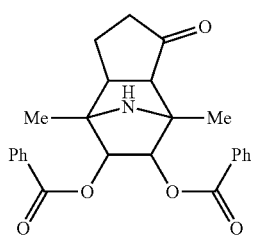
F-103
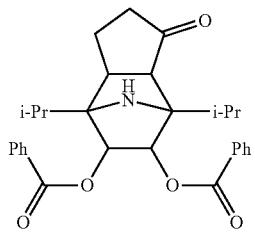
F-104
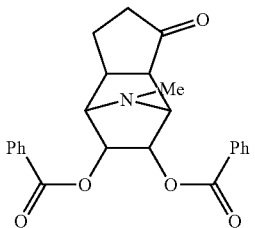
F-105
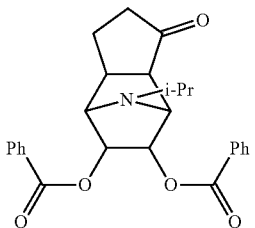
F-106
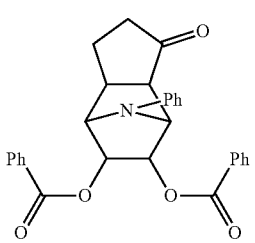
F-107
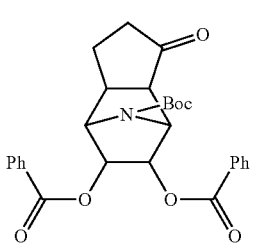
F-108
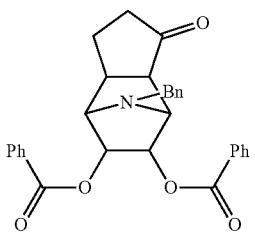
F-109
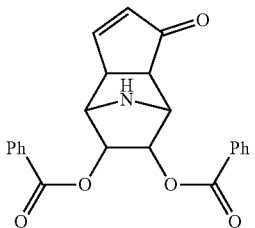

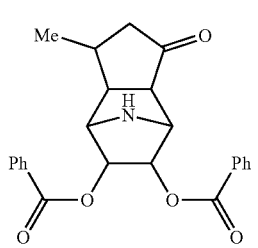
F-110
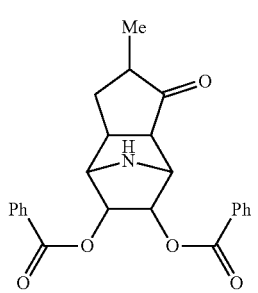
F-111
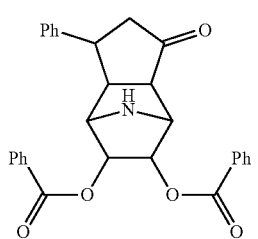
F-112
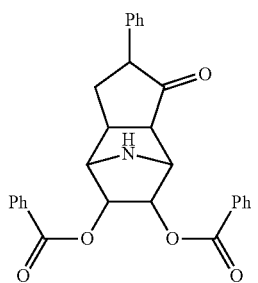
F-113
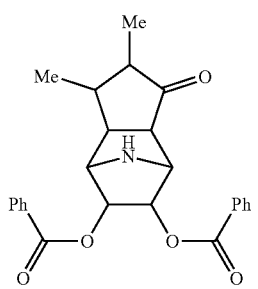
F-114
[Chem. 42]
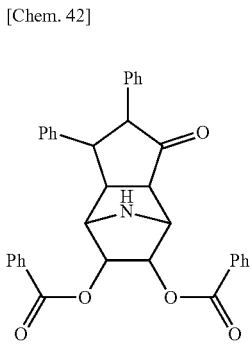
F-115
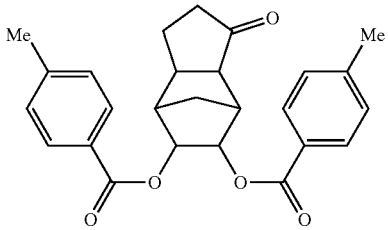
F-116
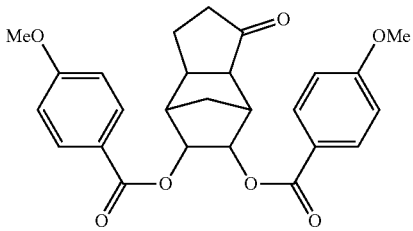
F-117
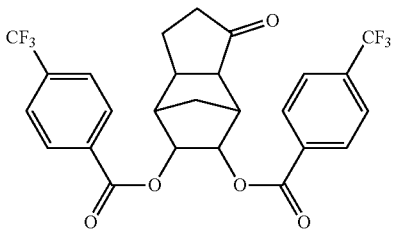
F-118
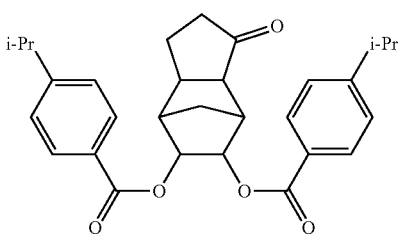
F-119
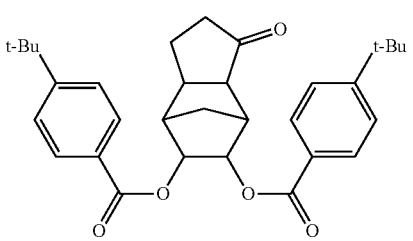
F-120

F-121
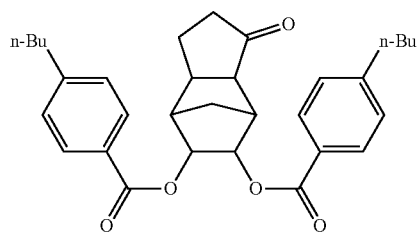
F-122
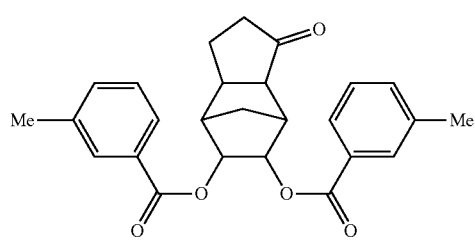
F-123
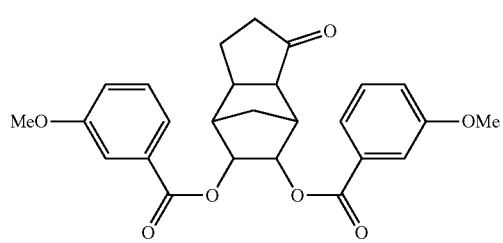
F-124
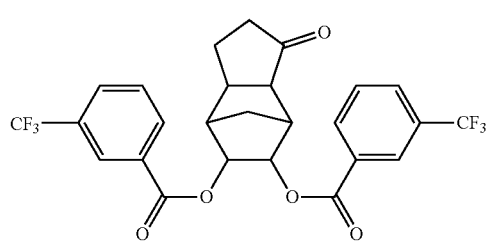
F-125
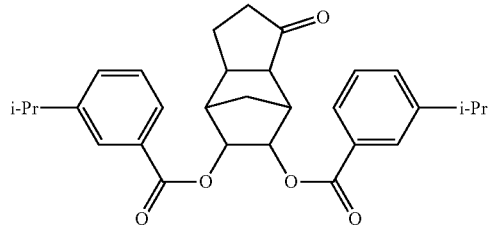
F-126
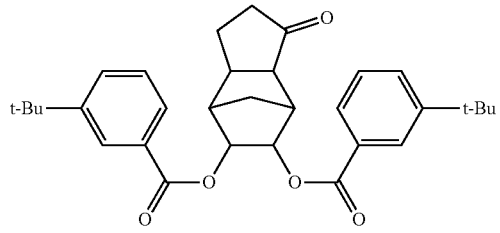
F-127
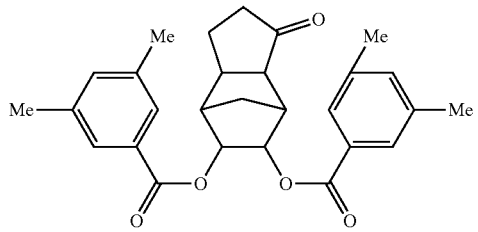
F-128
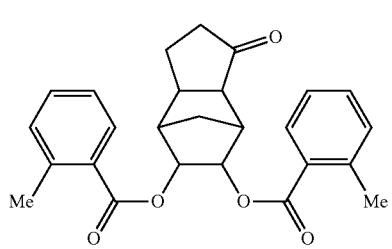
F-129
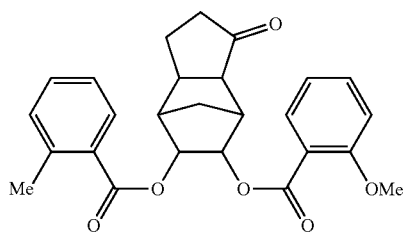
F-130
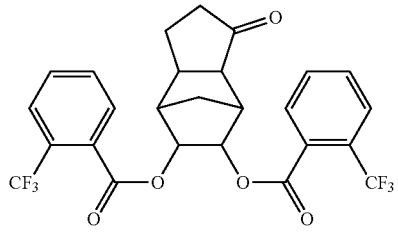
[Chem. 43]
F-131
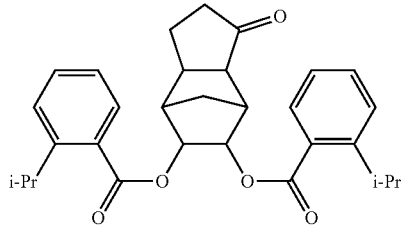
F-132
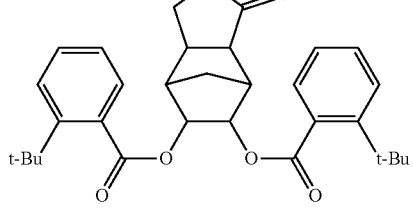

F-133 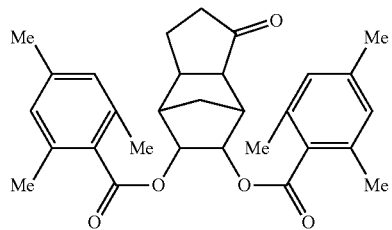
F-134 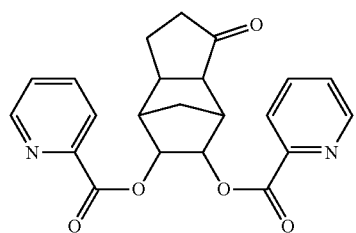
F-135 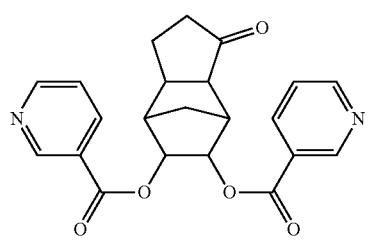
F-136 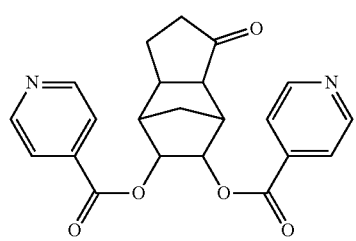
F-137 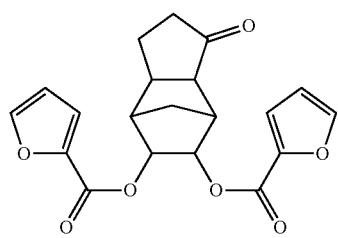
F-138 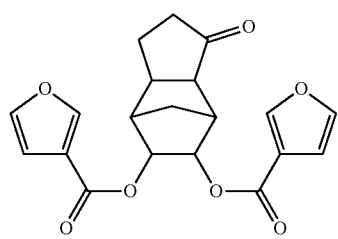
F-139 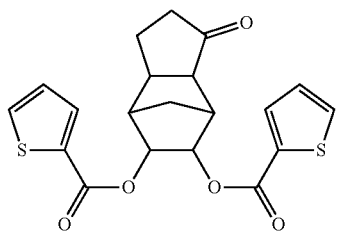
F-140 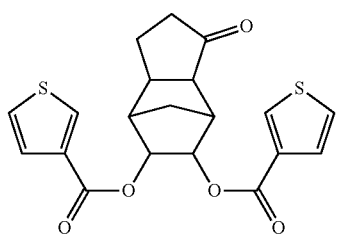
F-141 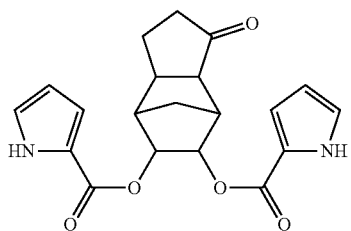
F-142 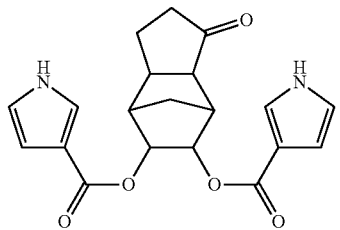
F-143 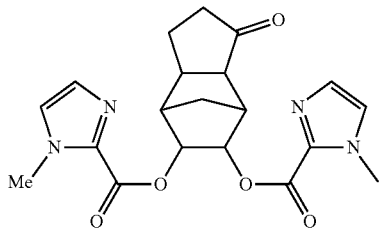
F-144 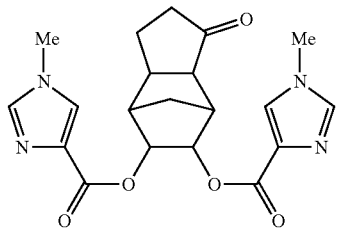

F-145 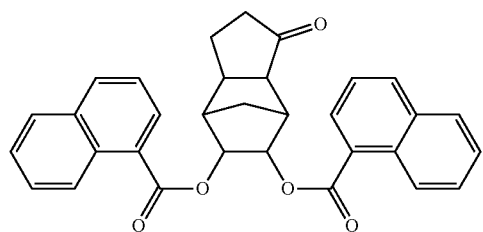
F-146 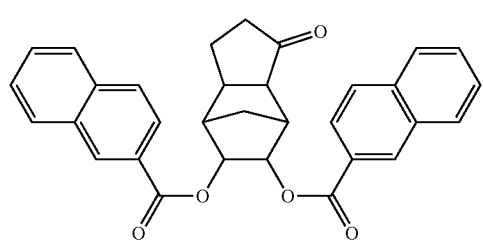
F-147 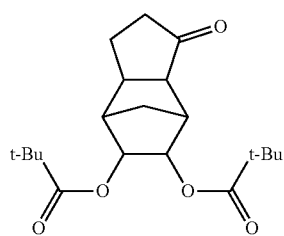
F-148 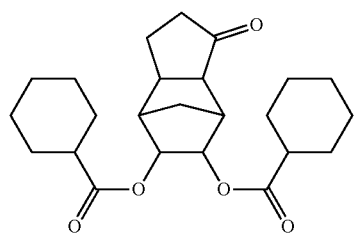
[Chem. 44]
H-1 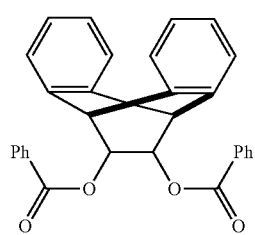
H-2 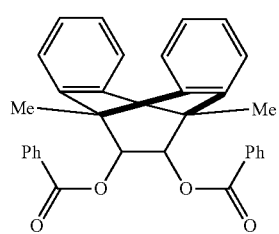
H-3 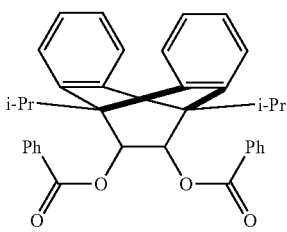
H-4 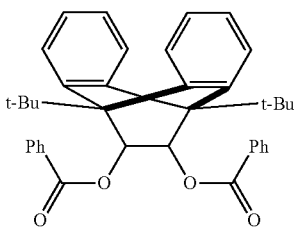
H-5 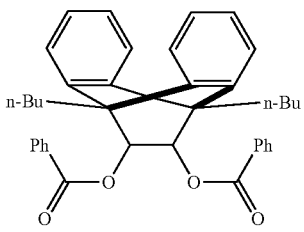
H-6 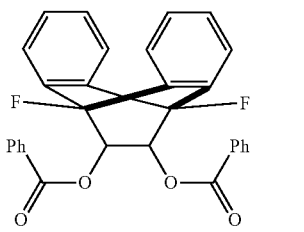
H-7 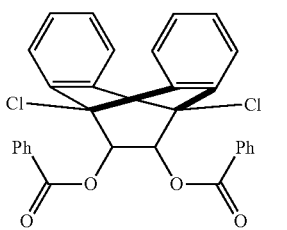
H-8 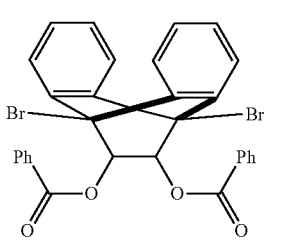
H-9 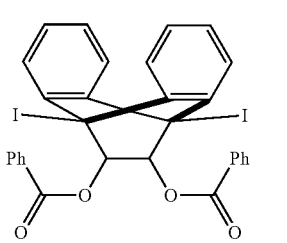

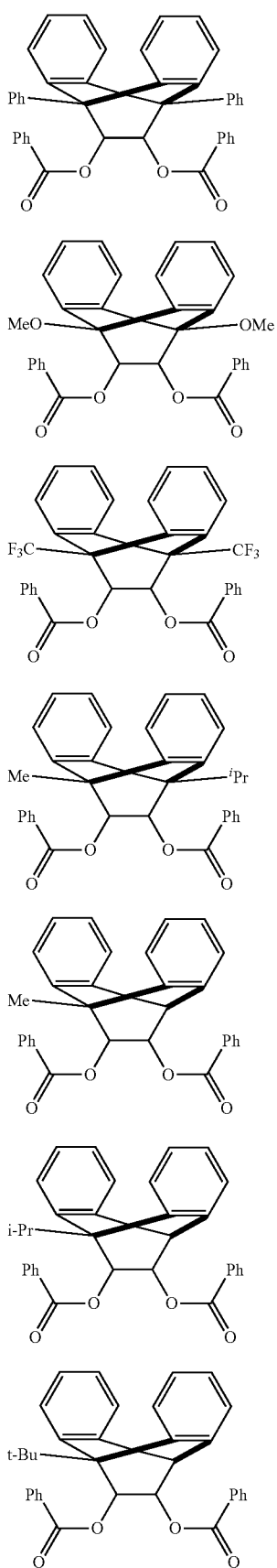
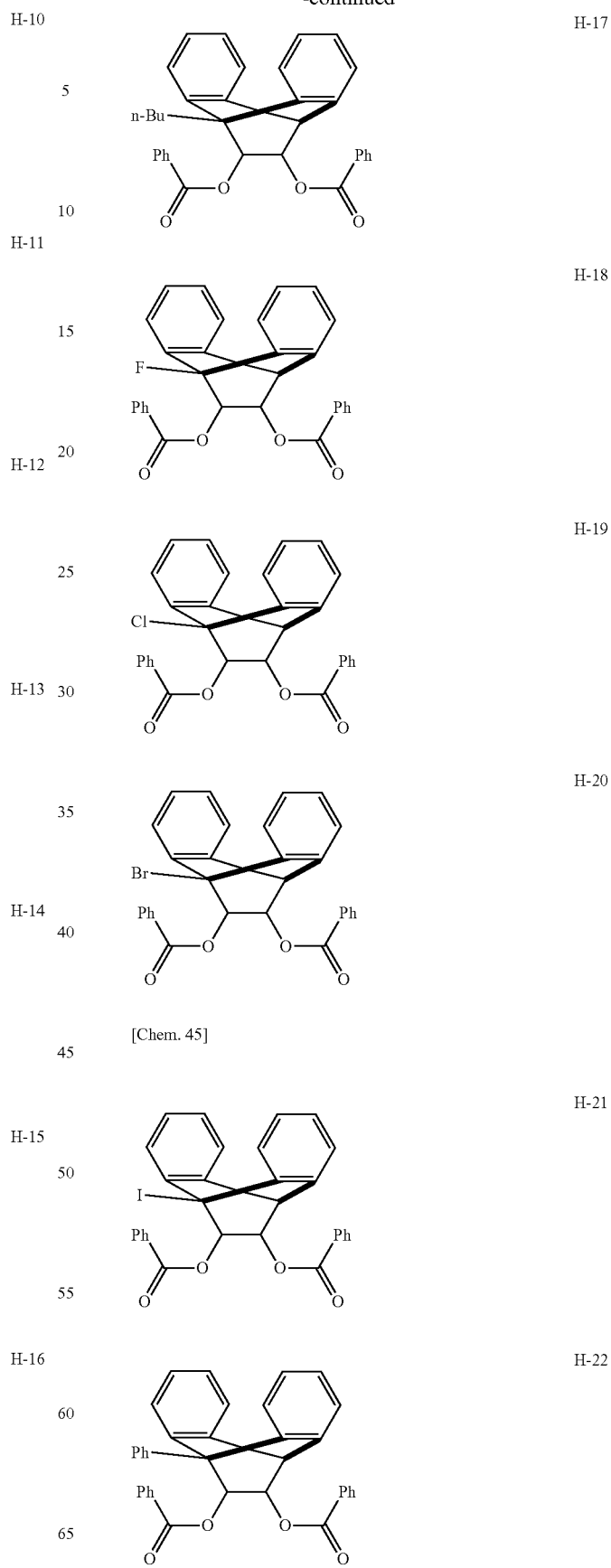

127
-continued
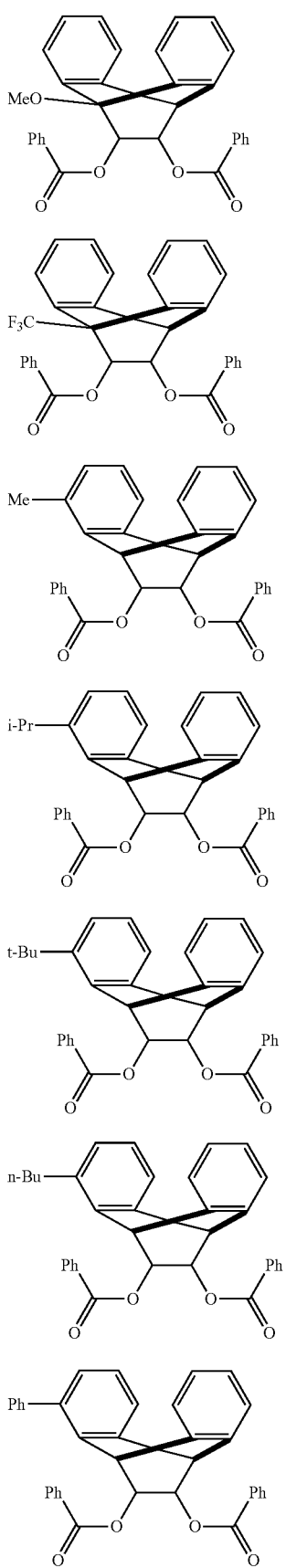
128
-continued
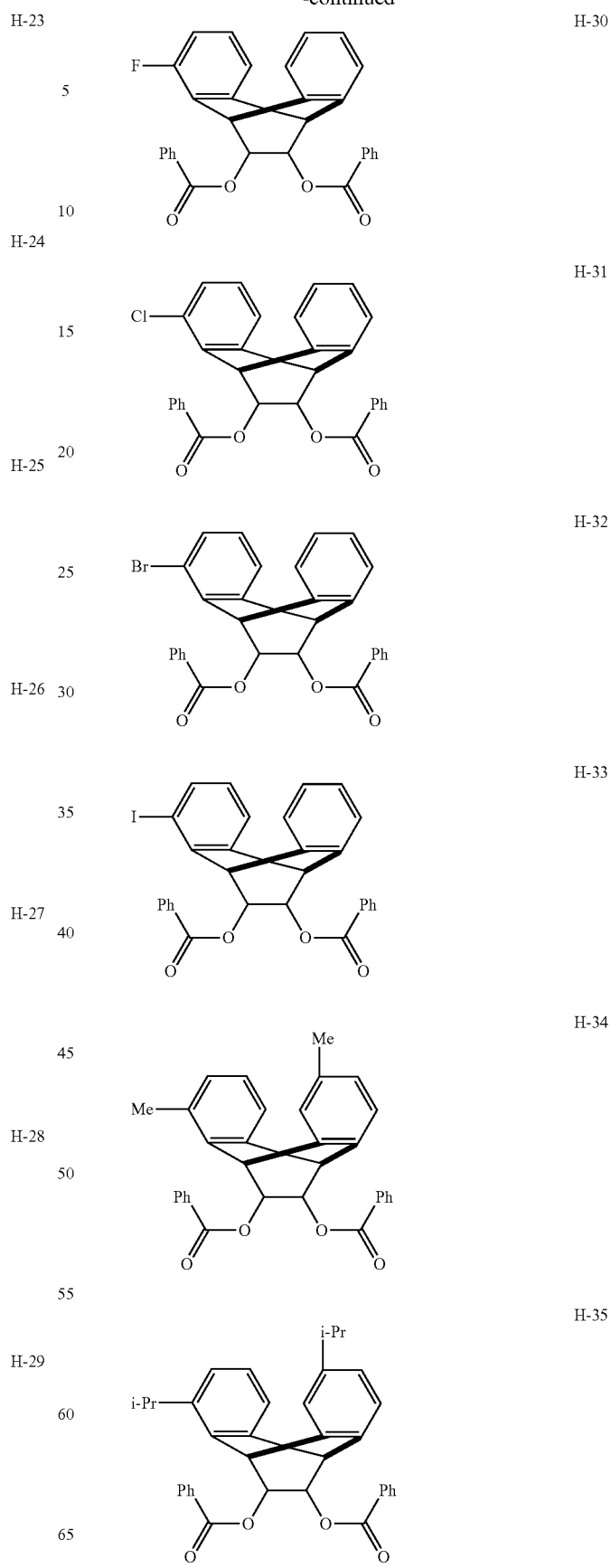

-continued
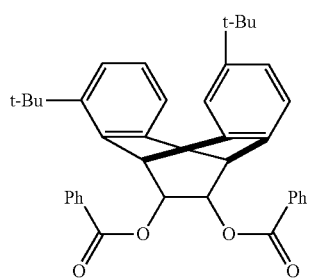
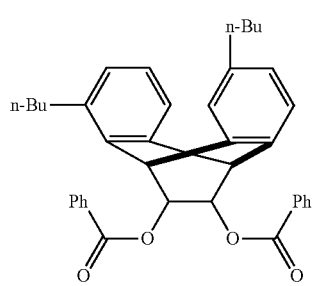
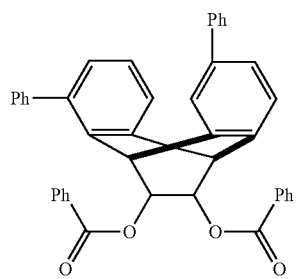
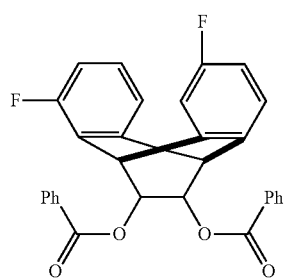
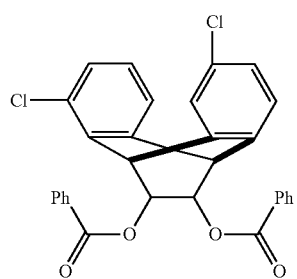
[Chem. 46]
H-36
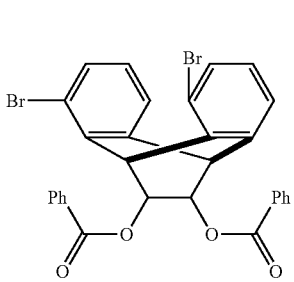
H-37
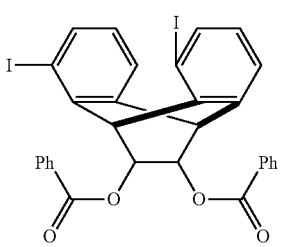
H-38
H-39
H-40
H-41
H-42
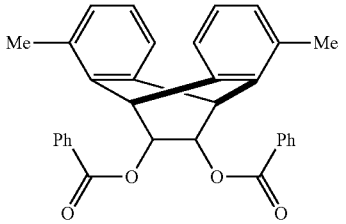
H-43
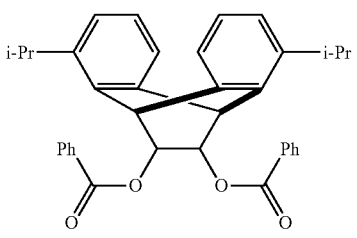
H-44
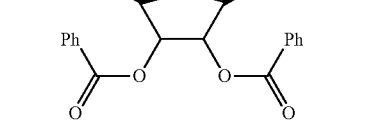
H-45
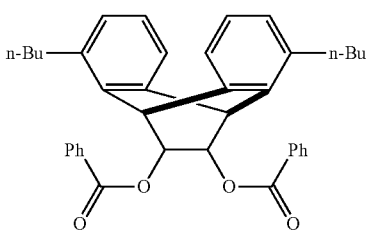
H-46

-continued
H-47
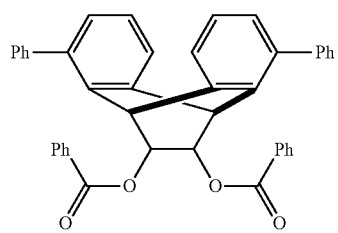
H-48
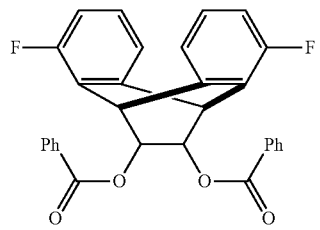
H-49
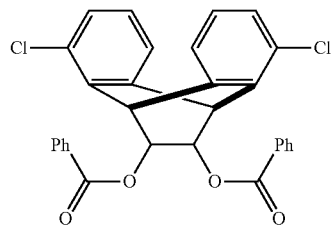
H-50
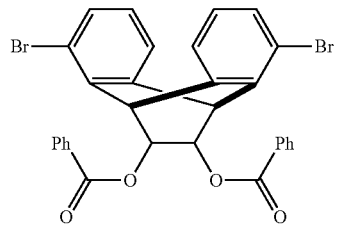
H-51
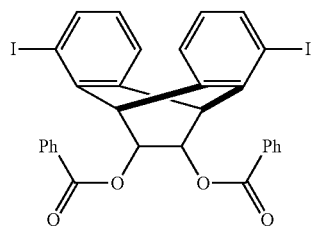
H-52
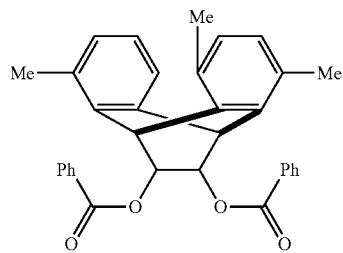
-continued
H-53
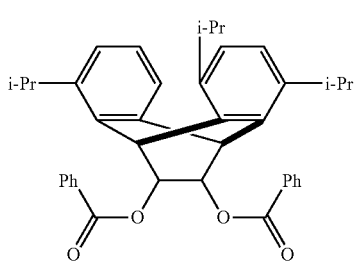
H-54
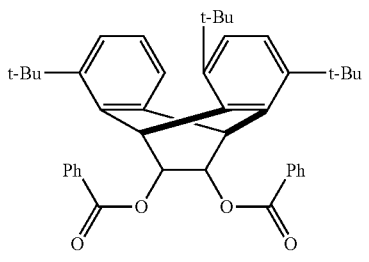
H-55
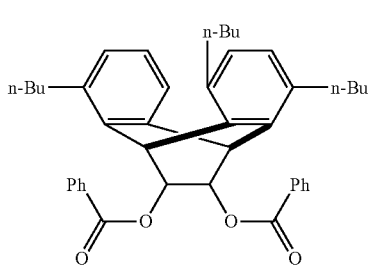
H-56
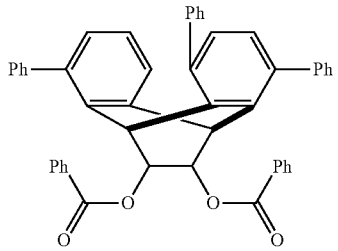
H-57
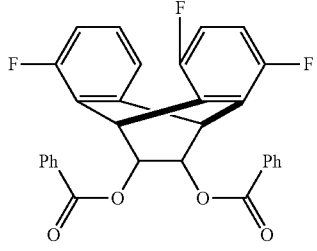
H-58
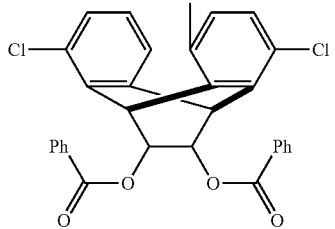

-continued
H-59
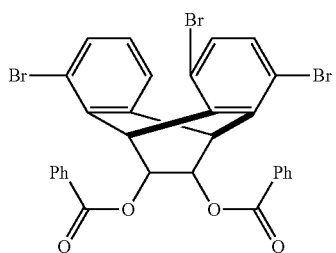
H-60
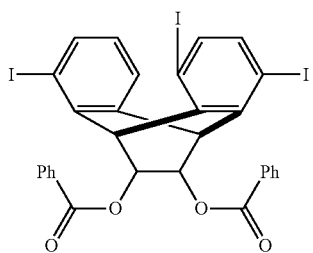
[Chem. 47]
H-61
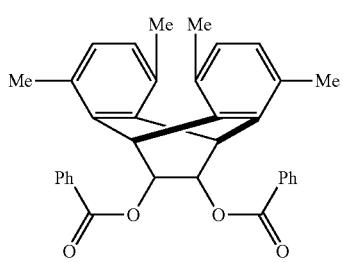
H-62
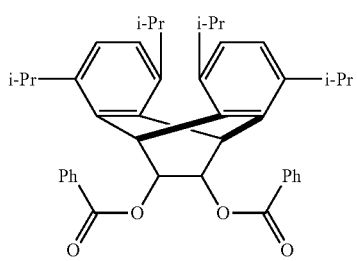
H-63
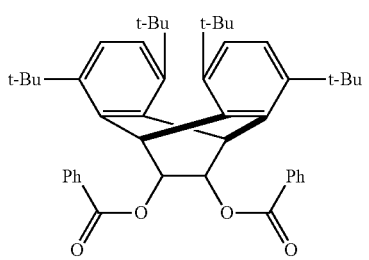
H-64
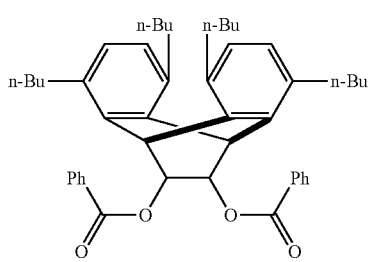
-continued
H-65
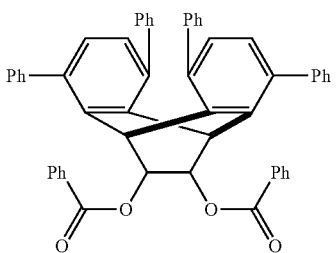
H-66
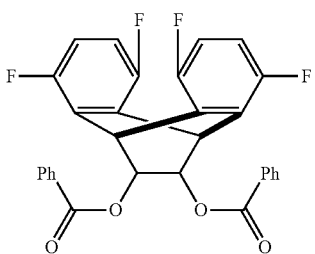
H-67
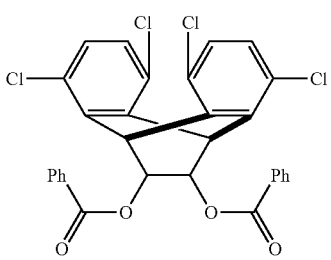
H-68
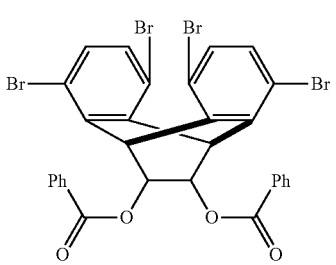
H-69
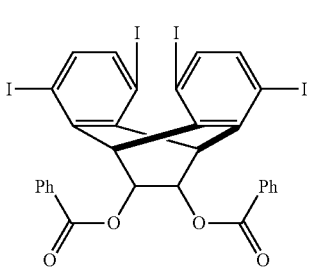
H-70
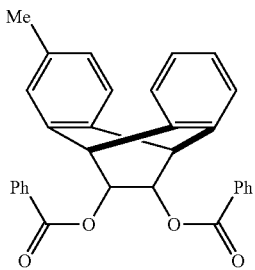

-continued
i-Pr
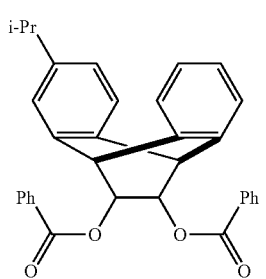
t-Bu
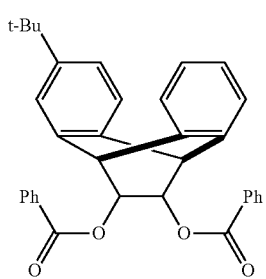
n-Bu
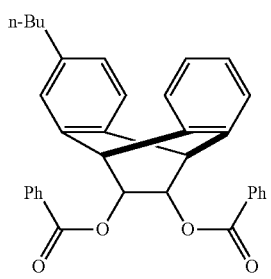
Ph
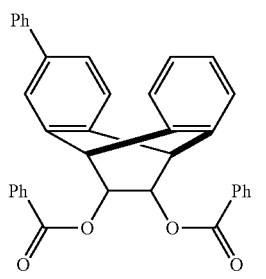
F
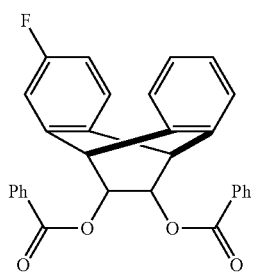
Cl
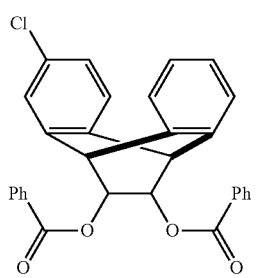
-continued
H-71
H-72
H-73
H-74
H-75
H-76
Br
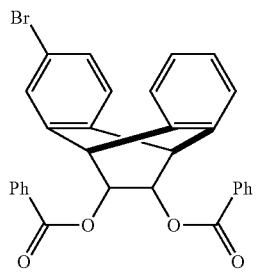 H-77
I
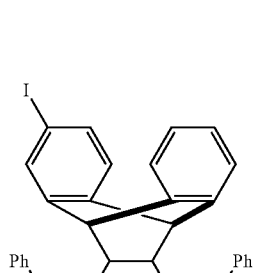 H-78
Me Me
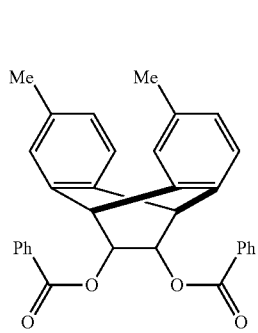 H-79
i-Pr i-Pr
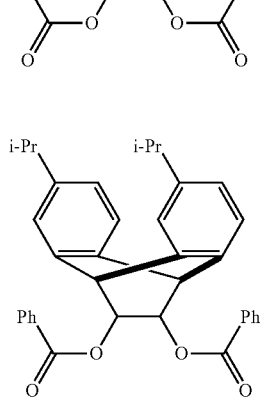 H-80
[Chem. 48]
t-Bu t-Bu
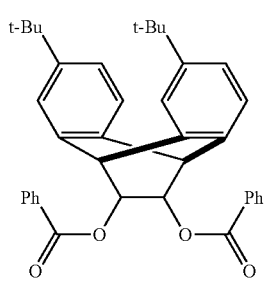 H-81

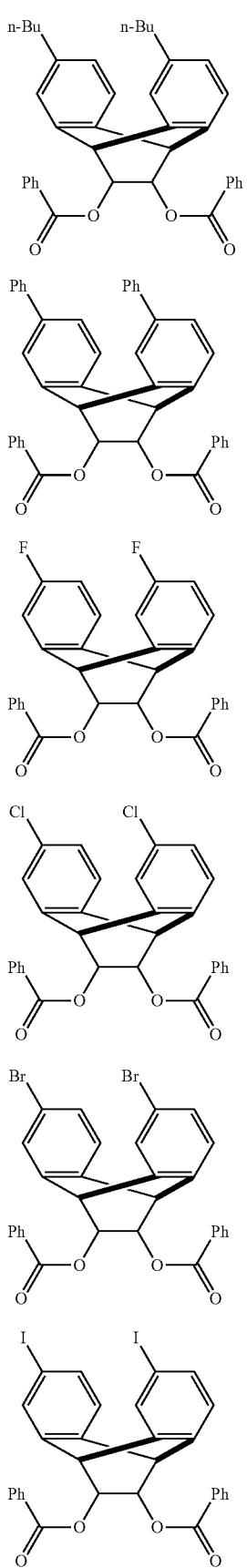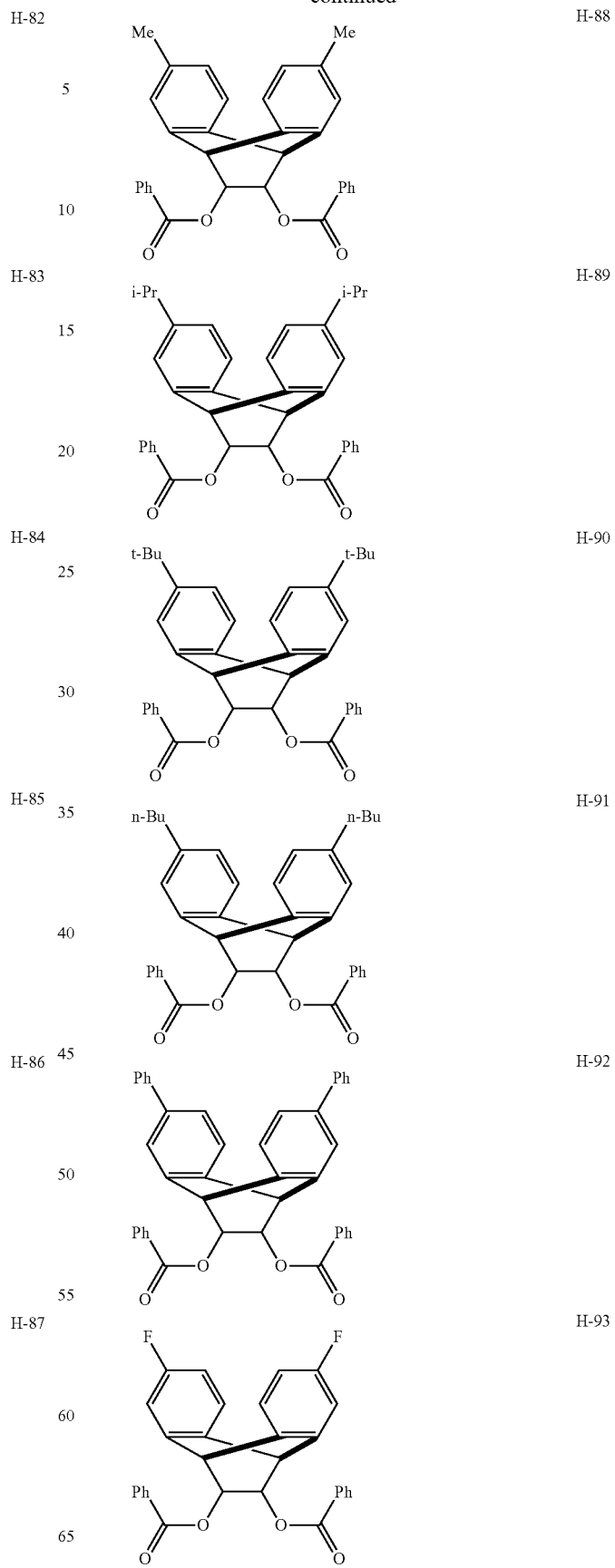

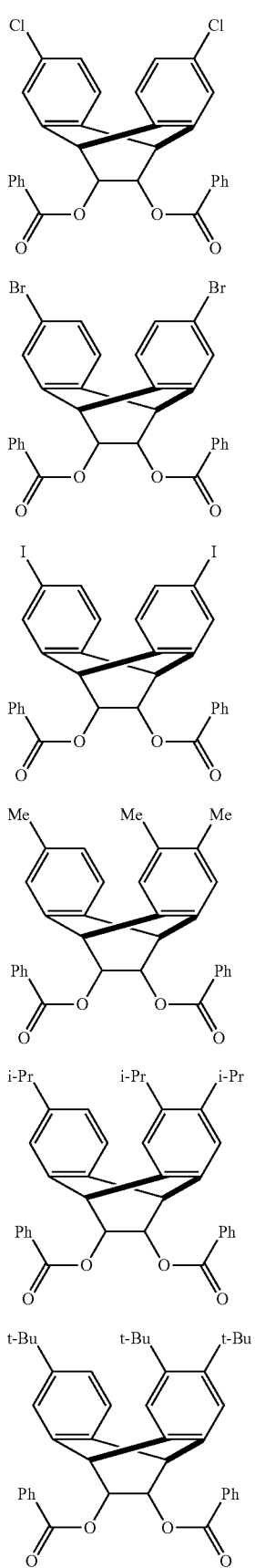
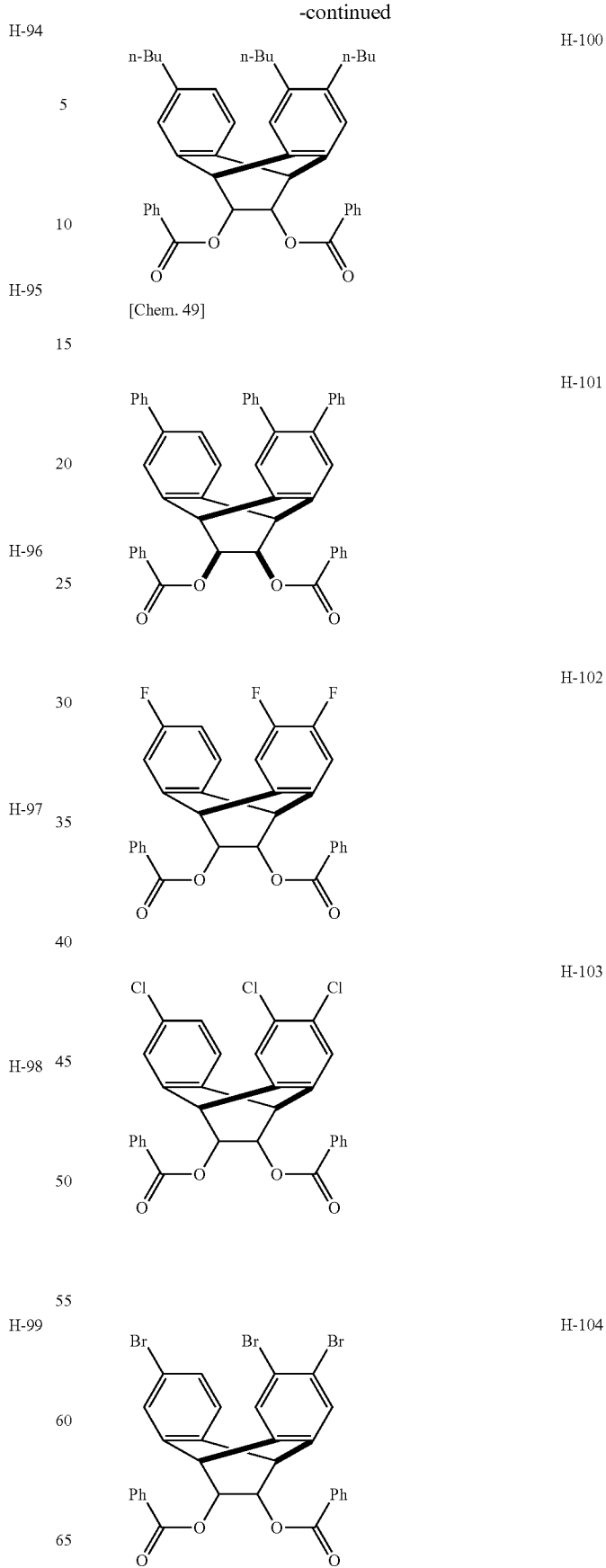

H-105 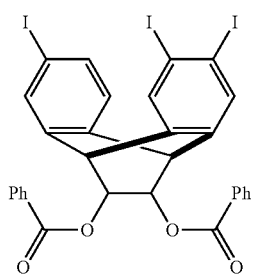
H-106 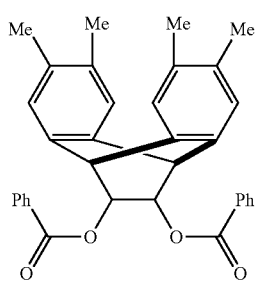
H-107 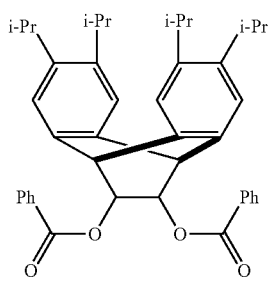
H-108 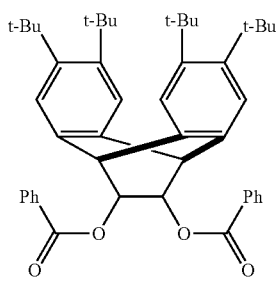
H-109 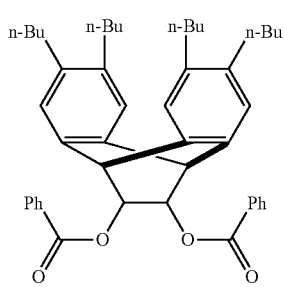
H-110 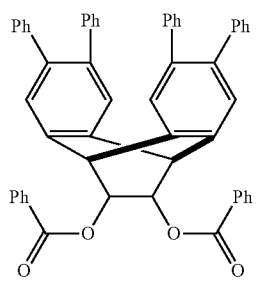
H-111 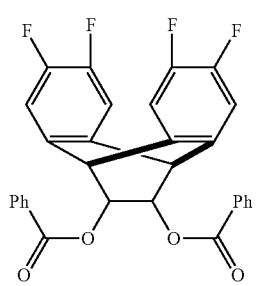
H-112 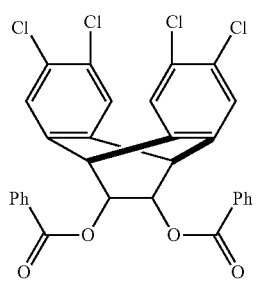
H-113 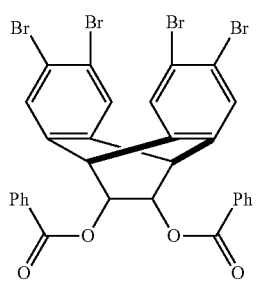
H-114 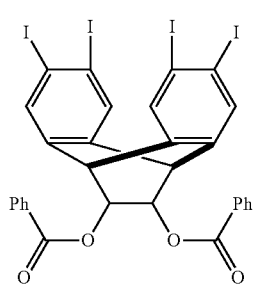

[Chem. 50]
H-115
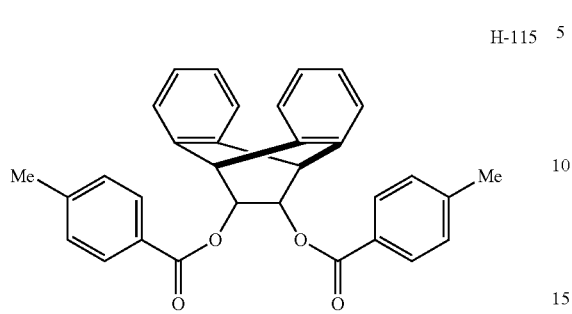
H-116
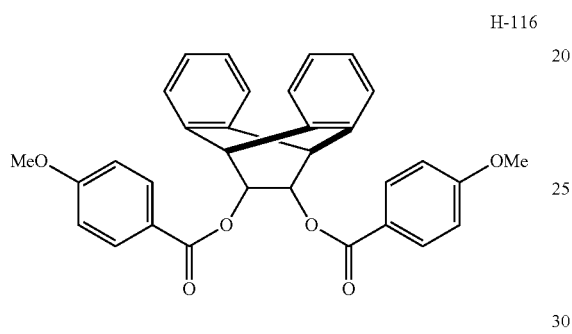
H-117
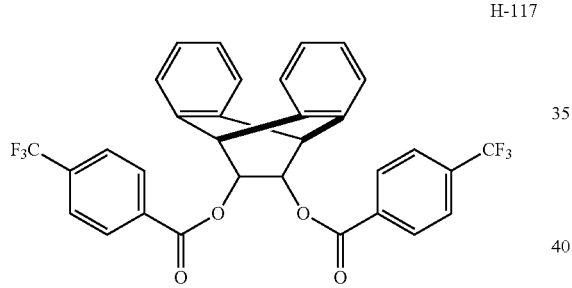
H-118
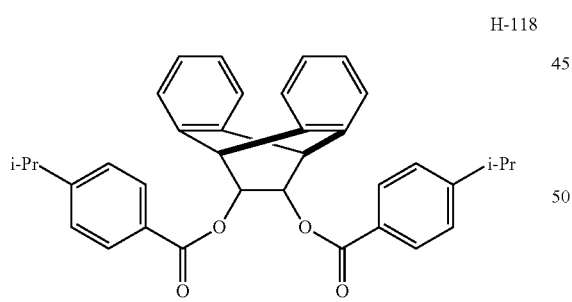
H-119
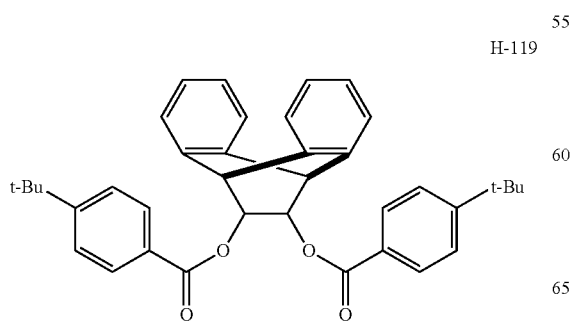
H-120
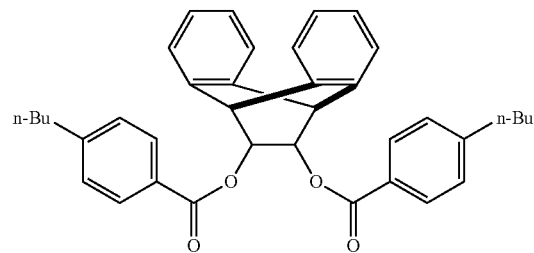
H-121
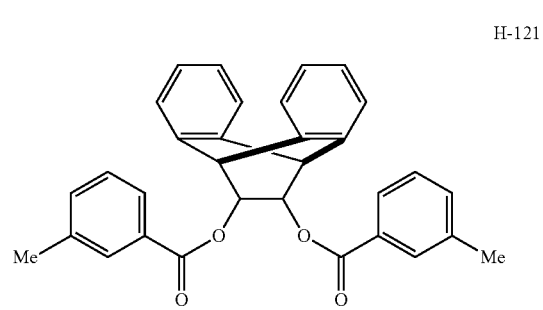
H-122
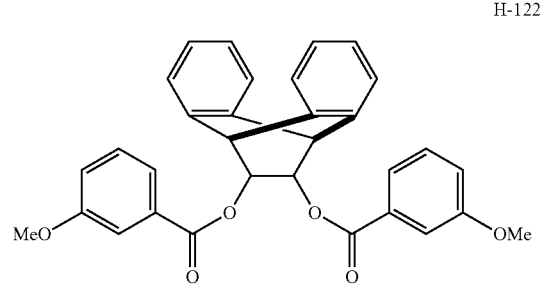
H-123
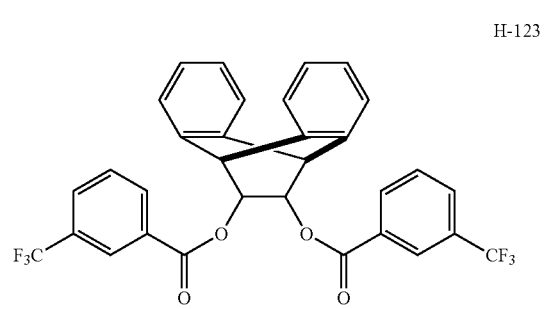
H-124
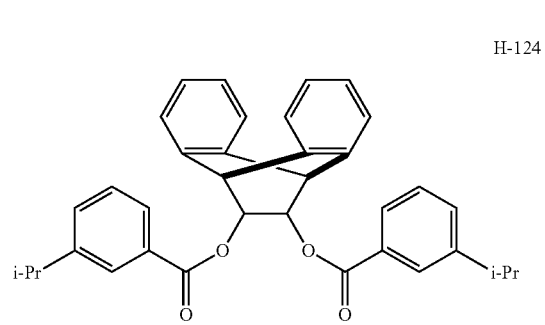

-continued
H-125
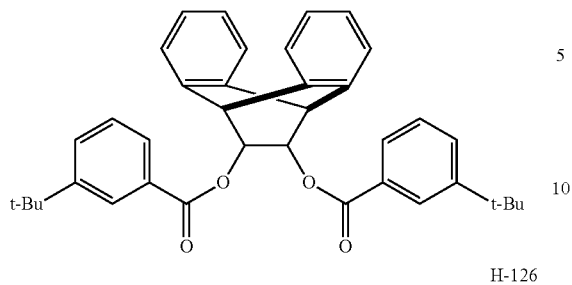
H-126
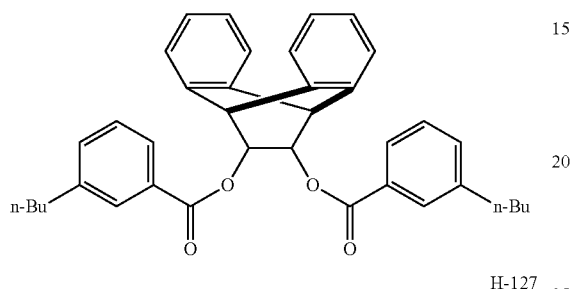
H-127
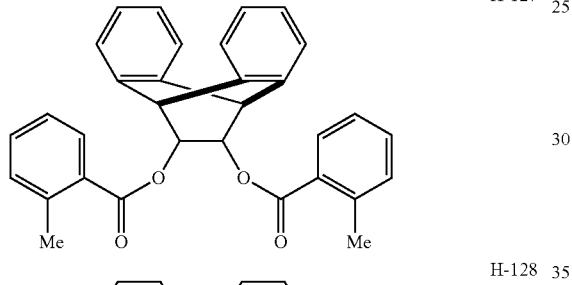
H-128
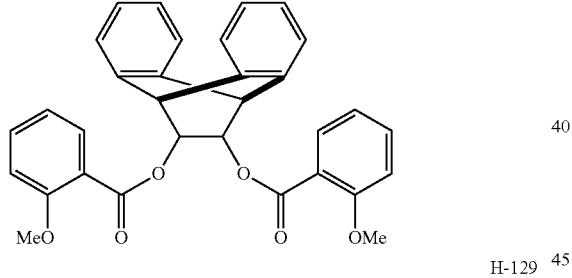
H-129
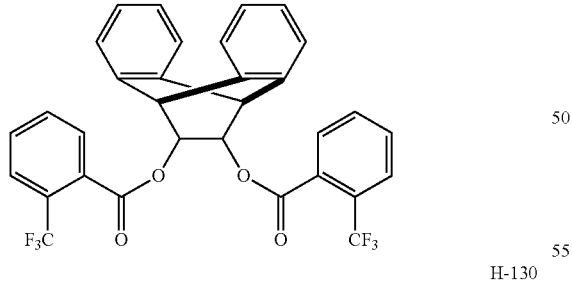
H-130
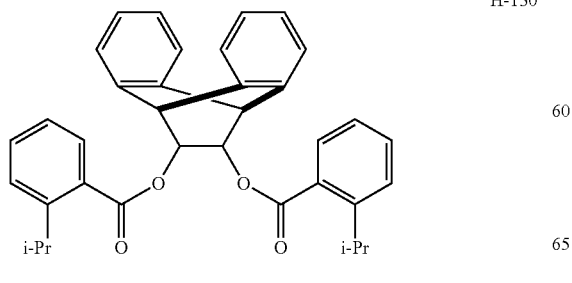
[Chem. 51]
H-131
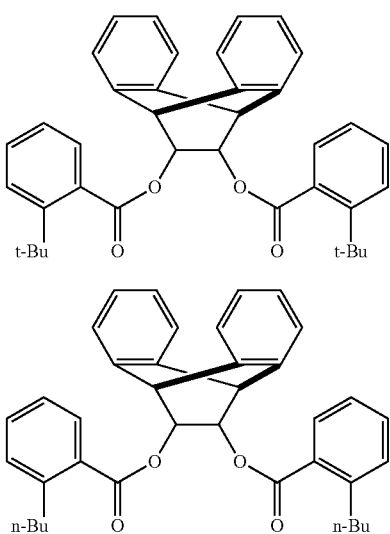
H-132
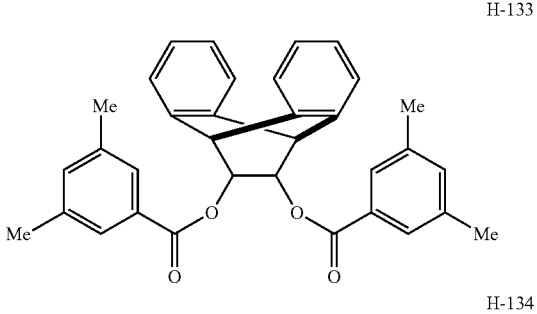
H-133
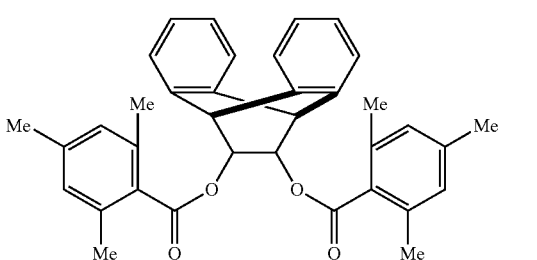
H-134
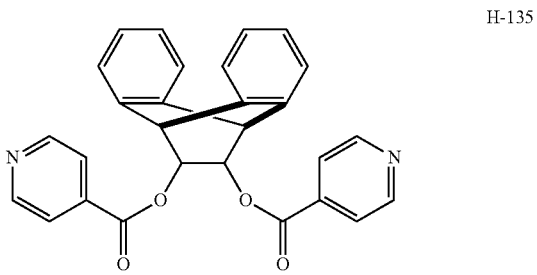
H-135
H-136
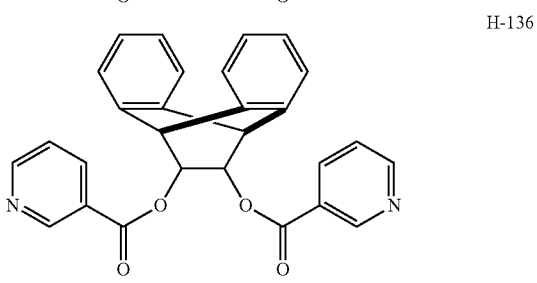

-continued
H-137
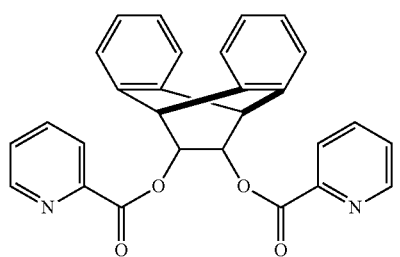
H-138
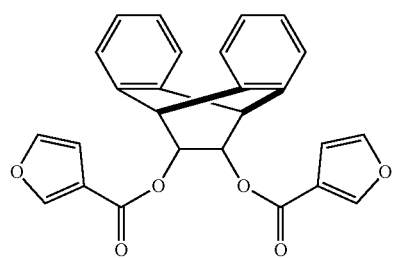
H-139
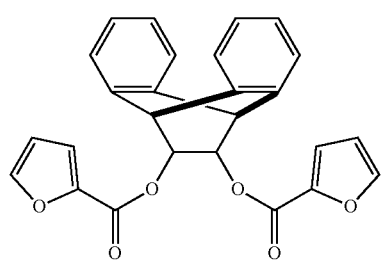
H-140
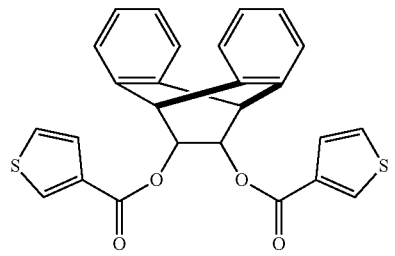
H-141
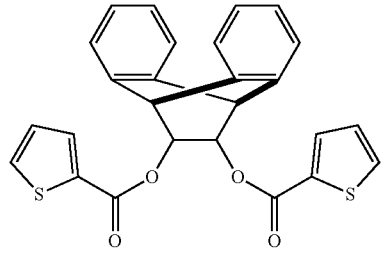
H-142
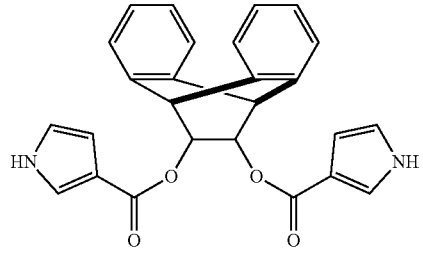
-continued
H-143
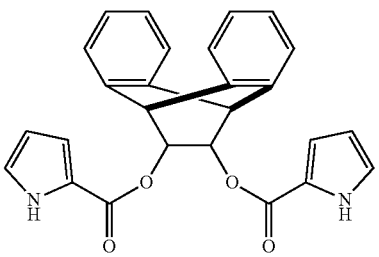
H-144
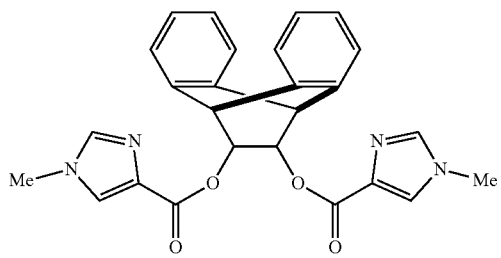
H-145
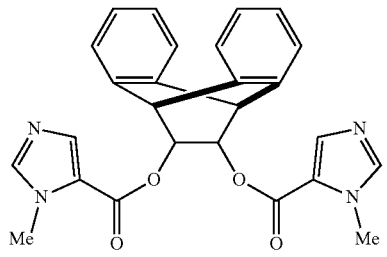
H-146
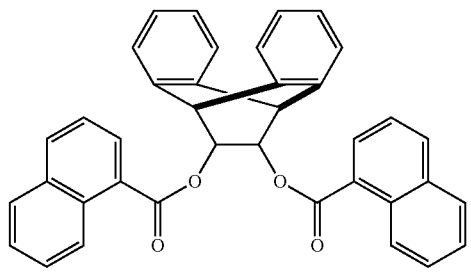
[Chem. 52]
H-147
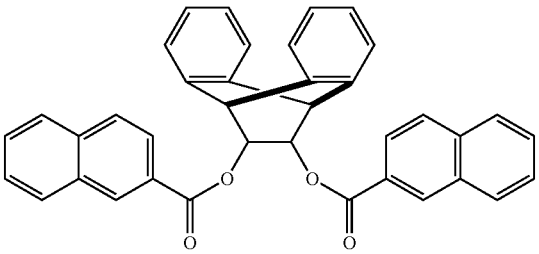
H-148
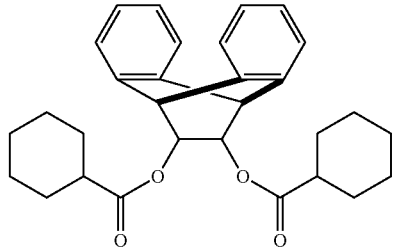

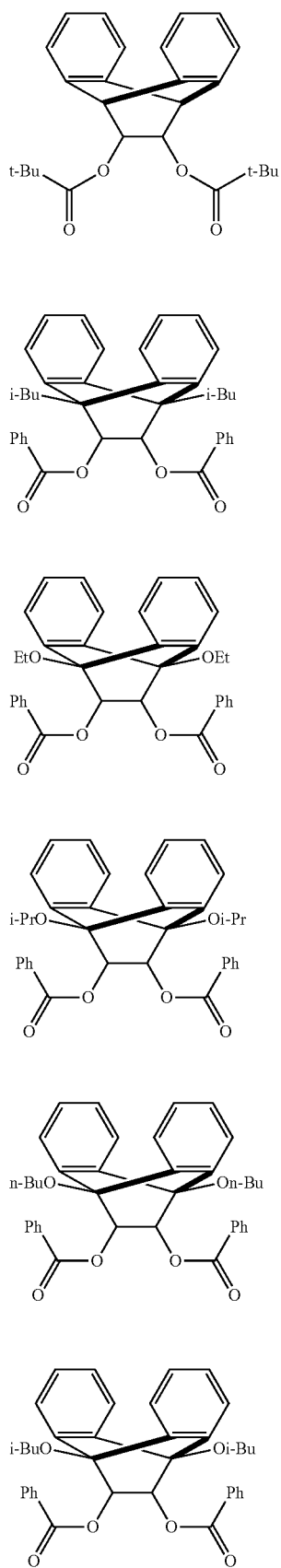
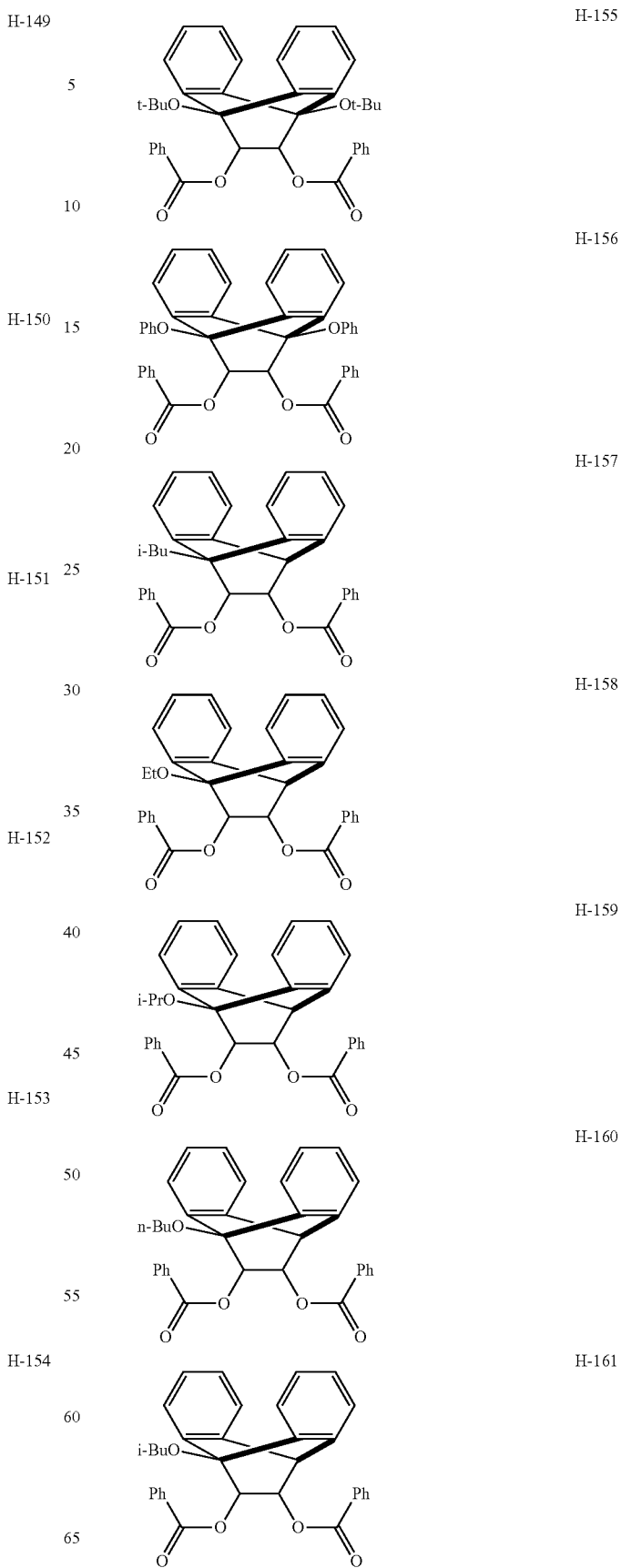

-continued
H-162
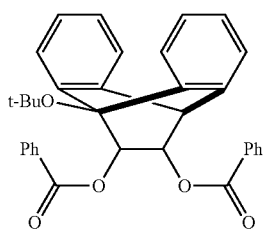
H-163
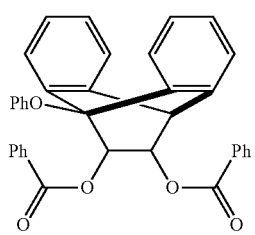
[Chem. 53]
H-164
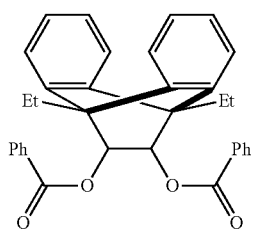
H-165
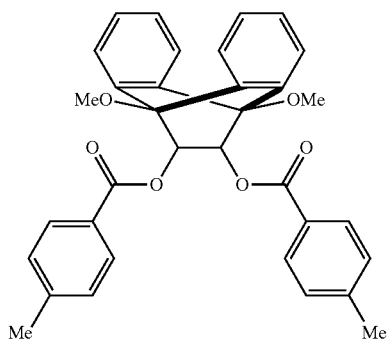
H-166
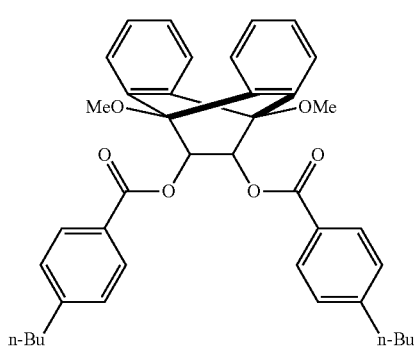
-continued
H-167
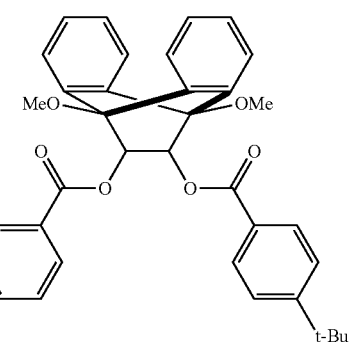
H-168
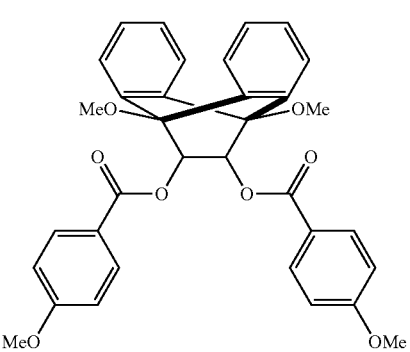
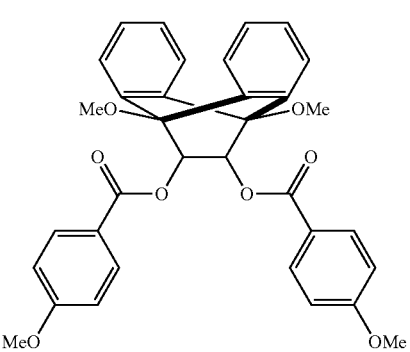
Moreover, not only the compounds provided above but also the compounds of structures having specific polycyclic skeletons are preferable examples.
[Chem. 54]
1
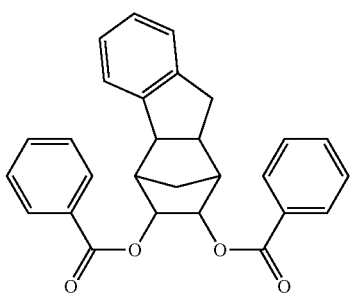
2
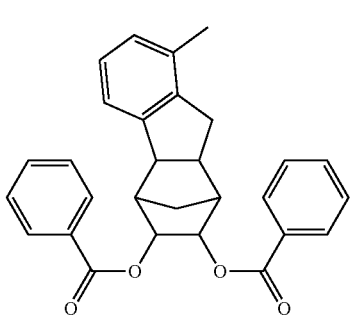

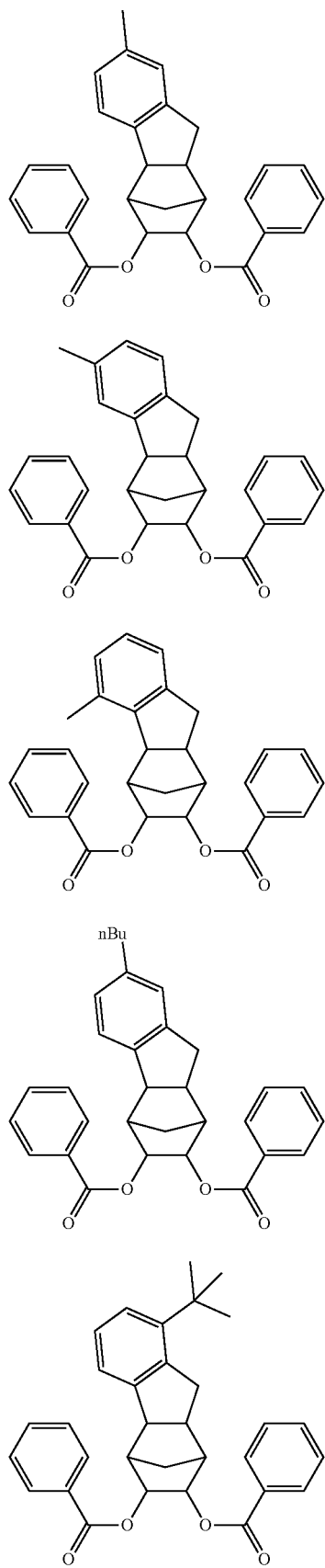
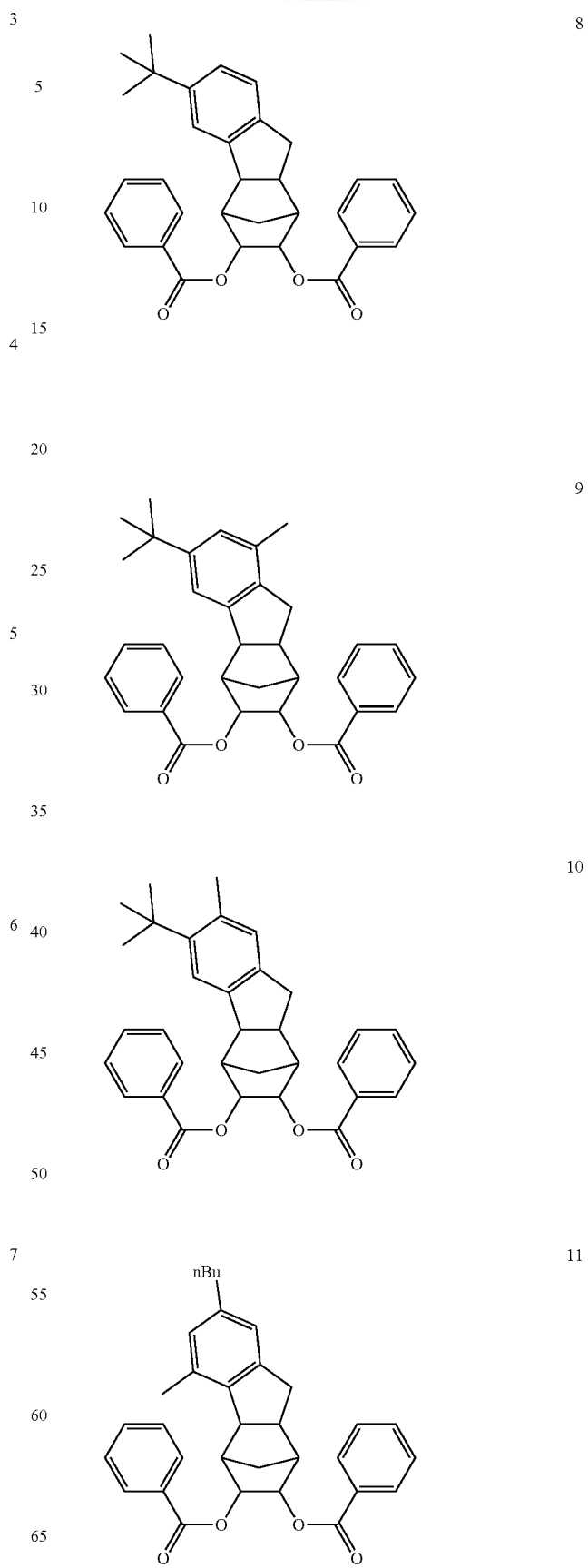

-continued
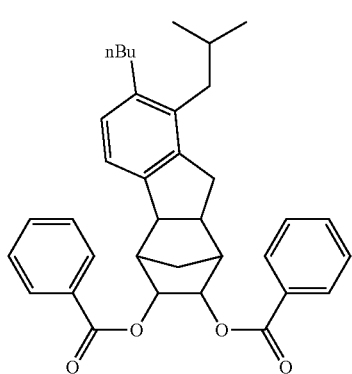
12
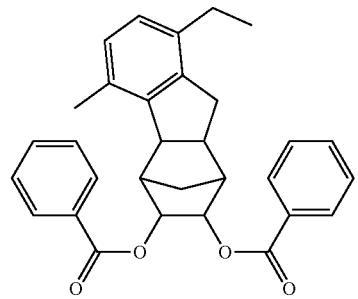
13
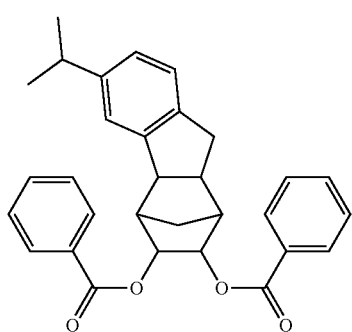
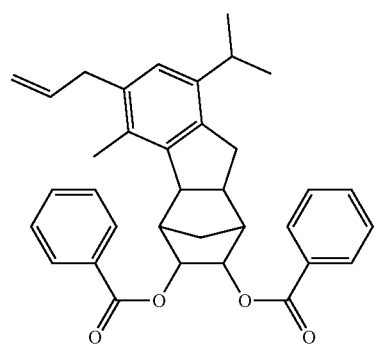
14
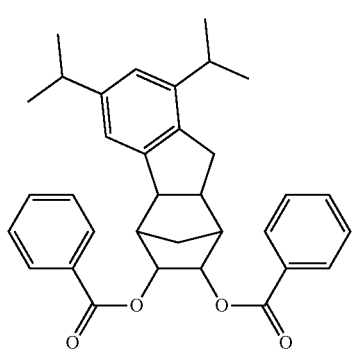
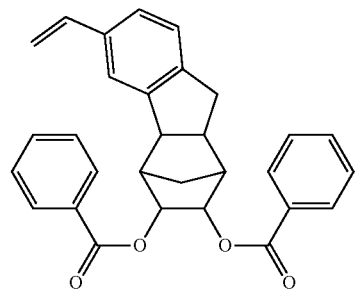
15
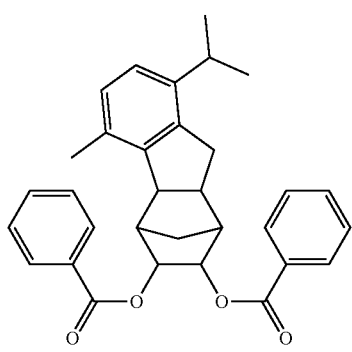
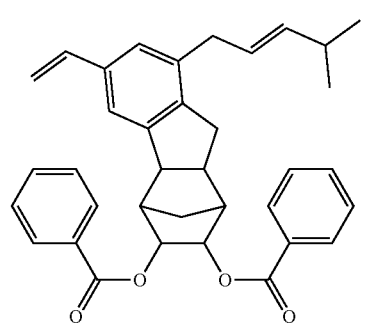

20
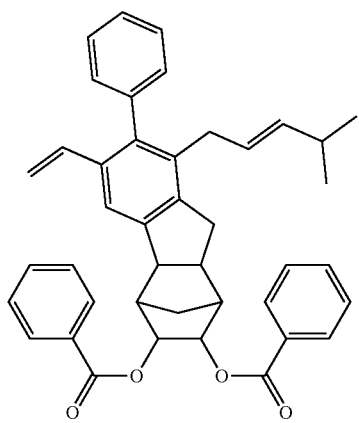
[Chem. 55]
21
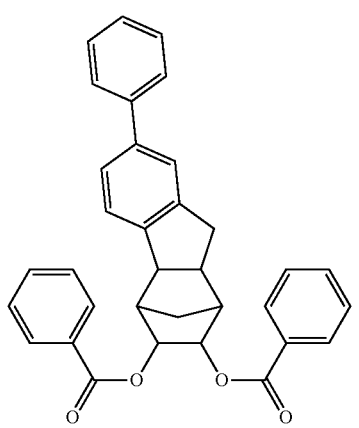
22
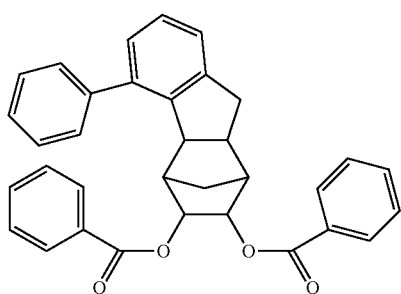
23
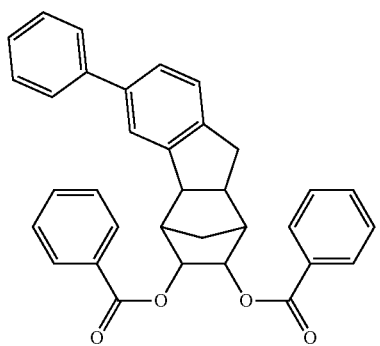
24
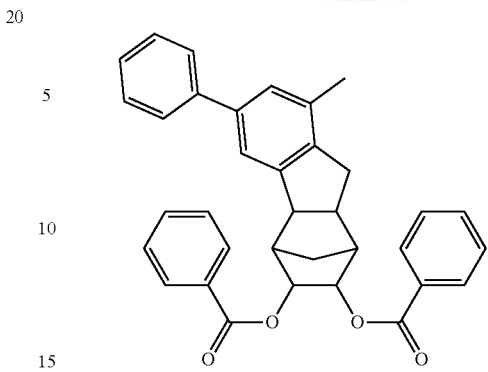
25
26
27

28
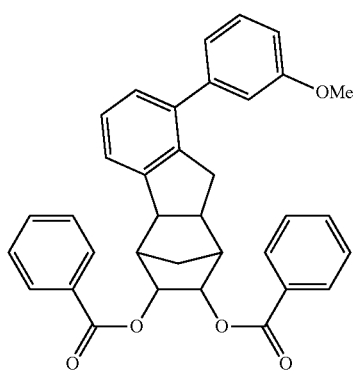
29
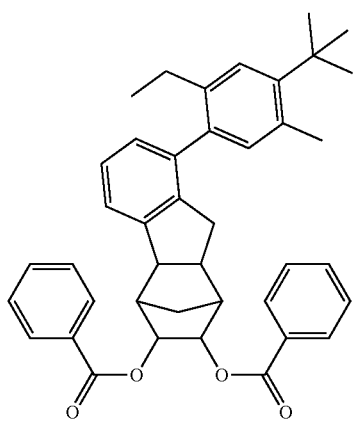
30
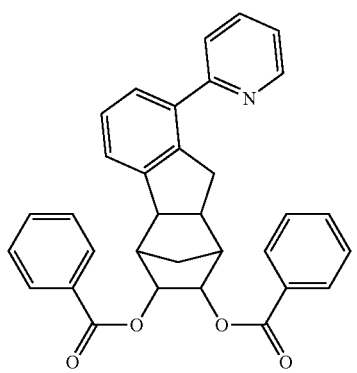
31
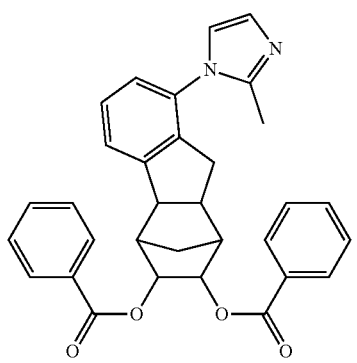
32
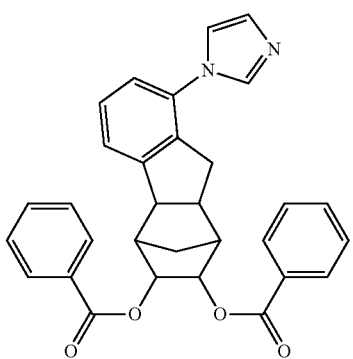
33
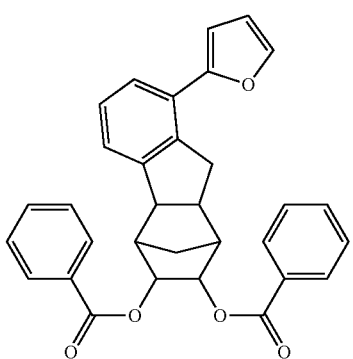
34
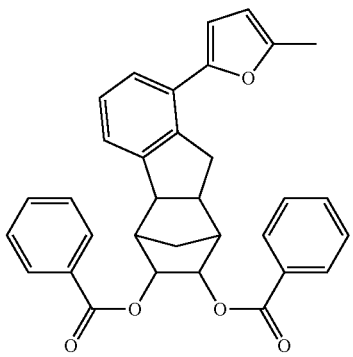
35
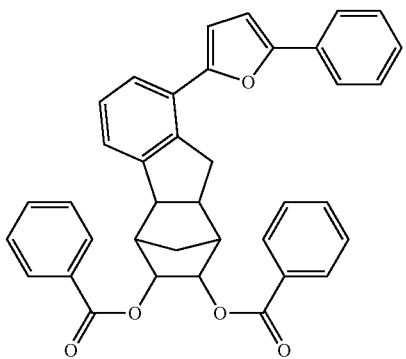

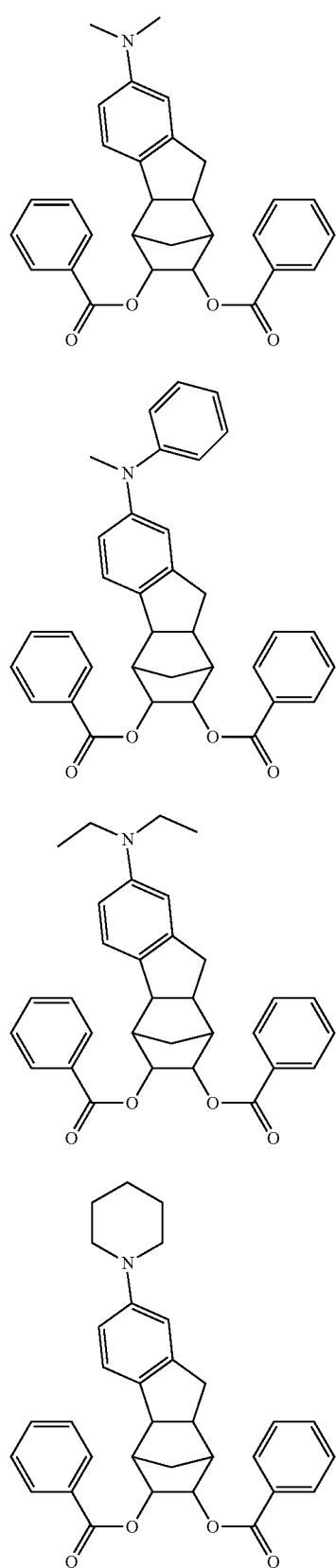
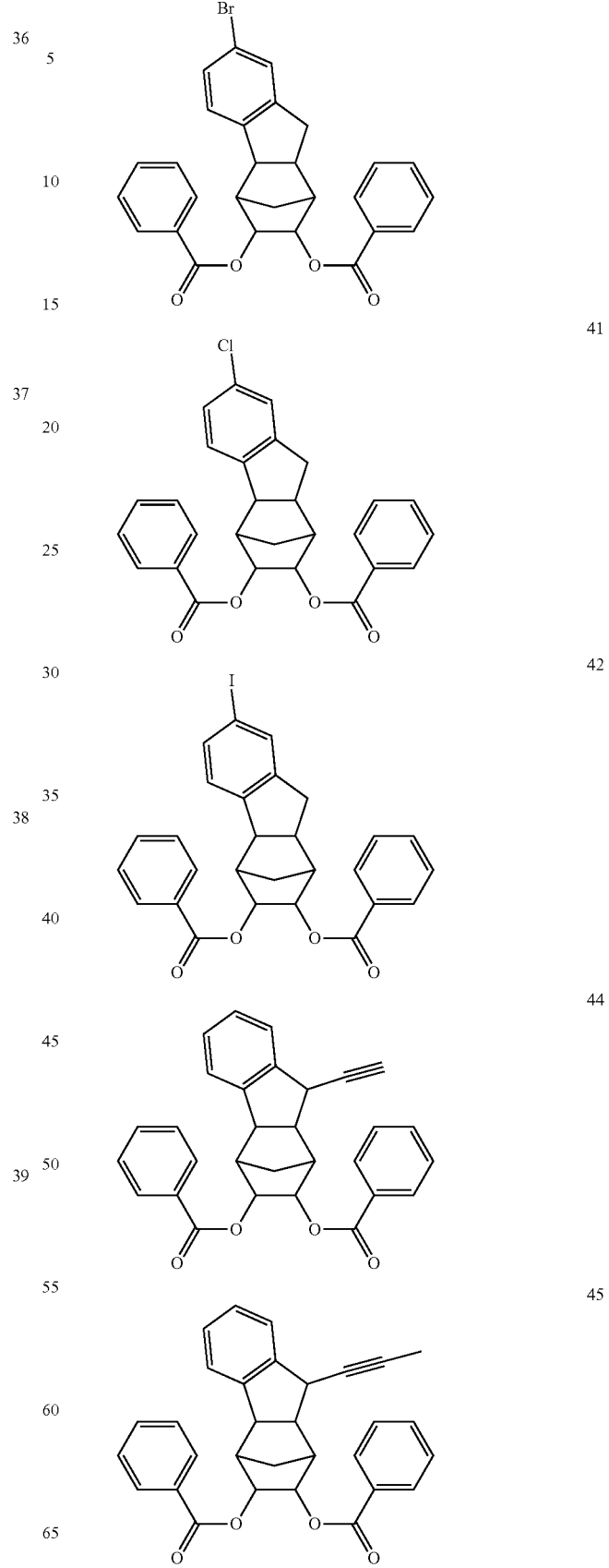

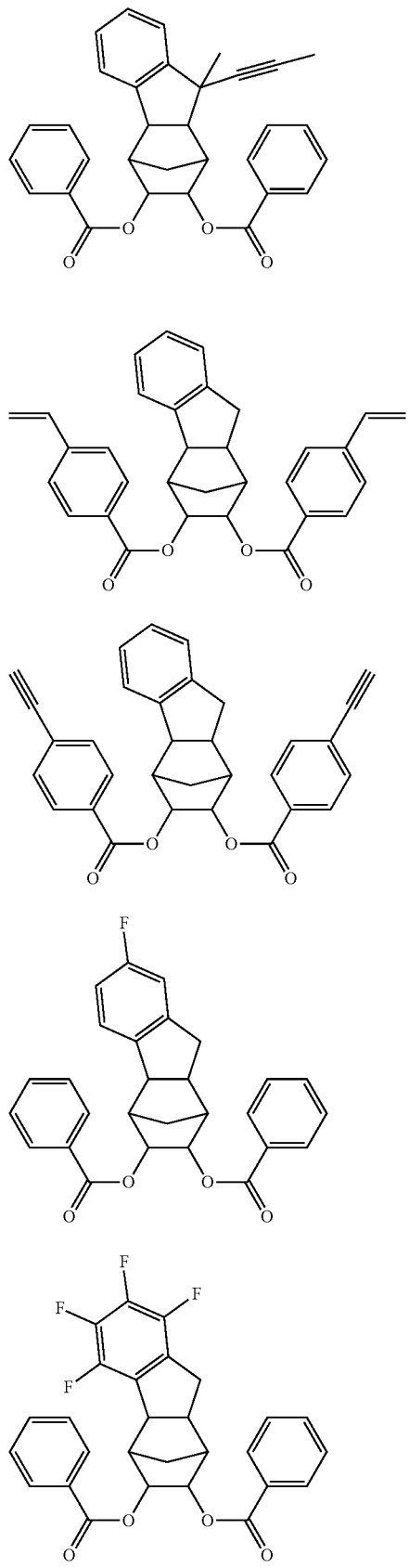
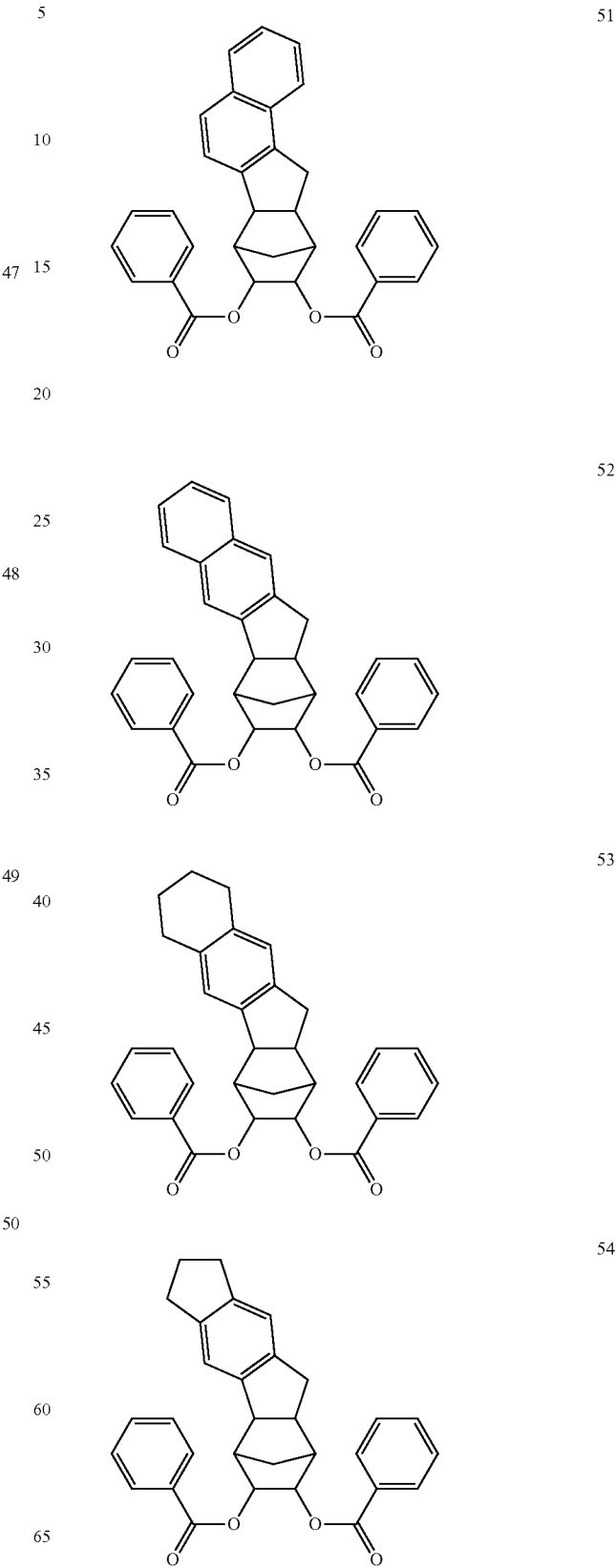

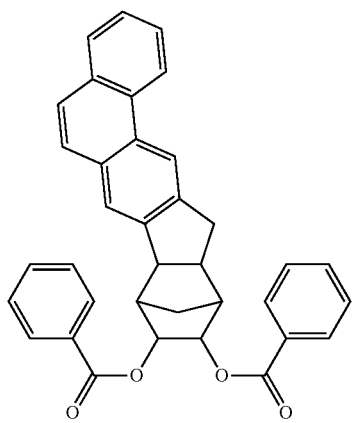
55
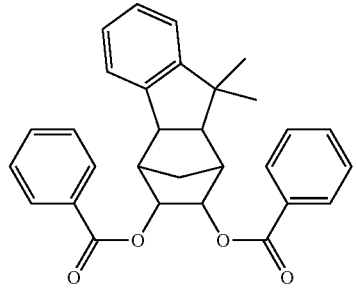
59
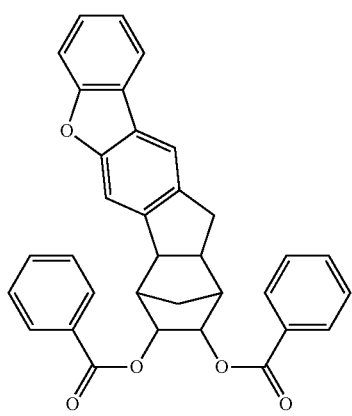
56
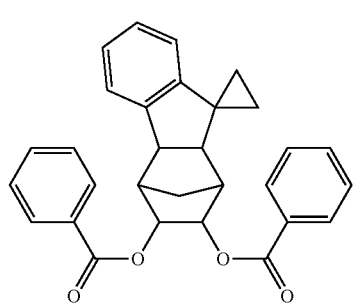
61
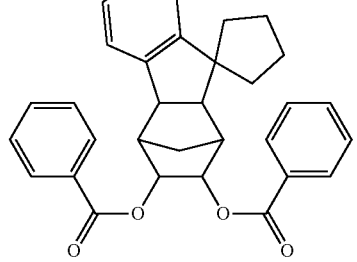
62
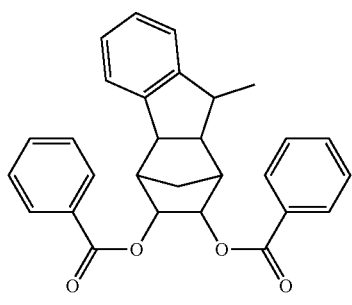
57
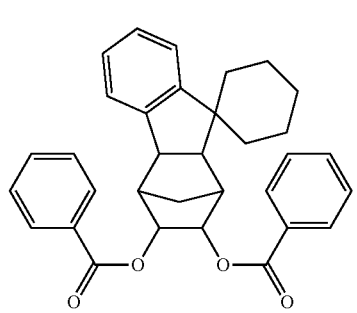
63
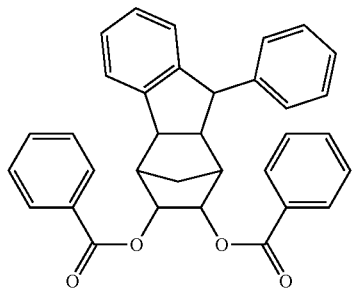
58
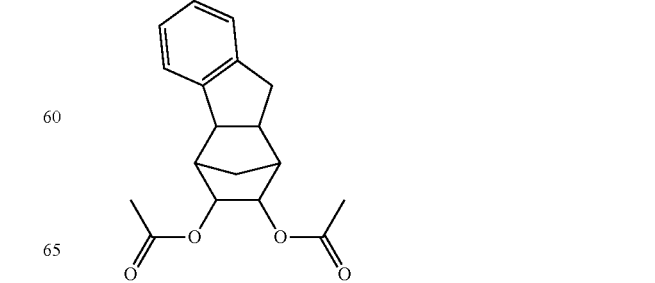
64

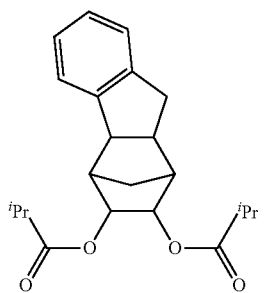
65
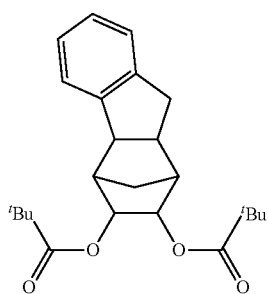
66
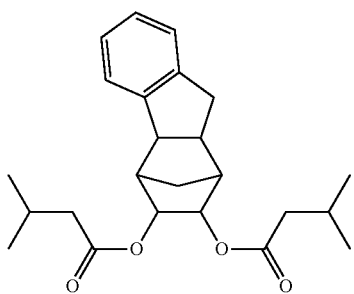
67
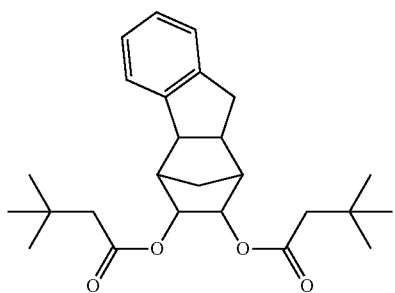
68
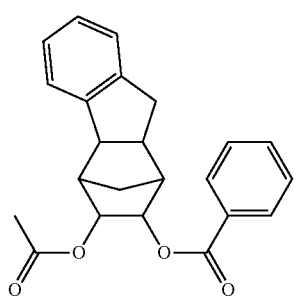
69
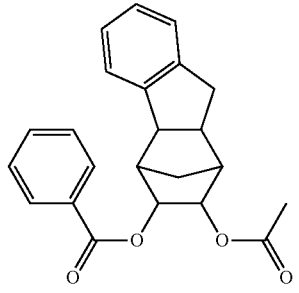
[Chem. 58]
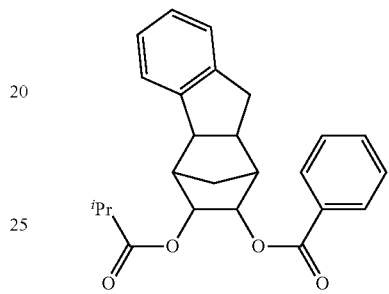
71
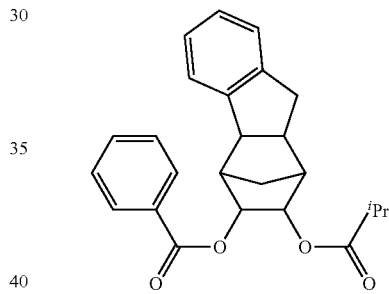
72
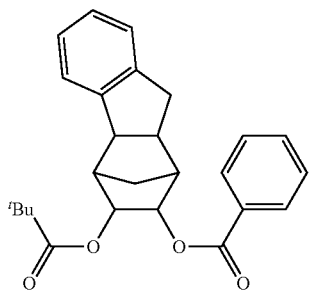
73
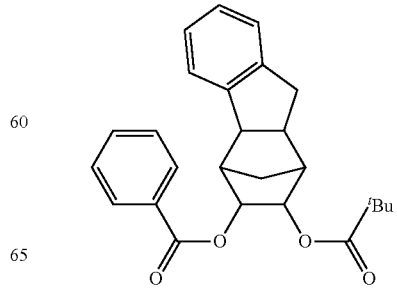
74

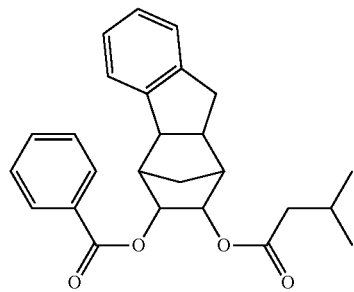
75
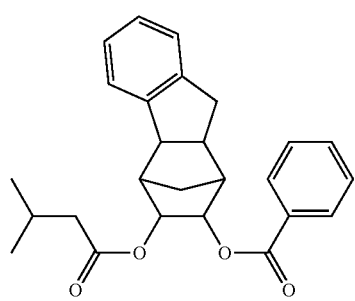
76
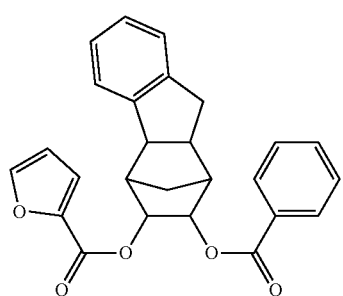
77
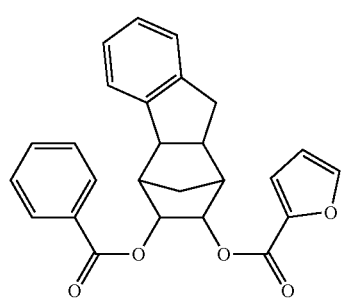
78
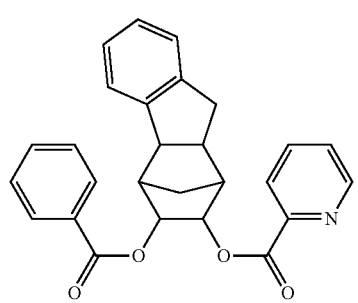
79
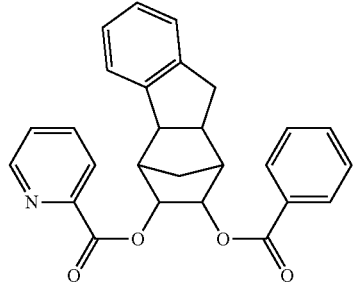
80
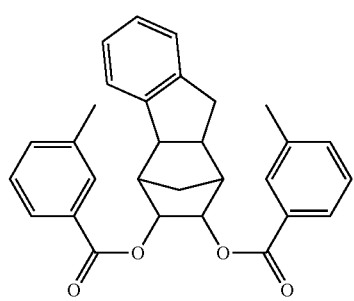
81
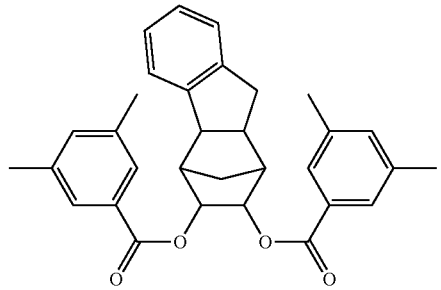
82
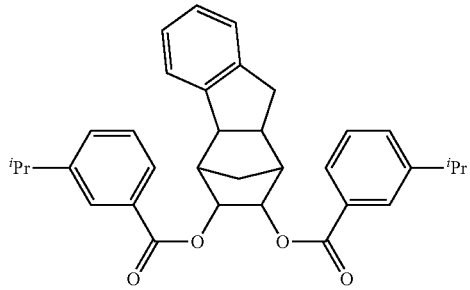
83
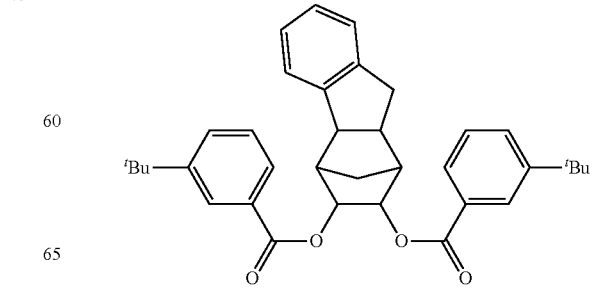
84

85
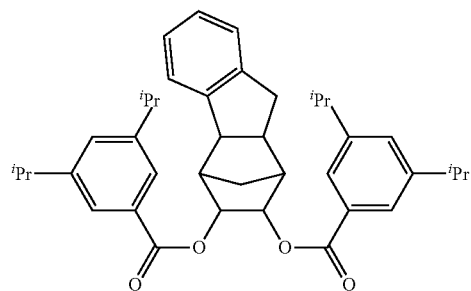
86
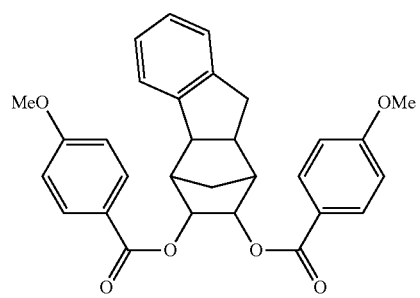
87
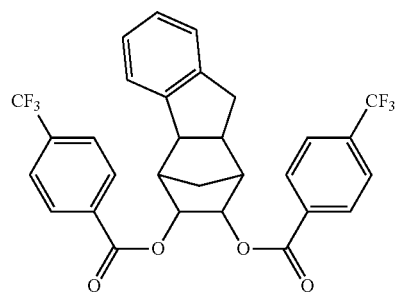
88
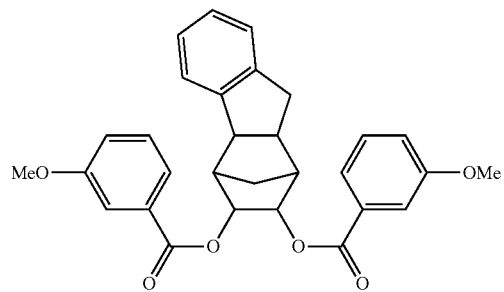
89
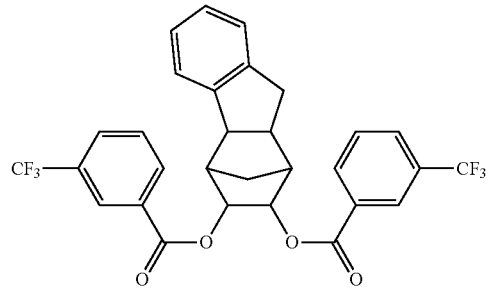
90
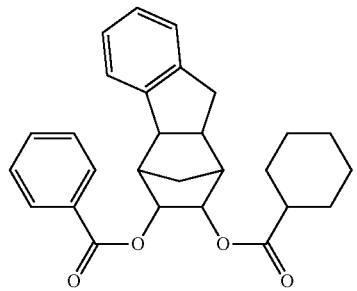
[Chem. 59]
91
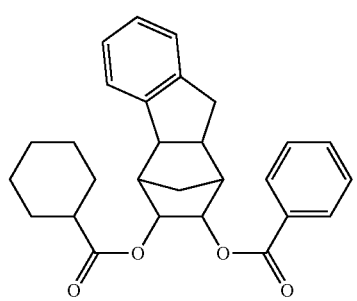
92
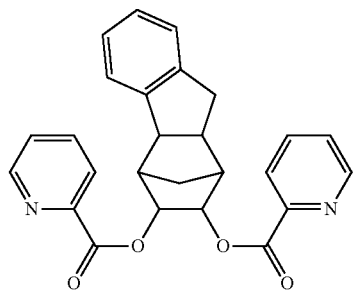
93
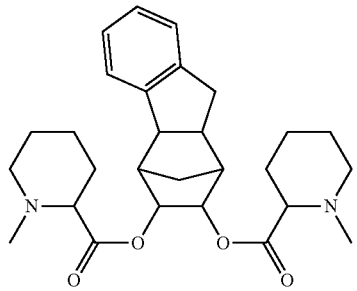
96
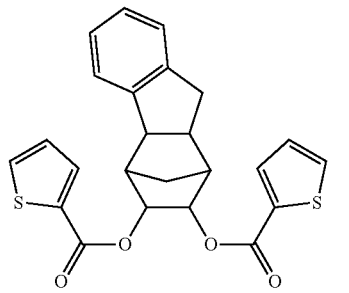

97
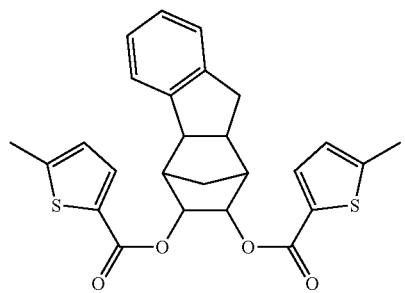
98
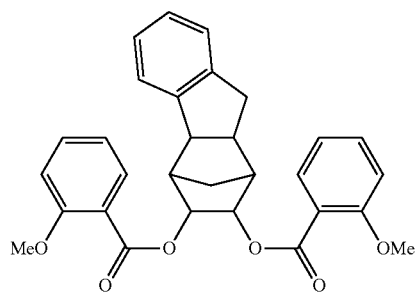
99
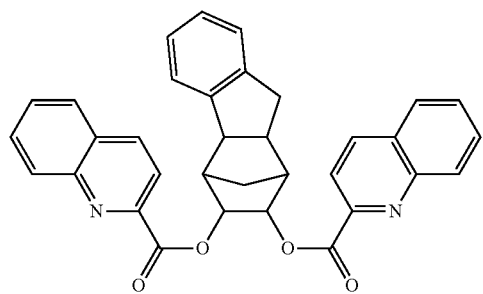
100
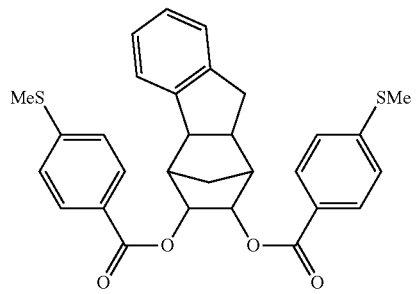
101
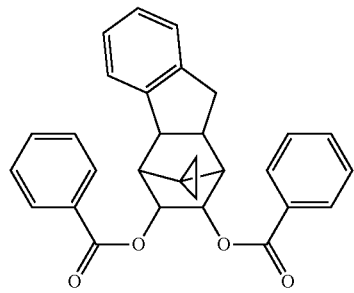
102
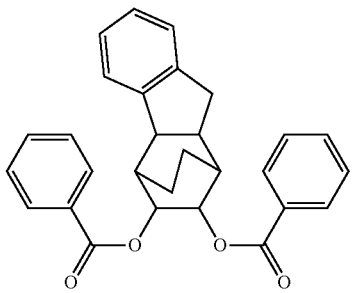
103
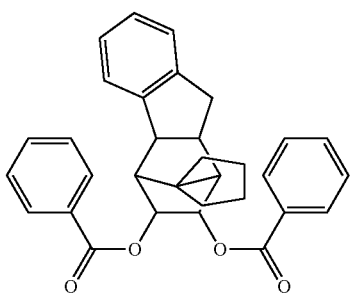
104
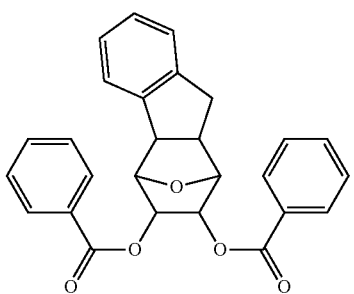
105
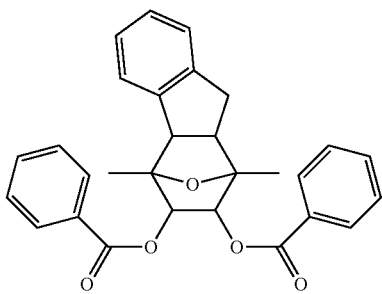
106
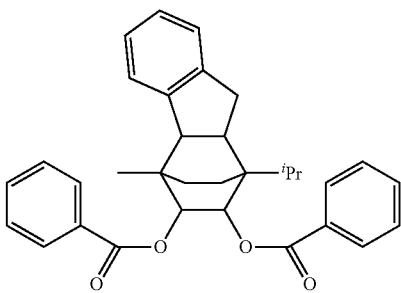

107
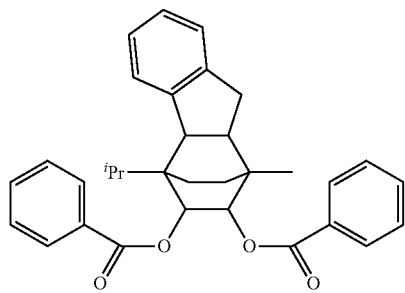
108
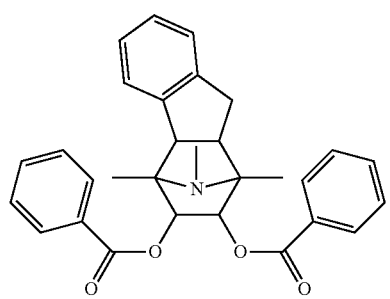
109
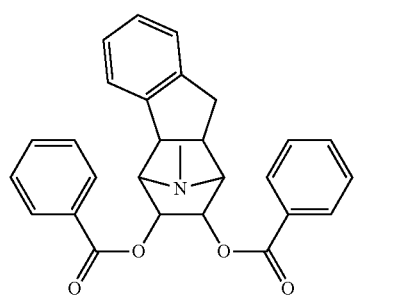
110
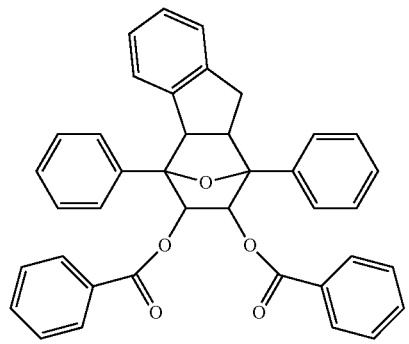
[Chem. 60]
111
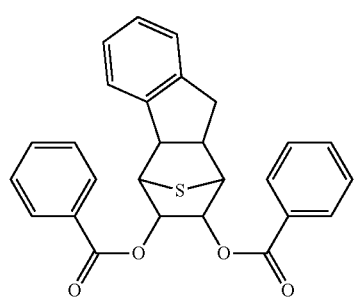
112
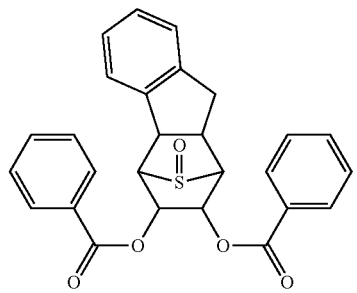
113
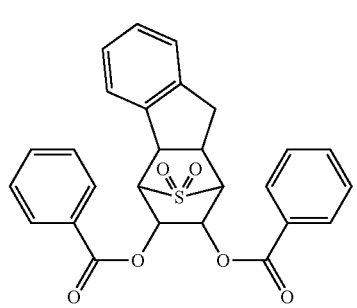
115
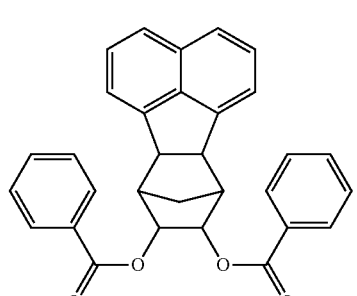
116
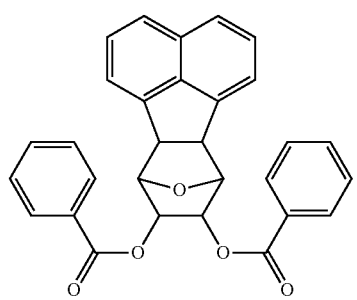
117
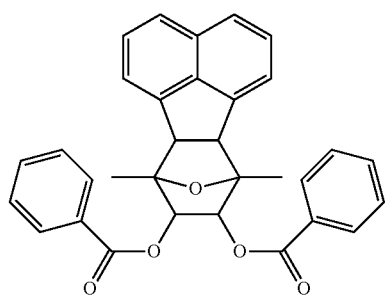

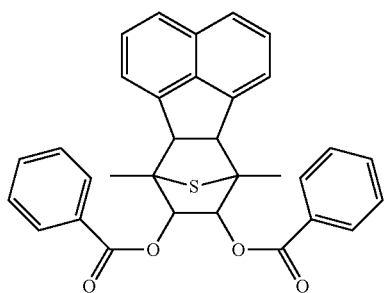
118
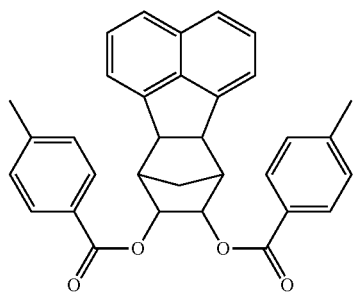
123
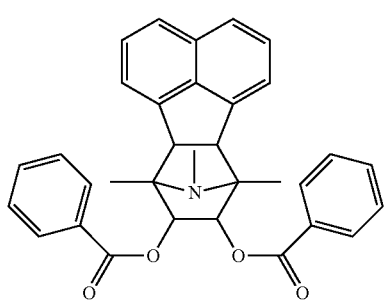
119
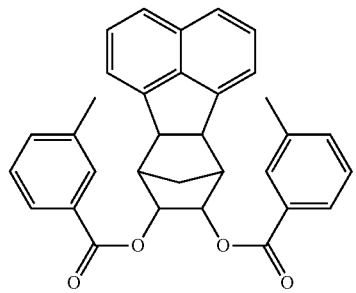
124
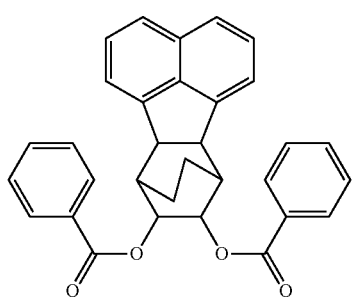
120
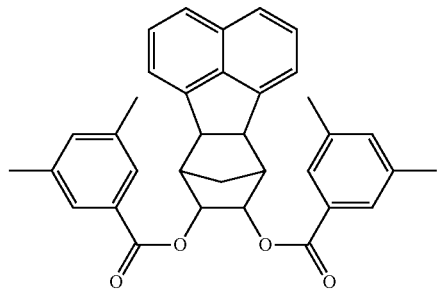
125
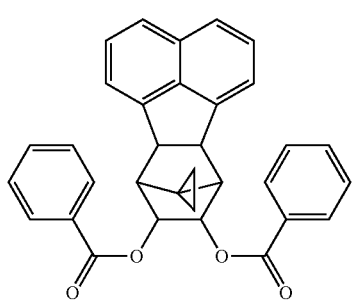
121
[Chem. 61]
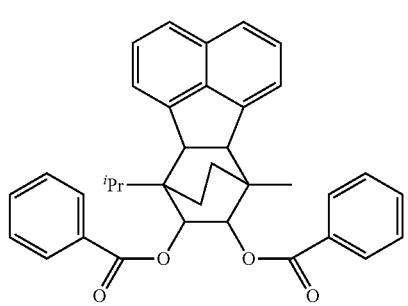
126
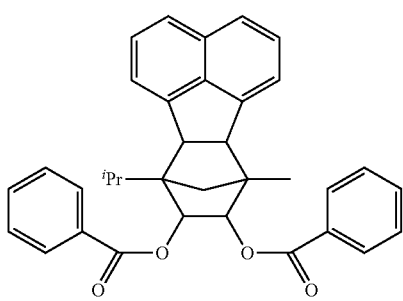
122
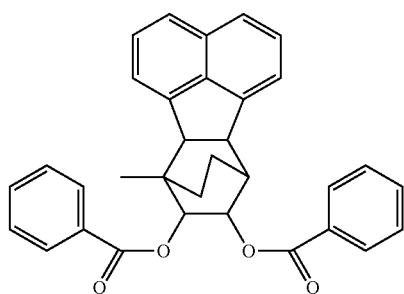
127

128
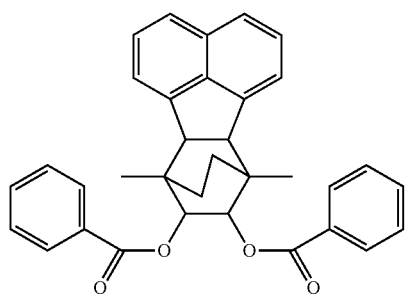
129
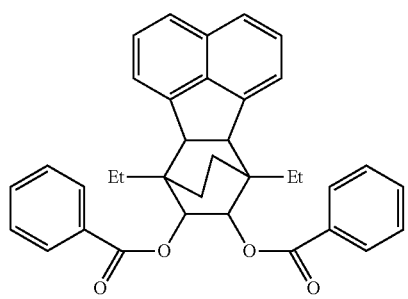
130
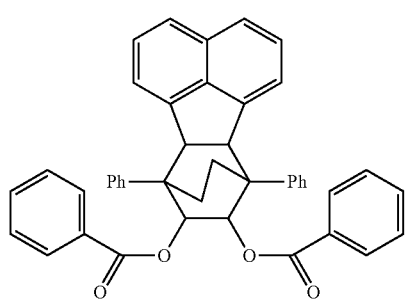
131
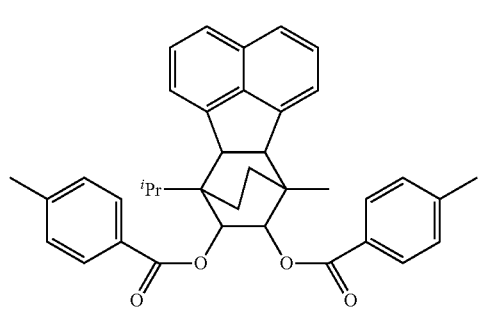
132
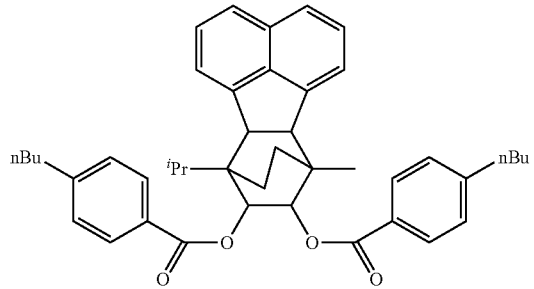
133
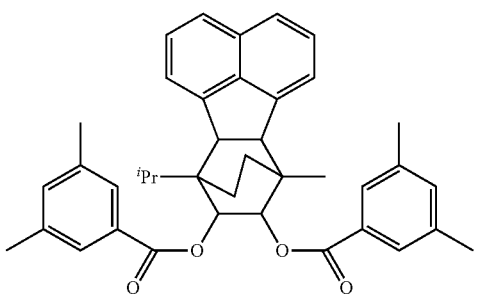
134
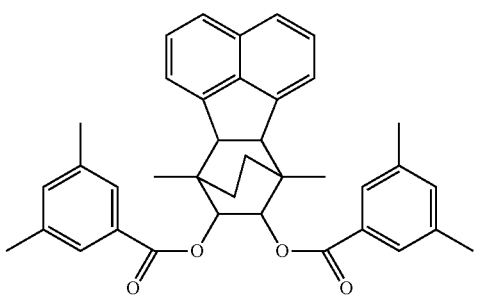
135
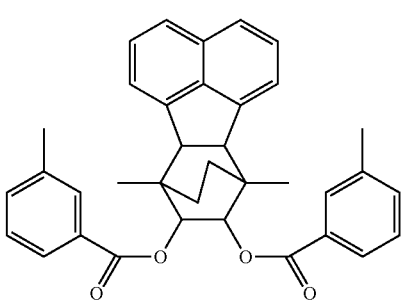
[Chem. 62]
136
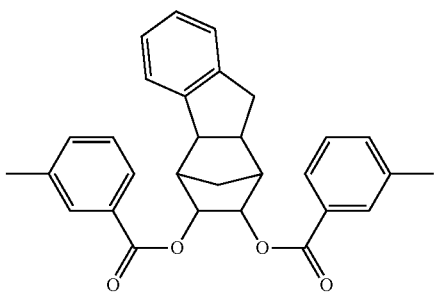
137
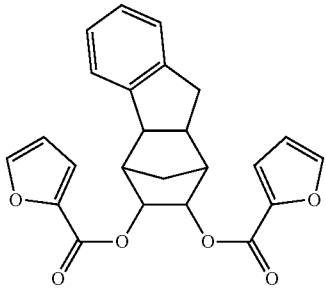

-continued
138
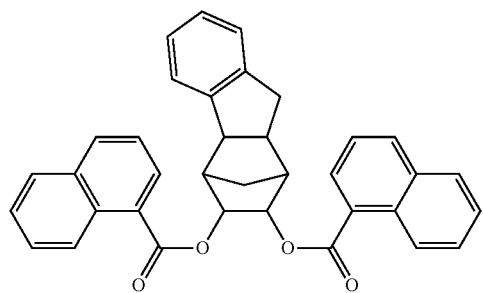
139
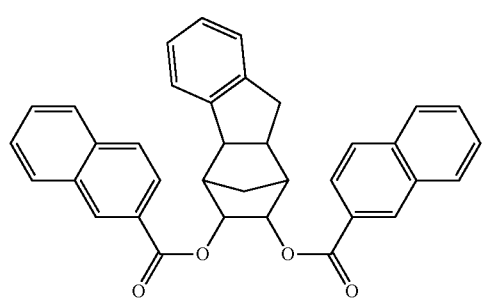
140
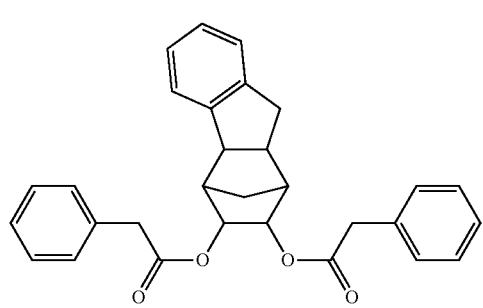
141
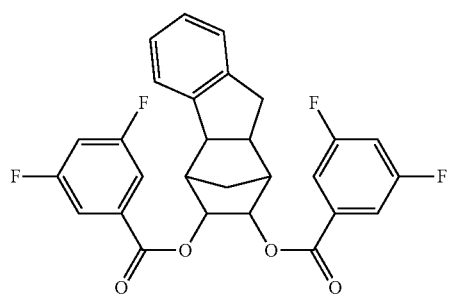
142
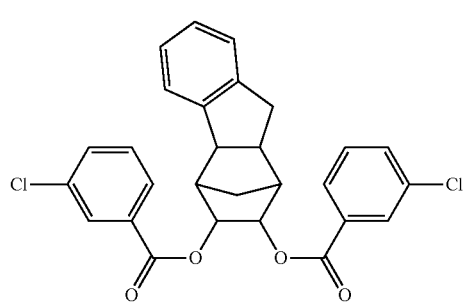
-continued
143
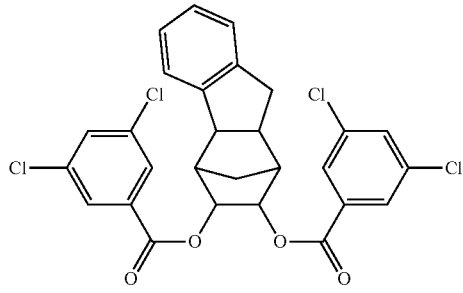
144
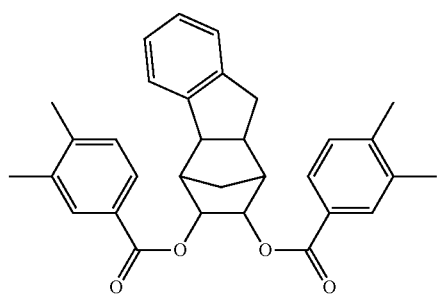
145
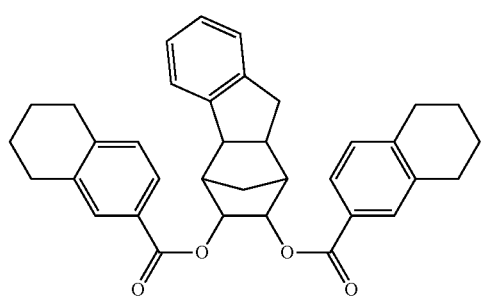
146
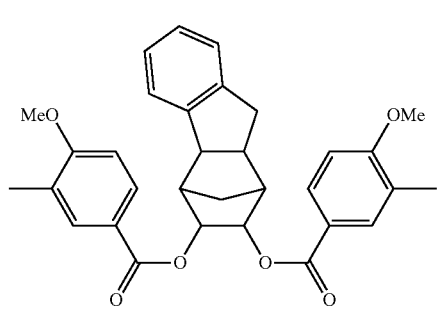
147
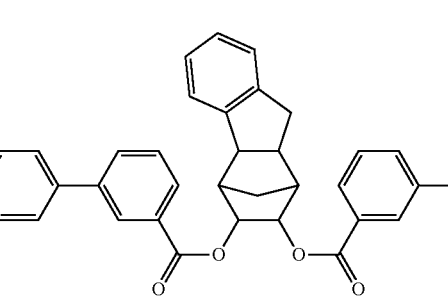
In the structural formulas described above, a methyl group is denoted as "Me", an ethyl group is denoted as "Et", a propyl group is denoted as "Pr", a butyl group is denoted as "Bu", and a phenyl group is denoted as "Ph", and [n] represents "normal", [i] represents "iso", and "t" represents "tertially".

Among the above compounds, compounds containing a double bond (including an aromatic structure) in a ring structure may be preferable from the viewpoint of, for example, a molecular weight regulating function by hydrogen.

A structure in which the carbon atoms to which $R^3$ to $R^{16}$ and R are bonded include quaternary carbon may be preferable.

The basic skeleton of such a compound is preferably a structure in which three or more cyclic skeletons are connected, such as anthracene. The cyclic structure preferably contains a double bond. Moreover, one or more cyclic skeleton thereof is preferably an aromatic ring.

The compounds preferably have a structure having a substituent other than hydrogen on the carbon at the bridgehead positions. A preferable embodiment of the substituent is a hydrocarbon group or a heteroatom-containing hydrocarbon group as described above. A preferable example of the heteroatom in the heteroatom-containing hydrocarbon group is a Group 16 element of the periodic table, such as oxygen or sulfur, and oxygen is more preferable. The heteroatom-containing hydrocarbon group is preferably an alkoxy group. Such a substituent may preferably be an electron-donating substituent.

The carbon atoms at the bridgehead positions refer to carbon atoms that share two or more rings. For example, the carbon to which $R^{11}$ and $R^{12}$ are bonded in the structural formula of the formula (1) are the carbon at the bridgehead positions. When olefin is polymerized using a solid titanium catalyst component containing such a compound of a structure having substituents at the bridgehead positions as the cyclic multiple-ester-group-containing compound (a), there is a tendency that a polymer having a relatively high melt flow rate is likely obtained. At this time, the polymerization activity of the solid titanium catalyst component and the stereospecificity unlikely deteriorate, and such a compound is thus preferable. Such properties are advantageous, for example, when producing the polymer as a feedstock for injection molding.

While the reason why the efficacy of such a structure is exhibited is currently not clear, it seems to the present inventors that the efficacy owes to one or both of a structural factor that the presence of the substituents relatively increases the proportion of attacking the active site of hydrogen rather than olefin, and an electronic factor resulting from the substituent effect.

Compounds having a diester structure as above have isomers such as cis and trans forms derived from an $OCOR^1$ group and an $OCOR^2$ group in the formula (1), and any structure has an effect that meets the object of the present invention. A cis form is more preferable. A higher content of a cis form tends to result in a higher activity, and a higher stereoregularity of the resulting polymer.

One of these compounds may be used singly, or two or more may be used in combination. As long as the object of the present invention is not defeated, the cyclic multiple-ester-group-containing compound (a) may be used in combination with a catalyst component (b) and a catalyst component (c) that will be described below.

The cyclic multiple-ester-group-containing compound (a) may be formed during the course of preparing the solid titanium catalyst component (I). For example, when preparing the solid titanium catalyst component (I), providing the step of bringing, for example, a carboxylic acid anhydride or a carboxylic acid halide corresponding to the catalyst component (a) to be substantially into contact with the corresponding polyol also enables the cyclic multiple-ester-group-containing compound (a) to be contained in the solid titanium catalyst component.

There is a tendency that the olefin polymer production method of the present invention likely provides a polymer having a broad molecular weight distribution and high stereoregularity in a highly active manner. While the reason therefor is currently not clear, it is presumed as follows.

The cyclic multiple-ester-group-containing compound (a) used in the present invention has, as described above, a structure in which rings are connected, and it is thus presumed that the compound has suitable rigidity as a compound, and the structural displacement is relatively small. Accordingly, it seems that when the cyclic multiple-ester-group-containing compound (a) coordinates to a titanium compound or a magnesium compound that will be described below, it maintains a stable structure, and variations of stereospecificity and polymerization reaction activity as a catalyst during an olefin polymerization reaction are small. From these viewpoints, it seems that a highly stereoregular polymer can be obtained in a highly active manner.

On the other hand, in the case of a stable structure with little structural displacement, there were initially concerns about a narrow molecular weight distribution, but as shown in the Examples below, the method of the present invention enables a polymer having a broad molecular weight distribution to be produced. This, as presumed by the present inventors, is due to the possibility that, in the case of the cyclic multiple-ester-group-containing compound (a), slight fluctuations of cyclic structures and combinations of such fluctuations of respective ring structures highly affect the molecular weight of the resulting polymer, and having multiple ring structures results in a variety of combinations of stereoisomeric structures that the respective rings can take (such as a chair conformation and a boat conformation).

Among the above compounds, there will be more conformations in the case of ester compounds having asymmetric structure and moreover in the case of interactions with a magnesium compound and a titanium compound than symmetrical compounds, and thus active species having various microstructures can be possibly formed. It is conceived that this point is possibly advantageous to obtaining embodiments including a polymer having a broad molecular weight distribution and a highly stereoregular polymer.

In addition to the cyclic multiple-ester-group-containing compound (a), a magnesium compound and a titanium compound are used in the preparation of the solid titanium catalyst component (I) of the present invention.

<Magnesium Compound>

Specific examples of such magnesium compounds include known magnesium compounds such as:
   magnesium halides such as magnesium chloride and magnesium bromide;
   alkoxymagnesium halides such as methoxymagnesium chloride, ethoxymagnesium chloride, and phenoxymagnesium chloride;
   alkoxymagnesium such as ethoxymagnesium, isopropoxymagnesium, butoxymagnesium, and 2-ethylhexoxymagnesium;
   aryloxymagnesium such as phenoxymagnesium; and
   carboxylic acid salts of magnesium, such as magnesium stearate.

One of these magnesium compounds may be used singly, or two or more may be used in combination. Also, such a magnesium compound may be a complex compound with another metal, a composite compound, or a mixture with another metal compound.

Among these magnesium compounds, a halogen-containing magnesium compound is preferable. Magnesium halide and, in particular, magnesium chloride are preferably used. Alkoxymagnesium such as ethoxymagnesium is preferably used as well. The magnesium compound may be a compound that is derived from another substance, such as a compound obtained by bringing an organomagnesium compound such as a Grignard reagent into contact with, for example, titanium halide, silicon halide, or alcohol halide.
<Titanium Compound>

Examples of the titanium compound include tetravalent titanium compounds represented by the general formula:

$$Ti(OR')_g X_{4-g}$$

wherein R' is a hydrocarbon group, X is a halogen atom, and g is 0≤g≤4. More specific examples include:
titanium tetrahalides such as $TiCl_4$ and $TiBr_4$;
alkoxytitanium trihalides such as $Ti(OCH_3)Cl_3$, $Ti(OC_2H_5)$ $Cl_3$, $Ti(O$-$n$-$C_4H_9)$ $Cl_3$, $Ti(OC_2H_5)$ $Br_3$, and $Ti(O$-$iso$-$C_4H_9)$ $Br_3$;
alkoxytitanium dihalides such as $Ti(OCH_3)_2Cl_2$ and $Ti(OC_2H_5)_2Cl_2$;
alkoxytitanium monohalides such as $Ti(OCH_3)_3Cl$, $Ti(O$-$n$-$C_4H_9)_3Cl$, and $Ti(OC_2H_5)_3Br$; and
tetraalkoxytitanium such as $Ti(OCH_3)_4$, $Ti(OC_2H_5)_4$, $Ti(OC_4H_9)_4$, and $Ti(O$-$2$-$ethylhexyl)_4$.

Among these, titanium tetrahalides are preferable, and titanium tetrachloride is particularly preferable. One of these titanium compounds may be used singly, or two or more may be used in combination.

Examples of such magnesium compounds and titanium compounds can also include those described in detail in, for example, Patent Literature 1 and Patent Literature 2.

In the preparation of the solid titanium catalyst component (I) used in the present invention, known methods can be used without limitation except that the cyclic multiple-ester-group-containing compound (a) is used. Examples of specific preferable methods include the following methods (P-1) to (P-4).

(P-1) Method involving bringing a solid adduct composed of a magnesium compound and a catalyst component (b), the cyclic multiple-ester-group-containing compound (a), and a liquid titanium compound into contact with each other in a suspended state in the presence of an inert hydrocarbon solvent.

(P-2) Method involving bringing a solid adduct composed of a magnesium compound and a catalyst component (b), the cyclic multiple-ester-group-containing compound (a), and a liquid titanium compound into contact with each other in divided portions.

(P-3) Method involving bringing a solid adduct composed of a magnesium compound and a catalyst component (b), the cyclic multiple-ester-group-containing compound (a), and a liquid titanium compound into contact with each other in a suspended state and in divided portions in the presence of an inert hydrocarbon solvent.

(P-4) Method involving bringing a liquid magnesium compound composed of a magnesium compound and a catalyst component (b), a liquid titanium compound, and the cyclic multiple-ester-group-containing compound (a) into contact with each other.

The reaction temperature is in a range of preferably −30° C. to 150° C., more preferably −25° C. to 130° C., and even more preferably −25° C. to 120° C.

Production of the solid titanium catalyst component can be performed also in the presence of a known medium as necessary. Examples of the medium include slightly polar aromatic hydrocarbons such as toluene and known aliphatic hydrocarbons and alicyclic hydrocarbon compounds such as heptane, octane, decane, and cyclohexane, and preferable examples among these are aliphatic hydrocarbons.

When the reaction is performed within the above range, the effect of obtaining a polymer having a broad molecular weight distribution, activity, and the stereoregularity of the resulting polymer can be simultaneously achieved at a higher level.

(Catalyst Component (b))

The catalyst component (b) used to form the solid adduct and the liquid magnesium compound is preferably a known compound capable of solubilizing the magnesium compound in a temperature range of about room temperature to 300° C., and, for example, alcohols, aldehydes, amines, carboxylic acids, and mixtures thereof are preferable. Examples of these compounds include those described in detail in Patent Literature 1 and Patent Literature 2.

More specific examples of alcohols capable of solubilizing the magnesium compound include:
aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol, and dodecanol;
alicyclic alcohols such as cyclohexanol and methylcyclohexanol;
aromatic alcohols such as benzyl alcohol and methylbenzyl alcohol; and aliphatic alcohols having an alkoxy group, such as n-butyl cellosolve.

Examples of carboxylic acids include organic carboxylic acids having 7 or more carbon atoms, such as caprylic acid and 2-ethylhexanoic acid. Examples of aldehydes include aldehydes having 7 or more carbon atoms, such as capric aldehyde and 2-ethylhexyl aldehyde.

Examples of amines include amines having 6 or more carbon atoms, such as heptylamine, octylamine, nonylamine, laurylamine, and 2-ethylhexylamine.

Preferable examples of the catalyst component (b) are the above alcohols, and, for example, ethanol, propanol, butanol, isobutanol, hexanol, 2-ethylhexanole, and decanol are particularly preferable.

While the amounts of the magnesium compound and the catalyst component (b) used when preparing the solid adduct and the liquid magnesium compound also vary according to, for example, the kinds and contact conditions, the magnesium compound is used in an amount of 0.1 to 20 mol/liter and preferably 0.5 to 5 mol/liter based on the unit volume of the catalyst component (b). Also, a medium that is inert to the solid adduct can be used in combination as necessary. Preferable examples of the medium include known hydrocarbon compounds such as heptane, octane, and decane.

While the compositional ratio of magnesium to the catalyst component (b) in the resulting solid adduct and the liquid magnesium compound cannot be generally specified because the ratio varies according to the kind of the compound used, the catalyst component (b) per mole of magnesium in the magnesium compound is in a range of preferably 2.0 mol or more, more preferably 2.2 mol or more, even more preferably 2.6 mol or more, and particularly preferably 2.7 mol or more, and preferably 5 mol or less.

<Aromatic Carboxylic Acid Ester and/or Compound Having Two or More Ether Bonds Via Multiple Carbon Atoms>

The solid titanium catalyst component (I) of the present invention may further contain an aromatic carboxylic acid ester and/or a compound having two or more ether bonds via multiple carbon atoms (hereinafter also referred to as a "catalyst component (c)"). The catalyst component (c) when contained in the solid titanium catalyst component (I) of the present invention may increase activity and stereoregularity and further broaden the molecular weight distribution.

Known aromatic carboxylic acid esters and polyether compounds that are preferably used in conventional catalysts for olefin polymerization, such as compounds described in Patent Literature 2 and JP2001-354714A, can be used without limitations as the catalyst component (c).

Specific examples of the aromatic carboxylic acid esters include aromatic carboxylic acid monoesters such as benzoic acid esters and toluic acid esters, and aromatic polycarboxylic acid esters such as phthalic acid esters. Among these, aromatic polycarboxylic acid esters are preferable, and phthalic acid esters are more preferable. The phthalic acid esters are preferably alkyl phthalates such as ethyl phthalate, n-butyl phthalate, isobutyl phthalate, hexyl phthalate, and heptyl phthalate, and diisobutyl phthalate is particularly preferable.

More specific examples of the polyether compound include compounds represented by the following formula (3):

[Chem. 63]

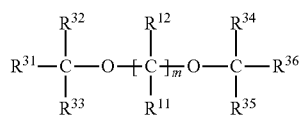

(3)

wherein m is an integer of 1≤m≤10 and more preferably an integer of 3≤m≤10; and $R^{11}$, $R^{12}$, and $R^{31}$ to $R^{36}$ are each independently a hydrogen atom or a substituent having at least one element selected from carbon, hydrogen, oxygen, fluorine, chlorine, bromine, iodine, nitrogen, sulfur, phosphorus, boron, and silicon.

When m is 2 or more, a plurality of $R^{11}$ and $R^{12}$ may be the same or different. Any $R^{11}$, $R^{12}$, $R^{31}$ to $R^{36}$, and preferably $R^{11}$ and $R^{12}$, may together form a ring other than a benzene ring.

Specific examples of such compounds include:
monosubstituted dialkoxypropanes such as 2-isopropyl-1,3-dimethoxypropane, 2-s-butyl-1,3-dimethoxypropane, and 2-cumyl-1,3-dimethoxypropane;
disubstituted dialkoxypropanes such as 2-isopropyl-2-isobutyl-1,3-dimethoxypropane, 2,2-dicyclohexyl-1,3-dimethoxypropane, 2-methyl-2-isopropyl-1,3-dimethoxypropane, 2-methyl-2-cyclohexyl-1,3-dimethoxypropane, 2-methyl-2-isobutyl-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2,2-di-s-butyl-1,3-dimethoxypropane, 2,2-dineopentyl-1,3-dimethoxypropane, 2-isopropyl-2-isopentyl-1,3-dimethoxypropane, and 2-cyclohexyl-2-cyclohexylmethyl-1,3-dimethoxypropane;
dialkoxyalkanes such as 2,3-dicyclohexyl-1,4-diethoxybutane, 2,3-dicyclohexyl-1,4-diethoxybutane, 2,3-diisopropyl-1,4-diethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, and 2,4-diisoamyl-1,5-dimethoxypentane;
trialkoxyalkanes such as 2-methyl-2-methoxymethyl-1,3-dimethoxypropane, 2-cyclohexyl-2-ethoxymethyl-1,3-diethoxypropane, and 2-cyclohexyl-2-methoxymethyl-1,3-dimethoxypropane; and
dialkoxycycloalkanes such as 2,2-diisobutyl-1,3-dimethoxy-4-cyclohexenyl, 2-isopropyl-2-isoamyl-1,3-dimethoxy-4-cyclohexenyl, 2-cyclohexyl-2-methoxymethyl-1,3-dimethoxy-4-cyclohexenyl, 2-isopropyl-2-methoxymethyl-1,3-dimethoxy-4-cyclohexenyl, 2-isobutyl-2-methoxymethyl-1,3-dimethoxy-4-cyclohexenyl, 2-cyclohexyl-2-ethoxymethyl-1,3-dimethoxy-4-cyclohexenyl, 2-isopropyl-2-ethoxymethyl-1,3-dimethoxy-4-cyclohexenyl, and 2-isobutyl-2-ethoxymethyl-1,3-dimethoxy-4-cyclohexenyl.

Among these, 1,3-diethers is preferable, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis(cyclohexylmethyl) 1,3-dimethoxypropane are particularly preferable.

One of these compounds may be used singly, or two or more may be used in combination.

The cyclic multiple-ester-group-containing compound (a), the catalyst component (b), and the catalyst component (c) as above can be generally regarded as belonging to components that are called electron donors by those skilled in the art. The electron donor components are known to show, for example, the effect of increasing the stereoregularity of the resulting polymer, the effect of controlling the compositional distribution of the resulting copolymer, the aggregating-agent effect of controlling the particle shape and the particle size of catalyst particles, while maintaining the high catalyst activity.

The cyclic multiple-ester-group-containing compound (a) of the present invention is considered as also showing the effect capable of further controlling the molecular weight distribution by the electron donor.

In the solid titanium catalyst component (I) used in the present invention, halogen/titanium (an atomic ratio) (i.e., the number of moles of halogen atoms/the number of moles of titanium atoms) is desirably 2 to 100 and preferably 4 to 90;

the cyclic multiple-ester-group-containing compound (a)/titanium (a molar ratio) (i.e., the number of moles of the cyclic multiple-ester-group-containing compound (a)/the number of moles of titanium atoms) is desirably 0.01 to 100 and preferably 0.2 to 10; and regarding the catalyst component (b) and the catalyst component (c), the catalyst component (b)/titanium atoms (a molar ratio) is desirably 0 to 100 and preferably 0 to 10; and the catalyst component (c)/titanium atoms (a molar ratio) is desirably 0 to 100 and preferably 0 to 10.

Magnesium/titanium (an atomic ratio) (i.e., the number of moles of magnesium atoms/the number of moles of titanium atoms) is desirably 2 to 100 and preferably 4 to 50.

The content of components that may be contained in other than the cyclic multiple-ester-group-containing compound (a), such as the catalyst component (b) and the catalyst component (c), is preferably 20 wt % or less and more preferably 10 wt % or less based on 100 wt % of the cyclic multiple-ester-group-containing compound (a).

As for the more detailed conditions for preparing the solid titanium catalyst component (I), the conditions described in, for example, EP585869A1 (the specification of European Patent Application Publication No. 0585869) and Patent Literature 2 can be preferably used except that the cyclic multiple-ester-group-containing compound (a) is used.

[Catalyst for Olefin Polymerization]

The catalyst for olefin polymerization according to the present invention contains:

the solid titanium catalyst component (I) according to the present invention, and an organometallic compound catalyst component (II) containing a metal atom selected from Group 1, Group 2, and Group 13 of the periodic table.

<Organometallic Compound Catalyst Component (II)>

A compound containing a Group 13 metal such as an organoaluminum compound, an alkyl complex compound of a Group 1 metal and aluminum, or an organometallic compound of a Group 2 metal can be used as the organometallic compound catalyst component (II). Among these, an organoaluminum compound is preferable.

Specific preferable examples of the organometallic compound catalyst component (II) include organometallic compound catalyst components described in known documents such as the aforementioned EP585869A1.

<Electron Donor (III)>

The catalyst for olefin polymerization of the present invention may contain, together with the organometallic compound catalyst component (II), an electron donor (III) as necessary. The electron donor (III) is preferably an organosilicon compound. Examples of the organosilicon compound include compounds represented by the following general formula (4):

$$R^S_n Si(OR'')_{4-n} \quad (4)$$

wherein $R^S$ and $R''$ are hydrocarbon groups, and n is an integer of $0 \leq n < 4$.

Specifically, as for the organosilicon compound represented by the general formula (4), for example, diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, and cyclopentyldimethylethoxysilane are used.

Among these, vinyltriethoxysilane, diphenyldimethoxysilane, dicyclohexyldimethoxysilane, cyclohexylmethyldimethoxysilane, and dicyclopentyldimethoxysilane are preferably used.

Also, silane compounds represented by the following formula (5) as described in WO2004/016662 are preferable examples of the organosilicon compound:

$$Si(OR^a)_3(NR^bR^c) \quad (5)$$

wherein $R^a$ is a hydrocarbon group having 1 to 6 carbon atoms, examples of $R^a$ include unsaturated or saturated aliphatic hydrocarbon groups having 1 to 6 carbon atoms, and particularly preferable examples include hydrocarbon groups having 2 to 6 carbon atoms. Specific examples include a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, and a cyclohexyl group, and, among these, an ethyl group is particularly preferable.

In the formula (5), Rb is a hydrocarbon group having 1 to 12 carbon atoms or hydrogen, and examples of Rb include unsaturated or saturated aliphatic hydrocarbon groups having 1 to 12 carbon atoms and hydrogen. Specific examples include a hydrogen atom, a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, a cyclohexyl group, and an octyl group, and, among these, an ethyl group is particularly preferable.

In the formula (5), $R^c$ is a hydrocarbon group having 1 to 12 carbon atoms, and examples of $R^c$ include unsaturated or saturated aliphatic hydrocarbon groups having 1 to 12 carbon atoms and hydrogen. Specific examples include a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, a cyclohexyl group, and an octyl group, and, among these, an ethyl group is particularly preferable.

Specific examples of the compound represented by the above formula (5) include dimethylaminotriethoxysilane, diethylaminotriethoxysilane, diethylaminotrimethoxysilane, diethylaminotriethoxysilane, diethylaminotri n-propoxysilane, di-n-propylaminotriethoxysilane, methyl-n-propylaminotriethoxysilane, t-butylaminotriethoxysilane, ethyl-n-propylaminotriethoxysilane, ethyl-iso-propylaminotriethoxysilane, and methylethylaminotriethoxysilane.

Other examples of the organosilicon compound include compounds represented by the following formula (6).

$$R^N NSi(OR^a)_3 \quad (6)$$

In the formula, $R^N N$ is a cyclic amino group, and examples of the cyclic amino group include a perhydroquinolino group, a perhydroisoquinolino group, a 1,2,3,4-tetrahydroquinolino group, a 1,2,3,4-tetrahydroisoquinolino group, and an octamethyleneimino group.

Specific examples of the compounds represented by the above formula (6) include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane, and octamethyleneiminotriethoxysilane.

Two or more of these organosilicon compounds can be used in combination.

Preferable examples of other useful compounds as the electron donor (III) include polyether compounds described as examples of the aromatic carboxylic acid ester and/or the compound having two or more ether bonds via multiple carbon atoms (the catalyst component (c)).

Among those polyether compounds, 1,3-diethers are preferable, and 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis(cyclohexylmethyl)-1,3-dimethoxypropane are particularly preferable.

One of these compounds can be used singly, and two or more can be used in combination.

The catalyst for olefin polymerization of the present invention may contain, other than the components described above, other components useful for olefin polymerization as necessary. Examples of other components include carriers such as silica, antistatic agents, particle aggregating agents, and storage stabilizers.

[Olefin Polymerization Method]

The olefin polymerization method according to the present invention involves performing olefin polymerization using the catalyst for olefin polymerization of the present invention. Herein, "polymerization" may include the meaning of homopolymerization as well as copolymerization such as random copolymerization and block copolymerization.

In the olefin polymerization method of the present invention, polymerization can also be performed in the presence of a prepolymerization catalyst obtained by prepolymerizing α-olefin in the presence of the catalyst for olefin polymerization of the present invention. This prepolymerization is performed by prepolymerizing an α-olefin in an amount of 0.1 to 1000 g, preferably 0.3 to 500 g, and particularly preferably 1 to 200 g per gram of the catalyst for olefin polymerization.

In prepolymerization, the catalyst can be used in a concentration higher than the catalyst concentration in the system of polymerization.

The concentration of the solid titanium catalyst component (I) in prepolymerization, in terms of titanium atom, is desirably in the range of usually about 0.001 to 200 mmol, preferably about 0.01 to 50 mmol, and particularly preferably 0.1 to 20 mmol per liter of a liquid medium.

It is sufficient that the amount of the organometallic compound catalyst component (II) in prepolymerization is an amount such that 0.1 to 1000 g and preferably 0.3 to 500 g of a polymer is produced per gram of the solid titanium catalyst component (I), and it is desirable that the amount is usually about 0.1 to 300 mol, preferably about 0.5 to 100 mol, and particularly preferably 1 to 50 mol per mole of titanium atoms in the solid titanium catalyst component (I).

In prepolymerization, for example, the electron donor (III) can also be used as necessary, and, at this time, such components are used in an amount of 0.1 to 50 mol, preferably 0.5 to 30 mol, and even more preferably 1 to 10 mol per mole of titanium atoms in the solid titanium catalyst component (I).

Prepolymerization can be performed under mild conditions after adding an olefin and the above catalyst components to an inert hydrocarbon medium.

In this case, specific examples of the inert hydrocarbon medium used include:
- aliphatic hydrocarbons such as propane, butane, pentane, hexane, heptane, octane, decane, dodecane, and kerosene;
- alicyclic hydrocarbons such as cycloheptane, methylcycloheptane, 4-cycloheptane, and methyl-4-cycloheptane;
- aromatic hydrocarbons such as benzene, toluene, and xylene;
- halogenated hydrocarbons such as ethylenechloride and chlorobenzene; and
- mixtures thereof.

Among these inert hydrocarbon media, aliphatic hydrocarbons are preferably used in particular. In the case of using an inert hydrocarbon medium, prepolymerization is preferably performed in a batch-wise manner.

On the other hand, prepolymerization can also be performed using the olefin itself as a solvent, and prepolymerization can also be performed in a substantially solvent-free state. In this case, prepolymerization is preferably performed in a continuous manner.

The olefin used in prepolymerization may be the same as or different from the olefin used in polymerization that will be described below, and, specifically, propylene is preferable.

Desirably, the temperature during prepolymerization is in a range of usually about −20 to +100° C., preferably about −20 to +80° C., and even more preferably 0 to +40° C.

Next, polymerization will now be described that is performed by way of the above-described prepolymerization or without prepolymerization.

Examples of olefins that are usable (i.e., to be polymerized) in polymerization include α-olefins having 3 to 20 carbon atoms, e.g., linear olefins such as propylene, 1-butene, 1-pentene, 1-hexene, 1-octene, 1-decene, 1-dodecene, 1-tetradecene, 1-hexadecene, 1-octadecene, and 1-eicosene, and branched olefins such as 4-methyl-1-pentene, 3-methyl-1-pentene, and 3-methyl-1-butene, and preferable are propylene, 1-butene, 1-pentene, 4-methyl-1-pentene, and 3-methyl-1-butene. From the viewpoint that advantages of a polymer having a broad molecular weight distribution are likely exhibited in a highly rigid resin, propylene, 1-butene, 4-methyl-1-pentene, and 3-methyl-1-butene are particularly preferable.

In addition to these α-olefins, also usable are ethylene, aromatic vinyl compounds such as styrene and allylbenzene, and alicyclic vinyl compounds such as vinylcyclohexane and vinylcycloheptane. Moreover, cyclopentene, cycloheptene, norbornene, tetracyclododecene, and compounds having multiple unsaturated bonds such as conjugated dienes and non-conjugated dienes, e.g., dienes such as isoprene and butadiene, can also be used as polymerization feedstocks together with ethylene and α-olefin. One of these compounds may be used singly, or two or more may be used in combination (hereinafter, olefins used with ethylene or the "α-olefins having 3 to 20 carbon atoms" are also referred to as "further olefins").

The olefins and further olefins may be conventional petroleum (crude oil)-derived compounds or natural-gas-derived compounds. They may be compounds that are derived from, for example, wild or cultivated plants, and that are commonly referred to as biomaterials. Such bio-compounds tend to have a higher content of $^{14}C$, which is an isotope of carbon, than compounds derived from petroleum or natural gas. As a matter of course, all carbon-containing compounds, such as the inert hydrocarbons and ester compounds, may also be bio-compounds.

Among the further olefins, ethylene and aromatic vinyl compounds are preferable. Out of the total 100 wt % of olefins, a small amount, e.g., 10 wt % or less and preferably 5 wt % or less, of further olefins such as ethylene may be used in combination.

In the present invention, prepolymerization and polymerization can be performed by any of the liquid-phase polymerization methods such as bulk polymerization, solution polymerization, and suspension polymerization, and the gas-phase polymerization methods.

When polymerization takes the reaction form of slurry polymerization, an inert hydrocarbon as used during the above-described prepolymerization can be used as a reaction solvent, and an olefin that is liquid at the reaction temperature, can also be used.

In polymerization in the polymerization method of the present invention, the solid titanium catalyst component (I) is used in an amount, in terms of titanium atom, of usually about 0.0001 to 0.5 mmol and preferably about 0.005 to 0.1 mmol per liter of the polymerization volume. The organometallic compound catalyst component (II) is used in an amount of usually about 1 to 2000 mol, preferably about 5 to 500 mol, more preferably 10 to 350 mol, even more preferably 30 to 350 mol, and particularly preferably 50 to 350 mol per mole of titanium atoms in the prepolymerization catalyst components in the polymerization system. The electron donor (III), if used, is used in an amount of 0.001 to 50 mol, preferably 0.01 to 30 mol, and particularly preferably 0.05 to 20 mol based on the organometallic compound catalyst component (II).

The catalyst for olefin polymerization containing a solid titanium catalyst component of the present invention is characterized by, as described above, enabling a highly stereoregular polymer to be obtained, and regulating the amount of the electron donor (III) used makes it possible to obtain a polymer having a stereoregularity comparable to that of known propylene polymers and to obtain a flexible propylene polymer. That is to say, the catalyst for olefin polymerization of the present invention is a useful catalyst that also enables propylene polymers of a general-purpose grade to be produced.

Performing polymerization in the presence of hydrogen makes it possible to regulate the molecular weight of the resulting polymer, and provides a polymer having a high melt flow rate.

In polymerization in the present invention, the olefin polymerization temperature is usually about 20 to 200° C., preferably about 30 to 100° C., and more preferably 50 to 90° C. The pressure is usually set to normal pressure to 10 MPa, and preferably 0.20 to 5 MPa. In the polymerization method of the present invention, polymerization can be performed in any of the batch-wise, semi-continuous, and continuous manners. Moreover, polymerization can be performed at two or more divided stages by changing the reaction conditions. Performing such multi-stage polymerization enables the molecular weight distribution of the olefin polymer to be further broadened.

The olefin polymer thus obtained may be any of, for example, a homopolymer, a random copolymer, and a block copolymer.

When olefin polymerization, or propylene polymerization in particular, is performed using the catalyst for olefin polymerization described above, a highly stereoregular propylene-based polymer having a decane-insoluble component content of 70% or more, preferably 85% or more, and particularly preferably 90% or more can be obtained.

Moreover, according to the olefin polymerization method of the present invention, polyolefin or, in particular, polypropylene having a broad molecular weight distribution can be obtained even without performing multi-stage polymerization, or even through polymerization having a small number of stages such as single-stage polymerization. It is a feature of the olefin polymerization method of the present invention that, in particular, an olefin polymer is often obtained that has a higher proportion of high molecular weight components and a lower proportion of low molecular weight components (which are especially referred to as sticky compounds) than conventional olefin polymers having a comparable melt flow rate (MFR). This feature can be verified by gel permeation chromatography (GPC) measurement that will be described below, and a polymer having both a high Mw/Mn value and a high Mz/Mw value can be obtained.

Polypropylene obtained using conventional solid titanium catalyst components including magnesium, titanium, halogen, and an electron donor generally has an Mw/Mn value of 5 or less and an Mz/Mw value of less than 3.5 and preferably less than 4, which are indices of a molecular weight distribution as determined by GPC measurement, in an MFR range of 1 to 10 g/10 min, but when the olefin polymerization method of the present invention is used, an olefin polymer having an Mw/Mn value of 6 to 30 and preferably 7 to 20 can be obtained under the same polymerization conditions. Moreover, an olefin polymer having an Mz/Mw value of preferably 4 to 15 and more preferably 4.5 to 10 can be obtained. In particular, according to the olefin polymerization method of the present invention, a polymer having a high Mz/Mw value is often obtained.

It is common knowledge among those skilled in the art that polypropylene having a high Mw/Mn value has excellent moldability and rigidity. On the other hand, a high Mz/Mw value indicates a high content of a high molecular weight component, and it is expected that the resulting polypropylene possibly has high melt tension and excellent moldability.

The use of the olefin polymerization method of the present invention enables a polymer having a broad molecular weight distribution to be obtained without performing multi-stage polymerization and thus, possibly, a polymer production apparatus to be more simplified. Also, application to a conventional multi-stage polymerization method is expected to enable a polymer having better melt tension and moldability to be obtained.

While there are other methods for obtaining a polymer having a broad molecular weight distribution such as a method involving melt-mixing or melt-kneading polymers having different molecular weights, polymers obtained by such methods may not have sufficiently increased melt tension or moldability despite the relatively complex procedure. This is presumably because polymers having different molecular weights, basically, are unlikely to mix. On the other hand, the polymer obtained by the olefin polymerization method of the present invention, because polymers having different molecular weights of extremely broad ranges are mixed at the catalyst level, i.e., the nano-level, is expected to have a high melt tension and excellent moldability.

The polymer obtained by the olefin polymerization method of the present invention has high stereoregularity as described above. Accordingly, the olefin polymer obtained by the method of the present invention tends to have a high melting point. The melting point is usually determined by differential scanning calorimetry (DSC) method.

As described above, the olefin polymer, or the propylene polymer in particular, obtained by the method of the present invention tends to have a broad molecular weight distribution and in particular a large Mz, and thus tends to have a distribution that spreads toward the high molecular weight side. Since the molecular mobility of an olefin polymer varies according to the molecular weight, a chart obtained by DSC measurement in the case of a polymer having a broad molecular weight distribution may have not a unimodal shape but a multimodal shape or a broad shape. That is to say, since an ultra-high molecular weight component is more unlikely to crystallize, it is conceived that a chart that has a broad shape on the low temperature side in a DSC measurement method is possibly due to an ultra-high molecular weight component. Also, in the case of a chart having a spread toward the low molecular weight side, a low molecular weight polymer generally has a high degree of crystallinity, but tends to have a small amount of heat of fusion. Accordingly, ΔH that is measured as heat of fusion (amount of heat of crystallization) may also tend to be low.

On the other hand, it was found that the DSC chart of the propylene polymer obtained using the method of the present invention tends to show a relatively small spread toward the low temperature side and also a high AH. This is possibly because the polymer obtained by the method of the present invention, especially components in the ultra-high molecular weight region, has high stereoregularity, and thus showed a tendency that the polymer easily crystallizes, and that the chart has little spread toward the low temperature side.

The polymer obtained by the method of the present invention shows a molecular weight distribution that also has a certain degree of spread toward the low molecular weight side. A low molecular weight component tends to have a weak crystal structure and a low melting point due to the low molecular weight.

It is also conceived that the propylene polymer obtained by the method of the present invention, because the stereoregularity of a low molecular weight component is high, possibly shows a DSC chart that has little spread toward the low temperature side.

In addition, a plurality of factors such as the possibility of exhibiting a nucleating agent effect in the crystallization step can also be conceived.

From these viewpoints, it is conceived that the propylene polymer obtained by the method of the present invention possibly has high stereoregularity regardless of the molecular weight range thereof. Accordingly, the polymer has high heat of fusion and shows a relatively high degree of crystallinity.

The propylene polymer obtained by the method of the present invention can be used in known various applications. In particular, since the propylene polymer is expected to have high heat resistance and rigidity, the propylene polymer is suitable for, for example, various injection-molded article applications and, more specifically, automobile components and household electric appliance components. Also, the propylene polymer can be used in various sheets and films due to the broad molecular weight distribution. In particular, the propylene polymer is suitable for, for example, separator applications in lithium ion batteries and capacitors as well. Also, the propylene polymer can be suitably used in, for example, stamping-molded articles, calender-molded articles, and rotational-molded articles.

[Propylene Polymer]

The propylene polymer of the present invention has a melt flow rate (MFR) in a range of 0.01 g/10 min or more and 1000 g/10 min or less as determined under conditions of a measurement temperature of 230° C. in accordance with ASTM 1238 standard.

A preferable lower limit is 0.05 g/10 min, more preferably 0.10 g/10 min, and even more preferably 0.12 g/10 min. On the other hand, a preferable upper limit is 900 g/10 min, more preferably 800 g/10 min, and even more preferably 750 g/10 min. In a range lower than the lower limit, the melt fluidity of the polymer may be excessively low, resulting in insufficient moldability and productivity. On the other hand, in a range exceeding the upper limit, the viscosity when in a molten state may be excessively low, resulting in insufficient shape retention, and insufficient strength and heat resistance of a molded article.

The propylene polymer of the present invention tends to have high heat resistance, and shows a characteristic chart on the high temperature side when measured by differential scanning calorimetry (DSC). Specifically, the maximum temperature (Tm-maxv) at which heat absorption is zero in differential scanning calorimetry (DSC) at a heating condition of 10° C./min is 169.0° C. or higher and 220° C. or lower. The values are determined by the DSC measurement method and conditions for determining the melting point (Tm) described in the Examples below.

The propylene-based polymer of the present invention tends to have a high melting point, and further tends to show a shape gently extending toward the higher temperature side. That is to say, since it suggests the presence of a polymer that unlikely dissolves up to a high temperature region, the polymer is possibly a highly heat-resistant polymer. The reason for showing such feature, while it is not clear, is presumed by the present inventors as follows.

It is conceived that the propylene polymer of the present invention, as will be described below, has a high content of a ultra-high molecular weight polymer, the stereoregularity of the ultra-high molecular weight polymer is higher than that of conventional propylene polymers, thus the propylene polymer readily crystallizes, or the ultra-high molecular weight polymer also functions as a crystallization nucleating agent, thus the polymer in a higher molecular weight region (a region where crystallization tends to be unlikely due to reduced molecular mobility) readily crystallizes than before, and a phenomenon concerning heat of fusion based on crystals is also observed on the high temperature side.

A preferable lower limit of Tm-maxv is 169.5° C., more preferably 170.0° C., even more preferably 170.5° C., and particularly preferably 171.0° C. On the other hand, a preferable upper limit is 215° C., more preferably 210° C., even more preferably 205° C., and particularly preferably 200° C.

Concerning the propylene polymer satisfying the above requirements, the amount of heat of fusion as a polymer tends to be large. Accordingly, the propylene polymer of the present invention can be expected to have high heat resistance. When the lower limit of Tm-maxv is lower than the above numerical value, the polymer may have poor heat resistance and, for example, a low heat distortion temperature (HDT). On the other hand, when the lower limit of Tm-maxv is higher than the above numerical value, a high temperature is required for melt flowing, and a large amount of energy (calorie) may be required during molding.

It is essential that the propylene polymer of the present invention satisfies two or more of the following requirements (p), (q), and (r):

(p) Mz/Mw determined by gel permeation chromatography (GPC) is 3.50 or more and 5.65 or less;

(q) a difference between Mw/Mn and Mz/Mw determined by GPC is 8.3 or less; and (r) a decane-soluble component content (C10sol.) (/wt %) and MFR (/(g/10 min)) satisfy the following relational expression:

$$(C10sol.)-4/3-\text{Log}(MFR) \leq 2.30.$$

Each requirement will now be described hereinbelow.

<Requirement (p)>

The propylene polymer of the present invention has an Mz/Mw determined by GPC of 3.50 or more and 5.65 or less.

Mz denotes a Z average molecular weight, and Mw denotes a weight average molecular weight. A polymer having a high Mz/Mw value can be considered as an index having a molecular weight distribution that tends to spread toward the high molecular weight side. Mz/Mw of ordinary propylene-based polymers is often less than 3.5, and preferably less than 4.0. That is to say, even propylene polymers that are considered as having a broad molecular weight distribution have a molecular weight distribution that tends to spread toward the low molecular weight side. The propylene polymer of the present invention tends to have a spread toward the high molecular weight side. It can be readily expected that such a high content of an ultra-high molecular weight component may result in high impact resistance. In addition, the propylene polymer of the present invention may have high heat resistance for, e.g., the reasons described in connection with the above (Tm-maxv).

A preferable lower limit of Mz/Mw of the propylene polymer of the present invention is 3.70, more preferably 3.80, even more preferably 3.90, and particularly preferably 4.00. On the other hand, a preferable upper limit is 5.63, more preferably 5.62, even more preferably 5.61, and particularly preferably 5.60. An Mz/Mw below the lower limit tends to result in a low content of the ultra-high molecular weight component. On the other hand, when the upper limit is exceeded, the ultra-high molecular weight polymer may cause fish eyes when, for example, a molded film is obtained. Also, a polymer having an excessively high molecular weight has slow molecular motion, and thus tends to be unlikely to crystallize, or that is to say, tends to have poor crystallinity. In other words, heat resistance may be insufficient. Also, there is a possibility that it unlikely functions as a crystallization nucleating agent.

<Requirement (q)>

The propylene polymer of the present invention has a difference between Mw/Mn and Mz/Mw determined by GPC of 8.3 or less.

As described above, Mw is a weight average molecular weight, and Mn is a number average molecular weight. Mw/Mn is a well-known index of a molecular weight distribution and, in comparison to Mz/Mw, can be considered as an index that tends to show a spread of the distribution toward the low molecular weight side.

Accordingly, the difference between Mw/Mn and Mz/Mw determined by GPC can be considered as an index indicating that the balance between a spread of the molecular weight distribution toward the low molecular weight side and a spread toward the high molecular weight side is in a suitable range. That is to say, it can be considered as indicating that when the spread of the molecular weight distribution toward the low molecular weight side is small, the spread toward the high molecular weight side is also relatively small, and when the spread of the molecular weight distribution toward the low molecular weight side is large, the spread toward the high molecular weight side is also relatively large.

A preferable upper limit of the difference is 8.00, more preferably 7.90, even more preferably 7.80, and particularly preferably 7.70.

Normally, the Mw/Mn value often shows a larger numerical value than the Mz/Mw value, and thus this requirement (q) is calculated by the expression "Mw/Mn-Mz/Mw". In this case, a preferable lower limit is 3.10, more preferably 3.50, even more preferably 4.00, and particularly preferably 4.60.

On the other hand, Mz/Mw may show a larger numerical value than Mw/Mn. That is to say, "Mw/Mn-Mz/Mw" may show a negative value. Also, the difference between the two numerical values may be extremely small. In such a case, the absolute value of "Mw/Mn-Mz/Mw" is preferably in a range of 0 or more and 2.0 or less. A more preferable lower limit in this case is 1.5, even more preferably 1.0, and particularly preferably 0.5.

When the lower limit is outside the above numerical range, the content of an ultra-high molecular weight component is excessively high or low, and thus, as described above, there may be a case where fish eyes are likely produced, and, as will be described below, the effect of an ultra-high molecular weight component as a crystallization nucleating agent is unlikely exhibited.

In addition, the content of a low molecular weight component becomes excessively high, possibly resulting in a lowered melting point and amount of heat of fusion. In other words, when "Mw/Mn-Mz/Mw" shows a negative value, the content of a low molecular weight component tends to be small, heat resistance is likely to be high, and improved impact resistance strength can be expected.

A preferable range of the Mw/Mn value is 5.5 or more and 13.70 or less. A more preferable lower limit is 5.80, even more preferably 5.90, and particularly preferably 6.00. On the other hand, a more preferable upper limit is 13.60, and even more preferably 13.50.

Mz, Mw, and Mn in the requirements (p) and (q) are values determined by the GPC measurement method of the Examples described below.

<Requirement (r)>

Concerning the propylene polymer of the present invention, the decane-soluble component content (C10sol.) (/wt %) and MFR (/(g/10 min)) satisfy the following relational expression:

$$(C10sol.) - 4/3 \times Log(MFR) \leq 2.30.$$

The decane-soluble component content is a value calculated by the measurement method described in the Examples below. This decane-soluble component content is known as an index of the stereoregularity of an olefin polymer such as a propylene polymer, and the value thereof may be influenced by the molecular weight of the olefin polymer. For example, when the molecular weight of the olefin polymer is extremely low, even a polymer having high regularity likely dissolves in decane. Accordingly, the term "4/3×Log (MFR)" is set mainly to mitigate this influence of the molecular weight. Thus, "(C10sol.)−4/3×Log(MFR)" is also an index of the stereoregularity of an olefin polymer. Since the lower limit of the decane-soluble component content is zero, it is obvious that the index "(C10sol.)−4/3×Log (MFR)" can also become a negative value.

A preferable upper limit of the "(C10sol.)−4/3×Log (MFR)" value is 2.2, more preferably 2.1, even more preferably 2.0, and particularly preferably 1.9. When the value of this index exceeds 2.30, large amounts of sticky byproducts are generated, and a molded article using a polymer thereof may develop, for example, stickiness, or the crystallinity of a polymer thereof may be impaired.

In the case of a polymer having a broad molecular weight distribution, the content of low molecular weight components may be high, and thus the value of the requirement (r) may likely be large, but concerning the propylene polymer of the present invention, having high stereoregularity as well as satisfying the requirements (p) and (q) can be considered as factors that keep this value small.

While it is clear that the propylene polymer of the present invention preferably satisfies all the requirements (p), (q), and (r), satisfying two of the requirements (p), (q), and (r) can often provide sufficient effects to which the present invention is directed. In this case, it is more preferable that the requirement (q) is an essential requirement. On the other hand, in the case of applications such as film where the appearance having, for example, fish eyes greatly affects the quality, it may also be preferable that the requirement (p) is an essential requirement. That is to say, important requirements may be different according to the application of the propylene polymer of the present invention.

Preferably, the propylene polymer of the present invention also satisfies the following requirement (s) that is similar to the requirements determined by DSC measurement above:

(s) temperature (Tm-maxt) at an intersection of a baseline and a tangent of an endothermic curve in a temperature range not lower than Tm of a chart obtained by differential scanning calorimetry (DSC) at a heating condition of 10° C./min is 168.1° C. or higher and 210° C. or lower.

The requirement (s) is used by the present inventors as an index showing, for example, that the phenomenon in which the heat of fusion is likely produced even in a high temperature region is more significant. In other words, the essential meaning of this index is the same as the requirements determined by DSC, and the presumed reason why such a phenomenon occurs is also the same.

A more preferable lower limit of the Tm-maxt is 168.3° C., even more preferably 168.5° C., and particularly preferably 168.7° C. On the other hand, a more preferable upper limit is 205° C., even more preferably 200° C., and particularly preferably 195° C.

The propylene polymer of the present invention can also be formed into a composition containing known additives and polymers in combination. Examples of the additives include heat-resistant stabilizers, light-resistant stabilizers, acid component absorbers, slip agents, brighteners, tackifiers, molding aids, and crystallization nucleating agents. Fillers such as glass fiber, talc, mica, and carbon fiber can also be used in combination. In addition, amide-based and alkylene oxide-based antistatic agents, and pigments and coloring agents such as dyes such as carbon black can be used.

Other polymers include known elastomer components such as olefinic copolymers, olefinic thermoplastic elastomers, styrenic thermoplastic elastomers, natural rubber, polyene rubber such as isoprene rubber and butadiene rubber, butyl rubber, and elastomer components containing heteroatoms such as chloroprene rubber and silicone rubber. An abrasion-resisting agent such as (meth)acrylate resin can also be used in combination.

As a matter of course, two or more of the above components may be used in combination.

The propylene polymer of the present invention can be obtained by polymerizing, in addition to the forementioned petroleum (crude oil)-derived propylene and natural-gas-derived propylene, i.e., propylene derived from conventional feedstocks that are referred to as fossil fuel, propylene derived from bio-materials. When propylene derived from bio-materials is used, the $^{14}C$ content of the corresponding propylene polymer tends to be higher than that of propylene polymers obtained using propylene derived from conventional feedstocks (which should be obvious).

Such a propylene polymer of the present invention can be produced by, for example, the olefin polymer production method of the present invention described above, i.e., using the catalyst for olefin polymerization of the present invention. As a matter of course, the propylene polymer may be produced with other catalysts for olefin polymerization. Preferable applications of such a propylene polymer of the present invention are the same as those described above.

EXAMPLES

The present invention will now be described by way of Examples hereinbelow, but the present invention is not limited to the Examples.

In the following Examples, for example, the bulk specific gravity, the melt flow rate, the amount of decane-soluble (insoluble) component, the molecular weight distribution, the final melting point, the melting point, the crystallization temperature, and the amount of heat of fusion of propylene polymers were measured by the following methods.

(1) Bulk Specific Gravity:

The bulk specific gravity was measured in accordance with JIS K-6721.

(2) Melt Flow Rate (MFR):

In accordance with ASTM D1238E, the measurement temperature for a propylene polymer was set at 230° C.

(3) Amount of Decane-Soluble (Insoluble) Component:

About 3 g of a propylene polymer (It was measured to a unit of 10-4 g, and this weight was denoted as b (g) in the following equation), 500 ml of decane, and a small amount of a heat-resistant stabilizer soluble in decane were loaded in a glass measurement vessel, and the propylene polymer was dissolved by being heated to 150° C. over 2 hours while being stirred with a stirrer in a nitrogen atmosphere, then maintained at 150° C. for 2 hours, and gradually cooled to 23° C. over 8 hours. The resulting liquid containing precipitates of the propylene polymer was subjected to filtration under reduced pressure through a 25G-4 standard glass filter manufactured by Tokyo Garasu Kikai Co., Ltd. Then, 100 ml of the filtrate was harvested and dried under reduced pressure to give a portion of a decane-soluble component, and the weight thereof was weighed to a unit of 10-4 g (this weight was denoted as a (g) in the following equation). After this operation, the amount of the decane-soluble component was determined by the following equation.

$$\text{Decane-soluble component content} = 100 \times (500 \times a)/(100 \times b)$$

$$\text{Decane-insoluble component content} = 100 - 100 \times (500 \times a)/(100 \times b)$$

(4) Molecular weight distribution:
- Gel permeation chromatograph: HLC-8321 GPC/HT model manufactured by Tosoh Corporation
- Detector: Differential refractometer
- Column: Two TSKgel GMH6-HT columns and two TSKgel GMH6-HTL columns manufactured by Tosoh Corporation (column size (all had the same size): 7.5 mm I.D.×30 cm) connected in series
- Mobile phase medium: o-Dichlorobenzene (containing 0.025% dibutylhydroxytoluene (BHT) as antioxidant)
- Flow rate: 1.0 ml/min
- Measurement temperature: 140° C.
- Method for creating calibration curve: Standard polystyrene sample manufactured by Tosoh Corporation was used.
- Sample concentration: 0.1% (w/v)
- Amount of sample solution: 0.4 ml
- Sampling interval: 1 sec Measurement was performed under the above conditions, and the resulting chromatogram was analyzed by a known method to calculate the weight average molecular weight (Mw), the number average molecular weight (Mn), the Z average molecular weight (Mz), and the Mw/Mn value and the Mz/Mw value that are indices of the molecular weight distribution (MWD). The measurement time per sample was 60 min.

(5) Melting Point (Tm) of Polymer:

The melting point (Tm), the crystallization temperature (Tc), and the amount of heat of fusion (ΔH) of polymers in the present invention were measured with a differential scanning calorimeter (DSC) in a DSC8000 apparatus manufactured by PerkinElmer Co., Ltd. First, 3 to 10 mg of a sample was sealed into an aluminum pan and heated from room temperature to 200° C. at 100° C./min. The sample was retained at 200° C. for 5 min, and then cooled to 30° C. at 10° C./min. In this cooling test, the peak temperature was regarded as the crystallization temperature (Tc). Subsequently, the sample was left to stand for 5 min at 30° C., and then heated for the second time to 200° C. at 10° C./min. In this second heating test, the peak temperature was regarded as the melting point (Tm), and the amount of heat absorbed was regarded as the amount of heat of fusion (ΔH). As the amount of heat of fusion, the amount of heat generated during cooling (temperature decrease) is also denoted as the amount of heat of fusion (ΔH).

(6) Maximum temperature (Tm-maxv) at which heat absorption is zero in differential scanning calorimetry (DSC) in heating condition of 10° C./min:

During the course of the second heating test, the highest temperature at the intersection of the endothermic curve and the baseline was regarded as the above index. It can be conceived that this index is attributed, for example, to that the ultra-high molecular weight polymer is highly crystallized. The molecular chain of the ultra-high molecular weight polymer component is slow, it is thus conceived that the higher the crystallinity of the component is, the more likely that an endothermic peak is shown even at high temperature in DSC measurement, and therefore this index is used in the present invention.

(7) Temperature (Tm-maxt) at intersection of baseline and tangent of endothermic curve in temperature region not lower than Tm of chart obtained by differential scanning calorimetry (DSC) at heating condition of 10° C./min:

The tangent of an endothermic curve in a region where the endothermic peak in (6) disappeared was created by an ordinary data processing method, and the intersection of the tangent and the baseline was regarded as the above temperature. The gentler the slope of the endothermic peak is, the higher this temperature tends to be. It can be conceived that such a shape is attributed to, for example, a high content of highly crystallized ultra-high molecular weight component.

The final melting point (Tmf) of a polymer in the present invention was measured with a differential scanning calorimeter (DSC) in a DSC 8000 apparatus manufactured by PerkinElmer Co., Ltd. First, 3 to 10 mg of a sample was sealed into an aluminum pan, and heated from room temperature to 240° C. at 80° C./min. The sample was retained at 240° C. for 1 minute and then cooled to 0° C. at 80° C./min. After being retained at 0° C. for 1 minute, the sample was heated to 150° C. at 80° C./min and retained for 5 min. Finally, the sample was heated to 180° C. at 1.35° C./min, and the intersection between the baseline and the tangent of the inflection point on the high temperature side of the peak obtained in this final heating test was regarded as the final melting point (Tmf).

Tmf can be considered one parameter for evaluating the ease of crystallization and the crystal structure, for example, of a polymer in the ultra-high molecular weight region, which is said to tend to be difficult to crystallize. More specifically, it can be considered that, as this Tmf value is higher, the ultra-high molecular weight polymer component is more likely to form crystals that is strong and has high heat resistance.

Some structural formulae of compounds used in the following Examples and Comparative Examples have stereoisomeric structures. The structural formulae of the exemplified compounds show the major isomers of the compounds used in the Examples and Comparative Examples.

Example 1

<Preparation of Solid Titanium Catalyst Component [α1]>

After a 1-liter glass vessel was sufficiently purged with nitrogen, 85.8 g of anhydrous magnesium chloride, 321 g of decane, and 352 g of 2-ethylhexyl alcohol were placed thereinto, and subjected to a heating reaction at 130° C. for 3 hours to give a homogeneous solution. Then, 241 g of this solution and 6.43 g of ethyl benzoate were added to the glass vessel, and mixed under stirring at 50° C. for 1 hour.

After the homogeneous solution thus obtained was cooled to room temperature, the entirety of 38.3 ml of the homogeneous solution was loaded dropwise over 45 min to 100 ml of titanium tetrachloride retained at −20° C. while being stirred at a revolution speed of 350 rpm. After completion of loading, the temperature of the mixed liquid was raised to 80° C. over 3.8 hours, and when the temperature reached 80° C., 0.97 g of the following compound 1 was added to the mixed liquid. The temperature was again raised to 120° C. over 40 min, and the mixture was retained at the same temperature for 35 min while being stirred. After the reaction was complete, the solid portion was harvested by hot filtration, resuspended in 100 ml of titanium tetrachloride, and again thermally reacted at 120° C. for 35 min. After the reaction was complete, the solid portion was harvested again by hot filtration and thoroughly washed with decane at 100° C. and decane at room temperature until no free titanium compound was detected in the washing liquid. The solid titanium catalyst component [α1] prepared by the above operations was preserved as a decane slurry, and a part of the slurry was dried to check the catalyst composition. The composition of the solid titanium catalyst component [α1] thus obtained had 0.28 mass % titanium, 1.7 mass % magnesium, and 0.12 mass % 2-ethylhexyl alcohol residue.

[Chem. 64]

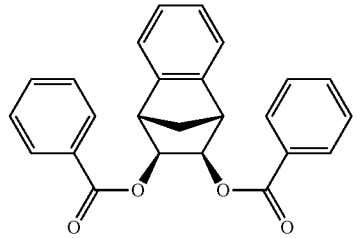

(Compound 1)

<Polymerization>

After 500 g of propylene and 1 NL of hydrogen at room temperature were added to a polymerization apparatus having an inner volume of 2 liters, a mixed liquid formed by mixing 7 ml of heptane, 0.5 mmol of triethyl aluminum, 0.10 mmol of cyclohexylmethyldimethoxysilane, and 0.004 mmol (in terms of titanium atom) of the solid titanium catalyst component [α1] at 25° C. for 10 min was added, and the temperature inside the polymerization apparatus was promptly raised to 70° C. After polymerization at 70° C. for 1.5 hours, the reaction was terminated by a small amount of methanol, and propylene was purged. Moreover, the resulting polymer particles were dried under reduced pressure at 80° C. overnight. Table 1 and Table 2 show, for example, activity, bulk specific gravity, MFR, amount of decane-soluble component, Tm, Tm-maxv, Tm-maxt, Tmf, and MWD (a difference between Mw/Mn and Mz/Mw).

Example 2

<Preparation of Solid Titanium Catalyst Component [α2]>

A solid titanium catalyst component [α2] was obtained in the same manner as Example 1, except that 0.91 g of the following compound 2 was used in place of 0.97 g of the compound 1.

[Chem. 65]

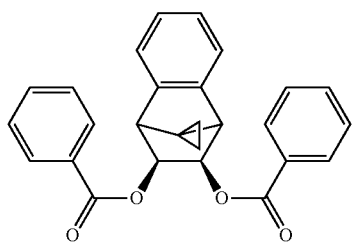

(Compound 2)

<Polymerization>

Polymerization of propylene was performed in the same manner as Example 1, except that the solid titanium catalyst component [α2] was used in place of the solid titanium catalyst component [α1]. Results are shown in Table 1 and Table 2.

Example 3

<Preparation of Solid Titanium Catalyst Component [α3]>

A solid titanium catalyst component [α3] was obtained in the same manner as Example 1, except that 1.10 g of the following compound 3 was used in place of 0.97 g of the compound 1.

[Chem. 66]

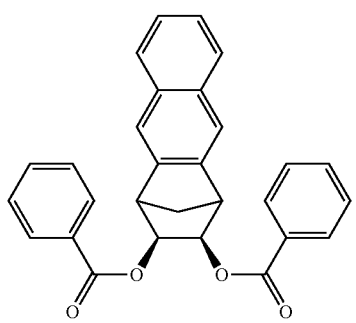

(Compound 3)

<Polymerization>

Polymerization of propylene was performed in the same manner as Example 1, except that 0.0032 mmol (in terms of titanium atom) of the solid titanium catalyst component [α3] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 4

<Preparation of Solid Titanium Catalyst Component [α4]>

A solid titanium catalyst component [α4] was obtained in the same manner as Example 1, except that 1.19 g of the following compound 4 was used in place of 0.97 g of the compound 1.

[Chem. 67]

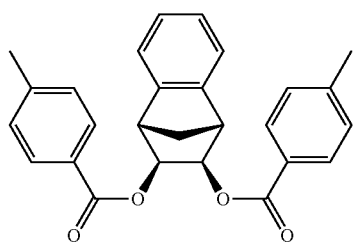

(Compound 4)

<Polymerization>

Polymerization of propylene was performed in the same manner as Example 1, except that 0.0032 mmol (in terms of titanium atom) of the solid titanium catalyst component [α4] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 5

<Preparation of Solid Titanium Catalyst Component [α5]>

A solid titanium catalyst component [α5] was obtained in the same manner as Example 1, except that 1.11 g of the following compound 5 was used in place of 0.97 g of the compound 1.

[Chem. 68]

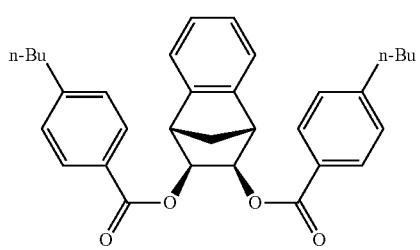

(Compound 5)

<Polymerization>

Polymerization of propylene was performed in the same manner as Example 1, except that 0.0032 mmol (in terms of titanium atom) of the solid titanium catalyst component [α5] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 6

<Preparation of Solid Titanium Catalyst Component [α6]>

A solid titanium catalyst component [α6] was obtained in the same manner as Example 1, except that 1.12 g of the following compound 6 was used in place of 0.97 g of the compound 1.

[Chem. 69]

(Compound 6)

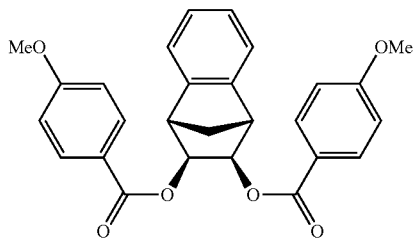

<Polymerization>

Polymerization of propylene was performed in the same manner as Example 1, except that 0.0032 mmol (in terms of titanium atom) of the solid titanium catalyst component [α6] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 7

<Preparation of Solid Titanium Catalyst Component [α7]>

A solid titanium catalyst component [α7] was obtained in the same manner as Example 1, except that 0.91 g of the following compound 6 was used in place of 0.97 g of the compound 1.

[Chem. 70]

(Compound 7)

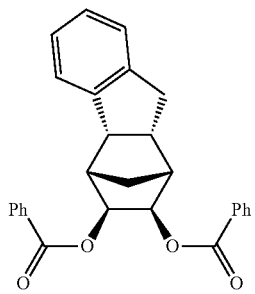

<Polymerization>

Polymerization of propylene was performed in the same manner as Example 1, except that 0.0032 mmol (in terms of titanium atom) of the solid titanium catalyst component [α7] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 8

<Preparation of Solid Titanium Catalyst Component [α8]>

A solid titanium catalyst component [α8] was obtained in the same manner as Example 1, except that 1.07 g of the following compound 8 was used in place of 0.97 g of the compound 1.

[Chem. 71]

(Compound 8)

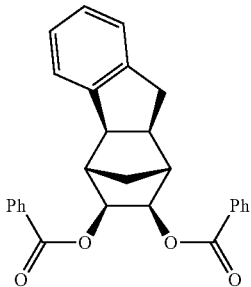

<Polymerization>

Polymerization of propylene was performed in the same manner as Example 1, except that 0.0032 mmol (in terms of titanium atom) of the solid titanium catalyst component [α8] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 9

<Preparation of Solid Titanium Catalyst Component [α9]>

A solid titanium catalyst component [α9] was obtained in the same manner as Example 1, except that 1.13 g of the following compound 9 was used in place of 0.97 g of the compound 1.

[Chem. 72]

(Compound 9)

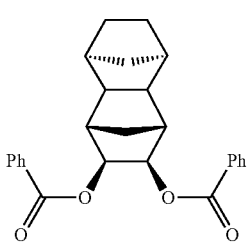

<Polymerization>

Polymerization of propylene was performed in the same manner as Example 1, except that 0.0032 mmol (in terms of titanium atom) of the solid titanium catalyst component [α9] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 10

<Preparation of Solid Titanium Catalyst Component [α10]>

A solid titanium catalyst component [α10] was obtained in the same manner as Example 1, except that 1.13 g of the following compound 10 was used in place of 0.97 g of the compound 1.

[Chem. 73]

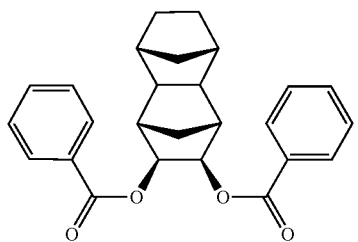

(Compound 10)

<Polymerization>

Polymerization of propylene was performed in the same manner as Example 1, except that 0.0032 mmol (in terms of titanium atom) of the solid titanium catalyst component [α10] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 11

<Preparation of Solid Titanium Catalyst Component [α11]>

A solid titanium catalyst component [α11] was obtained in the same manner as Example 1, except that 1.07 g of the following compound 11 was used in place of 0.97 g of the compound 1.

[Chem. 74]

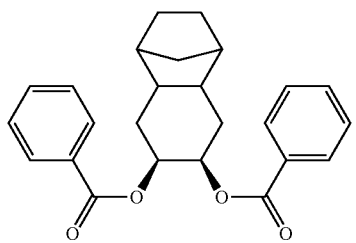

(Compound 11)

<Polymerization>

Polymerization of propylene was performed in the same manner as Example 1, except that 0.0032 mmol (in terms of titanium atom) of the solid titanium catalyst component [α11] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 12

<Preparation of Solid Titanium Catalyst Component [α12]>

A solid titanium catalyst component [α12] was obtained in the same manner as Example 1, except that 1.85 g of the following compound 12 was used in place of 0.97 g of the compound 1.

[Chem. 75]

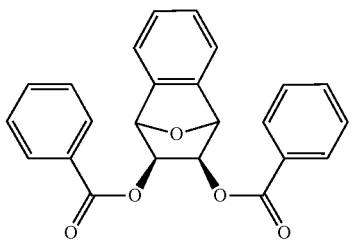

(Compound 12)

<Polymerization>

Polymerization of propylene was performed in the same manner as Example 1, except that 0.0032 mmol (in terms of titanium atom) of the solid titanium catalyst component [α12] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1.

Example 13

<Preparation of Solid Titanium Catalyst Component [α13]>

After a 1-liter glass vessel was sufficiently purged with nitrogen, 85.8 g of anhydrous magnesium chloride, 321 g of decane, and 352 g of 2-ethylhexyl alcohol were placed thereinto, and subjected to a heating reaction at 130° C. for 3 hours to give a homogeneous solution. Then, 241 g of this solution and 6.43 g of ethyl benzoate were added to the glass vessel, and mixed under stirring at 50° C. for 1 hour.

After the homogeneous solution thus obtained was cooled to room temperature, the entirety of 30.7 ml of the homogeneous solution was loaded dropwise to 80 ml of titanium tetrachloride retained at −20° C. over 45 min while being stirred at a revolution speed of 350 rpm. After completion of loading, the temperature of the mixed liquid was raised to 80° C. over 3.8 hours, and when the temperature reached 80° C., 1.88 g of the following compound 13 was added to the mixed liquid. The temperature was again raised to 120° C. over 40 min, and the mixture was retained at the same temperature for 35 min while being stirred. After the reaction was complete, the solid portion was harvested by hot filtration, resuspended in 80 ml of titanium tetrachloride, and again thermally reacted at 120° C. for 35 min. After the reaction was complete, the solid portion was harvested again by hot filtration and thoroughly washed with decane at 100° C. and decane at room temperature until no free titanium compound was detected in the washing liquid. The solid titanium catalyst component [α13] prepared by the above operations was preserved as a decane slurry.

[Chem. 76]

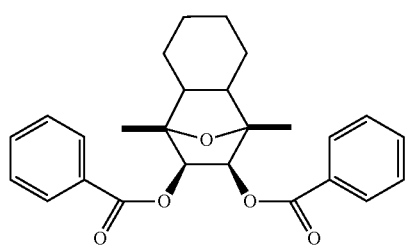

(Compound 13)

<Polymerization>

Polymerization of propylene was performed in the same manner as Example 1, except that 0.0032 mmol (in terms of titanium atom) of the solid titanium catalyst component [α13] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1.

Example 14

<Preparation of Solid Titanium Catalyst Component [α14]>

A solid titanium catalyst component [α14] was obtained in the same manner as Example 1, except that 1.01 g of the following compound 14 was used in place of 0.97 g of the compound 1.

[Chem. 77]

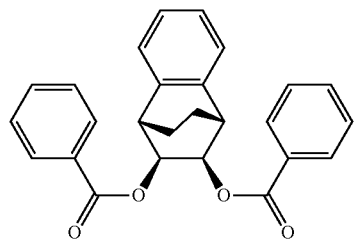

(Compound 14)

<Polymerization>

Polymerization of propylene was performed in the same manner as Example 1, except that 0.0032 mmol (in terms of titanium atom) of the solid titanium catalyst component [α14] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 15

<Preparation of Solid Titanium Catalyst Component [α15]>

A solid titanium catalyst component [α15] was prepared in the same manner as Example 13, except for the following operations:

0.77 g of the compound 12 was added at 80° C. in place of the compound 13;

the temperature was raised from 80° C. to 100° C. over 20 min in place of being raised from 80° C. to 120° C. over 40 min; and the solid portion was resuspended in titanium tetrachloride and heated at 100° C. for 35 min in place of being resuspended in titanium tetrachloride and heated at 120° C. for 35 min.

<Polymerization>

Polymerization of propylene was performed in the same manner as Example 1, except that 0.0032 mmol (in terms of titanium atom) of the solid titanium catalyst component [α15] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1.

Comparative Example 1

<Preparation of Solid Titanium Catalyst Component [β1]>

A solid titanium catalyst component [β1] was obtained in the same manner as Example 1, except that 1.51 g of the following compound-c1 was used in place of 0.97 g of the compound 1.

[Chem. 78]

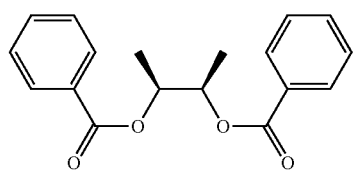

(Compound c1)

<Polymerization>

Polymerization of propylene was performed in the same manner as Example 1, except that 0.0032 mmol (in terms of titanium atom) of the solid titanium catalyst component [β1] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Comparative Example 2

<Preparation of Solid Titanium Catalyst Component [β2]>

A solid titanium catalyst component [β2] was obtained in the same manner as Example 1, except that 1.51 g of the following compound-c2 was used in place of 0.97 g of the compound 1.

[Chem. 79]

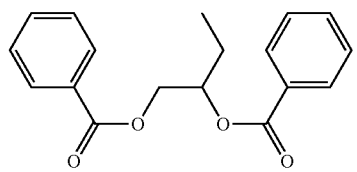

(Compound c2)

<Polymerization>

Polymerization of propylene was performed in the same manner as Example 1, except that 0.0032 mmol (in terms of titanium atom) of the solid titanium catalyst component [β2]

was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Comparative Example 3

<Preparation of Solid Titanium Catalyst Component [β3]>

A solid titanium catalyst component [β3] was obtained in the same manner as Example 1, except that 1.61 g of the following compound-c3 was used in place of 0.97 g of the compound 1.

[Chem. 80]

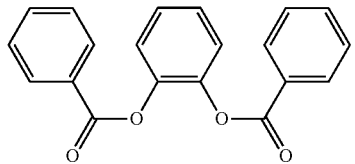

(Compound c3)

<Polymerization>

Polymerization of propylene was performed in the same manner as Example 1, except that 0.0032 mmol (in terms of titanium atom) of the solid titanium catalyst component [β3] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Comparative Example 4

<Preparation of Solid Titanium Catalyst Component [β4]>

A solid titanium catalyst component [34] was obtained in the same manner as Example 1, except that 1.64 g of the following compound-c4 was used in place of 0.97 g of the compound 1.

[Chem. 81]

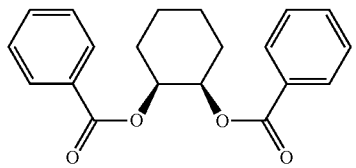

(Compound c4)

<Polymerization>

Polymerization of propylene was performed in the same manner as Example 1, except that 0.0032 mmol (in terms of titanium atom) of the solid titanium catalyst component [β4] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Comparative Example 5

<Preparation of Solid Titanium Catalyst Component [β5]>

A solid titanium catalyst component [(5] was obtained in the same manner as Example 1, except that 1.64 g of the following compound-c5 was used in place of 0.97 g of the compound 1.

[Chem. 82]

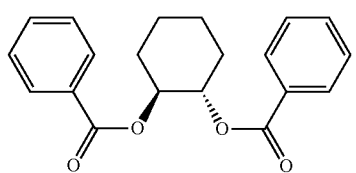

(Compound c5)

<Polymerization>

Polymerization of propylene was performed in the same manner as Example 1, except that 0.0032 mmol (in terms of titanium atom) of the solid titanium catalyst component [β5] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 16

<Preparation of Solid Titanium Catalyst Component [α16]>

A solid titanium catalyst component [α16] was obtained in the same manner as Example 1, except that 1.13 g of the following compound 16 was used in place of 0.97 g of the compound 1.

[Chem. 83]

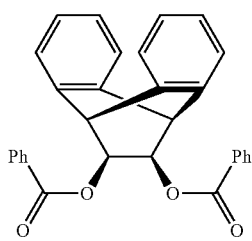

(Compound 16)

<Polymerization>

Polymerization of propylene was performed in the same manner as Example 1, except that 0.0032 mmol (in terms of titanium atom) of the solid titanium catalyst component [α16] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 17

<Preparation of Solid Titanium Catalyst Component [α17]>

A solid titanium catalyst component [α17] was obtained in the same manner as Example 1, except that 1.16 g of the following compound 17 was used in place of 0.97 g of the compound 1.

[Chem. 84]

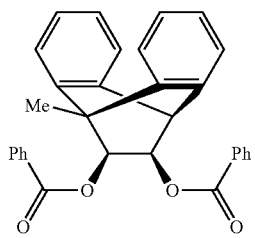

(Compound 17)

<Polymerization>

Polymerization of propylene was performed in the same manner as Example 1, except that 0.0028 mmol (in terms of titanium atom) of the solid titanium catalyst component [α17] was used in place of the solid titanium catalyst component [α1], the amount of triethylaluminum used was changed from 0.5 mmol to 0.35 mmol, and the amount of cyclohexylmethyldimethoxysilane used was changed from 0.10 mmol to 0.07 mmol. Results are shown in Table 1 and Table 2.

Example 18

<Preparation of Solid Titanium Catalyst Component [α18]>

A solid titanium catalyst component [α18] was obtained in the same manner as Example 1, except that 1.20 g of the following compound 18 was used in place of 0.97 g of the compound 1.

[Chem. 85]

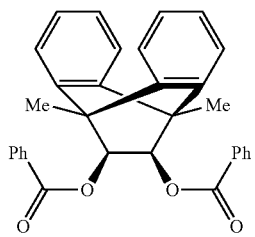

(Compound 18)

<Polymerization>

Polymerization of propylene was performed in the same manner as Example 1, except that 0.0028 mmol (in terms of titanium atom) of the solid titanium catalyst component [α18] was used in place of the solid titanium catalyst component [α1], the amount of triethylaluminum used was changed from 0.5 mmol to 0.35 mmol, and the amount of cyclohexylmethyldimethoxysilane used was changed from 0.10 mmol to 0.07 mmol. Results are shown in Table 1 and Table 2.

Example 19

<Preparation of Solid Titanium Catalyst Component [α19]>

A solid titanium catalyst component [α19] was obtained in the same manner as Example 1, except that 1.01 g of the following compound 19 was used in place of 0.97 g of the compound 1.

[Chem. 86]

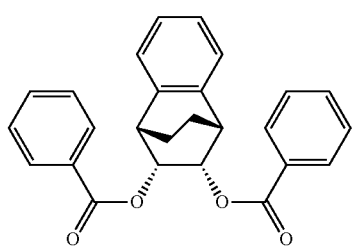

(Compound 19)

<Polymerization>

Polymerization of propylene was performed in the same manner as Example 1, except that 0.0032 mmol (in terms of titanium atom) of the solid titanium catalyst component [α19] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 20

<Preparation of Solid Titanium Catalyst Component [α20]>

A solid titanium catalyst component [α20] was obtained in the same manner as Example 1, except that 0.86 g of the following compound 20 was used in place of 0.97 g of the compound 1.

[Chem. 87]

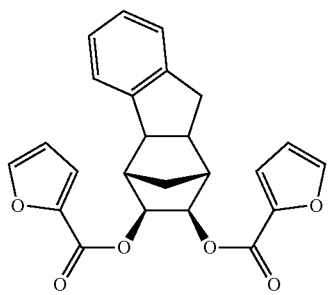

(Compound 20)

<Polymerization>

Polymerization of propylene was performed in the same manner as Example 1, except that 0.0032 mmol (in terms of titanium atom) of the solid titanium catalyst component [α20] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 21

<Preparation of Solid Titanium Catalyst Component [α21]>

A solid titanium catalyst component [α21] was obtained in the same manner as Example 1, except that 0.93 g of the following compound 21 was used in place of 0.97 g of the compound 1.

[Chem. 88]

(Compound 21)

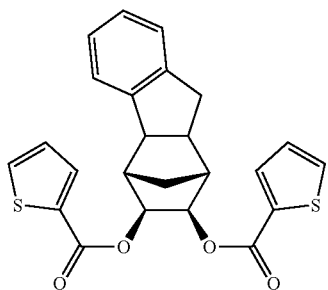

<Polymerization>

Polymerization of propylene was performed in the same manner as Example 1, except that 0.0032 mmol (in terms of titanium atom) of the solid titanium catalyst component [α21] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 22

<Preparation of Solid Titanium Catalyst Component [α22]>

A solid titanium catalyst component [α22] was obtained in the same manner as Example 1, except that 2.16 g of the following compound 22 was used in place of 0.97 g of the compound 1.

[Chem. 89]

(Compound 22)

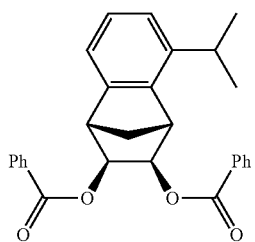

<Polymerization>

Polymerization of propylene was performed in the same manner as Example 1, except that 0.0032 mmol (in terms of titanium atom) of the solid titanium catalyst component [α22] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 23

<Preparation of Solid Titanium Catalyst Component [α23]>

A solid titanium catalyst component [α23] was obtained in the same manner as Example 1, except that 1.05 g of the following compound 23 was used in place of 0.97 g of the compound 1.

[Chem. 90]

(Compound 23)

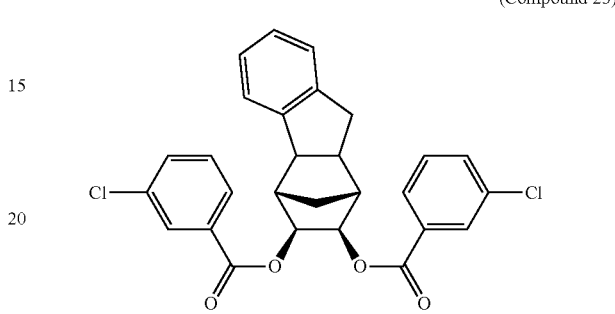

<Polymerization>

Polymerization of propylene was performed in the same manner as Example 1, except that 0.0032 mmol (in terms of titanium atom) of the solid titanium catalyst component [α23] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 24

<Preparation of Solid Titanium Catalyst Component [α24]>

A solid titanium catalyst component [α24] was obtained in the same manner as Example 1, except that 1.28 g of the following compound 24 was used in place of 0.97 g of the compound 1.

[Chem. 91]

(Compound 24)

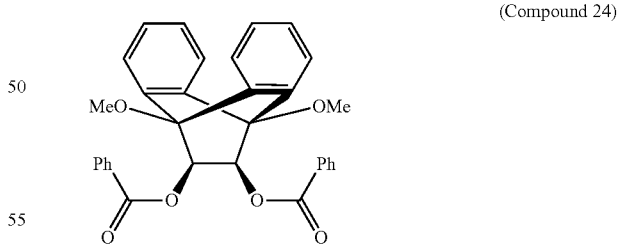

<Polymerization>

Polymerization of propylene was performed in the same manner as Example 1, except that 0.0028 mmol (in terms of titanium atom) of the solid titanium catalyst component [α24] was used in place of the solid titanium catalyst component [α1], the amount of triethylaluminum used was changed from 0.5 mmol to 0.35 mmol, and the amount of cyclohexylmethyldimethoxysilane used was changed from 0.10 mmol to 0.07 mmol. Results are shown in Table 1 and Table 2.

Example 25

<Preparation of Solid Titanium Catalyst Component [α25]>

A solid titanium catalyst component [α25] was obtained in the same manner as Example 1, except that 1.56 g of the following compound 25 was used in place of 0.97 g of the compound 1.

[Chem. 92]

(Compound 25)

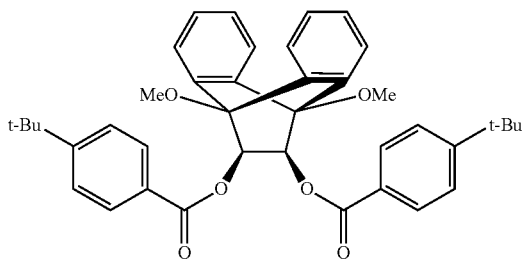

<Polymerization>

Polymerization of propylene was performed in the same manner as Example 1, except that 0.002 mmol (in terms of titanium atom) of the solid titanium catalyst component [α25] was used in place of the solid titanium catalyst component [α1], the amount of triethylaluminum used was changed from 0.5 mmol to 0.25 mmol, and the amount of cyclohexylmethyldimethoxysilane used was changed from 0.10 mmol to 0.05 mmol. Results are shown in Table 1 and Table 2.

Example 26

<Preparation of Solid Titanium Catalyst Component [α26]>

A solid titanium catalyst component [α26] was obtained in the same manner as Example 1, except that 1.56 g of the following compound 26 was used in place of 0.97 g of the compound 1.

[Chem. 93]

(Compound 26)

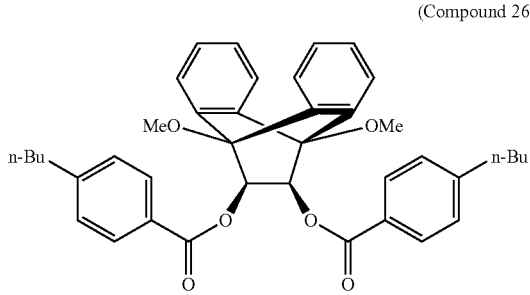

<Polymerization>

Polymerization of propylene was performed in the same manner as Example 1, except that 0.002 mmol (in terms of titanium atom) of the solid titanium catalyst component [α26] was used in place of the solid titanium catalyst component [α1], the amount of triethylaluminum used was changed from 0.5 mmol to 0.25 mmol, and the amount of cyclohexylmethyldimethoxysilane used was changed from 0.10 mmol to 0.05 mmol. Results are shown in Table 1 and Table 2.

Example 27

<Preparation of Solid Titanium Catalyst Component [α27]>

A solid titanium catalyst component [α27] was obtained in the same manner as Example 1, except that 1.43 g of the following compound 27 was used in place of 0.97 g of the compound 1.

[Chem. 94]

(Compound 27)

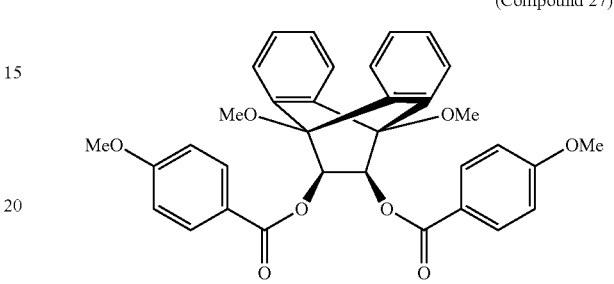

<Polymerization>

Polymerization of propylene was performed in the same manner as Example 1, except that 0.002 mmol (in terms of titanium atom) of the solid titanium catalyst component [α27] was used in place of the solid titanium catalyst component [α1], the amount of triethylaluminum used was changed from 0.5 mmol to 0.25 mmol, and the amount of cyclohexylmethyldimethoxysilane used was changed from 0.10 mmol to 0.05 mmol. Results are shown in Table 1 and Table 2.

Example 28

<Preparation of Solid Titanium Catalyst Component [α28]>

After a 1-liter glass vessel was sufficiently purged with nitrogen, 85.8 g of anhydrous magnesium chloride, 321 g of decane, and 352 g of 2-ethylhexyl alcohol were placed thereinto, and subjected to a heating reaction at 130° C. for 3 hours to give a homogeneous solution. Then, 241 g of this solution and 6.43 g of ethyl benzoate were added to the glass vessel, and mixed under stirring at 50° C. for 1 hour.

After the homogeneous solution thus obtained was cooled to room temperature, the entirety of 30.7 ml of the homogeneous solution was loaded dropwise to 80 ml of titanium tetrachloride retained at −20° C. over 45 min while being stirred at a revolution speed of 350 rpm. After completion of loading, the temperature of the mixed liquid was raised to 80° C. over 3.8 hours, and when the temperature reached 80° C., 1.08 g of the following compound 28 was added to the mixed liquid. The temperature was again raised to 120° C. over 40 min, and the mixture was retained at the same temperature for 35 min while being stirred. After the reaction was complete, the solid portion was harvested by hot filtration, resuspended in 80 ml of titanium tetrachloride, and again thermally reacted at 120° C. for 35 min. After the reaction was complete, the solid portion was harvested again by hot filtration and thoroughly washed with decane at 100° C. and decane at room temperature until no free titanium compound was detected in the washing liquid. The solid titanium catalyst component [α28] prepared by the above operations was preserved as a decane slurry.

[Chem. 95]

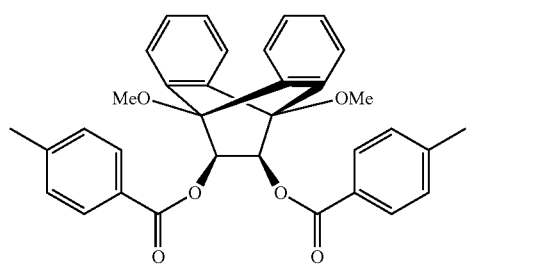

(Compound 28)

<Polymerization>

Polymerization of propylene was performed in the same manner as Example 1, except that 0.002 mmol (in terms of titanium atom) of the solid titanium catalyst component [α28] was used in place of the solid titanium catalyst component [α1], the amount of triethylaluminum used was changed from 0.5 mmol to 0.25 mmol, and the amount of cyclohexylmethyldimethoxysilane used was changed from 0.10 mmol to 0.05 mmol. Results are shown in Table 1 and Table 2.

Example 29

<Preparation of Solid Titanium Catalyst Component [α29]>

A solid titanium catalyst component [α29] was obtained in the same manner as Example 1, except that 0.97 g of the following compound 29 was used in place of 0.97 g of the compound 1.

[Chem. 96]

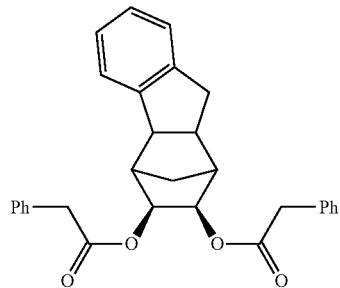

(Compound 29)

<Polymerization>

Polymerization of propylene was performed in the same manner as Example 1, except that 0.0032 mmol (in terms of titanium atom) of the solid titanium catalyst component [α29] was used in place of the solid titanium catalyst component [α1], the amount of triethylaluminum used was changed from 0.5 mmol to 0.4 mmol, and the amount of cyclohexylmethyldimethoxysilane used was changed from 0.10 mmol to 0.08 mmol. Results are shown in Table 1 and Table 2.

Example 30

<Preparation of Solid Titanium Catalyst Component [α30]>

After a 1-liter glass vessel was sufficiently purged with nitrogen, 85.8 g of anhydrous magnesium chloride, 321 g of decane, and 352 g of 2-ethylhexyl alcohol were placed thereinto, and subjected to a heating reaction at 130° C. for 3 hours to give a homogeneous solution. Then, 241 g of this solution and 6.43 g of ethyl benzoate were added to the glass vessel, and mixed under stirring at 50° C. for 1 hour.

After the homogeneous solution thus obtained was cooled to room temperature, the entirety of 28.7 ml of the homogeneous solution was loaded dropwise to 75 ml of titanium tetrachloride retained at −20° C. over 45 min while being stirred at a revolution speed of 350 rpm. After completion of loading, the temperature of the mixed liquid was raised to 80° C. over 3.8 hours, and when the temperature reached 80° C., 0.83 g of the following compound 30 was added to the mixed liquid. The temperature was again raised to 120° C. over 40 min, and the mixture was retained at the same temperature for 35 min while being stirred. After the reaction was complete, the solid portion was harvested by hot filtration, resuspended in 75 ml of titanium tetrachloride, and again thermally reacted at 120° C. for 35 min. After the reaction was complete, the solid portion was harvested again by hot filtration and thoroughly washed with decane at 100° C. and decane at room temperature until no free titanium compound was detected in the washing liquid. The solid titanium catalyst component [α30] prepared by the above operations was preserved as a decane slurry.

[Chem. 97]

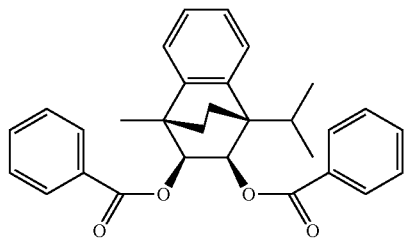

(Compound 30)

<Polymerization>

Polymerization of propylene was performed in the same manner as Example 1, except that 0.0028 mmol (in terms of titanium atom) of the solid titanium catalyst component [α30] was used in place of the solid titanium catalyst component [α1], the amount of triethylaluminum used was changed from 0.5 mmol to 0.35 mmol, and the amount of cyclohexylmethyldimethoxysilane used was changed from 0.10 mmol to 0.07 mmol. Results are shown in Table 1.

Example 31

<Preparation of Solid Titanium Catalyst Component [α31]>

After a 1-liter glass vessel was sufficiently purged with nitrogen, 85.8 g of anhydrous magnesium chloride, 321 g of decane, and 352 g of 2-ethylhexyl alcohol were placed thereinto, and subjected to a heating reaction at 130° C. for 3 hours to give a homogeneous solution. Then, 241 g of this solution and 6.43 g of ethyl benzoate were added to the glass vessel, and mixed under stirring at 50° C. for 1 hour.

After the homogeneous solution thus obtained was cooled to room temperature, the entirety of 28.7 ml of the homogeneous solution was loaded dropwise to 75 ml of titanium tetrachloride retained at −20° C. over 45 min while being stirred at a revolution speed of 350 rpm. After completion of loading, the temperature of the mixed liquid was raised to 80° C. over 3.8 hours, and when the temperature reached 80°

C., 0.83 g of the following compound 31 was added to the mixed liquid. The temperature was again raised to 120° C. over 40 min, and the mixture was retained at the same temperature for 35 min while being stirred. After the reaction was complete, the solid portion was harvested by hot filtration, resuspended in 75 ml of titanium tetrachloride, and again thermally reacted at 120° C. for 35 min. After the reaction was complete, the solid portion was harvested again by hot filtration and thoroughly washed with decane at 100° C. and decane at room temperature until no free titanium compound was detected in the washing liquid. The solid titanium catalyst component [α31] prepared by the above operations was preserved as a decane slurry.

[Chem. 98]

(Compound 31)

<Polymerization>

Polymerization of propylene was performed in the same manner as Example 1, except that 0.0028 mmol (in terms of titanium atom) of the solid titanium catalyst component [α31] was used in place of the solid titanium catalyst component [α1], the amount of triethylaluminum used was changed from 0.5 mmol to 0.35 mmol, and the amount of cyclohexylmethyldimethoxysilane used was changed from 0.10 mmol to 0.07 mmol. Results are shown in Table 1 and Table 2.

Example 32

<Preparation of Solid Titanium Catalyst Component [α32]>

A solid titanium catalyst component [α32] was obtained in the same manner as Example 1, except that 1.33 g of the following compound 32 was used in place of 0.97 g of the compound 1.

[Chem. 99]

(Compound 32)

<Polymerization>

Polymerization of propylene was performed in the same manner as Example 1, except that 0.0028 mmol (in terms of titanium atom) of the solid titanium catalyst component [α32] was used in place of the solid titanium catalyst component [α1], the amount of triethylaluminum used was changed from 0.5 mmol to 0.35 mmol, and the amount of cyclohexylmethyldimethoxysilane used was changed from 0.10 mmol to 0.07 mmol. Results are shown in Table 1 and Table 2.

TABLE 1

|  | Activity (Kg-PP/g-cat.) | Bulk specific gravity (g/mL) | MFR (g/10 min) | Amount of decane-soluble component (%) | Mn | Mw | Mz |
|---|---|---|---|---|---|---|---|
| Ex.1 | 48.6 | 0.49 | 0.57 | 1.87 | 72,300 | 769,000 | 3,730,000 |
| Ex.2 | 41.5 | 0.48 | 0.74 | 1.75 | 61,200 | 734,000 | 4,050,000 |
| Ex.3 | 35.6 | 0.50 | 0.91 | 2.25 | 63,000 | 641,000 | 3,320,000 |
| Ex.4 | 41.0 | 0.50 | 0.15 | 0.68 | 87,100 | 1,180,000 | 5,290,000 |
| Ex.5 | 53.3 | 0.49 | 0.32 | 0.85 | 78,800 | 867,000 | 3,680,000 |
| Ex.6 | 48.5 | 0.50 | 0.27 | 1.07 | 79,500 | 898,000 | 3,870,000 |
| Ex.7 | 72.7 | 0.49 | 0.45 | 0.67 | 79,600 | 896,000 | 3,950,000 |
| Ex.8 | 48.5 | 0.50 | 0.55 | 1.05 | 69,100 | 935,000 | 4,930,000 |
| Ex.9 | 50.0 | 0.50 | 0.22 | 0.84 | 90,200 | 1,110,000 | 5,070,000 |
| Ex.10 | 48.6 | 0.50 | 0.19 | 0.98 | 86,000 | 1,080,000 | 4,970,000 |
| Ex.11 | 37.2 | 0.49 | 0.90 | 1.60 | 61,200 | 688,000 | 3,640,000 |
| Ex.12 | 26.1 | 0.46 | 5.05 | 5.43 | 36,400 | 422,000 | 3,020,000 |
| Ex.13 | 32.1 | 0.48 | 10.30 | 6.55 | 36,700 | 321,000 | 1,980,000 |
| Ex.14 | 41.5 | 0.49 | 0.61 | 2.22 | 57,300 | 751,000 | 3,910,000 |
| Ex.15 | 32.7 | 0.48 | 6.60 | 4.03 | 45,200 | 356,000 | 2,920,000 |
| Comp. Ex.1 | 10.8 | — | 23.58 | 9.25 | 31,100 | 226,000 | 1,410,000 |
| Comp. Ex.2 | 11.9 | 0.46 | 13.58 | 8.71 | 33,300 | 275,000 | 1,660,000 |
| Comp. Ex.3 | 23.1 | 0.46 | 8.20 | 6.32 | 37,400 | 337,000 | 2,340,000 |
| Comp. Ex.4 | 9.0 | 0.46 | 10.60 | 6.63 | 34,900 | 292,000 | 1,650,000 |
| Comp. Ex.5 | 6.8 | — | 6.90 | 5.97 | 36,900 | 339,000 | 2,110,000 |

TABLE 1-continued

| | | | | | | | |
|---|---|---|---|---|---|---|---|
| Ex.16 | 50.0 | 0.49 | 0.39 | 1.23 | 78,900 | 890,000 | 4,650,000 |
| Ex.17 | 61.5 | 0.49 | 0.67 | 0.72 | 60,400 | 738,000 | 4,060,000 |
| Ex.18 | 76.2 | 0.49 | 2.71 | 1.50 | 49,700 | 480,000 | 2,800,000 |
| Ex.19 | 35.4 | 0.49 | 1.12 | 3.05 | 55,600 | 678,000 | 3,800,000 |
| Ex.20 | 51.6 | 0.46 | 0.68 | 1.43 | 60,700 | 657,000 | 2,860,000 |
| Ex.21 | 51.6 | 0.49 | 0.68 | 1.53 | 73,200 | 759,000 | 3,780,000 |
| Ex.22 | 31.4 | 0.49 | 0.59 | 1.18 | 70,200 | 813,000 | 4,080,000 |
| Ex.23 | 65.2 | 0.49 | 0.69 | 1.20 | 68,200 | 679,000 | 3,270,000 |
| Ex.24 | 83.3 | 0.49 | 8.15 | 2.43 | 41,500 | 333,000 | 2,540,000 |
| Ex.25 | 93.8 | 0.47 | 5.66 | 1.55 | 48,200 | 344,000 | 1,610,000 |
| Ex.26 | 116.7 | 0.49 | 12.44 | 2.00 | 42,800 | 276,000 | 1,470,000 |
| Ex.27 | 100.0 | 0.49 | 9.91 | 2.22 | 47,300 | 285,000 | 1,240,000 |
| Ex.28 | 83.3 | 0.49 | 15.84 | 2.48 | 40,600 | 263,000 | 1,520,000 |
| Ex.29 | 37.8 | 0.47 | 3.49 | 3.80 | 45,800 | 463,000 | 3,330,000 |
| Ex.30 | 40.0 | 0.49 | 8.70 | 5.77 | 37,500 | 322,000 | 2,210,000 |
| Ex.31 | 68.2 | 0.46 | 3.20 | 1.20 | 50,700 | 427,000 | 2,420,000 |
| Ex.32 | 19.8 | 0.49 | 1.37 | 2.27 | 48,200 | 614,000 | 3,760,000 |

| | Mw/Mn | Mz/Mw | Tmf (°C) | Tm[1] (°C) | | Tc (°C) | ΔH[2] (1st-Cool) (J/g) | ΔH[3] (2nd-Heat) (J/g) |
|---|---|---|---|---|---|---|---|---|
| Ex.1 | 10.64 | 4.85 | 172.08 | 163.92 | | 112.60 | 86.46 | 84.2 |
| Ex.2 | 11.99 | 5.51 | 172.60 | 162.17 | | 112.20 | 89.06 | 79.9 |
| Ex.3 | 10.17 | 5.18 | 171.64 | 162.58 | | 112.33 | 88.45 | 77.7 |
| Ex.4 | 13.57 | 4.48 | 172.38 | 165.02 | | 114.85 | 90.56 | 80.1 |
| Ex.5 | 11 | 4.24 | 172.56 | 164.69 | | 115.69 | 88.40 | 75.8 |
| Ex.6 | 11.3 | 4.3 | 172.60 | 165.00 | | 115.00 | 88.61 | 80.9 |
| Ex.7 | 11.25 | 4.41 | 172.33 | 165.39 | | 114.08 | 94.15 | 83.4 |
| Ex.8 | 13.53 | 5.28 | 172.44 | 163.81 | | 111.57 | 88.34 | 82.4 |
| Ex.9 | 12.26 | 4.59 | 172.89 | 164.72 | | 111.49 | 88.20 | 80.1 |
| Ex.10 | 12.52 | 4.62 | 172.46 | 164.80 | | 110.74 | 90.94 | 82.1 |
| Ex.11 | 11.24 | 5.29 | 171.31 | 161.80 | | 113.21 | 87.46 | 77.2 |
| Ex.12 | 11.6 | 7.15 | 170.28 | 158.93 | 164.79 | 110.68 | 80.68 | 68.0 |
| Ex.13 | 8.76 | 6.16 | 169.41 | 158.5 | 164.46 | 112.36 | 83.93 | 71.3 |
| Ex.14 | 13.1 | 5.21 | 171.94 | 162.93 | 166.43 | 112.27 | 90.01 | 78.3 |
| Ex.15 | 7.88 | 8.21 | 169.7 | 158.79 | 165.22 | 109.97 | 83.95 | 72.0 |
| Comp. Ex.1 | 7.27 | 6.25 | 169.29 | 156.65 | 163.77 | 111.02 | 79.67 | 70.4 |
| Comp. Ex.2 | 8.24 | 6.04 | 169.34 | 157.42 | 163.59 | 111.17 | 80.88 | 73.1 |
| Comp. Ex.3 | 9.01 | 6.94 | 169.79 | 160.85 | | 115.61 | 85.11 | 81.1 |
| Comp. Ex.4 | 8.35 | 5.67 | 169.77 | 157.99 | 164.46 | 111.66 | 76.33 | 66.9 |
| Comp. Ex.5 | 9.17 | 6.24 | 169.75 | 158.99 | 164.86 | 113.25 | 82.00 | 70.0 |
| Ex.16 | 11.27 | 5.23 | 172.14 | 163.42 | | 113 | 99.87 | 83.4 |
| Ex.17 | 12.23 | 5.5 | 172.68 | 163.53 | | 111.9 | 88.76 | 83.1 |
| Ex.18 | 9.66 | 5.83 | 171.06 | 161.72 | 164.15 | 111.15 | 88.02 | 88.7 |
| Ex.19 | 12.2 | 5.6 | 171.01 | 162.25 | | 114.1 | 85.43 | 76.6 |
| Ex.20 | 10.82 | 4.35 | 171.95 | 163.3 | | 116.72 | 88.57 | 83.7 |
| Ex.21 | 10.37 | 4.98 | 171.77 | 163.21 | | 113.73 | 88.82 | 85.7 |
| Ex.22 | 11.58 | 5.02 | 172.66 | 164.05 | | 113.82 | 88.6 | 82.0 |
| Ex.23 | 9.96 | 4.82 | 172.84 | 163.54 | | 112.73 | 88.8 | 77.7 |
| Ex.24 | 8.01 | 7.65 | 170.1 | 160.2 | | 112.7 | 96.3 | 98.3 |
| Ex.25 | 7.13 | 4.67 | 170.2 | 160.1 | | 111.4 | 98.2 | 105.2 |
| Ex.26 | 6.44 | 5.33 | 169.6 | 159.0 | 152.0 (144.5) | 111.1 | 95.4 | 92.2 |
| Ex.27 | 6.04 | 4.34 | 170.0 | 159.8 | | 113.9 | 95.1 | 101.7 |
| Ex.28 | 6.49 | 5.78 | 169.4 | 160.6 | | 111.0 | 95.6 | 101.1 |
| Ex.29 | 10.1 | 7.19 | 170.5 | 160.7 | | 114.3 | 92.1 | 96.2 |
| Ex.30 | 8.6 | 6.85 | 172.1 | 162.9 | | 115.5 | 106.4 | 112.4 |
| Ex.31 | 8.42 | 5.67 | 171.5 | 161.9 | | 111.5 | 97.4 | 92.5 |
| Ex.32 | 12.74 | 6.12 | 171.5 | 162.9 | | 112.9 | 94.6 | 93.2 |

In Table 1, the meanings of [1] to [3] are as follows:

[1] Left: main melting point peak, right: sub melting point peak

[2] Amount of heat generated during cooling in DSC measurement (index of crystallization energy)

[3] Amount of heat absorbed during second heating (10° C./min) in DSC measurement (index of heat of fusion)

Table 2 below shows the results of an experiment corresponding to the contents of item (14) of the Solution to Problem.

TABLE 2

| | MFR (g/10 min) | Amount of decane-soluble component (%) | Mn | Mw | Mz | Mw/Mn | Mz/Mw |
|---|---|---|---|---|---|---|---|
| Ex. 1 | 0.57 | 1.87 | 72,300 | 769,000 | 3,730,000 | 10.64 | 4.85 |
| Ex.2 | 0.74 | 1.75 | 61,200 | 734,000 | 4,050,000 | 11.99 | 5.51 |
| Ex.3 | 0.91 | 2.25 | 63,000 | 641,000 | 3,320,000 | 10.17 | 5.18 |
| Ex.4 | 0.15 | 0.68 | 87,100 | 1,180,000 | 5,290,000 | 13.57 | 4.48 |
| Ex.5 | 0.32 | 0.85 | 78,800 | 867,000 | 3,680,000 | 11 | 4.24 |
| Ex.6 | 0.27 | 1.07 | 79,500 | 898,000 | 3,870,000 | 11.3 | 4.3 |
| Ex.7 | 0.45 | 0.67 | 79,600 | 896,000 | 3,950,000 | 11.25 | 4.41 |
| Ex.8 | 0.55 | 1.05 | 69,100 | 935,000 | 4,930,000 | 13.53 | 5.28 |
| Ex.9 | 0.22 | 0.84 | 90,200 | 1,110,000 | 5,070,000 | 12.26 | 4.59 |
| Ex.10 | 0.19 | 0.98 | 86,000 | 1,080,000 | 4,970,000 | 12.52 | 4.62 |
| Ex.11 | 0.90 | 1.60 | 61,200 | 688,000 | 3,640,000 | 11.24 | 5.29 |
| Ex.14 | 0.61 | 2.22 | 57,300 | 751,000 | 3,910,000 | 13.1 | 5.21 |
| Comp.Ex.1 | 23.58 | 9.25 | 31,100 | 226,000 | 1,410,000 | 7.27 | 6.25 |
| Comp.Ex.2 | 13.58 | 8.71 | 33,300 | 275,000 | 1,660,000 | 8.24 | 6.04 |
| Comp.Ex.3 | 8.20 | 6.32 | 37,400 | 337,000 | 2,340,000 | 9.01 | 6.94 |
| Comp.Ex.4 | 10.60 | 6.63 | 34,900 | 292,000 | 1,650,000 | 8.35 | 5.67 |
| Comp.Ex.5 | 6.90 | 5.97 | 36,900 | 339,000 | 2,110,000 | 9.17 | 6.24 |
| Ex.16 | 0.39 | 1.23 | 78,900 | 890,000 | 4,650,000 | 11.27 | 5.23 |
| Ex.17 | 0.67 | 0.72 | 60,400 | 738,000 | 4,060,000 | 12.23 | 5.5 |
| Ex.18 | 2.71 | 1.50 | 49,700 | 480,000 | 2,800,000 | 9.66 | 5.83 |
| Ex.19 | 1.12 | 3.05 | 55,600 | 678,000 | 3,800,000 | 12.2 | 5.6 |
| Ex.20 | 0.68 | 1.43 | 60,700 | 657,000 | 2,860,000 | 10.82 | 4.35 |
| Ex.21 | 0.68 | 1.53 | 73,200 | 759,000 | 3,780,000 | 10.37 | 4.98 |
| Ex.22 | 0.59 | 1.18 | 70,200 | 813,000 | 4,080,000 | 11.58 | 5.02 |
| Ex.23 | 0.69 | 1.20 | 68,200 | 679,000 | 3,270,000 | 9.96 | 4.82 |
| Ex.24 | 8.15 | 2.43 | 41,500 | 333,000 | 2,540,000 | 8.01 | 7.65 |
| Ex.25 | 5.66 | 1.55 | 48,200 | 344,000 | 1,610,000 | 7.13 | 4.67 |
| Ex.26 | 12.44 | 2.00 | 42,800 | 276,000 | 1,470,000 | 6.44 | 5.33 |
| Ex.27 | 9.91 | 2.22 | 47,300 | 285,000 | 1,240,000 | 6.04 | 4.34 |
| Ex.28 | 15.84 | 2.48 | 40,600 | 263,000 | 1,520,000 | 6.49 | 5.78 |
| Ex.31 | 3.20 | 1.20 | 50,700 | 427,000 | 2,420,000 | 8.42 | 5.67 |
| Ex.32 | 1.37 | 2.27 | 48,200 | 614,000 | 3,760,000 | 12.74 | 6.12 |

| | ΔMWD[4)] | C10sol. −4/3 × log(MFR) | Tm-maxv/° C. | Tm-maxt/° C. | Tmf (° C.) |
|---|---|---|---|---|---|
| Ex. 1 | 5.79 | 2.20 | 170.9 | 169.5 | 172.08 |
| Ex.2 | 6.48 | 1.93 | 170.0 | 168.7 | 172.60 |
| Ex.3 | 4.99 | 2.30 | 170.2 | 169.27 | 171.64 |
| Ex.4 | 9.09 | 1.71 | 171.0 | 169.6 | 172.38 |
| Ex.5 | 6.76 | 1.58 | 170.5 | 169.2 | 172.56 |
| Ex.6 | 7.00 | 1.83 | 171.3 | 169.8 | 172.60 |
| Ex.7 | 6.84 | 1.13 | 171.4 | 169.8 | 172.33 |
| Ex.8 | 8.25 | 1.40 | 170.5 | 169.5 | 172.44 |
| Ex.9 | 7.67 | 1.72 | 170.7 | 169.7 | 172.89 |
| Ex.10 | 7.90 | 1.94 | 171.4 | 170.1 | 172.46 |
| Ex.11 | 5.95 | 1.66 | 169.3 | 168.6 | 171.31 |
| Ex.14 | 7.89 | 2.51 | 170.5 | 169.2 | 171.94 |
| Comp.Ex.1 | 1.02 | 7.42 | 168.6 | 167.3 | 169.29 |
| Comp.Ex.2 | 2.20 | 7.20 | 168.3 | 167.4 | 169.34 |
| Comp.Ex.3 | 2.07 | 5.10 | 170.0 | 168.3 | 169.79 |
| Comp.Ex.4 | 2.68 | 5.26 | 168.6 | 167.5 | 169.77 |
| Comp.Ex.5 | 2.93 | 4.85 | 168.1 | 167.6 | 169.75 |
| Ex.16 | 6.04 | 1.77 | 170.4 | 169.1 | 172.14 |
| Ex.17 | 6.73 | 0.95 | 171.4 | 169.7 | 172.68 |
| Ex.18 | 3.83 | 0.92 | 171.0 | 169.7 | 171.06 |
| Ex.19 | 6.60 | 2.99 | 169.5 | 168.9 | 171.01 |
| Ex.20 | 6.47 | 2.99 | 169.0 | 166.7 | 171.95 |
| Ex.21 | 5.39 | 1.65 | 169.5 | 168.1 | 171.77 |
| Ex.22 | 6.56 | 1.76 | 170.7 | 169.3 | 172.66 |
| Ex.23 | 5.14 | 1.42 | 171.0 | 169.6 | 172.84 |
| Ex.24 | 0.36 | 1.22 | 170.0 | 168.3 | 170.1 |
| Ex.25 | 2.46 | 0.55 | 170.0 | 167.7 | 170.2 |
| Ex.26 | 1.11 | 0.54 | 169.5 | 168.0 | 169.6 |
| Ex.27 | 1.70 | 0.89 | 169.0 | 168.7 | 170.0 |

TABLE 2-continued

| | | | | | |
|---|---|---|---|---|---|
| Ex.28 | 0.71 | 0.88 | 171.0 | 168.8 | 169.4 |
| Ex.31 | 2.75 | 0.53 | 169.5 | 169.4 | 171.5 |
| Ex.32 | 6.62 | 2.09 | 171.4 | 169.8 | 171.5 |

| | Tm[1] (° C.) | | Tc (° C.) | ΔH[2] (1st-Cool) (J/g) | ΔH[3] (2nd-Heat) (J/g) |
|---|---|---|---|---|---|
| Ex. 1 | 163.92 | | 112.60 | 86.46 | 84.2 |
| Ex.2 | 162.17 | | 112.20 | 89.06 | 79.9 |
| Ex.3 | 162.58 | | 112.33 | 88.45 | 77.7 |
| Ex.4 | 165.02 | | 114.85 | 90.56 | 80.1 |
| Ex.5 | 164.69 | | 115.69 | 88.40 | 75.8 |
| Ex.6 | 165.00 | | 115.00 | 88.61 | 80.9 |
| Ex.7 | 165.39 | | 114.08 | 94.15 | 83.4 |
| Ex.8 | 163.81 | | 111.57 | 88.34 | 82.4 |
| Ex.9 | 164.72 | | 111.49 | 88.20 | 80.1 |
| Ex.10 | 164.80 | | 110.74 | 90.94 | 82.1 |
| Ex.11 | 161.80 | | 113.21 | 87.46 | 77.2 |
| Ex.14 | 162.93 | 166.43 | 112.27 | 90.01 | 78.3 |
| Comp. Ex.1 | 156.65 | 163.77 | 111.02 | 79.67 | 70.4 |
| Comp. Ex.2 | 157.42 | 163.59 | 111.17 | 80.88 | 73.1 |
| Comp. Ex.3 | 160.85 | | 115.61 | 85.11 | 81.1 |
| Comp. Ex.4 | 157.99 | 164.46 | 111.66 | 76.33 | 66.9 |
| Comp. Ex.5 | 158.99 | 164.86 | 113.25 | 82.00 | 70.0 |
| Ex.16 | 163.42 | | 113 | 99.87 | 83.4 |
| Ex.17 | 163.53 | | 111.9 | 88.76 | 83.1 |
| Ex.18 | 161.72 | 164.15 | 111.15 | 88.02 | 88.7 |
| Ex.19 | 162.25 | | 114.1 | 85.43 | 76.6 |
| Ex.20 | 163.3 | | 116.72 | 88.57 | 83.7 |
| Ex.21 | 163.21 | | 113.73 | 88.82 | 85.7 |
| Ex.22 | 164.05 | | 113.82 | 88.6 | 82.0 |
| Ex.23 | 163.54 | | 112.73 | 88.8 | 77.7 |
| Ex.24 | 160.2 | | 112.7 | 96.3 | 98.3 |
| Ex.25 | 160.1 | | 111.4 | 98.2 | 105.2 |
| Ex.26 | 159.0 | 152.0 (144.5) | 111.1 | 95.4 | 92.2 |
| Ex.27 | 159.8 | | 113.9 | 95.1 | 101.7 |
| Ex.28 | 160.6 | | 111.0 | 95.6 | 101.1 |
| Ex.31 | 161.9 | | 111.5 | 97.4 | 92.5 |
| Ex.32 | 162.9 | | 112.9 | 94.6 | 93.2 |

In Table 2, the meanings of [1] to [4] are as follows:
[1] Left: main melting point peak, right: sub melting point peak
[2] Amount of heat generated during cooling in DSC measurement (index of crystallization energy)
[3] Amount of heat adsorbed during second heating (10° C./min) in DSC measurement (index of heat of fusion)
[4] Value of (Mw/Mn) − (Mz/Mw)

Example 33

<Polymerization>
Polymerization of propylene was performed in the same manner as Example 7, except that the solid titanium catalyst component [α7] was changed from 0.0032 mmol (in terms of titanium atom) to 0.0024 mmol (in terms of titanium atom), the amount of triethylaluminum used was changed from 0.4 mmol to 0.3 mmol, and cyclohexylmethyldimethoxysilane was not used. Results were as follows.
Polymerization activity: 123.1 kg/g-catalyst
MFR: 2.4 g/10 min
Decane-soluble component content: 8.33 wt %
As shown above, it can be understood that the catalyst for olefin polymerization containing the solid titanium catalyst component of the present invention is also capable of regulating the stereoregularity of the resulting polymer without deterioration of polymerization activity resulting from polymerization conditions.

The invention claimed is:
1. A solid titanium catalyst component (I) comprising titanium, magnesium, halogen, and a cyclic multiple-ester-group-containing compound (a) represented by the following formula (1):

[Chem. 1]

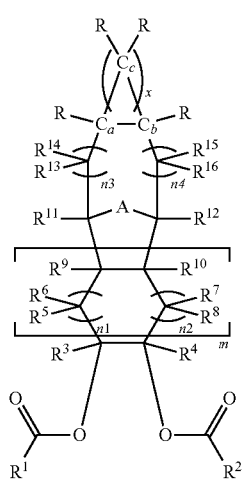

(1)

wherein n1 to n4 are each independently an integer of 0 to 2, m is 0 or 1, and x is an integer of 0 to 10, with a relationship of m+x≥1 being satisfied;

$R^1$ and $R^2$ are each independently a substituted or unsubstituted hydrocarbon group having 1 to 20 carbon atoms; $R^3$ to $R^{16}$ and R are each independently a hydrogen atom, a substituted or unsubstituted hydrocarbon group having 1 to 20 carbon atoms, or a halogen atom; a hydrogen atom, a carbon atom, or both, of $R^1$ to $R^{16}$ and R are optionally replaced by at least one atom selected from the group consisting of a nitrogen atom, an oxygen atom, a phosphorus atom, a halogen atom, and a silicon atom; and two or more selected from $R^3$ to $R^{16}$ and R are optionally bonded to one another to form a monocyclic or polycyclic ring, and adjacent substituents are optionally directly bonded to form a multiple bond;

$C_a$, $C_b$, and $C_c$ are carbon atoms, and in a carbon-carbon bond of a cyclic structure formed of $C_a$, $C_b$, and $C_c$, R bonded to adjacent carbon are optionally directly bonded to one another to form a multiple bond; and A is a single bond or a divalent linking group having a chain with a length of 1 to 3 atoms between two free radicals, wherein any two or more of $R_3$-$R_{10}$ may be absent on adjacent carbon atoms, and a bond between adjacent carbon atoms where two or more of $R_3$-$R_{10}$ are absent may comprise a double carbon-carbon bond or a triple carbon-carbon bond; and wherein R may be absent on any two or more of adjacent carbon atoms, and a bond between adjacent carbon atoms where R is absent may comprise a double carbon-carbon bond or a triple carbon-carbon bond.

2. The solid titanium catalyst component (I) according to claim 1, wherein in the formula (1), a moiety in which two or more selected from $R^3$ to $R^{16}$ and R are bonded to one another to form a monocyclic or polycyclic ring is a structure containing a carbon-carbon double bond.

3. The solid titanium catalyst component (I) according to claim 1, wherein in the formula (1), a moiety in which two or more selected from $R^3$ to $R^{16}$ and R are bonded to one another to form a monocyclic or polycyclic ring further contains a monocyclic or polycyclic structure.

4. The solid titanium catalyst component (I) according to claim 1, wherein A is a divalent group selected from the following general formula group (2):

[Chem. 2]

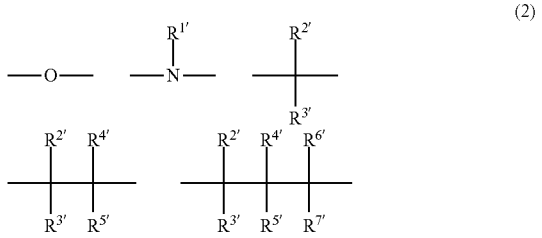

(2)

wherein $R^{1'}$ to $R^{7'}$ each independently represent a hydrogen atom, a substituted or unsubstituted alkyl group, a substituted or unsubstituted cycloalkyl group, a substituted or unsubstituted aryl group, or a substituted or unsubstituted heteroaryl group; and $R^{2'}$ to $R^{7'}$ are optionally bonded to one another to form a monocyclic or polycyclic ring, or adjacent substituents are optionally directly bonded to each other to form a multiple bond.

5. The solid titanium catalyst component (I) according to claim 1, wherein x is 2 to 6.

6. The solid titanium catalyst component (I) according to claim 1, wherein n1 and n2 are 1.

7. The solid titanium catalyst component (I) according to claim 1, wherein n3 and n4 are 0.

8. The solid titanium catalyst component (I) according to claim 1, wherein $R^1$ and $R^2$ are a substituted or unsubstituted alkyl group, a substituted or unsubstituted alkenyl group, a substituted or unsubstituted cycloalkyl group, a substituted or unsubstituted aryl group, or a substituted or unsubstituted heteroaryl group.

9. The solid titanium catalyst component (I) according to claim 1, wherein $R^3$ to $R^{16}$ are each independently a hydrogen atom, a substituted or unsubstituted alkyl group, a substituted or unsubstituted alkenyl group, a substituted or unsubstituted cycloalkyl group, a substituted or unsubstituted cycloalkenyl group, a substituted or unsubstituted alkoxy group, a substituted or unsubstituted alkenyloxy group, a substituted or unsubstituted cycloalkyloxy group, a substituted or unsubstituted cycloalkenyloxy group, a substituted or unsubstituted aryl group, a substituted or unsubstituted aryloxy group, a substituted or unsubstituted heteroaryl group, or a substituted or unsubstituted heteroaryloxy group.

10. The solid titanium catalyst component (I) according to claim 1, wherein R is each independently a hydrogen atom, a substituted or unsubstituted alkyl group, a substituted or unsubstituted alkenyl group, a substituted or unsubstituted cycloalkyl group, a substituted or unsubstituted cycloalkenyl group, a substituted or unsubstituted alkoxy group, a substituted or unsubstituted alkenyloxy group, a substituted or unsubstituted cycloalkyloxy group, a substituted or unsubstituted cycloalkenyloxy group, a substituted or unsubstituted aryl group, a substituted or unsubstituted aryloxy group, a substituted or unsubstituted heteroaryl group, or a substituted or unsubstituted heteroaryloxy group.

11. A catalyst for olefin polymerization, comprising: the solid titanium catalyst component (I) according to claim 1; and an organometallic compound catalyst component (II) comprising a metal element selected from Group 1, Group 2, and Group 13 of the periodic table.

12. The catalyst for olefin polymerization according to claim 11, further comprising an electron donor (III).

13. An olefin polymerization method, comprising polymerizing an olefin in the presence of the catalyst for olefin polymerization according to claim 11.

* * * * *